US012101476B2

(12) United States Patent
Lim et al.

(10) Patent No.: US 12,101,476 B2
(45) Date of Patent: Sep. 24, 2024

(54) ADAPTIVE IN-LOOP FILTERING METHOD AND DEVICE

(71) Applicant: Electronics and Telecommunications Research Institute, Daejeon (KR)

(72) Inventors: Sung Chang Lim, Daejeon (KR); Jung Won Kang, Daejeon (KR); Soo Woong Kim, Sejong (KR); Gun Bang, Daejeon (KR); Jin Ho Lee, Daejeon (KR); Ha Hyun Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 56 days.

(21) Appl. No.: 17/778,351

(22) PCT Filed: Nov. 23, 2020

(86) PCT No.: PCT/KR2020/016558
§ 371 (c)(1),
(2) Date: May 19, 2022

(87) PCT Pub. No.: WO2021/101345
PCT Pub. Date: May 27, 2021

(65) Prior Publication Data
US 2022/0408085 A1 Dec. 22, 2022

(30) Foreign Application Priority Data
Nov. 22, 2019 (KR) .................. 10-2019-0151653

(51) Int. Cl.
*H04N 19/117* (2014.01)
*H04N 19/172* (2014.01)
(Continued)

(52) U.S. Cl.
CPC ......... *H04N 19/117* (2014.11); *H04N 19/172* (2014.11); *H04N 19/176* (2014.11);
(Continued)

(58) Field of Classification Search
None
See application file for complete search history.

(56) References Cited

U.S. PATENT DOCUMENTS

2021/0084340 A1* 3/2021 Li ..................... H04N 19/176
2021/0152841 A1* 5/2021 Hu ..................... H04N 19/186
2022/0345698 A1* 10/2022 Misra ................. H04N 19/176

FOREIGN PATENT DOCUMENTS

CN 103891293 A 6/2014
CN 106028050 A 10/2016
(Continued)

OTHER PUBLICATIONS

Jonathon Taquet et al., NON-CE5 : CCALF design simplifications, Joint Video Experts Team (JVET) of ITU-T SG 16 WP 3 and ISO/IEC JTC 1/SC 29/WG 11, Document: JVET-P0331, 16th Meeting: Geneva, CH, Oct. 1-11, 2019, Canon.
(Continued)

*Primary Examiner* — Talha M Nawaz
(74) *Attorney, Agent, or Firm* — BROADVIEW IP LAW, PC

(57) ABSTRACT

The present invention relates to a video decoding method, according to embodiment of the invention, image decoding method comprises, acquiring a reconstructed luma block of a current block, determining whether a cross-component adaptive loop filter is applied to the current block, acquiring a reconstructed chroma block of the current block, to which an adaptive loop filter is applied, when the cross-component adaptive loop filter is applied to the current block and acquiring a final reconstructed chroma block of the current block, to which the cross-component loop filter is applied, using the reconstructed luma block and the reconstructed chroma block, to which the adaptive loop filter is applied.

12 Claims, 60 Drawing Sheets

(51) Int. Cl.
  *H04N 19/176* (2014.01)
  *H04N 19/186* (2014.01)
  *H04N 19/70* (2014.01)
  *H04N 19/82* (2014.01)
(52) U.S. Cl.
  CPC .......... *H04N 19/186* (2014.11); *H04N 19/70* (2014.11); *H04N 19/82* (2014.11)

(56) References Cited

FOREIGN PATENT DOCUMENTS

| KR | 100772576 B1 | 11/2007 |
|---|---|---|
| KR | 1020180019549 A | 2/2018 |
| KR | 1020190042579 A | 4/2019 |
| KR | 1020190062302 A | 6/2019 |

OTHER PUBLICATIONS

Junghak Nam et al., CE5-related: Cleanup on cross-component adaptive loop filter, Joint Video Experts Team (JVET) of ITU-T SG 16 WP 3 and ISO/IEC JTC 1/SC 29/WG 11, Document: JVET-P0543-v2, 16th Meeting: Geneva, CH, Oct. 1-11, 2019, LG Electronics Inc.

Misra, Kiran et al. "Cross-Component Adaptive Loop Filter for chroma", 15. JVET Meeting; Jul. 3, 2019-Jul. 12, 2019; Gothenburg; (The Joint Video Exploration Team of ISO/IEC JTC1/SC29/WG11 and ITU-T SG.16), No. JVET-O0636; m48779, Jul. 7, 2019 (Jul. 7, 2019), pp. 1-9, XP030220123.

Misra, Kiran et al. "Cross-Component Adaptive Loop Filter for chroma", 15. JVET Meeting; Jul. 3, 2019-Jul. 12, 2019; Gothenburg; (The Joint Video Exploration Team of ISO/IEC JTC1/SC29/WG11 and ITU-T SG.16), No. JVET-O0636_r1; m48779, Jul. 7, 2019 (Jul. 7, 2019), XP030220122.

Misra, Kiran et al. "On Cross Component Adaptive Loop Filter for Video Compression", 2019 Picture Coding Symposium (PCS), IEEE, Nov. 12, 2019 (Nov. 12, 2019), pp. 1-5, XP033688175.

Zhao, Yin et al. "CE5-related: Simplified CCALF with 6 filter coefficients", 16. JVET Meeting; Oct. 1, 2019-Oct. 11, 2019; Geneva; (The Joint Video Exploration Team of ISO/IEC JTC1/SC29/WG11 and ITU-T SG.16), No. JVET-P0251-v3; m50215, Oct. 8, 2019 (Oct. 8, 2019), XP030216691.

Zhao, Yin et al. "CE5-related: Simplified CCALF with 6 filter coefficients", Joint Video Experts Team (JVET) of ITU-T SG 16 WP 3 and ISO/IEC JTC 1/SC 29/WG 11, JVET-P0251-v3. Oct. 2019.

Misra, Kiran et al. "Cross-Component Adaptive Loop Filter for chroma", Joint Video Experts Team (JVET) of Itu-T SG 16 WP 3 and ISO/IEC JTC 1/SC 29/WG 11, JVET-O0636_r1. Jul. 2019.

* cited by examiner

FIG. 9
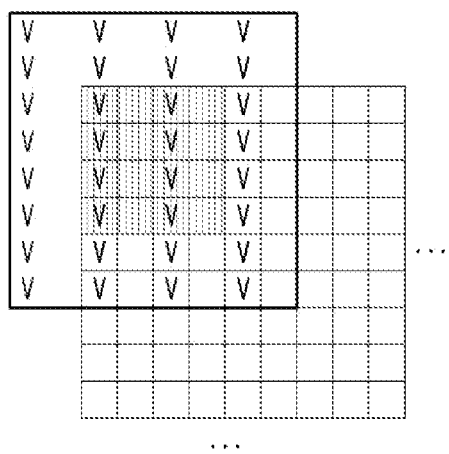
(a) calculation of vertical gradient V
on the basis of subsampling
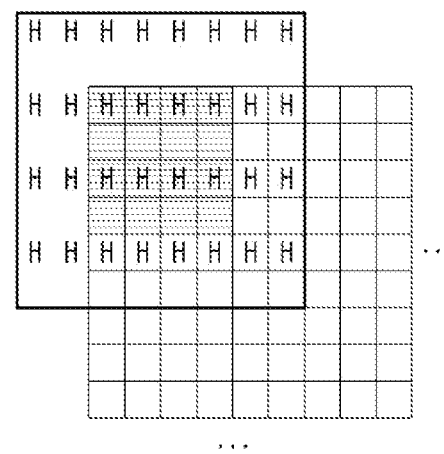
(b) calculation of horizontal gradient H
on the basis of subsampling
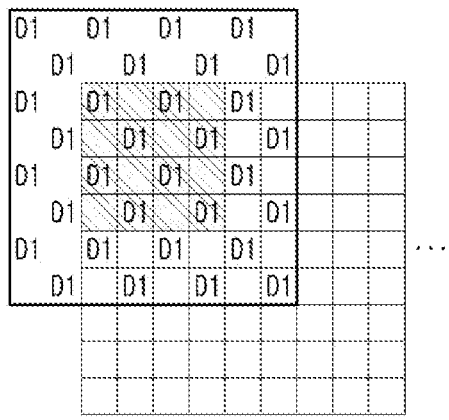
(c) calculation of first diagonal gradient D1
on the basis of subsampling
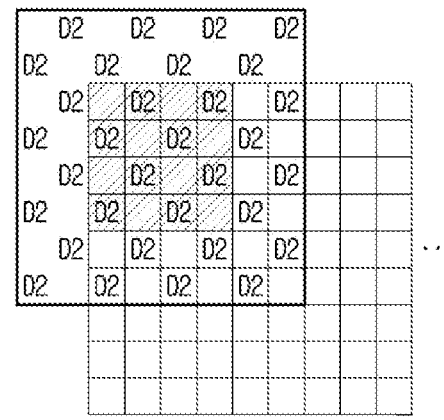
(d) calculation of second diagonal gradient D2
on the basis of subsampling FIG. 10
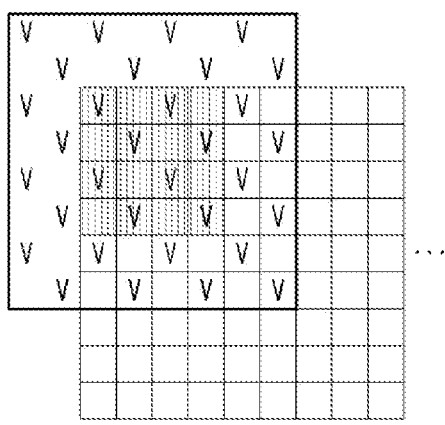
(a) calculation of vertical gradient V on the basis of subsampling
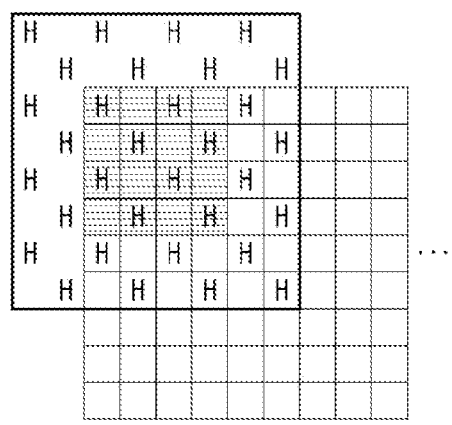
(b) calculation of horizontal gradient H on the basis of subsampling
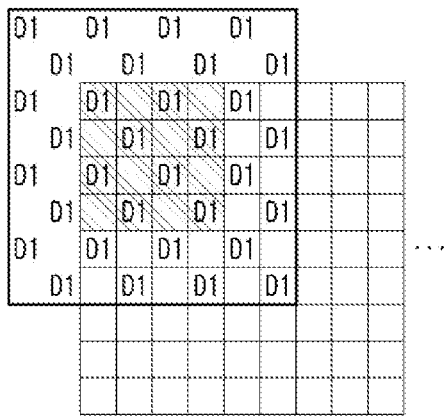
(c) calculation of first diagonal gradient D1 on the basis of subsampling
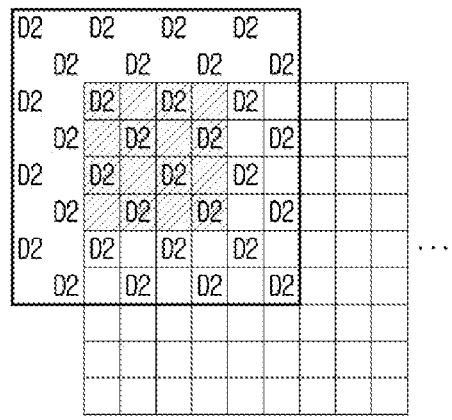
(d) calculation of second diagonal gradient D2 on the basis of subsampling

FIG. 11

(a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling FIG. 12
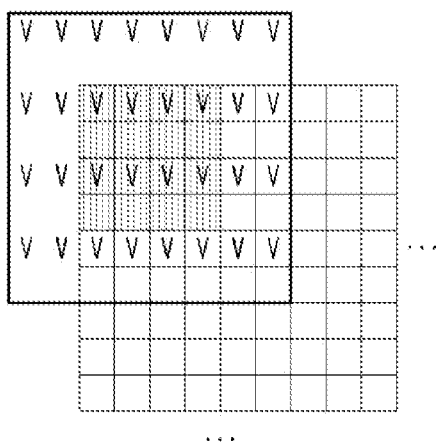
(a) calculation of vertical gradient V on the basis of subsampling
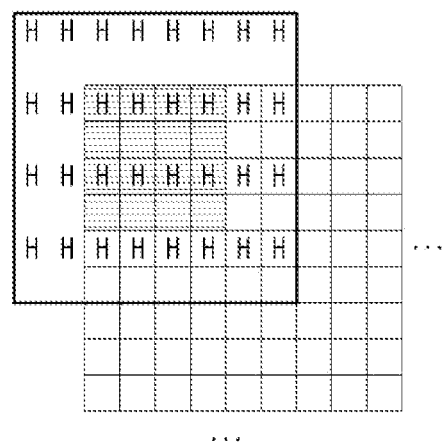
(b) calculation of horizontal gradient H on the basis of subsampling
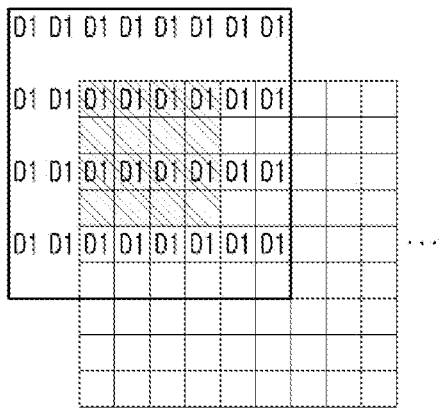
(c) calculation of first diagonal gradient D1 on the basis of subsampling
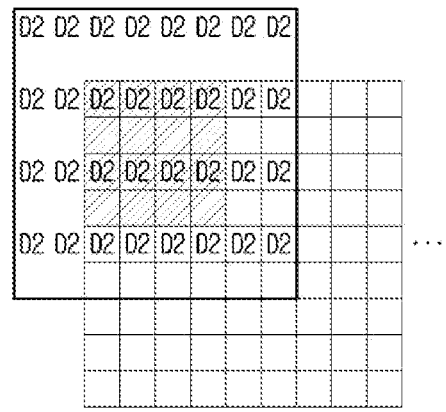
(d) calculation of second diagonal gradient D2 on the basis of subsampling FIG. 13
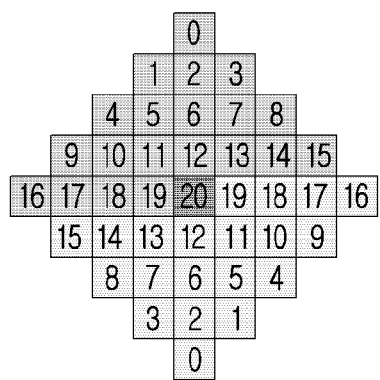
(a) 9x9 rhombic filter
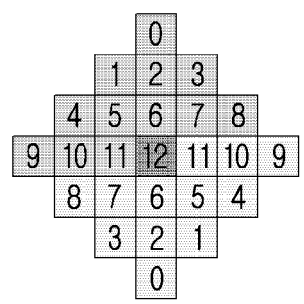
(b) 7x7 rhombic filter
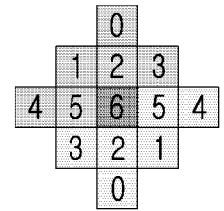
(c) 5x5 rhombic filter (a) 5x5 square filter (b) 5x5 octagonal filter (c) 5x5 snowflake-shaped filter (d) 5x5 rhombic filter FIG. 15a
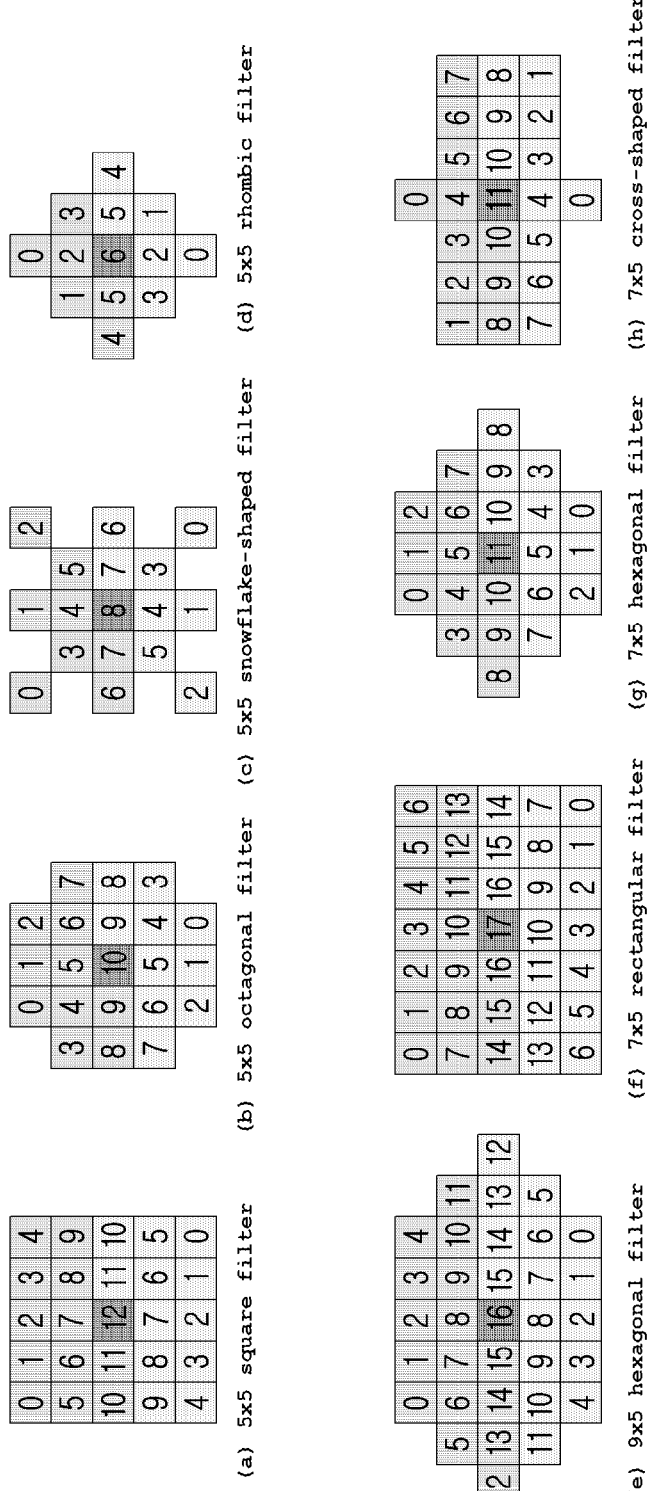
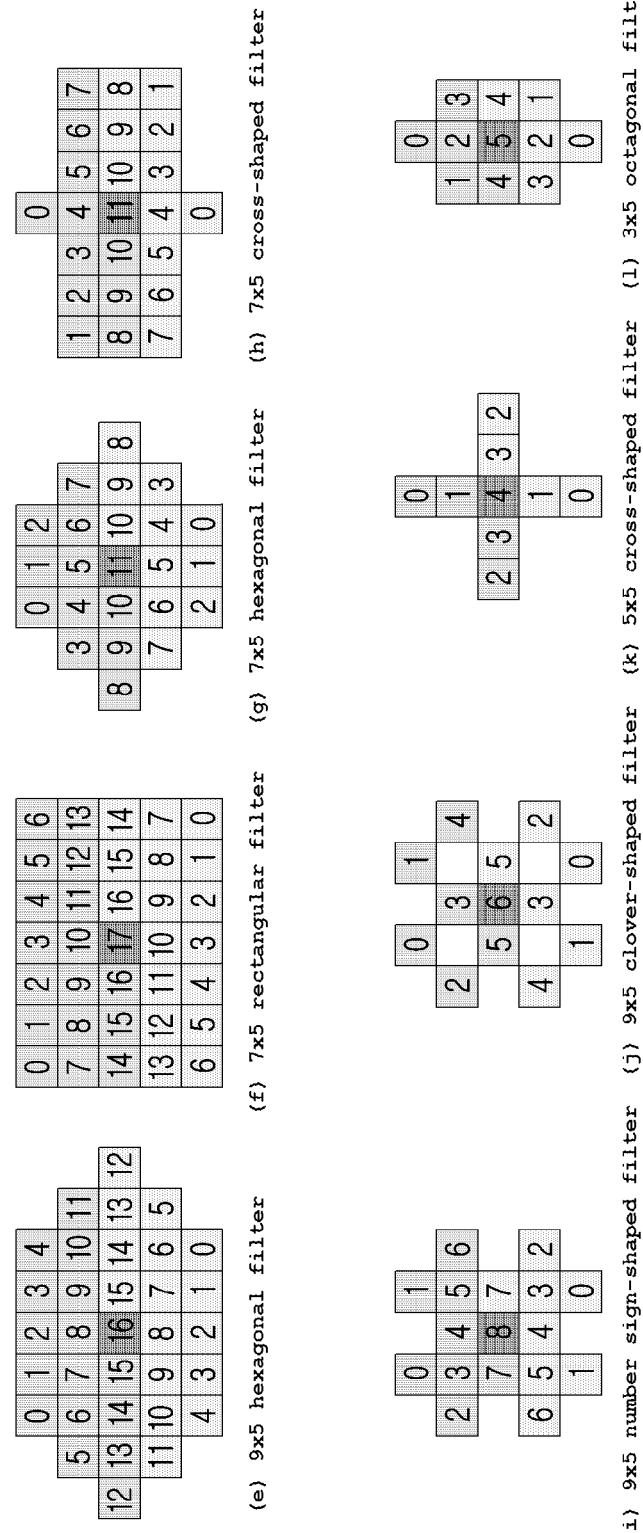

| seq_parameter_set_rbsp( ) { | Descriptor |
|---|---|
| sps_alf_enabled_flag | u(1) |

FIG. 17

| adaptation_parameter_set_rbsp() { | Descriptor |
|---|---|
| adaptation_parameter_set_id | u(5) |
| aps_params_type | u(3) |
| if( aps_params_type == ALF_APS ) | |
| alf_data( adaptation_parameter_set_id ) | |
| else if( aps_params_type == LMCS_APS ) | |
| lmcs_data() | |
| else if( aps_params_type == SL_APS ) | |
| scaling_list_data() | |
| } | |

FIG. 18

| apa_params_type | apa_params_type name | Type of Adaptation Parameter |
|---|---|---|
| 0 | ALF_APS | ALF parameter (Adaptive In-loop Filter parameter) |
| 1 | LMCS_APS | LMCS parameter (Luma Mapping Chroma Scaling parameter) |
| 2 | SL_APS | SL parameter (Quantization matrix parameter) |
| 3..7 | Reserved | Reserved |

FIG. 19

| | Descriptor |
|---|---|
| slice_header( ) { | |
|   if( sps_alf_enabled_flag ) { | |
|     slice_alf_enabled_flag | u(1) |
|     if( slice_alf_enabled_flag ) { | |
|       slice_num_alf_aps_ids_luma | tb(v) |
|       for( i = 0; i < slice_num_alf_aps_ids_luma; i++ ) | |
|         slice_alf_aps_id_luma[ i ] | u(5) |
|       slice_alf_chroma_idc | tu(v) |
|       if( slice_alf_chroma_idc && ( slice_type != I \|\| slice_num_alf_aps_ids_luma != 1 ) ) | |
|         slice_alf_aps_id_chroma | u(5) |
|     } | |
|   } | |
| } | |

FIG. 20a

| | Descriptor |
|---|---|
| alf_data_adaptation_parameter_set_id ) { | |
| alf_luma_filter_signal_flag | u(1) |
| alf_chroma_filter_signal_flag | u(1) |
| if( alf_luma_filter_signal_flag ) { | |
| alf_luma_clip_flag | u(1) |
| alf_luma_num_filters_signalled_minus1 | tb(v) |
| if( alf_luma_num_filters_signalled_minus1 > 0 ) { | |
| for( filtIdx = 0; filtIdx < NumAlfFilters; filtIdx++ ) { | |
| alf_luma_coeff_delta_idx[ filtIdx ] | tb(v) |
| } | |
| alf_luma_use_fixed_filter_flag | u(1) |
| if( alf_luma_use_fixed_filter_flag ) { | |
| alf_luma_fixed_filter_set_idx | tb(v) |
| alf_luma_fixed_filter_pred_present_flag | u(1) |
| if( alf_luma_fixed_filter_pred_present_flag ) { | |
| for( i = 0; i < NumAlfFilters; i++ ) | |
| alf_luma_fixed_filter_pred_flag[ i ] | u(1) |
| } | |
| } | |

FIG. 20b

| | |
|---|---|
| alf_luma_coeff_delta_flag | u(1) |
| if( alf_luma_coeff_delta_flag && alf_luma_num_filters_signalled_minus1 > 0 ) | |
|   alf_luma_coeff_delta_prediction_flag | u(1) |
| alf_luma_min_eg_order_minus1 | ue(v) |
| for( i = 0; i < 3; i++ ) | |
|   alf_luma_eg_order_increase_flag[ i ] | u(1) |
| if( alf_luma_coeff_delta_flag ) { | |
|   for( sfIdx = 0; sfIdx <= alf_luma_num_filters_signalled_minus1; sfIdx++ ) | |
|     alf_luma_coeff_flag[ sfIdx ] | u(1) |
| } | |
| for( sfIdx = 0; sfIdx <= alf_luma_num_filters_signalled_minus1; sfIdx++ ) { | |
|   if( alf_luma_coeff_flag[ sfIdx ] ) { | |
|     for( j = 0; j < 12; j++ ) { | |
|       alf_luma_coeff_delta_abs[ sfIdx ][ j ] | uek(v) |
|       if( alf_luma_coeff_delta_abs[ sfIdx ][ j ] ) | |
|         alf_luma_coeff_delta_sign[ sfIdx ][ j ] | u(1) |
|     } | |
|   } | |
| } | |

FIG. 20C

| | |
|---|---|
| if( alf_luma_clip_flag ){ | |
| alf_luma_clip_min_eg_order_minus1 | ue(v) |
| for( i = 0; i < 3; i++ ) | |
| alf_luma_clip_eg_order_increase_flag[ i ] | u(1) |
| for( sfIdx = 0; sfIdx <= alf_luma_num_filters_signalled_minus1; sfIdx++ ){ | |
| if( alf_luma_coeff_flag[ sfIdx ] ){ | |
| for( j = 0; j < 12; j++ ){ | |
| if( filtCoeff[ sfIdx ][ j ] ) | |
| alf_luma_clip_idx[ sfIdx ][ j ] | uek(v) |
| } | |
| } | |
| } | |
| } | |

FIG. 20d

| | |
|---|---|
| if( alf_chroma_filter_signal_flag ) { | |
|   alf_chroma_clip_flag | u(1) |
|   alf_chroma_min_eg_order_minus1 | ue(v) |
|   for( i = 0; i < 2; i++ ) | |
|     alf_chroma_eg_order_increase_flag[ i ] | u(1) |
|   for( j = 0; j < 6; j++ ) { | |
|     alf_chroma_coeff_abs[ j ] | uek(v) |
|     if( alf_chroma_coeff_abs[ j ] > 0 ) | |
|       alf_chroma_coeff_sign[ j ] | u(1) |
|   } | |
|   if( alf_chroma_clip_flag ) { | |
|     alf_chroma_clip_min_eg_order_minus1 | ue(v) |
|     for( i = 0; i < 2; i++ ) | |
|       alf_chroma_clip_eg_order_increase_flag[ i ] | u(1) |
|     for( j = 0; j < 6; j++ ) | |
|       if( alf_chroma_coeff_abs[ j ] ) | |
|         alf_chroma_clip_idx[ j ] | uek(v) |
|   } | |
| } | |
| } | |

FIG. 21

| coding_tree_unit( ) { | Descriptor |
|---|---|
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| if( slice_sao_luma_flag \|\| slice_sao_chroma_flag ) | |
| sao( xCtb >> CtbLog2SizeY, yCtb >> CtbLog2SizeY ) | |
| if( slice_alf_enabled_flag ) { | |
| alf_ctb_flag[ 0 ][ xCtb >> Log2CtbSize ][ yCtb >> Log2CtbSize ] | ae(v) |
| if( alf_ctb_flag[ 0 ][ xCtb >> Log2CtbSize ][ yCtb >> Log2CtbSize ] ) { | |
| if( slice_num_alf_aps_ids_luma > 0) | |
| alf_ctb_use_first_aps_flag | ae(v) |
| if( !alf_ctb_use_first_aps_flag ) { | |
| if( slice_num_alf_aps_ids_luma > 1 ) | |
| alf_use_aps_flag | ae(v) |
| if( alf_use_aps_flag ) | |
| alf_luma_prev_filter_idx_minus1 | |
| else | |
| alf_luma_fixed_filter_idx | ae(v) |
| } | |
| } | |
| if( slice_alf_chroma_idc == 1 \|\| slice_alf_chroma_idc == 3 ) | |
| alf_ctb_flag[ 1 ][ xCtb >> Log2CtbSize ][ yCtb >> Log2CtbSize ] | ae(v) |
| if( slice_alf_chroma_idc == 2 \|\| slice_alf_chroma_idc == 3 ) | |
| alf_ctb_flag[ 2 ][ xCtb >> Log2CtbSize ][ yCtb >> Log2CtbSize ] | ae(v) |
| } | |
| if( slice_type == I && qtbtt_dual_tree_intra_flag ) | |
| dual_tree_implicit_qt_split ( xCtb, yCtb, CtbSizeY, 0 ) | |
| else | |
| coding_tree( xCtb, yCtb, CtbSizeY, CtbSizeY, 1, 0, 0, 0, 0, SINGLE_TREE ) | |
| } | |

FIG. 22a

```
AlfFixFilCoeff =
{
    {  0,   0,   2,  -3,   1,  -4,   1,   7,  -2,   1,  -1,   5}
    {  0,   0,   0,   0,   0,  -1,   0,   1,   0,   0,  -1,   2}
    {  0,   0,   0,   0,   0,   0,   0,   1,   0,   0,   0,   0}
    {  0,   0,   0,   0,   0,   0,   0,   0,   0,   0,  -1,   1}
    {  2,   2,  -7,  -3,   0,  -5,  13,  22,  12,  -3,  -3,  17}
    { -1,   0,   6,  -8,   1,  -5,   1,  23,   0,   2,  -5,  10}
    {  0,   0,  -1,  -1,   0,  -1,   2,   1,   0,   0,  -1,   4}
    {  0,   0,   3, -11,   1,   0,  -1,  25,   5,   2,  -9,   9}
    {  0,   0,   6,  -8,  -2,  -7,   4,   4,   2,   1,  -1,  25}
    {  0,   0,   1,  -1,   0,  -3,   1,   3,  -1,   1,  -1,   3}
    {  0,   0,   3,  -3,   0,  -6,   5,  -1,   2,   1,  -4,  21}
    { -7,   1,   5,   4,  -3,   5,  11,  13,  12,  -6,  11,  12}
    { -5,  -3,   6,  -2,  -3,   6,  14,  15,   2,  -7,  11,  16}
    {  2,  -1,  -6,  -5,  -2,  -2,  20,  14,  -4,   0,  -3,  25}
    {  3,   1,  -8,  -4,   0,  -8,  22,   5,  -3,   2, -10,  29}
    {  2,   1,  -7,  -1,   2, -11,  23,  -5,   0,   2, -10,  29}
    { -6,  -3,   8,   9,  -4,   6,   9,   7,  14,  -2,   8,   9}
    {  2,   1,  -4,  -7,   0,  -6,  17,  22,   1,  -1,  -4,  23}
    {  3,   0,  -5,  -7,   0,  -7,  15,  15,  -5,   0,  -5,  27}
    {  2,   0,   0,  -7,   1, -10,  13,  13,  -4,   2,  -7,  24}
    {  3,   3, -13,   4,  -2,  -5,   9,  21,  25,  -2,  -3,  12}
    { -5,  -2,   7,  -3,  -7,   9,   8,   9,  16,  -2,  15,  12}
    {  0,  -1,   0,  -7,  -5,   4,  11,  11,   8,  -6,  12,  21}
    {  3,  -2,  -3,  -6,  -4,  -1,  16,  15,  -2,  -3,   3,  26}
    {  2,   1,  -5,  -4,  -1,  -8,  16,   4,  -2,   1,  -7,  33}
    {  2,   1,  -4,  -2,   1, -10,  17,  -2,   0,   2, -11,  33}
    {  1,  -2,   7, -15, -16,  10,   8,   8,  20,  11,  14,  11}
    {  2,   2,   3, -13, -13,   4,   8,  12,   2,  -3,  16,  24}
    {  1,   4,   0,  -7,  -8,  -4,   9,   9,  -2,  -2,   8,  29}
    {  1,   1,   2,  -4,  -1,  -6,   6,   3,  -1,  -1,  -3,  30}
```

FIG. 24

| alf_data( adaptation_parameter_set_id ) { | Descriptor |
|---|---|
| ... | |
| if( alf_luma_clip_flag ) { | |
|   for( sfIdx = 0; sfIdx <= alf_luma_num_filters_signalled_minus1; sfIdx++ ) { | |
|     if( alf_luma_coeff_flag[ sfIdx ] ) { | |
|       for( j = 0; j < 12; j++ ) { | |
|         if( filtCoeff[ sfIdx ][ j ] ) | |
|           alf_luma_clip_idx[ sfIdx ][ j ] | u(2) |
|       } | |
|     } | |
|   } | |
| } | |
| if( alf_chroma_clip_flag ) { | |
|   for( j = 0; j < 6; j++ ) { | |
|     if( alf_chroma_coeff_abs[ j ] ) | |
|       alf_chroma_clip_idx[ j ] | u(2) |
|   } | |
| } | |
| ... | |

FIG. 25

7.4.6.3 Adaptive loop filter data semantics

...

alf_luma_clip_idx[ sfIdx ][ j ] specifies the clipping index of the clipping value to use before multiplying by the j-th coefficient of the signalled luma filter indicated by sfIdx. When alf_luma_clip_idx[ sfIdx ][ j ] is not present, it is inferred to be equal 0 (no clipping). It is a requirement of bitstream conformance that the values of alf_luma_clip_idx[ sfIdx ][ j ] with sfIdx = 0..alf_luma_num_filters_signalled_minus1 and j = 0..11 shall be in the range of 0 to 3, inclusive.

...

alf_chroma_clip_idx[ j ] specifies the clipping index of the clipping value to use before multiplying by the j-th coefficient of the chroma filter. When alf_chroma_clip_idx[ j ] is not present, it is inferred to be equal 0 (no clipping). It is a requirement of bitstream conformance that the values of alf_chroma_clip_idx[ j ] with j = 0..5 shall be in the range of 0 to 3, inclusive.

| | Descriptor |
|---|---|
| alf_data( adaptation_parameter_set_id ) { | |
|   if( alf_luma_clip_flag ) { | |
|   for( sfIdx = 0; sfIdx <= alf_luma_num_filters_signalled_minus1; sfIdx++ ) { | |
|     if( alf_luma_coeff_flag[ sfIdx ] ) { | |
|     for( j = 0; j < 12; j++ ) { | |
|       if( filtCoeff[ sfIdx ][ j ] ) | |
|         alf_luma_clip_idx[ sfIdx ][ j ] | tu(v) |
|     } | |
|   } | |
|   } | |
|   if( alf_chroma_clip_flag ) { | |
|     for( j = 0; j < 6; j++ ) { | |
|       if( alf_chroma_coeff_abs[ j ] ) | |
|         alf_chroma_clip_idx[ j ] | tu(v) |
|     } | |
|   } | |
| } | |

FIG. 27

7.4.6.3 Adaptive loop filter data semantics

...

alf_luma_clip_idx[ sfIdx ][ j ] specifies the clipping index of the clipping value to use before multiplying by the j-th coefficient of the signalled luma filter indicated by sfIdx. When alf_luma_clip_idx[ sfIdx ][ j ] is not present, it is inferred to be equal 0 (no clipping). It is a requirement of bitstream conformance that the values of alf_luma_clip_idx[ sfIdx ][ j ] with sfIdx = 0..alf_luma_num_filters_signalled_minus1 and j = 0..11 shall be in the range of 0 to 3, inclusive. The maximum value maxVal of the truncated unary binarization tu(v) is set equal to 3.

...

alf_chroma_clip_idx[ j ] specifies the clipping index of the clipping value to use before multiplying by the j-th coefficient of the chroma filter. When alf_chroma_clip_idx[ j ] is not present, it is inferred to be equal 0 (no clipping). It is a requirement of bitstream conformance that the values of alf_chroma_clip_idx[ j ] with j = 0..5 shall be in the range of 0 to 3, inclusive. The maximum value maxVal of the truncated unary binarization tu(v) is set equal to 3.

General slice header syntax

| | Descriptor |
|---|---|
| slice_header( ) { | |
| ... | |
| if( sps_alf_enabled_flag ) { | |
|   slice_alf_enabled_flag | u(1) |
|   if( slice_alf_enabled_flag ) { | |
|     slice_num_alf_aps_ids_luma | tb(v) |
|     for( i = 0; i < slice_num_alf_aps_ids_luma; i++ ) | |
|       slice_alf_aps_id_luma[ i ] | u(5) |
|     slice_alf_chroma_idc | tu(v) |
|     if( slice_alf_chroma_idc ) | |
|       slice_alf_aps_id_chroma | u(5) |
|     } | |
|   } | |
| ... | |
| } | |

FIG. 29a
Adaptive loop filter data syntax

| | Descriptor |
|---|---|
| alf_data(adaptation_parameter_set_id) { | |
|   alf_luma_filter_signal_flag | u(1) |
|   alf_chroma_filter_signal_flag | u(1) |
|   if( alf_luma_filter_signal_flag ) { | |
|     alf_luma_clip_flag | u(1) |
|     alf_luma_num_filters_signalled_minus1 | tb(v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | tb(v) |
|     } | |
|     alf_luma_coeff_signal_flag | u(1) |
|     if( alf_luma_coeff_signal_flag ) { | |
|       for( sfIdx = 0; sfIdx <= alf_luma_num_filters_signalled_minus1; sfIdx++ ) | |
|         alf_luma_coeff_flag[ sfIdx ] | u(1) |
|     } | |
|     for( sfIdx = 0; sfIdx <= alf_luma_num_filters_signalled_minus1; sfIdx++ ) { | |
|       if( alf_luma_coeff_flag[ sfIdx ] ) { | |
|         for( j = 0; j < 12; j++ ) { | |
|           alf_luma_coeff_abs[ sfIdx ][ j ] | uek(v) |
|           if( alf_luma_coeff_abs[ sfIdx ][ j ] ) | |
|             alf_luma_coeff_sign[ sfIdx ][ j ] | u(1) |
|         } | |
|       } | |
|     } | |
|   } | |

FIG. 29b

| | |
|---|---|
| if( alf_luma_clip_flag ) { | |
|   for( sfIdx = 0; sfIdx <= alf_luma_num_filters_signalled_minus1; sfIdx++ ) { | |
|     for( j = 0; j < 12; j++ ) { | |
|       alf_luma_clip_idx[ sfIdx ][ j ] | u(2) |
|     } | |
|   } | |
| } | |
| if( alf_chroma_filter_signal_flag ) { | |
|   alf_chroma_num_alt_minus1 | tb(v) |
|   for( altIdx = 0; altIdx <= alf_chroma_num_alt_minus1; altIdx++ ) { | |
|     alf_chroma_clip_flag[ altIdx ] | u(1) |
|     for( j = 0; j < 6; j++ ) { | |
|       alf_chroma_coeff_abs[ altIdx ][ j ] | ua3(v) |
|       if( alf_chroma_coeff_abs[ altIdx ][ j ] > 0 ) | |
|         alf_chroma_coeff_sign[ altIdx ][ j ] | u(1) |
|     } | |
|     if( alf_chroma_clip_flag[ altIdx ] ) { | |
|       for( j = 0; j < 6; j++ ) { | |
|         alf_chroma_clip_idx[ altIdx ][ j ] | u(2) |
|       } | |
|     } | |
|   } | |
| } | |

FIG. 30a

Coding tree unit syntax

| coding_tree_unit( ) { | Descriptor |
|---|---|
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| if( slice_sao_luma_flag \| slice_sao_chroma_flag ) | |
| sao( xCtb >> CtbLog2SizeY, yCtb >> CtbLog2SizeY ) | |
| if( slice_alf_enabled_flag ){ | |
| alf_ctb_flag[ 0 ][ xCtb >> Log2CtbSize ][ yCtb >> Log2CtbSize ] | ae(v) |
| if( alf_ctb_flag[ 0 ][ xCtb >> Log2CtbSize ][ yCtb >> Log2CtbSize ] ){ | |
| if( slice_num_alf_aps_ids_luma > 0) | |
| alf_ctb_use_first_aps_flag | ae(v) |
| if( !alf_ctb_use_first_aps_flag ){ | |
| if( slice_num_alf_aps_ids_luma > 1 ) | |
| alf_use_aps_flag | ae(v) |
| if( alf_use_aps_flag ) | |
| alf_luma_prev_filter_idx_minus1 | ae(v) |
| else | |
| alf_luma_fixed_filter_idx | ae(v) |
| } | |
| } | |

FIG. 30b

| | |
|---|---|
| if( slice_alf_chroma_idc == 1 \|\| slice_alf_chroma_idc == 3 ) { | |
|   alf_ctb_flag[ 1 ][ xCtb >> Log2CtbSize ][ yCtb >> Log2CtbSize ] | ae(v) |
|   if( alf_ctb_flag[ 1 ][ xCtb >> Log2CtbSize ][ yCtb >> Log2CtbSize ]<br>    && aps_alf_chroma_num_alts_minus1 > 0 ) | |
|     alf_ctb_filter_alt_idx[ 1 ][ xCtb >> Log2CtbSize ][ yCtb >> Log2CtbSize ][ 0 ] | ae(v) |
| } | |
| if( slice_alf_chroma_idc == 2 \|\| slice_alf_chroma_idc == 3 ) { | |
|   alf_ctb_flag[ 2 ][ xCtb >> Log2CtbSize ][ yCtb >> Log2CtbSize ] | ae(v) |
|   if( alf_ctb_flag[ 2 ][ xCtb >> Log2CtbSize ][ yCtb >> Log2CtbSize ]<br>    && aps_alf_chroma_num_alts_minus1 > 0 ) | |
|     alf_ctb_filter_alt_idx[ 2 ][ xCtb >> Log2CtbSize ][ yCtb >> Log2CtbSize ][ 0 ] | ae(v) |
| } | |
| if( slice_type == I && qtbtt_dual_tree_intra_flag ) | |
|   dual_tree_implicit_qt_split ( xCtb, yCtb, CtbSizeY, 0 ) | |
| else | |
|   coding_tree( xCtb, yCtb, CtbSizeY, CtbSizeY, 1, 0, 0, 0, 0, 0, SINGLE_TREE ) | |
| } | |

FIG. 31

General slice header semantics slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice.

slice_num_alf_aps_ids_luma specifies the number of ALF APSs that the slice refers to. The value of slice_num_alf_aps_ids_luma shall be in the range of 0 to 6, inclusive.

The maximum value maxVal of the truncated binary binarization tb(v) is set equal to 6.

slice_alf_aps_id_luma[ i ] specifies the adaptation_parameter_set_id of the i-th ALF APS that the slice refers to. The TemporalId of the ALF APS NAL unit having adaptation_parameter_set_id equal to slice_alf_aps_id_luma[ i ] shall be less than or equal to the TemporalId of the coded slice NAL unit.

When multiple ALF APSs with the same value of adaptation_parameter_set_id are referred to by two or more slices of the same picture, the multiple ALF APSs with the same value of adaptation_parameter_set_id shall have the same content.

For intra slices and slices in an IRAP picture, slice_alf_aps_id_luma[ i ] shall not refer to an ALF APS associated with other pictures rather than the picture containing the intra slices or the IRAP picture.

slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to 0.

The maximum value maxVal of the truncated unary binarization tu(v) is set equal to 3.

slice_alf_aps_id_chroma specifies the adaptation_parameter_set_id that the chroma component of the slice refers to. The TemporalId of the ALF APS NAL unit having adaptation_parameter_set_id equal to slice_alf_aps_id_chroma shall be less than or equal to the TemporalId of the coded slice NAL unit.

For intra slices and slices in an IRAP picture, slice_alf_aps_id_chroma shall not refer to an ALF APS associated with other pictures rather than the picture containing the intra slices or the IRAP picture.

FIG. 32

Adaptive loop filter data semantics alf_luma_filter_signal_flag equal to 1 specifies that a luma filter set is signalled. alf_luma_filter_signal_flag equal to 0 specifies that a luma filter set is not signalled.

alf_chroma_filter_signal_flag equal to 1 specifies that a chroma filter is signalled. alf_chroma_filter_signal_flag equal to 0 specifies that a chroma filter is not signalled.

The variable NumAlfFilters specifying the number of different adaptive loop filters is set equal to 25.

alf_luma_clip_flag equal to 0 specifies that linear adaptive loop filtering is applied on luma component. alf_luma_clip_flag equal to 1 specifies that non-linear adaptive loop filtering may be applied on luma component.

alf_luma_num_filters_signalled_minus1 plus 1 specifies the number of adaptive loop filter classes for which luma coefficients can be signalled. The value of alf_luma_num_filters_signalled_minus1 shall be in the range of 0 to NumAlfFilters − 1, inclusive.

The maximum value maxVal of the truncated binary binarization tb(v) is set equal to NumAlfFilters − 1.

alf_luma_coeff_delta_idx[ filtIdx ] specifies the indices of the signalled adaptive loop filter luma coefficient deltas for the filter class indicated by filtIdx ranging from 0 to NumAlfFilters − 1. When alf_luma_coeff_delta_idx[ filtIdx ] is not present, it is inferred to be equal to 0.

The alf_luma_coeff_signal_flag[ sfIdx ] equal to 1 indicates that alf_luma_coeff_flag[ sfIdx ] is signalled. alf_luma_coeff_signal_flag equal to 0 indicates that alf_luma_coeff_flag[ sfIdx ] is not signalled.

alf_luma_coeff_flag[ sfIdx ] equal 1 specifies that the coefficients of the luma filter indicated by sfIdx are signalled. alf_luma_coeff_flag[ sfIdx ] equal to 0 specifies that all filter coefficients of the luma filter indicated by sfIdx are set equal to 0. When not present, alf_luma_coeff_flag[ sfIdx ] is set equal to 1.

alf_luma_coeff_abs[ sfIdx ][ j ] specifies the absolute value of the j-th coefficient delta of the signalled luma filter indicated by sfIdx. When alf_luma_coeff_abs[ sfIdx ][ j ] is not present, it is inferred to be equal 0.

FIG. 33 alf_luma_coeff_sign[ sfIdx ][ j ] specifies the sign of the j-th luma coefficient of the filter indicated by sfIdx as follows:
- If alf_luma_coeff_sign[ sfIdx ][ j ] is equal to 0, the corresponding luma filter coefficient has a positive value.
- Otherwise (alf_luma_coeff_sign[ sfIdx ][ j ] is equal to 1), the corresponding luma filter coefficient has a negative value.

When alf_luma_coeff_sign[ sfIdx ][ j ] is not present, it is inferred to be equal to 0.

The variable filtCoeff[ sfIdx ][ j ] with sfIdx = 0..alf_luma_num_filters_signalled_minus1, j = 0..11 is initialized as follows:

filtCoeff[ sfIdx ][ j ] = alf_luma_coeff_abs[ sfIdx ][ j ] * (1 − 2 * alf_luma_coeff_sign[ sfIdx ][ j ] )   (7-68)

The luma filter coefficients AlfCoeff$_L$[ adaptation_parameter_set_id ] with elements AlfCoeff$_L$[ adaptation_parameter_set_id ][ filtIdx ][ j ], with filtIdx = 0..NumAlfFilters − 1 and j = 0..11 are derived as follows:

AlfCoeff$_L$[ adaptation_parameter_set_id ][ filtIdx ][ j ] = filtCoeff[ alf_luma_coeff_delta_idx[ filtIdx ] ][ j ]   (7-70)

The fixed filter coefficients AlfFixFiltCoeff[ i ][ j ] with i = 0..64, j = 0..11 and the class to filter mapping AlfClassToFiltMap[ m ][ n ] with m = 0..15 and n = 0..24 are derived as follows:

FIG. 34

AlfClassToFiltMap =                                                                                                    (7-73)
{
 {  8,  2,  2,  2,  3,  4, 53,  9,  9, 52,  4,  4,  5,  9,  2,  8, 10,  9,  1,  3, 33, 39, 10,  9, 52 },
 { 11, 12, 13, 14, 15, 30, 11, 17, 18, 19, 16, 20, 20,  4, 53, 21, 22, 23, 14, 25, 26, 26, 27, 28, 10 },
 { 16, 12, 31, 32, 14, 16, 30, 33, 53, 34, 35, 16, 20,  4,  7, 16, 21, 36, 18, 19, 21, 26, 37, 38, 38 },
 { 35, 11, 13, 14, 43, 35, 16,  4, 34, 62, 35, 35, 30, 56,  7, 35, 21, 38, 24, 40, 16, 21, 48, 57, 39 },
 { 11, 31, 32, 43, 44, 16,  4, 17, 34, 45, 30, 20, 20,  7,  5, 21, 22, 46, 40, 47, 26, 48, 63, 58, 10 },
 { 12, 13, 50, 51, 52, 11, 17, 53, 45,  9, 30,  4, 53, 19,  0, 22, 23, 25, 43, 44, 37, 27, 28, 10, 55 },
 { 30, 33, 62, 31, 44, 20, 41, 56, 34, 45, 20, 41, 41, 56,  5, 30, 56, 32, 40, 47, 11, 37, 42, 57,  3 },
 { 35, 11, 23, 32, 14, 35, 20,  4, 17, 18, 21, 20, 20, 20,  4, 16, 21, 36, 46, 25, 41, 26, 48, 49, 58 },
 { 12, 31, 59, 59,  3, 33, 33, 59, 59, 52,  4, 33, 17, 59, 55, 22, 36, 59, 59, 60, 22, 36, 59, 25, 55 },
 { 31, 25, 15, 60, 60, 22, 17, 19, 55, 55, 25, 20, 53, 13, 55, 22, 46, 25, 43, 60, 37, 28, 10, 55, 52 },
 { 12, 31, 32, 50, 51, 11, 33, 53, 19, 45, 16,  4,  4, 53,  5, 22, 36, 18, 25, 43, 26, 27, 27, 28, 10 },
 {  5,  2, 44, 52,  3,  4, 53, 45,  9,  3,  4, 56,  5,  0,  2,  5, 10, 47, 52,  3, 63, 39, 10,  9, 52 },
 { 12, 34, 44, 44,  3, 56, 58, 62, 45,  9, 56, 56,  7,  5,  0, 22, 38, 40, 47, 52, 48, 57, 39, 10,  9 },
 { 35, 11, 23, 14, 51, 35, 20, 41, 56, 62, 16, 20, 41, 56,  7, 16, 21, 38, 24, 40, 26, 26, 42, 57, 39 },
 { 33, 34, 51, 51, 52, 41, 41, 34, 62,  0, 41, 41, 56,  7,  5, 56, 38, 38, 40, 44, 37, 42, 57, 39, 10 },
 { 16, 31, 32, 15, 60, 30,  4, 17, 19, 25, 22, 20,  4, 53, 19, 21, 22, 46, 25, 55, 26, 48, 63, 58, 58 },
}, It is a requirement of bitstream conformance that the values of AlfCoeff$_L$[ adaptation_parameter_set_id ][ filtIdx ][ j ] with filtIdx = 0..NumAlfFilters − 1, j = 0..11 shall be in the range of −$2^7$ to $2^7$ − 1, inclusive.

alf_luma_clip_idx[ sfIdx ][ j ] specifies the clipping index of the clipping value to use before multiplying by the j-th coefficient of the signalled luma filter indicated by sfIdx. When alf_luma_clip_idx[ sfIdx ][ j ] is not present, it is inferred to be equal 0 (no clipping). It is a requirement of bitstream conformance that the values of alf_luma_clip_idx[ sfIdx ][ j ] with sfIdx = 0..alf_luma_num_filters_signalled_minus1 and j = 0..11 shall be in the range of 0 to 3, inclusive.

filters_signalled_minus1, j = 0..11 are derived from Table 7.1 by using BitDepthY and alf_luma_clip_idx[sfIdx][j] as input of the Table 7.1.

The luma filter clipping values AlfClip$_L$[ adaptation_parameter_set_id ] with elements AlfClip$_L$[ adaptation_parameter_set_id ][ filtIdx ][ j ], with filtIdx = 0..NumAlfFilters − 1 and j = 0..11 are derived as follows:

AlfClip$_L$[ adaptation_parameter_set_id ][ filtIdx ][ j ] = filterClips[ alf_luma_coeff_delta_idx[ filtIdx ] ][ j ]   (7-77)

alf_chroma_num_alts_minus1 specifies the number of alternative filters for Chroma components.
The maximum value maxVal of the truncated binary binarization tb(v) is set equal to 8.

alf_chroma_clip_flag[ altIdx ] equal to 0 specifies that linear adaptive loop filtering is applied on chroma components when using the Chroma filter with index altIdx ranging from 0 to alf_chroma_num_alts_minus1; alf_chroma_clip_flag[ altIdx ] equal to 1 specifies that non-linear adaptive loop filtering is applied on chroma component when using the Chroma filter with index altIdx. When not present, alf_chroma_clip_flag[ altIdx ] is inferred to be equal to 0

FIG. 35a alf_chroma_coeff_abs[ altIdx ][ j ] specifies the absolute value of the j-th chroma filter coefficient of the alternative Chroma filter with index altIdx, for altIdx ranging from 0 to alf_chroma_num_alts_minus1. When alf_chroma_coeff_abs[ altIdx ][ j ] is not present, it is inferred to be equal 0. It is a requirement of bitstream conformance that the values of alf_chroma_coeff_abs[ altIdx ][ j ] shall be in the range of 0 to $2^7 - 1$, inclusive.

alf_chroma_coeff_sign[ altIdx ][ j ] specifies the sign of the j-th chroma filter coefficient of the alternative Chroma filter with index altIdx, for altIdx ranging from 0 to alf_chroma_num_alts_minus1, as follows:

- If alf_chroma_coeff_sign[ altIdx ][ j ] is equal to 0, the corresponding chroma filter coefficient has a positive value.
- Otherwise (alf_chroma_coeff_sign[ altIdx ][ j ] is equal to 1), the corresponding chroma filter coefficient has a negative value.

When alf_chroma_coeff_sign[ altIdx ][ j ] is not present, it is inferred to be equal to 0.

The chroma filter coefficients $AlfCoeff_C$[ adaptation_parameter_set_id ][ altIdx ] with elements $AlfCoeff_C$[ adaptation_parameter_set_id ][ altIdx ][ j ], with altIdx = 0..alf_chroma_num_alts_minus1, j = 0..5 are derived as follows:

$$AlfCoeff_C[\text{ adaptation\_parameter\_set\_id }][\text{ altIdx }][\text{ j }] = alf\_chroma\_coeff\_abs[\text{ altIdx }][\text{ j }] * \quad (7\text{-}82)$$
$$(1 - 2 * alf\_chroma\_coeff\_sign[\text{ altIdx }][\text{ j }])$$

It is a requirement of bitstream conformance that the values of $AlfCoeff_C$[ adaptation_parameter_set_id ][ altIdx ][ j ] with altIdx = 0..alf_chroma_num_alts_minus1, j = 0..5 shall be in the range of $-2^7 - 1$ to $2^7 - 1$, inclusive.

alf_chroma_clip_idx[ altIdx ][ j ] specifies the clipping index of the clipping value to use before multiplying by the j-th coefficient of the alternative Chroma filter with index altIdx, for altIdx ranging from 0 to alf_chroma_num_alts_minus1. When alf_chroma_clip_idx[ altIdx ][ j ] is not present, it is inferred to be equal 0 (no clipping). It is a requirement of bitstream conformance that the values of alf_chroma_clip_idx[ altIdx ][ j ] with j = 0..5 shall be in the range of 0 to 3, inclusive.

The chroma filter clipping values $AlfClip_C$[ adaptation_parameter_set_id ][ altIdx ] with elements $AlfClip_C$[ adaptation_parameter_set_id ][ altIdx ][ j ], with altIdx = 0..alf_chroma_num_alts_minus1, j = 0..5 are derived from the Table 7.1 by using BitDepthC and alf_chroma_clip_idx[ altIdx ][ j ] as inputs of the Table 7.1:

FIG. 35b

Table 7.1 – Specification of the ALF clipping values

| BitDepthY or BitDepthC | alf_chroma_clip_idx[ altIdx ][ j ] or alf_luma_clip_idx[ sfIdx ][ j ] | | | |
|---|---|---|---|---|
| | 0 | 1 | 2 | 3 |
| 8 | 4 | 16 | 64 | 255 |
| 9 | 5 | 23 | 108 | 511 |
| 10 | 6 | 32 | 181 | 1023 |
| 11 | 7 | 45 | 304 | 2047 |
| 12 | 8 | 64 | 512 | 4095 |
| 13 | 10 | 91 | 861 | 8191 |
| 14 | 11 | 128 | 1448 | 16383 |
| 15 | 13 | 181 | 2435 | 32767 |
| 16 | 16 | 256 | 4096 | 65535 |

FIG. 36

Coding tree unit semantics

The CTU is the root node of the coding tree structure.

The array IsInSmr[ x ][ y ] specifying whether the sample at ( x, y ) is located inside a shared merging candidate list region, is initialized as follows for x = 0..CtbSizeY − 1 and y = 0..CtbSizeY − 1:

IsInSmr[ x ][ y ] = FALSE     (7-96)

alf_ctb_flag[ cIdx ][ xCtb >> Log2CtbSize ][ yCtb >> Log2CtbSize ] equal to 1 specifies that the adaptive loop filter is applied to the coding tree block of the colour component indicated by cIdx of the coding tree unit at luma location ( xCtb, yCtb ). alf_ctb_flag[ cIdx ][ xCtb >> Log2CtbSize ][ yCtb >> Log2CtbSize ] equal to 0 specifies that the adaptive loop filter is not applied to the coding tree block of the colour component indicated by cIdx of the coding tree unit at luma location ( xCtb, yCtb ).

When alf_ctb_flag[ cIdx ][ xCtb >> Log2CtbSize ][ yCtb >> Log2CtbSize ] is not present, it is inferred to be equal to 0

FIG. 37 alf_ctb_use_first_aps_flag equal to 1 sepcifies that the filter information in APS with adaptive_parameter_set_id equal to slice_alf_aps_id_luma[ 0 ] is used. alf_ctb_use_first_aps_flag equal to 0 specifies that the luma CTB does not use the filter information in APS with adaptive_parameter_set_id equal to slice_alf_aps_id_luma[ 0 ]. When alf_ctb_use_first_aps_flag is not present, it is inferred to be equal to 0.

alf_use_aps_flag equal to 0 specifies that one of the fixed filter sets is applied to the luma CTB. alf_use_aps_flag equal to 1 specifies that a filter set from an APS is applied to the luma CTB. When alf_use_aps_flag is not present, it is inferred to be equal to 0.

alf_luma_prev_filter_idx_minus1 plus 1 specifies the previous filter that is applied to the luma CTB. The value of alf_luma_prev_filter_idx_minus1 shall be in a range of 0 to slice_num_alf_aps_ids_luma − 2, inclusive.

The variable AlfCtbFiltSetIdxY[ xCtb >> Log2CtbSize ][ yCtb >> Log2CtbSize ] specifying the filter set index for the luma CTB at location ( xCtb, yCtb ) is derived as follows:

- If alf_ctb_use_first_aps is equal to 1, AlfCtbFiltSetIdxY[ xCtb >> Log2CtbSize ][ yCtb >> Log2CtbSize ] is set equal to 16.
- Otherwise, if alf_use_aps_flag is equal to 0, AlfCtbFiltSetIdxY[ xCtb >> Log2CtbSize ][ yCtb >> Log2CtbSize ] is set equal to alf_luma_fixed_filter_idx.
- Otherwise, AlfCtbFiltSetIdxY[ xCtb >> Log2CtbSize ][ yCtb >> Log2CtbSize ] is set equal to 17 + alf_luma_prev_filter_idx_minus1.

alf_luma_fixed_filter_idx specifies the fixed filter that is applied to the luma CTB. The value of alf_luma_fixed_filter_idx shall be in a range of 0 to 15, inclusive.

alf_ctb_filter_alt_idx[ 1 ][ xCtb >> Log2CtbSize ][ yCtb >> Log2CtbSize ][ sfIdx ] specify the index of the alternative chroma filter to use when applying the adaptive loop filter on chroma component with index 1 of the coding tree unit at luma location ( xCtb, yCtb ). When alf_ctb_filter_alt_idx[ 1 ][ xCtb >> Log2CtbSize ][ yCtb >> Log2CtbSize ][ sfIdx ] is not present, it is infered to be equal to zero.

alf_ctb_filter_alt_idx[ 2 ][ xCtb >> Log2CtbSize ][ yCtb >> Log2CtbSize ][ sfIdx ] specify the index of the alternative chroma filter to use when applying the adaptive loop filter on chroma component with index 2 of the coding tree unit at luma location ( xCtb, yCtb ). When alf_ctb_filter_alt_idx[ 2 ][ xCtb >> Log2CtbSize ][ yCtb >> Log2CtbSize ][ sfIdx ] is not present, it is infered to be equal to zero.

FIG. 42

| seq_parameter_set_rbsp() { | Descriptor |
|---|---|
| sps_alf_enabled_flag | u(1) |

FIG. 43

| | Descriptor |
|---|---|
| adaptation_parameter_set_rbsp( ) { | |
|   adaptation_parameter_set_id | u(5) |
|   aps_params_type | u(3) |
|   if( aps_params_type == ALF_APS ) | |
|     alf_data( adaptation_parameter_set_id ) | |
|   else if( aps_params_type == LMCS_APS ) | |
|     lmcs_data( ) | |
| } | |

FIG. 44

| aps_params_type | aps_params_type NAME | TYPE OF ADAPTATION PARAMETER |
|---|---|---|
| 0 | ALF_APS | ALF PARAMETER (ADAPTIVE IN-LOOP FILTERING PARAMETER) |
| 1 | LMCS_APS | LMCS PARAMETER (LUMA MAPPING WITH CHROMA SCALING) |
| 2..7 | Reserved | Reserved |

FIG. 45

| | Descriptor |
|---|---|
| picture_header_rbsp( ) { | |
|   if( sps_alf_enabled_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc ) | |
|         pic_alf_aps_id_chroma | u(3) |
|   } | |
|   if( ChromaArrayType != 0 ) { | |
|     pic_cross_component_alf_cb_enabled_flag | u(1) |
|     if( pic_cross_component_alf_cb_enabled_flag ) { | |
|       pic_cross_component_alf_cb_aps_id | u(3) |
|       pic_cross_component_alf_cb_filters_signalled_minus1 | ue(v) or u(2) |
|     } | |
|     if( ChromaArrayType != 0 ) { | |
|       pic_cross_component_alf_cr_enabled_flag | u(1) |
|       if( pic_cross_component_alf_cr_enabled_flag ) { | |
|         pic_cross_component_alf_cr_aps_id | u(3) |
|         pic_cross_component_cr_filters_signalled_minus1 | ue(v) or u(2) |
|       } | |

FIG. 46

| | Descriptor |
|---|---|
| slice_header() { | |
| if( sps_alf_enabled_flag && !pic_alf_enabled_present_flag ) { | |
| slice_alf_enabled_flag | u(1) |
| if( slice_alf_enabled_flag ) { | |
| slice_num_alf_aps_ids_luma | u(3) |
| for( i = 0; i < slice_num_alf_aps_ids_luma; i++ ) | |
| slice_alf_aps_id_luma[ i ] | u(3) |
| if( ChromaArrayType != 0 ) | |
| slice_alf_chroma_idc | u(2) |
| if( slice_alf_chroma_idc ) | |
| slice_alf_aps_id_chroma | u(3) |
| } | |
| if( ChromaArrayType != 0 ) { | |
| slice_cross_component_alf_cb_enabled_flag | u(1) |
| if( slice_cross_component_alf_cb_enabled_flag ) { | |
| slice_cross_component_alf_cb_aps_id | u(3) |
| slice_cross_component_cb_filters_signalled_minus1 | ue(v) or u(2) |
| } | |
| if( ChromaArrayType != 0 ) { | |
| slice_cross_component_alf_cr_enabled_flag | u(1) |
| if( slice_cross_component_alf_cr_enabled_flag ) { | |
| slice_cross_component_alf_cr_aps_id | u(3) |
| slice_cross_component_cr_filters_signalled_minus1 | ue(v) or u(2) |
| } | |
| } | |

FIG. 47a

| | Descriptor |
|---|---|
| alf_data( ) { | |
|   alf_luma_filter_signal_flag | u(1) |
|   alf_chroma_filter_signal_flag | u(1) |
|   alf_cross_component_cb_filter_signal_flag | u(1) |
|   alf_cross_component_cr_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | u(v) |
|     } | |
|     for( sfIdx = 0; sfIdx <= alf_luma_num_filters_signalled_minus1; sfIdx++ ) { | |
|       for ( j = 0; j < 12; j++ ) { | |
|         alf_luma_coeff_abs[ sfIdx ][ j ] | uek(v) |
|         if( alf_luma_coeff_abs[ sfIdx ][ j ] ) | |
|           alf_luma_coeff_sign[ sfIdx ][ j ] | u(1) |
|       } | |
|     } | |
|     if( alf_luma_clip_flag ) { | |
|       for( sfIdx = 0; sfIdx <= alf_luma_num_filters_signalled_minus1; sfIdx++ ) { | |
|         for ( j = 0; j < 12; j++ ) | |
|           alf_luma_clip_idx[ sfIdx ][ j ] | u(2) |
|       } | |
|     } | |

FIG. 47b

| | Descriptor |
|---|---|
| if( alf_chroma_filter_signal_flag ) { | |
|   alf_chroma_num_alt_filters_minus1 | ue(v) |
|   for( altIdx = 0; altIdx <= alf_chroma_num_alt_filters_minus1; altIdx++ ) { | |
|     alf_chroma_clip_flag[ altIdx ] | u(1) |
|     for( j = 0; j < 6; j++ ) { | |
|       alf_chroma_coeff_abs[ altIdx ][ j ] | uek(v) |
|       if( alf_chroma_coeff_abs[ altIdx ][ j ] > 0 ) | |
|         alf_chroma_coeff_sign[ altIdx ][ j ] | u(1) |
|     } | |
|     if( alf_chroma_clip_flag[ altIdx ] ) { | |
|       for( j = 0; j < 6; j++ ) | |
|         alf_chroma_clip_idx[ altIdx ][ j ] | u(2) |
|     } | |
|   } | |
| } | |
| if ( alf_cross_component_cb_filter_signal_flag ) { | |
|   alf_cross_component_cb_filters_signalled_minus1 | ue(v) or u(2) |
|   for( k = 0; k < ( alf_cross_component_cb_filters_signalled_minus1+1); k++ ) { | |
|     for( j = 0; j < 8; j++ ) | |
|       alf_cross_component_cb_coeff_plus32[ k ][ j ] | u(6) or uek(v) |
|   } | |
| } | |
| if ( alf_cross_component_cr_filter_signal_flag ) { | |
|   alf_cross_component_cr_filters_signalled_minus1 | ue(v) or u(2) |
|   for( k = 0; k < ( alf_cross_component_cr_filters_signalled_minus1+1); k++ ) { | |
|     for( j = 0; j < 8; j++ ) | |
|       alf_cross_component_cr_coeff_plus32[ k ][ j ] | u(6) or uek(v) |
|   } | |
| } | |

FIG. 48

| | Descriptor |
|---|---|
| coding_tree_unit( ) { | |
| xCtb = CtbAddrX << CtbLog2SizeY | |
| yCtb = CtbAddrY << CtbLog2SizeY | |
| if( slice_sao_luma_flag \|\| slice_sao_chroma_flag ) | |
|   sao( CtbAddrX, CtbAddrY ) | |
| if( slice_alf_enabled_flag ) { | |
|   alf_ctb_flag[ 0 ][ CtbAddrX ][ CtbAddrY ] | ae(v) |
|   if( alf_ctb_flag[ 0 ][ CtbAddrX ][ CtbAddrY ] ) { | |
|     if( slice_num_alf_aps_ids_luma > 0 ) | |
|       alf_use_aps_flag | ae(v) |
|     if( alf_use_aps_flag ) { | |
|       if( slice_num_alf_aps_ids_luma > 1 ) | |
|         alf_luma_prev_filter_idx | ae(v) |
|     } else | |
|       alf_luma_fixed_filter_idx | ae(v) |
|   } | |
| } | |
| if ( slice_cross_component_alf_cb_enabled_flag ) | |
|   alf_ctb_cross_component_cb_idc[ CtbAddrX ][ CtbAddrY ] | ae(v) |
| if( alf_ctb_cross_component_cb_enabled_flag == 0 \|\| alf_ctb_cross_component_cb_idc[ CtbAddrX ][ CtbAddrY ] == 0 ) | |
|   if( slice_alf_chroma_idc == 1 \|\| slice_alf_chroma_idc == 3 ) { | |
|     alf_ctb_flag[ 1 ][ CtbAddrX ][ CtbAddrY ] | ae(v) |
|     if( alf_ctb_flag[ 1 ][ CtbAddrX ][ CtbAddrY ] && alf_chroma_num_alt_filters_minus1 > 0 ) | |
|       alf_ctb_filter_alt_idx[ 0 ][ CtbAddrX ][ CtbAddrY ] | ae(v) |
|   } | |
| if ( slice_cross_component_alf_cr_enabled_flag ) | |
|   alf_ctb_cross_component_cr_idc[ CtbAddrX ][ CtbAddrY ] | ae(v) |
| if( alf_ctb_cross_component_cr_enabled_flag == 0 \|\| alf_ctb_cross_component_cr_idc[ CtbAddrX ][ CtbAddrY ] == 0 ) | |
|   if( slice_alf_chroma_idc == 2 \|\| slice_alf_chroma_idc == 3 ) { | |
|     alf_ctb_flag[ 2 ][ CtbAddrX ][ CtbAddrY ] | ae(v) |
|     if( alf_ctb_flag[ 2 ][ CtbAddrX ][ CtbAddrY ] && alf_chroma_num_alt_filters_minus1 > 0 ) | |
|       alf_ctb_filter_alt_idx[ 1 ][ CtbAddrX ][ CtbAddrY ] | ae(v) |
|   } | |
| if( slice_type == I && qtbtt_dual_tree_intra_flag ) | |
|   dual_tree_implicit_qt_split ( xCtb, yCtb, CtbSizeY, 0 ) | |
| else | |
|   coding_tree( xCtb, yCtb, CtbSizeY, CtbSizeY, 1, 1, 0, 0, 0, 0, SINGLE_TREE, MODE_TYPE_ALL ) | |
| } | |

FIG. 49

| alf_data( adaptation_parameter_set_id ) { | Descriptor |
|---|---|
|   if( alf_luma_clip_flag ) { | |
|     for( sfIdx = 0, sfIdx <= alf_luma_num_filters_signalled_minus1; sfIdx++ ) { | |
|       for ( j = 0; j < 12; j++ ) { | |
|         if( filtCoeff_sfIdx ][ i ] ) | |
|           alf_luma_clip_idx[ sfIdx ][ i ] | u(2) |
|       } | |
|     } | |
|   } | |
|   if( alf_chroma_clip_flag ) { | |
|     for( j = 0; j < 6; j++ ) { | |
|       if( alf_chroma_coeff_abs[ j ] ) | |
|         alf_chroma_clip_idx[ j ] | u(2) |
|     } | |
|   } | |

FIG. 50

7.4.6.3 Adaptive loop filter data semantics

...

alf_luma_clip_idx[ sfIdx ][ j ] specifies the clipping index of the clipping value to use before multiplying by the j-th coefficient of the signalled luma filter indicated by sfIdx. When alf_luma_clip_idx[ sfIdx ][ j ] is not present, it is inferred to be equal 0 (no clipping). It is a requirement of bitstream conformance that the values of alf_luma_clip_idx[ sfIdx ][ j ] with sfIdx = 0..alf_luma_num_filters_signalled_minus1 and j = 0..11 shall be in the range of 0 to 3, inclusive.

...

alf_chroma_clip_idx[ j ] specifies the clipping index of the clipping value to use before multiplying by the j-th coefficient of the chroma filter. When alf_chroma_clip_idx[ j ] is not present, it is inferred to be equal 0 (no clipping). It is a requirement of bitstream conformance that the values of alf_chroma_clip_idx[ j ] with j = 0..5 shall be in the range of 0 to 3, inclusive.

FIG. 51

| alf_data( adaptation_parameter_set_id ) { | Descriptor |
|---|---|
|   if( alf_luma_clip_flag ) { | |
|     for( sfIdx = 0; sfIdx <= alf_luma_num_filters_signalled_minus1; sfIdx++ ) { | |
|       for ( j = 0; j < 12; j++ ) { | |
|         if( filtCoeff[ sfIdx ][ j ] ) | |
|           alf_luma_clip_idx[ sfIdx ][ j ] | tu(v) |
|       } | |
|     } | |
|   } | |
|   if( alf_chroma_clip_flag ) { | |
|     for( j = 0; j < 6; j++ ) { | |
|       if( alf_chroma_coeff_abs[ j ] ) | |
|         alf_chroma_clip_idx[ j ] | tu(v) |
|     } | |
|   } | |
| ... | |

FIG. 52

7.4.6.3 Adaptive loop filter data semantics

...

alf_luma_clip_idx[ sfIdx ][ j ] specifies the clipping index of the clipping value to use before multiplying by the j-th coefficient of the signalled luma filter indicated by sfIdx. When alf_luma_clip_idx[ sfIdx ][ j ] is not present, it is inferred to be equal 0 (no clipping). It is a requirement of bitstream conformance that the values of alf_luma_clip_idx[ sfIdx ][ j ] with sfIdx = 0..alf_luma_num_filters_signalled_minus1 and j = 0..11 shall be in the range of 0 to 3, inclusive. The maximum value maxVal of the truncated unary binarization tu(v) is set equal to 3.

...

alf_chroma_clip_idx[ j ] specifies the clipping index of the clipping value to use before multiplying by the j-th coefficient of the chroma filter. When alf_chroma_clip_idx[ j ] is not present, it is inferred to be equal 0 (no clipping). It is a requirement of bitstream conformance that the values of alf_chroma_clip_idx[ j ] with j = 0..5 shall be in the range of 0 to 3, inclusive. The maximum value maxVal of the truncated unary binarization tu(v) is set equal to 3.

ADAPTIVE IN-LOOP FILTERING METHOD AND DEVICE

TECHNICAL FIELD

The present invention relates to a video encoding/decoding method, a video encoding/decoding apparatus, and a recording medium in which a bitstream is stored. In particular, the present invention relates to a video encoding/decoding method and apparatus using in-loop filtering.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

DISCLOSURE

Technical Problem

An objective of the present invention is to provide a video encoding/decoding method and apparatus using adaptive in-loop filtering.

An objective of the present invention is to provide a video encoding/decoding method and apparatus using cross-component adaptive in-loop filtering.

A further objective of the present invention is to provide a recording medium in which a bitstream generated by a video encoding/decoding method or apparatus is stored.

Technical Solution

According to embodiment of the present disclosure, image decoding method comprises, acquiring a reconstructed luma block of a current block, determining whether a cross-component adaptive loop filter is applied to the current block, acquiring a reconstructed chroma block of the current block, to which an adaptive loop filter is applied, when the cross-component adaptive loop filter is applied to the current block and acquiring a final reconstructed chroma block of the current block, to which the cross-component loop filter is applied, using the reconstructed luma block and the reconstructed chroma block, to which the adaptive loop filter is applied.

Wherein the determining of the cross-component adaptive loop filter comprises acquiring information indicating whether the cross-component adaptive loop filter is applicable to the current block, and wherein the information indicating whether the cross-component adaptive loop filter is applicable is signaled through a sequence parameter set.

Wherein the image decoding method further comprises, when the cross-component adaptive loop filter is applicable to the current block, acquiring information indicating whether a cross-component adaptive loop filter is applied to a Cb component of the current block.

Wherein the information indicating whether a cross-component adaptive loop filter is applied to the Cb component is signaled through a picture header.

Wherein the image decoding method further comprises acquiring an adaptive parameter set indicator referred to by the Cb component, when the cross-component loop filter is applied to the Cb component.

Wherein the image decoding method further comprises when the cross-component adaptive loop filter is applicable to the current block, acquiring information indicating whether a cross-component loop filter is applied to a Cr component of the current block.

wherein the information indicating whether the cross-component adaptive loop filter is applied to the Cr component is signaled through a picture header.

Wherein the image decoding method further comprises when the cross-component adaptive loop filter is applicable to the Cr component, acquiring an adaptive parameter set indicator referred to by the Cr component.

Wherein, when information indicating whether the cross-component adaptive loop filter is applicable is not signaled, it is determined that the cross-component loop filter is not applicable to the current block.

Wherein the image decoding method further comprises acquiring a reconstructed chroma block of the current block; and determining whether an adaptive loop filter is applied to the reconstructed chroma block.

wherein the determining of whether the adaptive loop filter is applied to the reconstructed chroma block comprises acquiring information indicating whether the adaptive loop filter is applicable to the reconstructed chroma block, and wherein the information indicating whether the adaptive loop filter is applicable is signaled through a picture header.

wherein the information indicating whether the adaptive loop filter is applicable is signaled for each of a Cb component and a Cr component.

Wherein the image decoding method further comprises acquiring information indicating a type of an adaptive loop filter applied to the reconstructed chroma block, wherein the type of the adaptive loop filter includes a linear adaptive loop filter and a non-linear adaptive loop filter.

wherein the information on the type of the adaptive loop filter applied to the reconstructed chroma block is a single syntax element.

wherein the final reconstructed chroma block is derived using a luma block, to which a cross-component loop filter is applied, acquired by applying the cross-component adaptive loop filter to the reconstructed luma block, and a reconstructed chroma block, to which an adaptive loop filter is applied.

According to embodiment of the present disclosure, image decoding method comprises, acquiring a reconstructed luma block of a current block, determining whether a cross-component adaptive loop filter is applied to the current block, acquiring a reconstructed chroma block of the current block, to which an adaptive loop filter is applied, when the cross-component adaptive loop filter is applied to the current block; and acquiring a final reconstructed chroma block of the current block, to which the cross-component adaptive loop filter is applied, using the reconstructed luma block and the reconstructed chroma block, to which the adaptive loop filter is applied.

Wherein the image encoding method further comprises encoding information indicating whether the cross-component adaptive loop filter is applicable to the current block, wherein the information indicating whether the cross-component adaptive loop filter is applicable is encoded through a sequence parameter set.

wherein the final reconstructed chroma is derived using a luma block, to which the cross-component loop filter is applied, acquired by applying the cross-component loop filter to the reconstructed luma block, and a reconstructed chroma block, to which an adaptive loop filter is applied.

According to embodiment of the present disclosure, a computer-readable recording medium storing a bitstream received by an image decoding apparatus and used to reconstruct a current block included in a current picture, the bitstream being generated by an image encoding method, the image encoding method comprising, acquiring a reconstructed luma block of a current block, determining whether a cross-component adaptive loop filter is applied to the current block, acquiring a reconstructed chroma block of the current block, to which an adaptive loop filter is applied, when the cross-component adaptive loop filter is applied to the current block and acquiring a final reconstructed chroma block of the current block, to which the cross-component adaptive loop filter is applied, using the reconstructed luma block and the reconstructed chroma block, to which the adaptive loop filter is applied.

wherein the image encoding method further comprises encoding information indicating whether the cross-component adaptive loop filter is applicable to the current block, and wherein the information indicating whether the cross-component adaptive loop filter is applicable is encoded through a sequence parameter set.

Advantageous Effects

According to the present invention, it is possible to provide an image encoding/decoding method and apparatus using adaptive in-loop filtering.

According to the present invention, it is possible to provide an image encoding/decoding method and apparatus using cross-component adaptive in-loop filtering.

According to the present invention, it is possible to provide an in-loop filtering method and apparatus using subsample based block classification in order to reduce computational complexity of an image encoder/decoder and memory access bandwidth.

According to the present invention, it is possible to provide an in-loop filtering method and apparatus using a multi-filter type in order to reduce computational complexity of an image encoder/decoder, memory requirements and memory access bandwidth.

According to the present invention, it is possible to provide a recording medium storing a bitstream generated by an image encoding/decoding method or apparatus of the present invention.

According to the present invention, it is possible to improve image encoding and/or decoding efficiency.

DESCRIPTION OF DRAWINGS

FIG. 9 is a view showing an example of determining a slope value according to horizontal, vertical, first diagonal, and second diagonal directions based on a subsample.

FIGS. 10 to 12 are views showing an example of determining a slope value according to horizontal, vertical, first diagonal, and second diagonal directions at a specific sample position according to an embodiment of the present invention.

FIG. 13 is a view showing a diamond-shaped filter according to an embodiment of the present invention.

FIGS. 15a and 15b are views showing various filter types according to an embodiment of the present invention.

FIG. 16 is a view showing an embodiment of a sequence parameter set syntax required for adaptive in-loop filtering.

FIG. 17 is a view showing an embodiment of an adaptive parameter set syntax required for adaptive in-loop filtering.

FIG. 18 is a view showing an embodiment of an adaptive parameter type of an adaptive parameter set.

FIG. 19 is a view showing an embodiment of a slice header syntax required for adaptive in-loop filtering.

FIGS. 20a to 20d are views showing embodiments of an adaptive in-loop filter data syntax required for adaptive in-loop filtering.

FIG. 21 is a view showing an embodiment of an encoding tree block syntax required for adaptive in-loop filtering.

FIGS. 22a and 22b are views showing an embodiment of a fixed filter coefficient.

FIG. 24 is a view showing an embodiment of a clipping index of an adaptive in-loop filter data syntax.

FIG. 25 is a view illustrating the clipping index of the adaptive in-loop filter data syntax of FIG. 24 in detail.

FIG. 26 is a view showing another embodiment of a clipping index of an adaptive in-loop filter data syntax.

FIG. 27 is a view illustrating the clipping index of the adaptive in-loop filter data syntax of FIG. 26 in detail.

FIG. 28 is a view showing another embodiment of a slice header syntax required for adaptive in-loop filtering.

FIGS. 29a and 29b are views another embodiment of an adaptive in-loop filter data syntax required for adaptive in-loop filtering.

FIGS. 30a and 30b are views showing another embodiment of an encoding tree block syntax required for adaptive in-loop filtering.

FIG. 31 is a view illustrating the slice header syntax of FIG. 28 in detail.

FIGS. 32 and 33 are views illustrating the adaptive in-loop filter data syntax of FIGS. 29a and 29b in detail.

FIGS. 34 and 35 are views illustrating the adaptive in-loop filter data syntax of FIGS. 29a and 29b in detail.

FIGS. 36 and 27 are views illustrating the encoding tree block syntax of FIG. 31 in detail.

FIG. 42 is a view illustrating a sequence parameter set according to another embodiment of the present disclosure.

FIG. 43 is a view illustrating an adaptation parameter set according to another embodiment of the present disclosure.

FIG. 44 is a view illustrating an adaptation parameter according to another embodiment of the present disclosure.

FIG. 45 is a view illustrating a picture header according to another embodiment of the present disclosure.

FIG. 46 is a view illustrating a slice header according to another embodiment of the present disclosure.

FIG. 47 is a view illustrating ALF data according to another embodiment of the present disclosure.

FIG. 48 is a view illustrating a coding tree unit (CTU) according to another embodiment of the present disclosure.

FIGS. 49 and 50 are other views illustrating ALF data according to another embodiment of the present disclosure.

FIGS. 51 and 52 are other views illustrating ALF data according to another embodiment of the present disclosure.

MODE FOR INVENTION

Figure 1:
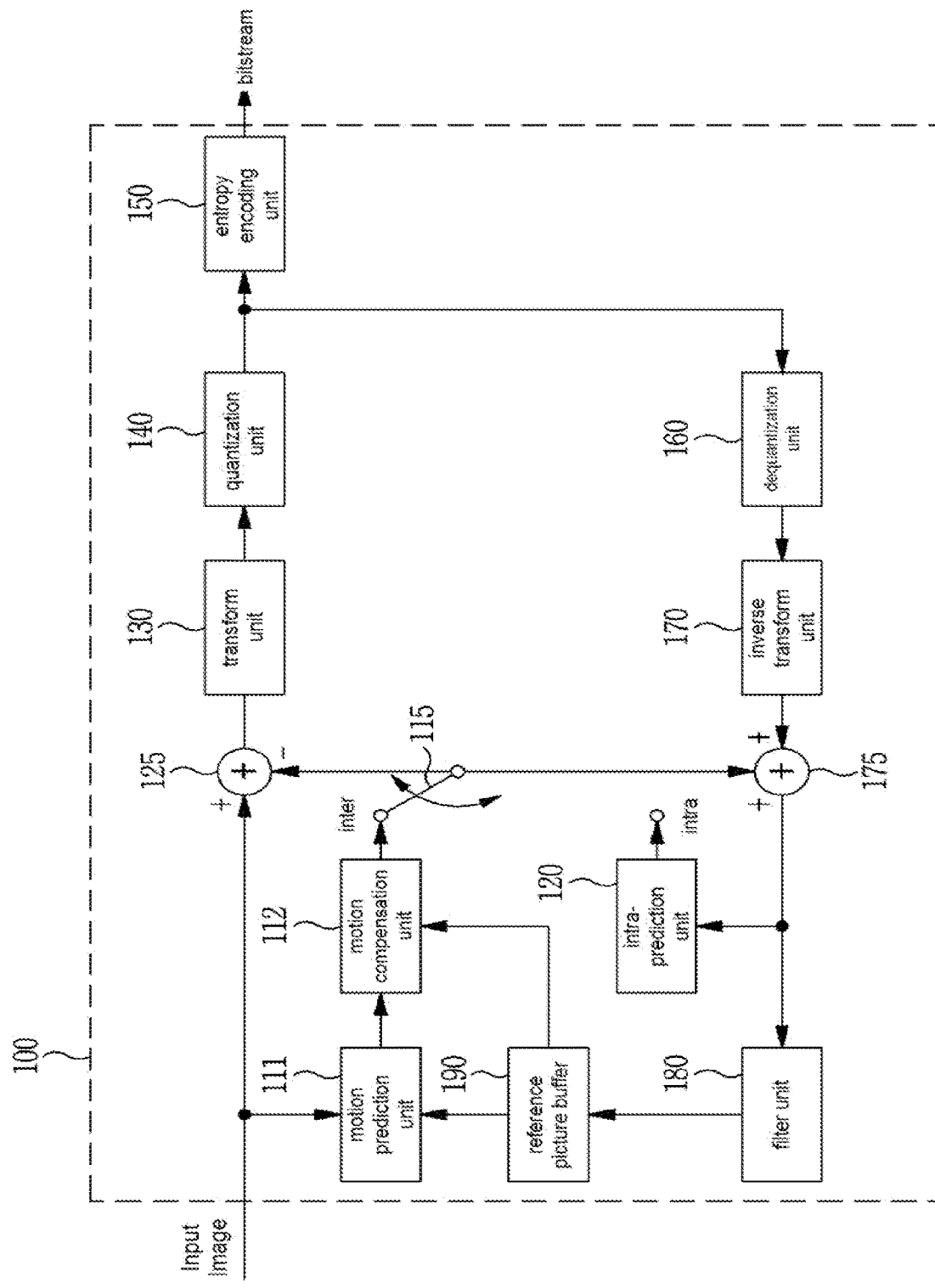
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the 5 drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{B_d}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block.

In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive in-loop filter, an adaptive in-loop filter coefficient, an adaptive in-loop filter tab, an adaptive in-loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive in-loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive in-loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
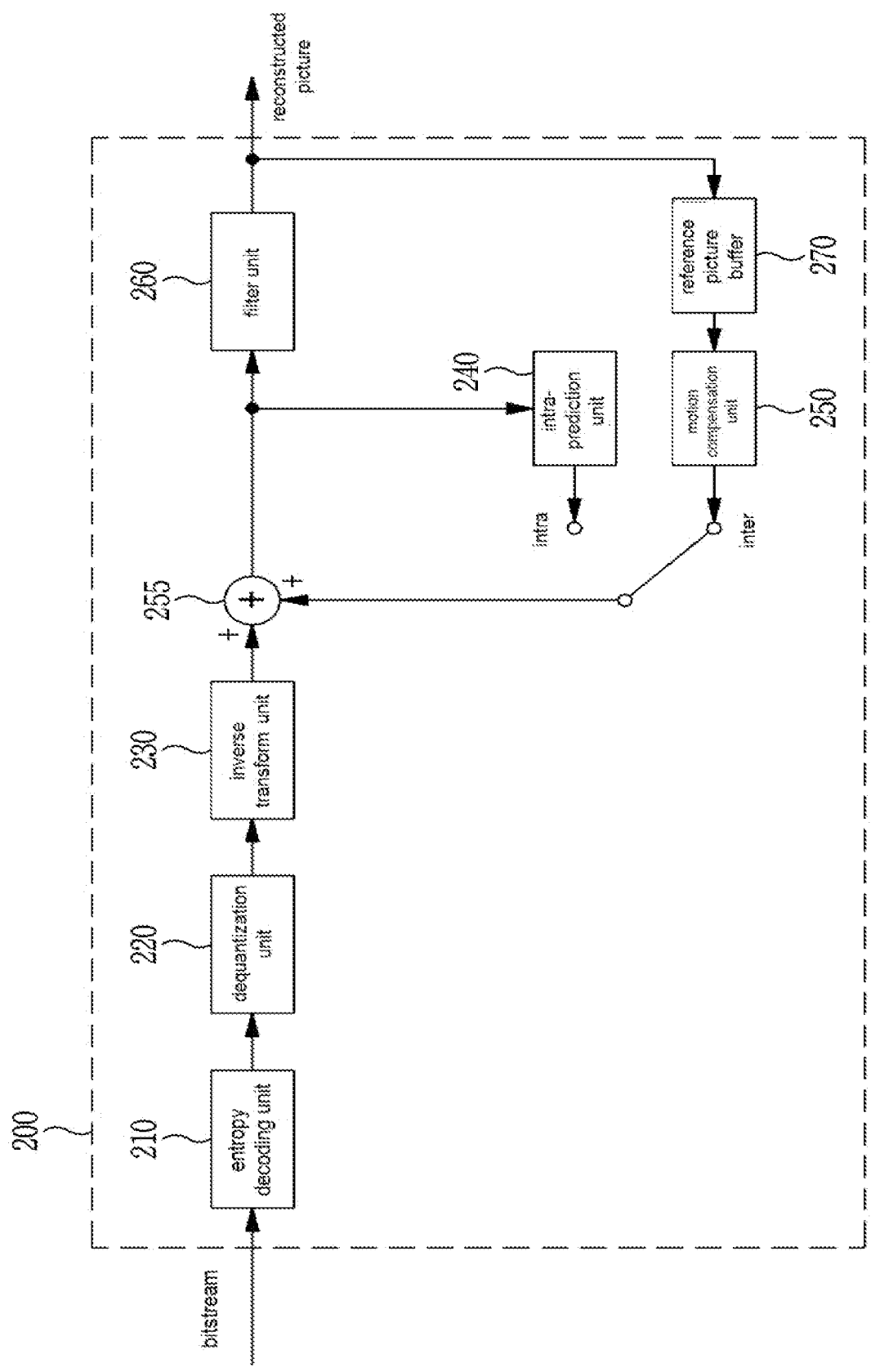
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode.

In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive in-loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
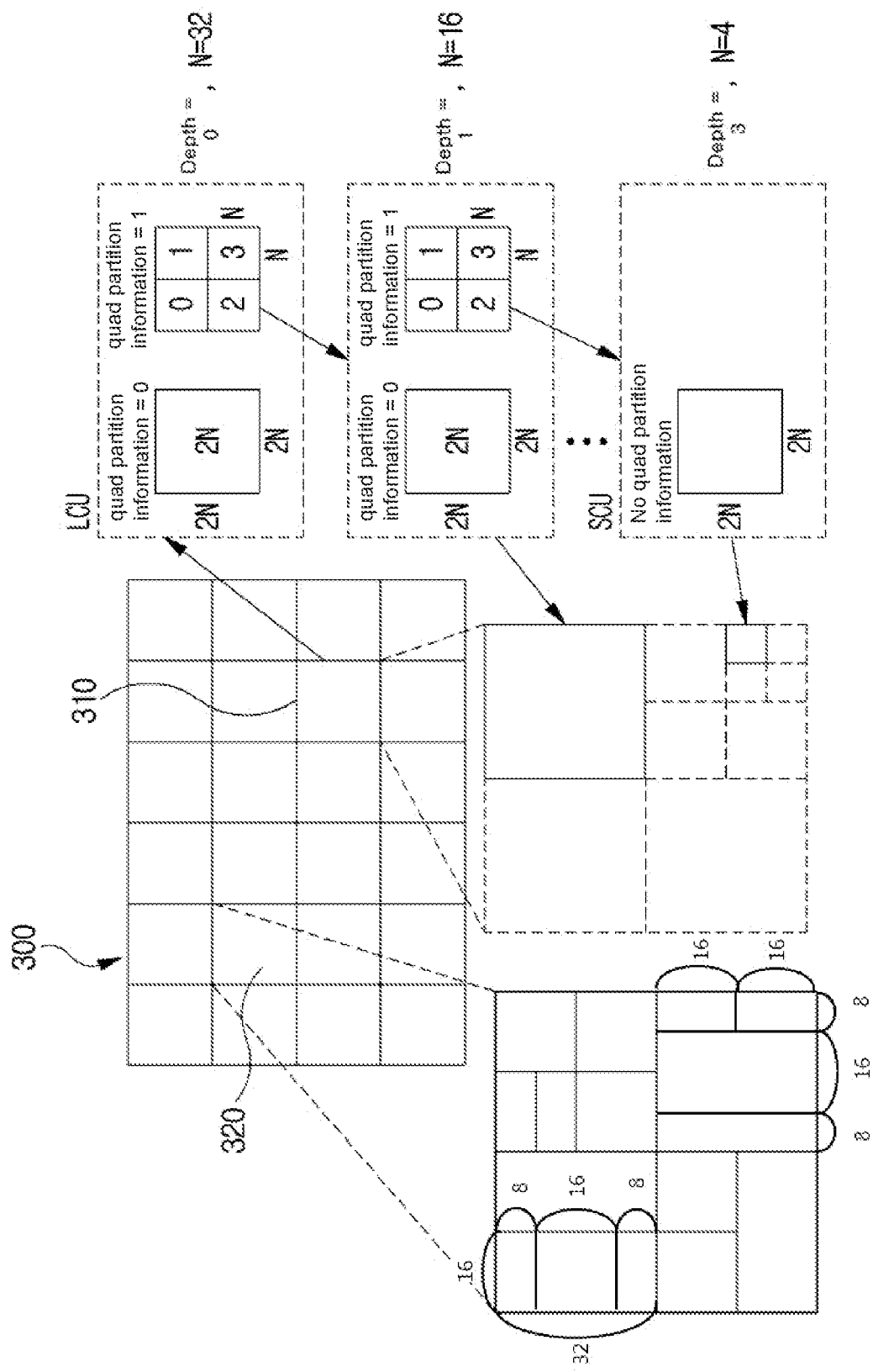
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUS. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning r the ternary tree partitioning, the corresponding binary tree partitioning or ternary tree partitioning may be limited. The pipeline buffer size may be the size of the maximum transform block (e.g., 64×64). For example, when the pipeline buffer size is 64λ64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree direction partitioning and the horizontal ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction tree ternary partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
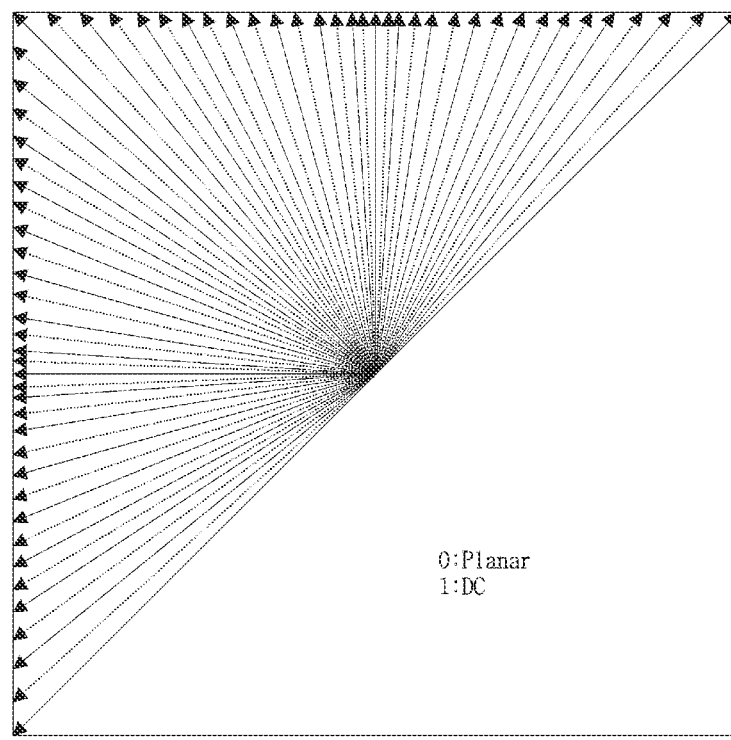
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
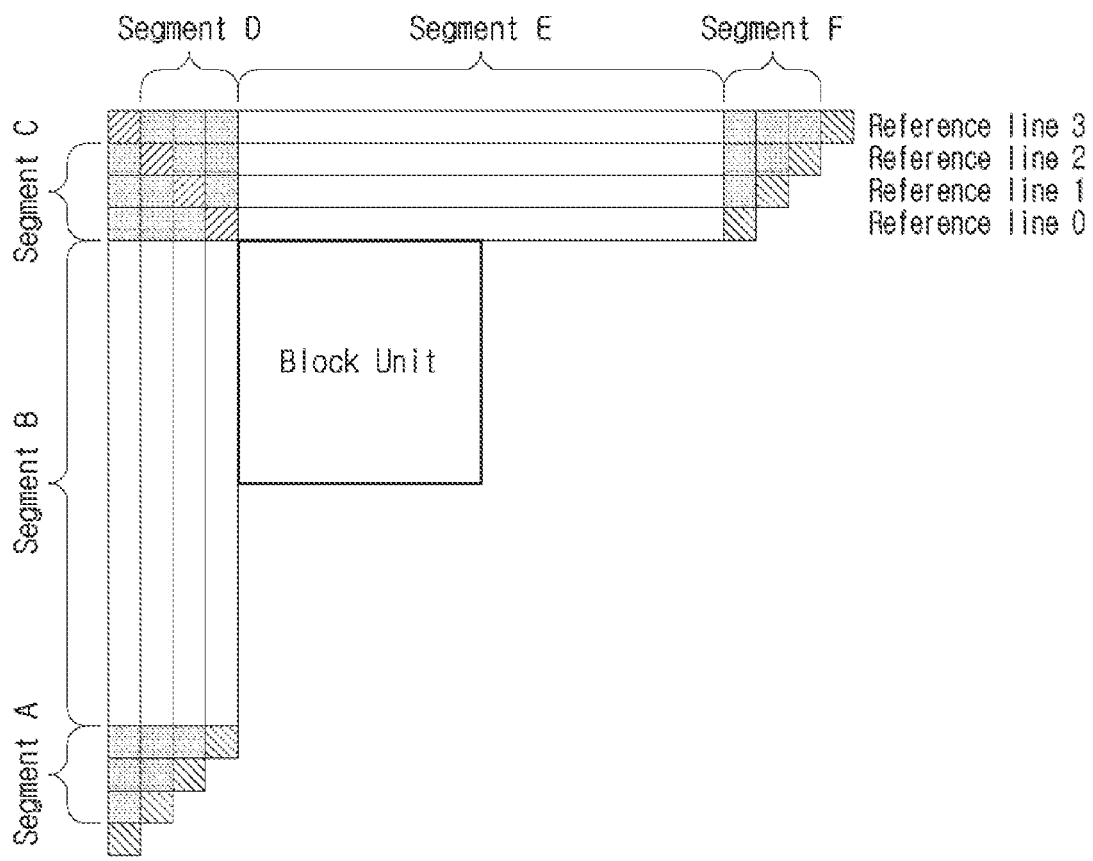
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
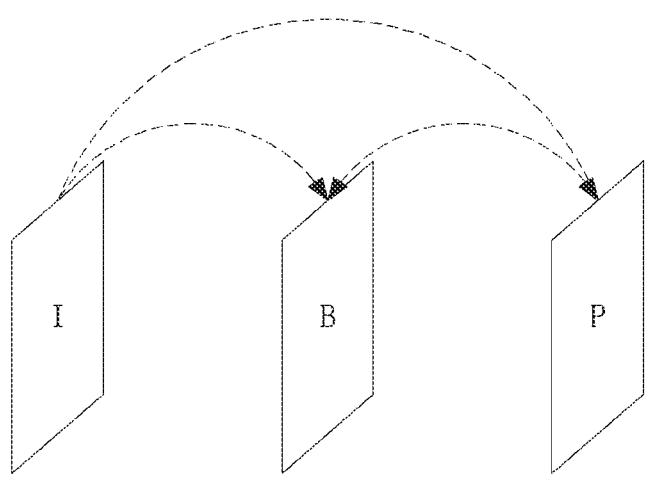
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
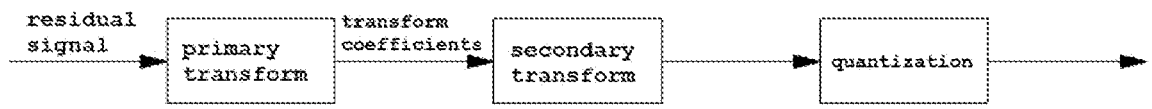
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, an in-loop filtering method using subsampling-based block classification, according to an embodiment of the present invention, will be described with reference to FIGS. 8 to 15.

In the present invention, the in-loop filtering method includes deblocking filtering, sample adaptive offset (SAO), bilateral filtering, and adaptive in-loop filtering, etc.

By applying at least one of the deblocking filtering and the SAO to a reconstructed picture (i.e., video frame) that is generated by summing a reconstructed intra/inter prediction block and a reconstructed residue block, it is possible to effectively reduce blocking artifacts and ringing artifacts within the reconstructed picture. The deblocking filtering is intended to reduce blocking artifacts around block boundaries by performing vertical filtering and horizontal filtering on the block boundaries. However, the deblocking filtering has a problem in that it cannot minimize the distortion between an original picture and a reconstructed picture when block boundaries are filtered. The sample adaptive offset (SAO) is a filtering technique of adding an offset to a specific sample after comparing the pixel value of the sample with the pixel value of an adjacent sample on a per sample basis or adding an offset to samples whose pixel values are within a specific pixel value range in order to reduce the ringing artifacts. The SAO has an effect of reducing the distortion between an original picture and a reconstructed picture to some degree by using rate-distortion optimization. However, when the difference between the original picture and the reconstructed picture is large, there is a limit in minimizing the distortion.

The bidirectional filtering refers to a filtering technique by which filter coefficients are determined on the basis of the distances from the center sample in a filtering target area to each of the other samples in the filtering target area and on the basis of the differences between the pixel value of the center sample and the pixel value of each of the other samples.

The adaptive in-loop filtering refers to a filtering technique to minimize the distortion between an original picture and a reconstructed picture by using a filter that can minimize the distortion between the original picture and the reconstructed picture.

Unless otherwise specifically stated in the description of the present invention, in-loop filtering means adaptive in-loop filtering. In addition, an adaptive in-loop filter may have the same meaning as an adaptive in-loop filter.

In the present invention, filtering means a process of applying a filter to at least one basic unit selected from among a sample, a block, a coding unit (CU), a prediction unit (PU), a transform unit (TU), a coding tree unit (CTU), a slice, a tile, a group of tiles (tile group), a picture, and a sequence. The filtering includes at least one of a block classification process, a filtering execution process, and a filter information encoding/decoding process.

In the present invention, a coding unit (CU), a prediction unit (PU), a transform unit (TU), and a coding tree unit (CTU) respectively have the same meaning as a coding block (CB), a (prediction block (PB), a transform block (TB), and a coding tree block (CTB).

In the present invention, a block refers to at least one of a CU, PU, TU, CB, PB, and TB that are used as a basic unit in an encoding/decoding process.

The in-loop filtering is performed such that bidirectional filtering, deblocking filtering, sample adaptive offset, and adaptive in-loop filtering are sequentially applied to a reconstructed picture to generate a decoded picture. However, the order in which the filtering schemes categorized as the in-loop filtering are applied to a reconstructed picture varies.

For example, the in-loop filtering may be performed such that the deblocking filtering, the sample adaptive offset, and the adaptive in-loop filtering are sequentially applied to a reconstructed picture in this order.

Alternatively, the in-loop filtering may be performed such that the bidirectional filtering, the adaptive in-loop filtering, the deblocking filtering, and the sample adaptive offset are sequentially applied to a reconstructed picture in this order.

Further alternatively, the in-loop filtering may be performed such that the adaptive in-loop filtering, the deblocking filtering, and the sample adaptive offset are sequentially applied to a reconstructed picture in this order.

Further alternatively, the in-loop filtering may be performed such that the adaptive in-loop filtering, the sample adaptive offset, and the deblocking filtering are sequentially applied to a reconstructed picture in this order.

In the present invention, a decoded picture refers to the output from the in-loop filtering or post-processing filtering performed on a reconstructed picture composed of reconstructed blocks each of which is generated by summing reconstructed residual blocks and the corresponding intra prediction blocks, or summing reconstructed blocks and the corresponding inter prediction blocks. In the present invention, the meaning of the decoded sample, block, CTU, or picture does not differ from that of the reconstructed sample, block, CTU, or picture, respectively.

The adaptive in-loop filtering is performed on a reconstructed picture to generate a decoded picture. The adaptive in-loop filtering may be performed on a decoded picture that has undergone at least one of the deblocking filtering, the sample adaptive offset, and the bidirectional filtering. In addition, the adaptive in-loop filtering may be performed on a reconstructed picture that has undergone the adaptive in-loop filtering. In this case, the adaptive in-loop filtering can be repeatedly performed N times on the reconstructed or decoded picture. In this case, N is a positive integer.

The in-loop filtering may be performed on a decoded picture that has undergone at least one of the in-loop filtering methods. For example, when at least one of the in-loop filtering methods is performed on a decoded picture which has undergone at least one of the other in-loop filtering methods, parameters used for the latter filtering method may be changed, and then the former filtering with the changed parameters may be performed on the decoded picture. In this case, the parameters include a coding parameter, a filter coefficient, the number of filter taps (a filter length), a filter shape, a filter type, the number of filtering executions, a filter strength, a threshold value, and/or combinations of those.

The filter coefficient means a coefficient constituting a filter. Alternatively, the filter coefficient means a coefficient value corresponding to a specific mask position in a mask form, and a reconstructed sample is multiplied by the coefficient value.

The number of filter taps refers to the length of a filter. When a filter is symmetric respect to one specific direction, filter coefficients to be encoded/decoded can be reduced by half. In addition, the filter tap refers to the width (horizontal dimension) or the height (vertical dimension) of a filter. Alternatively, the filter tap refers to both of the width (dimension in the transverse direction) and the height (dimension in the longitudinal direction) of a two-dimensional filter. In addition, the filter may be symmetrical with respect to two or more specific directions.

When a filter has a mask form, the filter may be a two-dimensional geometrical figure having a diamond/rhombus shape, a non-square rectangle shape, a square shape, a trapezoid shape, a diagonal shape, a snowflake shape, a number sign shape, a clover shape, a cross shape, a triangle shape, a pentagon shape, a hexagon shape, an octagon shape, a decagon shape, a dodecagon shape, or any combination of those. Alternatively, the filter shape may be a shape obtained by projecting a three-dimensional figure to a two-dimensional plane.

The filter type means a filter selected from among a Wiener filter, a low-pass filter, a high-pass filter, a linear filter, a non-linear filter, and a bidirectional filter.

In the present invention, i among the various filters, description will be focused on the Wiener filter. However, the present invention is not limited thereto, and a combination of the above filters may be used in embodiments of the present invention.

As the filter type for the adaptive in-loop filtering, the Wiener filter may be used. The Wiener filter is an optimal linear filter for effectively removing noise, blurring, and distortion within a picture, thereby improving coding efficiency. The Wiener filter is designed to minimize the distortion between an original picture and a reconstructed/decoded picture.

At least one of the filtering methods may be performed in an encoding process or a decoding process. The encoding process or the decoding process refers to encoding or decoding that is performed in units of at least one of a slice, a tile, a tile group, a picture, a sequence, a CTU, a block, a CU, a PU, and a TU. At least one of the filtering methods is performed during encoding or decoding that is performed in units of a slice, a tile, a tile group, a picture, or the like. For example, the Wiener filter is used for adaptive in-loop filtering during encoding or decoding. That is, in the phrase "adaptive in-loop filtering", the term "in-loop" means that the filtering is performed during the encoding or decoding process. When adaptive in-loop filtering is performed, a decoded picture that has undergone the adaptive in-loop filtering may be used as a reference picture when encoding or decoding a subsequent picture. In this case, since intra prediction or motion compensation is performed on the subsequent picture to be encoded/decoded by referring to a reconstructed picture that has undergone the adaptive in-loop filtering, coding efficiency of the subsequent picture as well as the coding efficiency of the current picture that has undergone in-loop filtering can be improved.

In addition, at least one of the filtering methods described above is performed in a CTU-based or block-based encoding or decoding process. For example, the Wiener filter is used for adaptive in-loop filtering in a CTU-based or block-based encoding or decoding process. That is, in the phrase "adaptive in-loop filtering", the term "in-loop" means that the filtering is performed during the CTU-based or block-based encoding or decoding process. When the adaptive in-loop filtering is performed on a per CTU basis or a per block basis, a decoded CTU or block which has undergone the adaptive in-loop filtering is used as a reference CTU or block for a subsequent CTU or block to be encoded/decoded. In this case, since intra prediction or motion compensation is performed on the subsequent CTU or block by referring to the current CTU or block on which the adaptive in-loop filtering is applied, the coding efficiency of the current CTU or block on which the in-loop filtering is applied is improved as well as the coding efficiency of the subsequent CTU or block to be encoded/decoded is improved.

In addition, at least one of the filtering methods is performed as post-processing filtering after a decoding process is performed. For example, the Wiener filter may be used as a post-processing filter after the decoding process is performed. When the Wiener filter is used after the decoding process, the Wiener filter is applied to a reconstructed/decoded picture before the reconstructed/decoded picture is output (i.e., displayed). When the post-processing filtering is performed, the decoded picture that has undergone the post-processing filtering may not be used as a reference picture for a subsequent picture to be encoded/decoded.

The adaptive in-loop filtering cannot be performed on a per block basis. That is, the block-based filter adaption cannot be performed. Here, the block-based filter adaption means that different filters are selected for different blocks, respectively. The block-based filter adaption also means block classification.

Figure 8A:
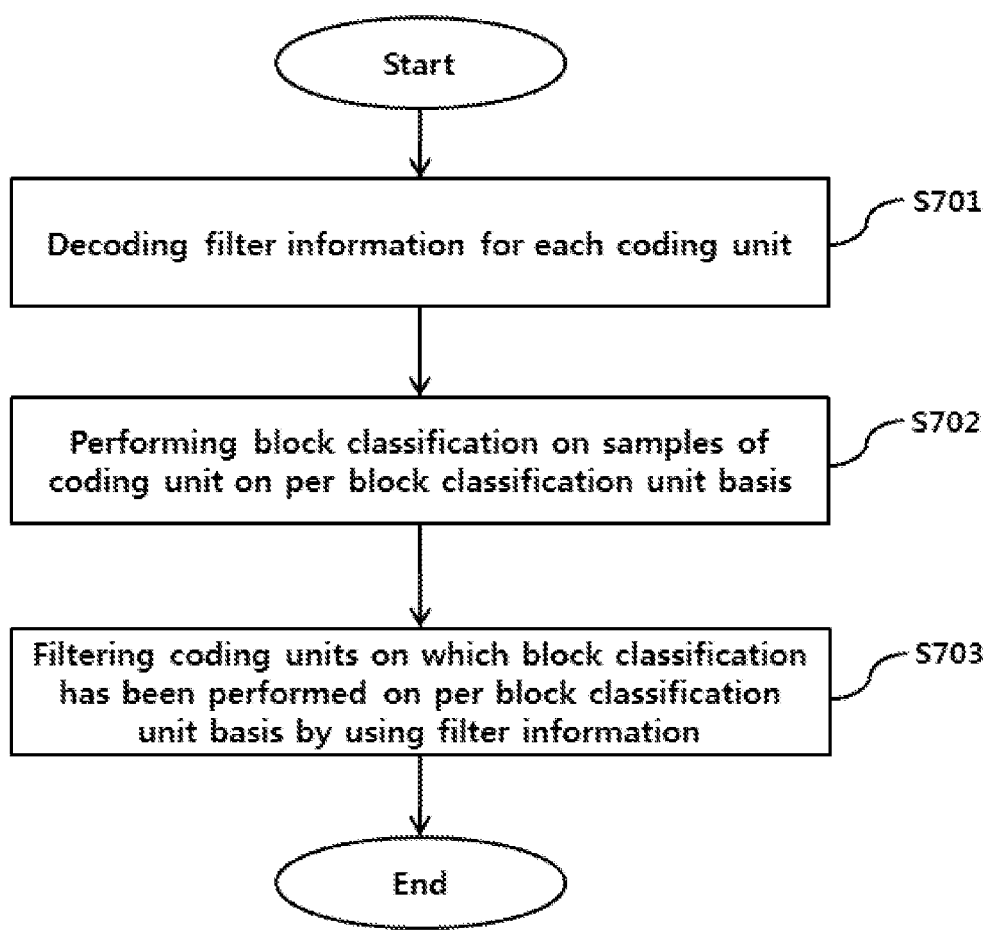
FIGS. 8a and 8b are flowcharts illustrating an image decoding and encoding method according to an embodiment of the present invention.

FIG. 8a is a flowchart illustrating a video decoding method according to an embodiment of the present invention.

Referring to FIG. 8a, a decoder decodes filter information for each coding unit (S701).

The filter information is not limited to filter information on a per coding unit basis. It also means filter information on a per slice, tile, tile group, picture, sequence, CTU, block, CU, PU, or TU basis.

The filter information includes information on whether filtering is executed, a filter coefficient value, the number of filters, the number of filter taps (a filter length), filter shape information, filter type information, information on whether a fixed filter is used for a block class index, and/or filter symmetry type information.

The filter shape information includes at least one shape selected from among a rhombus (diamond), a rectangle, a square, a trapezoid, a diagonal shape, a snowflake shape, a number sign shape, a clover shape, a cross shape, a triangle, a pentagon, a hexagon, an octagon, a decagon, and a dodecagon.

The filter coefficient value includes geometrically transformed filter coefficient values for each block in which samples are classified into classes on a per block classification unit basis.

On the other hand, examples of the filter symmetry type include at least one of a point symmetry, a horizontal symmetry, a longitudinal symmetry, and a diagonal symmetry.

In addition, the decoder performs block classification on samples of a coding unit on a per block classification unit basis (Step S702). In addition, the decoder allocates block class indices to the block classification units in the coding unit.

The block classification is not limited to the classification on a per coding unit basis. That is, the block classification may be performed in units of a slice, a tile, a tile group, a picture, a sequence, a CTU, a block, a CU, a PU, or a TU.

The block class indices are determined on the basis of directionality information and activity information.

At least one of the directionality information and the activity information is determined according to a gradient value with respect to at least one of vertical, horizontal, first diagonal, and second diagonal directions.

On the other hand, the gradient value is obtained using a one-dimensional Laplacian operation on a per block classification unit basis.

The one-dimensional Laplacian operation is preferably a one-dimensional Laplacian operation in which the operation position is a sub-sampled position.

Alternatively, the gradient value may be determined according to a temporal layer identifier.

In addition, the decoder filters the coding units on which the block classification has been performed on a per block classification unit basis by using the filter information (S703).

A filtering target unit is not limited to the coding unit. That is, the filtering may be performed in units of a slice, a tile, a tile group, a picture, a sequence, a CTU, a block, a CU, a PU, or a TU.

Figure 8B:
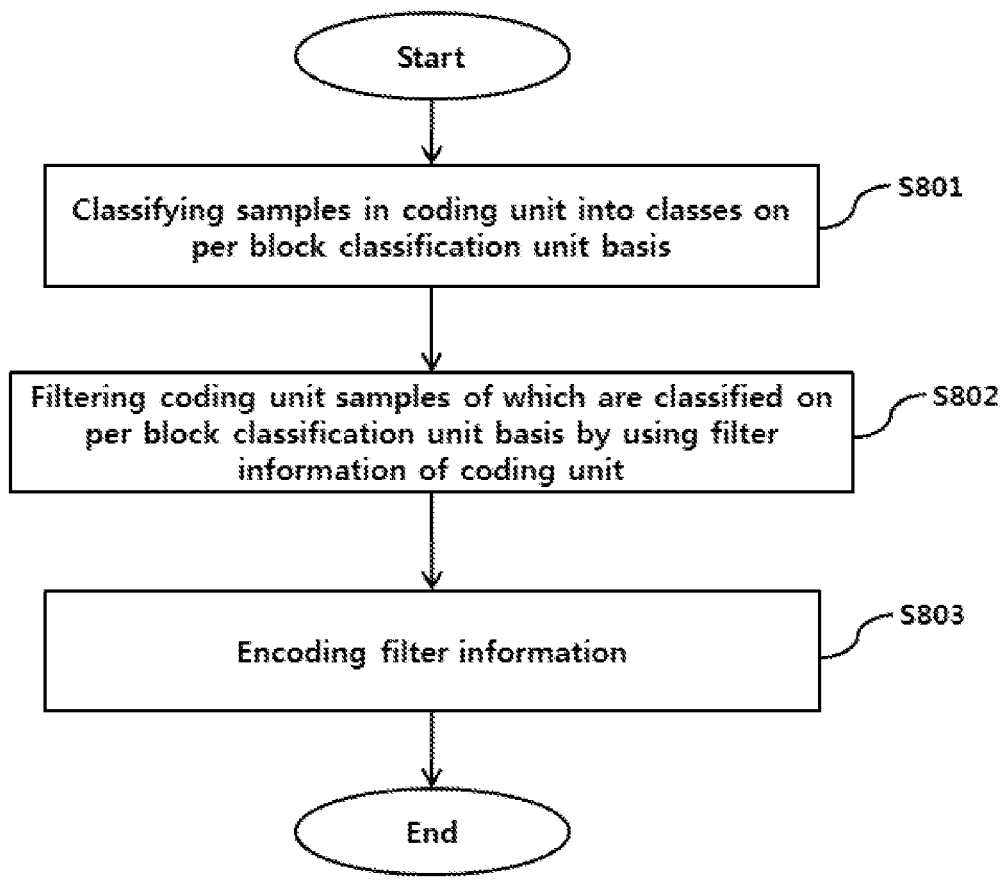

FIG. 8b is a flowchart illustrating a video encoding method according to an embodiment of the present invention.

Referring to FIG. 8b, an encoder classifies samples in a coding unit into classes on a per block classification unit basis (Step S801). In addition, the encoder allocates block class indices to the block classification units in each of the coding unit.

The basic unit for the block classification is not limited to the coding unit. That is, the block classification may be performed in units of a slice, a tile, a tile group, a picture, a sequence, a CTU, a block, a CU, a PU, or a TU.

The block class indices are determined on the basis of directionality information and activity information.

At least one of the directionality information and the activity information is determined on the basis of a gradient value with respect to at least one of vertical, horizontal, first diagonal, and second diagonal directions.

The gradient value is obtained using a one-dimensional Laplacian operation on a per block classification unit basis.

The one-dimensional Laplacian operation is preferably a one-dimensional Laplacian operation in which the operation position is a sub-sampled position.

Alternatively, the gradient value is determined according to a temporal layer identifier.

In addition, the encoder filters the coding unit the samples of which are classified on a per block classification unit basis by using the filter information of the coding unit (S802).

The basis unit for filtering is not limited to the coding unit. That is, the filtering may be performed in units of a slice, a tile, a tile group, a picture, a sequence, a CTU, a block, a CU, a PU, or a TU.

The filter information includes information on whether filtering is executed, a filter coefficient value, the number of filters, the number of filter taps (a filter length), filter shape information, filter type information, information on whether a fixed filter is used for a block class index, and/or filter symmetry type information.

Examples of the filter shape include at least one of a rhombus (diamond), a rectangle, a square, a trapezoid, a diagonal shape, a snowflake shape, a number sign shape, a clover shape, a cross shape, a triangle, a pentagon, a hexagon, an octagon, a decagon and a dodecagon.

The filter coefficient value includes filter coefficient values that are geometrically transformed on a per block classification unit basis.

Next, the encoder encodes the filter information (S803).

The filter information is not limited to filter information on a per coding unit basis. The filter information may be filter information on a per slice, tile, tile group, picture, sequence, CTU, block, CU, PU, or TU basis.

At the encoder side, the adaptive in-loop filtering process may be divided into several sub-steps such as a block classification, filtering, and filter information encoding.

Meanwhile, at the decoder side, the adaptive in-loop filtering process is divided into filter information decoding, block classification, and filtering steps.

Hereinafter, in order to avoid redundant description, the filter information encoding step and the filter information decoding step are collectively termed as the filter information encoding/decoding step.

Hereinafter, the block classification step will be described first.

Block class indices are allocated on a M×N-size block basis (or on a per block classification unit basis) within a reconstructed picture so that the blocks within a reconstructed picture can be classified into L classes. Here, the block class indices may be allocated not only to a reconstructed/decoded picture but also to at least one of a restored/decoded slice, a restored/decoded tile group, a restored/decoded tile, a restored/decoded CTU, and a restored/decoded block.

Here, N, M, and L are each positive integers. For example, N and M are each positive integers selected from among 2, 4, 8, 16, and 32, and L is a positive integer selected from among 4, 8, 16, 20, 25, and 32. When N and M are the same integer of 1, the block classification is performed on a sample basis rather than on a block basis. On the other hand, when N and M are different positive integers, a N×M-size block has a non-square shape. Alternatively, N and M may be the same positive integer.

For example, a total of 25 block class indices can be allocated to a reconstructed picture on a per 2×2-size block basis. For example, a total of 25 block class indices can be allocated to a reconstructed picture on a per 4×4-size block basis.

The block class index has a value within a range of from 0 to L−1, or may have a value within a range of from 1 to L.

The block class indices C are determined on the basis of at least one of a directionality value D and a quantized activity value Aq of an activity value A and is represented by Equation 1.

$$C = 5D + A_q \quad \text{[Equation 1]}$$

In Equation 1, 5 is an exemplary constant value. The constant value may be represented by J. In this case, J is a positive integer having a value smaller than L.

For example, in one embodiment in which the block classification is performed on a per 2×2-size block basis, the sum of one-dimensional Laplacian gradient values for the vertical direction is represented by gv, and the sums of one-dimensional Laplacian gradient values for the horizontal direction, the first diagonal direction (an angle of 135°), and the second diagonal direction (an angle of 45°) are respectively represented by gh, gd1, and gd2. The Laplacian operations for the vertical direction, the horizontal direction, the first directional direction, and the second diagonal direction are respectively represented by Expressions 2, 3, 4, 5. The directionality value D and the activity value A are derived by using the sum of the gradient values. In one embodiment, the sum of the gradient values is used. Alternatively, an arbitrary statistical value of the gradient values can be used instead of the sum of the gradient values.

$$g_v = \Sigma_{k=i-2}^{i+3}\Sigma_{l=j-2}^{j+3} V_{k,l}, V_{k,l} = |2R(k,l)-R(k,l-1)-R(k,l+1)| \quad \text{[Equation 2]}$$

$$g_h = \Sigma k = i-2^{i+3}\Sigma_{l=j-2}^{j+3} H_{k,l}, H_{k,l} = |2R(k,l)-R(k-1,l)-R(k+1,l)| \quad \text{[Equation 3]}$$

$$g_{d1} = \Sigma_{k=i-2}^{i+3}\Sigma_{l=j-2}^{j+3} D1_{k,l}, D1_{k,l} = |2R(k,l)-R(k-1,l-1)-R(k+1,l+1)| \quad \text{[Equation 4]}$$

$$g_{d2} = \Sigma_{k=i-2}^{i+3}\Sigma_{l=j-2}^{j+3} D2_{k,l}, D2_{k,l} = |2R(k,l)-R(k-1,l+1)-R(k+1,l-1)| \quad \text{[Equation 5]}$$

In Equations 2 through 5, i and j represent the coordinates of the upper left position in the horizontal direction and in the vertical direction, respectively, and R(i, j) represents a reconstructed sample value at a position (i, j).

In Equations 2 through 5, k and l respectively represent horizontal and vertical operation ranges to produce the sum of the results Vk,l, Hk,l, D1$k,l$, D2$k,l$ of the sample-based one-dimensional Laplacian operations for the respective directions. The result of the sample-based one-dimensional Laplacian operation for one direction means a sample-based gradient value for the corresponding direction. That is, the result of the one-dimensional Laplacian operation means a gradient value. The one-dimensional Laplacian operation is performed on each of the vertical, horizontal, first diagonal, and second diagonal directions, and indicates a gradient value for the corresponding direction. In addition, the results of the one-dimensional Laplacian operations for the vertical, horizontal, first diagonal, and second diagonal directions are respectively represented by Vk,l, Hk,l, D1$k,l$, D2$k,l$.

For example, k and l may be the same range. That is, the horizontal length and the vertical length of the operation range in which the one-dimensional Laplacian sum is calculated may be the same.

Alternatively, k and l may be different ranges. That is, the horizontal length and the vertical length of the operation range in which the one-dimensional Laplacian sum is calculated may be different.

As an example, k is a range of from i−2 to i+3 and l is a range of from j−2 to j+3. In this case, the range in which the one-dimensional Laplacian sum is calculated is a 6×6 size. In this case, the operation range in which the one-dimensional Laplacian sum is calculated is larger than the size of the block classification unit.

As another example, k is a range of from i−1 to i+2 and l is a range of from j−1 to j+2. In this case, the operation range in which the one-dimensional Laplacian sum is calculated is a 4×4 size. In this case, the operation range in which the one-dimensional Laplacian sum is calculated is larger than the size of the block classification unit.

As a further example, k is a range of from i to i+1 and l is a range of from j to j+1. In this case, the operation range in which the one-dimensional Laplacian sum is calculated is a 2×2 size. In this case, the operation range in which the one-dimensional Laplacian sum is calculated is equal to the size of the block classification unit.

For example, the operation range in which the sum of the results of the one-dimensional Laplacian operations is calculated has a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

For example, the block classification unit has a two-dimensional geometric shape selected from among a rhombus/diamond, a rectangle, a square, a trapezoid, a diagonal shape, a snowflake shape, a number sign shape, a clover shape, a cross shape, a triangle, a pentagon, a hexagon, an octagon, a decagon, and a dodecagon.

For example, the range in which the sum of the one-dimensional Laplacian operations is calculated has a S×T size. In this case, S and T are each zero or positive integers.

Meanwhile, D1 representing the first diagonal and D2 representing the second diagonal may mean DO representing the first diagonal and D1 representing the second diagonal, respectively.

For example, in one embodiment in which block classification is performed on a per 4×4-size block, the sums gv, gh, gd1, gd2 of the gradient values for the horizontal direction, the vertical direction, the first diagonal direction, and the second diagonal direction are calculated by Equations 6, 7, 8, 9 based on the one-dimensional Laplacian operation. The directionality value D and the activity value A are derived by using the sum of the gradient values. In one the embodiment, the sum of the gradient values is used. Alternatively, an arbitrary statistical value of the gradient values may be used instead of the sum of the gradient values.

$$g_v = \Sigma_{k=i-2}^{i+5}\Sigma_{l=j-2}^{j+5} V_{k,l}, V_{k,l} = |2R(k,l)-R(k,l-1)-R(k,l+1)| \quad \text{[Equation 6]}$$

$$g_h = \Sigma_{k=i-2}^{i+5}\Sigma_{l=j-2}^{j+5} H_{k,l}, H_{k,l} = |2R(k,l)-R(k-1,l)-R(k+1,l)| \quad \text{[Equation 7]}$$

$$g_{d1} = \Sigma_{k=i-2}^{i+5}\Sigma_{l=j-2}^{j+5} D1_{k,l}, D1_{k,l} = |2R(k,l)-R(k-1,l-1)-R(k+1,l+1)| \quad \text{[Equation 8]}$$

$$g_{d2} = \Sigma_{k=i-2}^{i+5}\Sigma_{l=j-2}^{j+5} D2_{k,l}, D2_{k,l} = |2R(k,l)-R(k-1,l+1)-R(k+1,l-1)| \quad \text{[Equation 9]}$$

In Equations 6 through 9, i and j represent the coordinates of the upper left position in the horizontal direction and the vertical direction, respectively, and R(i, j) represents a reconstructed sample value at a position (i, j).

In Equations 6 through 9, k and 1 respectively represent horizontal and vertical operation ranges for calculation of the sum of the results Vk,l, Hk,l, D1$k,l$, D2$k,l$ of the sample-based one-dimensional Laplacian operations for the respective directions. The result of the sample-based one-dimensional Laplacian operation for one direction means a sample-based gradient value for the corresponding direction. That is, the result of the one-dimensional Laplacian operation means a gradient value. The one-dimensional Laplacian operation is performed for each of the vertical, horizontal, first diagonal, and second diagonal directions, and indicates a gradient value for the corresponding direction. In addition, the results of the one-dimensional Laplacian operations for the vertical, horizontal, first diagonal, and second diagonal directions are represented as Vk,l, Hk,l, D1$k,l$, D2$k,l$, respectively.

For example, k and l may be the same range. That is, the horizontal length and the vertical length of the operation range in which the sum of one-dimensional Laplacian operations is calculated may be the same.

Alternatively, k and l may be different ranges. That is, the horizontal length and the vertical length of the operation range in which the sum of one-dimensional Laplacian operations is calculated may be different.

As an example, k is a range of from i−2 to i+5 and l is a range of from j−2 to j+5. In this case, the operation range in which the sum of the one-dimensional Laplacian operations is calculated is a 8×8 size. In this case, the operation range in which the sum of one-dimensional Laplacian operations is calculated is larger than the size of the block classification unit.

As another example, k is a range of from i to i+3 and l is a range of from j to j+3. In this case, the operation range in which the sum of the one-dimensional Laplacian operations is calculated is a 4×4 size. In this case, the operation range in which the sum of one-dimensional Laplacian operations is calculated is equal to the size of the block classification unit.

For example, the operation range in which the sum of the results of one-dimensional Laplacian operations is calculated has a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

For example, the operation range in which the sum of the one-dimensional Laplacian operations is calculated has a S×T size. In this case, S and T are each zero or positive integers.

For example, the block classification unit has a two-dimensional geometric shape selected from among a rhombus/diamond, a rectangle, a square, a trapezoid, a diagonal shape, a snowflake shape, a number sign shape, a clover shape, a cross shape, a triangle, a pentagon, a hexagon, an octagon, a decagon, and a dodecagon.

For example, in one embodiment in the block classification is performed on a per 4×4-size block basis, the one-dimensional Laplacian sums gv, gh, gd1, gd2 of gradient values with respect to the horizontal, vertical direction, first diagonal, and second diagonal directions are calculated by Equations 10 to 13, respectively. The gradient values are represented on a sub-sample basis to reduce the computational complexity for the block classification. The directionality value D and the activity value A are derived by using the sum of the gradient values. In one the embodiment, the sum of the gradient values is used. Alternatively, an arbitrary statistical value of the gradient values can be used instead of the sum of the gradient values.

$$g_v = \sum_k \sum_l V_{k,l}, \; V_{k,l} = |2R(k,l) - R(k,l-1) - R(k,l+1)|, \quad \text{[Equation 10]}$$

$$k = i-2, i, i+2, i+4, l = j-2, \ldots, j+5$$

$$g_h = \sum_k \sum_l H_{k,l}, \; H_{k,l} = |2R(k,l) - R(k-1,l) - R(k+1,l)|, \quad \text{[Equation 11]}$$

$$k = i-2, \ldots, i+5, l = j-2, j, j+2, j+4$$

$$g_{d1} = \sum_k \sum_l m_{k,l} D1_{k,l}, \quad \text{[Equation 12]}$$

$$D1_{k,l} = |2R(k,l) - R(k-1,l-1) - R(k+1,l+1)|,$$

$$k = i-2, \ldots, i+5, l = j-2, \ldots, j+5$$

$$m_{k,l} \begin{cases} 1 & \text{if both } k \text{ and } l \text{ are even} \\ 1 & \text{if both } k \text{ and } l \text{ are odd} \\ 0 & \text{otherwise} \end{cases}$$

$$g_{d2} = \sum_k \sum_l n_{k,l} D2_{k,l}, \quad \text{[Equation 13]}$$

$$D2_{k,l} = |2R(k,l) - R(k-1,l+1) - R(k+1,l-1)|,$$

$$k = i-2, \ldots, i+5, l = j-2, \ldots, j+5$$

$$n_{k,l} \begin{cases} 1 & \text{if } k \text{ is even and } l \text{ is odd} \\ 1 & \text{if } k \text{ is odd and } l \text{ is even} \\ 0 & \text{otherwise} \end{cases}$$

In Equations 10 to 13, i and j represent the coordinates of the upper left position in the horizontal direction and in the vertical direction, respectively, and R(i, j) represents a reconstructed sample value at a position (i, j).

In Equations 10 to 13, k and l respectively represent horizontal and vertical operation ranges in which the sum of the results Vk,l, Hk,l, D1k,l, D2k,l of the sample-based one-dimensional Laplacian operations is calculated. The result of the sample-based one-dimensional Laplacian operation for one direction means a sample-based gradient value for the corresponding direction. That is, the result of the one-dimensional Laplacian operation means a gradient value. The one-dimensional Laplacian operation is performed for each of the vertical, horizontal, first diagonal, and second diagonal directions, and indicates a gradient value for the corresponding direction. In addition, the results of the one-dimensional Laplacian operations for the vertical, horizontal, first diagonal, and second diagonal directions are denoted as Vk,l, Hk,l, D1k,l, D2k,l, respectively.

For example, k and l may be the same range. That is, the horizontal length and the vertical length of the operation range in which the sum of the one-dimensional Laplacian operation is calculated are the same.

Alternatively, k and l may be different ranges. That is, the horizontal length and the vertical length of the operation range in which the sum of the one-dimensional Laplacian operations is calculated may be different.

As an example, k is a range of from i−2 to i+5 and l is be a range of from j−2 to j+5. In this case, the operation range in which the sum of the one-dimensional Laplacian operations is calculated is a 8×8 size. In this case, the operation range in which the one-dimensional Laplacian sum is calculated is larger than the size of the block classification unit.

As another example, k is a range of from i to i+3 and l is a range of from j to j+3. In this case, the operation range in which the sum of the one-dimensional Laplacian operations is calculated is a 4×4 size. In this case, the operation range in which the sum of one-dimensional Laplacian operations is calculated is equal to the size of the block classification unit.

For example, the operation range in which the sum of the results of the one-dimensional Laplacian operations is calculated has a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

For example, the operation range in which the sum of the one-dimensional Laplacian operations is calculated has a S×T size. In this case, S and T are zero or positive integers.

For example, the block classification unit has a two-dimensional geometric shape selected from among a rhombus/diamond, a rectangle, a square, a trapezoid, a diagonal shape, a snowflake shape, a number sign shape, a clover shape, a cross shape, a triangle, a pentagon, a hexagon, an octagon, a decagon, and a dodecagon.

According to an embodiment of the present invention, a sample-based gradient value calculation method can calculate a gradient value by performing the one-dimensional Laplacian operation on the samples within the operation range along the corresponding direction. Here, the statistical value of the gradient values can be calculated by calculating a statistical value of the results of the one-dimensional Laplacian operations performed on at least one of the samples within the operation range in which the sum of one-dimensional Laplacian operations is calculated. In this case, the statistical value is any one of a sum, a weighted sum, and an average value.

For example, for calculation of a gradient value for the horizontal direction, the one-dimensional Laplacian operation is performed at every sample position within the operation range in which the sum of the one-dimensional Laplacian operations is calculated. In this case, the gradient value for the horizontal direction can be calculated at an interval of P rows within the operation range in which the sum of the one-dimensional Laplacian operations is calculated. Here, P is a positive integer.

Alternatively, for the calculation of the gradient value for the vertical direction, the one-dimensional Laplacian operation is performed at every sample position within the operation range, on a column, in which the sum of the one-dimensional Laplacian operations is calculated. In this case, the gradient value for the vertical direction can be calculated at an interval of P columns within the operation range in which the sum of the one-dimensional Laplacian operations is calculated. Here, P is a positive integer.

Further alternatively, for calculation of a gradient value for the first diagonal direction, within the operation range in which the sum of the one-dimensional Laplacian operations is calculated, the one-dimensional Laplacian operations are performed on the sample positions at an interval of P rows or Q columns in at least one of the horizontal direction and the vertical direction, thereby obtaining the gradient value for the first diagonal direction. Here, P and Q are zero or positive integers.

Further alternatively, for calculation of the gradient value for the second diagonal direction, within the operation range in which the sum of the one-dimensional Laplacian operations is calculated, the one-dimensional Laplacian operations are performed on the sample positions at an interval of P rows or Q columns in at least one of the horizontal direction and the vertical direction, thereby obtaining the gradient value for the second diagonal direction. Here, P and Q are zero or positive integers.

According to an embodiment of the present invention, a sample-based gradient value calculation method can calculate a gradient value by performing the one-dimensional Laplacian operation on at least one sample within the operation range in which the sum of the one-dimensional Laplacian operations is calculated. Here, the statistical value of the gradient values can be calculated by calculating a statistical value of the results of the one-dimensional Laplacian operations performed on at least one sample among the samples within the operation range in which the sum of the one-dimensional Laplacian operations is calculated. In this case, the statistical value is any one of a sum, a weighted sum, and an average value.

For example, for calculation of a gradient value, the one-dimensional Laplacian operation is performed at every sample position within the operation range in which the sum of the one-dimensional Laplacian operations is calculated. In this case, the gradient value can be calculated at an interval of P rows within the operation range in which the sum of the one-dimensional Laplacian operations is calculated. Here, P is a positive integer.

Alternatively, for the calculation of the gradient value, the one-dimensional Laplacian operation is performed at every sample position within the operation range on a column in which the sum of the one-dimensional Laplacian operations is calculated. In this case, the gradient value can be calculated at an interval of P rows within the operation range in which the sum of the one-dimensional Laplacian operations is calculated. Here, P is a positive integer.

Further alternatively, for calculation of the gradient value, within the operation range in which the sum of the one-dimensional Laplacian operations is calculated, the one-dimensional Laplacian operation is performed on the sample positions at an interval of P rows or Q columns in at least one of the horizontal direction and the vertical direction, thereby obtaining the gradient value. Here, P and Q are zero or positive integers.

Further alternatively, for calculation of the gradient value, within the operation range in which the sum of the one-dimensional Laplacian operations is calculated, the one-dimensional Laplacian operation is performed on the sample positions at an interval of P rows and Q columns in the horizontal direction and the vertical direction, thereby obtaining the gradient value. Here, P and Q are zero or positive integers.

On the other hand, the gradient refers to at least one of a gradient with respect to a horizontal direction, a gradient with respect to a vertical direction, a gradient with respect to a first diagonal direction, and a gradient with respect to a second diagonal direction.

FIG. 9 is a view showing an example of determining a slope value according to horizontal, vertical, first diagonal, and second diagonal directions based on a subsample.

As illustrated in FIG. 9, when the block classification is performed on a 4×4-size block basis, at least one of the sums gv, gh, gd1, gd2 of the gradient values for the vertical, horizontal, first diagonal, and second diagonal directions can be calculated on the basis of subsampling. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the vertical, horizontal, first diagonal, and second diagonal directions at positions V, H, D1, and D2, respectively. In addition, the positions at which the one-dimensional Laplacian operation is performed are sub-sampled positions. In FIG. 9, the block class indices C are allocated to 4×4-size blocks that are shaded. In this case, the operation range in the one-dimensional Laplacian sum is calculated is larger than the size of the block classification unit. Here, a thin solid-line rectangle represents a reconstructed sample position, and a thick solid-line rectangle represents the operation range in which the one-dimensional Laplacian sum is calculated.

According to an embodiment of the present invention, a gradient value may be calculated by performing the one-dimensional Laplacian operation on a sample disposed at a specific position in an N×M-size block on the basis of subsampling. In this case, the specific position may be at least one of an absolute position and a relative position within a block. Here, a statistical value of the gradient values may be calculated by calculating a statistical value of the results of the one-dimensional Laplacian operations performed on at least one sample among the samples within the operation range in which the one-dimensional Laplacian sum is calculated. In this case, the statistical value is any one of a sum, a weighted sum, and an average value.

For example, the absolute position means the upper left position within an N×M block.

Alternatively, the absolute position mean the lower right position within an N×M block.

Further alternatively, the relative position means the center position within the N×M block.

According to an embodiment of the present invention, a gradient value may be calculated by performing the one-dimensional Laplacian operation on R samples within an N×M-size block on the basis of subsampling. In this case, P and Q are zero or positive integers. In addition, R is equal to or less than the product of N and M. Here, a statistical value of the gradient values may be calculated by calculating a statistical value of the results of the one-dimensional Laplacian operations performed on at least one sample among the samples within the operation range in which the one-dimensional Laplacian sum is calculated. In this case, the statistical value is any one of a sum, a weighted sum, and an average value.

For example, when R is 1, the one-dimensional Laplacian operation is performed on only one sample within an N×M block.

Alternatively, when R is 2, the one-dimensional Laplacian operation is performed on only two samples within an N×M block.

Further alternatively, when R is 4, the one-dimensional Laplacian operation is performed on only 4 samples within each N×M-size block.

According to an embodiment of the present invention, a gradient value may be calculated by performing the one-dimensional Laplacian operation on R samples within each N×M-size block on the basis of subsampling. In this case, R is a positive integer. In addition, R is equal to or less than the product of N and M. Here, a statistical value of the gradient values is obtained by calculating a statistical value of the results of the one-dimensional Laplacian operations performed on at least one sample among the samples within the operation range in which the one-dimensional Laplacian sum is calculated. In this case, the statistical value is any one of a sum, a weighted sum, and an average value.

For example, when R is 1, the one-dimensional Laplacian operation is performed on only one sample within each N×M-size block in which the one-dimensional Laplacian sum is calculated.

Alternatively, when R is 2, the one-dimensional Laplacian operation is performed on only two samples within each N×M-size block in which the one-dimensional Laplacian sum is calculated.

Further alternatively, when R is 4, the one-dimensional Laplacian operation is performed on only 4 samples within each N×M-size block in which the one-dimensional Laplacian sum is calculated.

FIGS. 10 to 12 are diagrams illustrating methods of determining gradient values at specific sample positions with respect to horizontal, vertical, first diagonal, and second diagonal directions. The specific sample position may be a sub-sampled sample position within a block classification unit or may be a sub-sampled sample position within an operation range in which the sum of one-dimensional Laplacian operations is calculated. In addition, the specific sample positions are the sample positions within each block. Alternatively, the specific sample positions may vary from block to block. In addition, the specific sample positions may be the same regardless of the direction of one-dimensional Laplacian operation to be calculated. In addition, the specific sample positions may be the same for each block regardless of the direction of one-dimensional Laplacian operation.

As illustrated in FIG. 10, when the block classification is performed on a 4×4-size block basis, at least one of the sums gv, gh, gd1, gd2 of the gradient values at one or more specific sample positions. Here, V, H, D1, and D2 represent the results of the sample-based one-dimensional Laplacian operations for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 10, the block class indices C are allocated to 4×4-size blocks that are shaded. In this case, the operation range for calculation of one-dimensional Laplacian sum may be larger than the size of the block classification unit. Here, a thin solid-line rectangle represents a reconstructed sample position, and a thick solid-line rectangle represents an operation range in which one-dimensional Laplacian sum is calculated.

As illustrated in FIG. 10, regardless of the direction of the one-dimensional Laplacian operation, the specific sample position at which the one-dimensional Laplacian operation is performed are the same. In addition, as illustrated in FIG. 10, the pattern of the sample positions on which the one-dimensional Laplacian calculation is performed may be referred to as a checkerboard pattern or a quincunx pattern. In addition, all of the sample positions on which one-dimensional Laplacian operation is performed are even-numbered or odd-numbered sample positions, in both the horizontal direction (x-axis direction) and the vertical direction (y-axis direction), within the operation range in which the one-dimensional Laplacian sum is calculated, within the block classification unit or block unit.

As illustrated in FIG. 11, when the block classification is performed on a 4×4-size block basis, at least one of the sums gv, gh, gd1, and gd2 of the gradient values is calculated at one or more specific sample positions. Here, V, H, D1, and D2 represent the results of the sample-based one-dimensional Laplacian operations performed on a sample basis for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 11, the block class indices C are allocated to 4×4-size blocks that are shaded. In this case, an operation range for the one-dimensional Laplacian sum may be larger than the size of the block classification unit. Here, a thin solid-line rectangle represents a reconstructed sample position, and a thick solid-line rectangle represents an operation range in which the one-dimensional Laplacian sum is calculated.

As illustrated in FIG. 11, regardless of the one-dimension Laplacian operation direction, the specific sample position at which the one-dimensional Laplacian operation is performed are the same. In addition, as illustrated in FIG. 11, the pattern of the sample positions at which the one-dimensional Laplacian calculation is performed may be referred to as a checkerboard pattern or a quincunx pattern. In addition, the sample positions at which the one-dimensional Laplacian operation is performed are even-numbered or odd-numbered sample positions in both the horizontal direction (x-axis direction) and the vertical direction (y-axis direction) in a one-dimensional Laplacian operation range within a block classification unit or block unit.

As illustrated in FIG. 12, when block classification is performed on a 4×4-size block basis, at least one of the sums gv, gh, gd1, and gd2 of the gradient values is calculated at one or more specific sample positions. Here, V, H, D1, and D2 represent the results of the sample-based one-dimensional Laplacian operations on a sample basis for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 12, the block class indices C are allocated to 4×4-size blocks that are shaded. In this case, an operation range in which the one-dimensional Laplacian sum is calculated may be larger than the size of the block classification unit. Here, a thin solid-line rectangle represents a reconstructed sample position, and a thick solid-line rectangle represents an operation range in which the one-dimensional Laplacian sum is calculated.

According to an embodiment of the present invention, two or more values of the sums gv, gh, gd1, and gd2 of the gradient values along the vertical direction, the horizontal direction, the first diagonal direction, and the second diagonal direction are compared with each other.

For example, after calculating the sums of the gradient values, the sum gv of the gradient values for the vertical direction and the sum gh of the gradient value for the horizontal direction are compared, and the maximum value $g_{h,v}^{max}$ and the minimum value $g_{h,v}^{min}$ of the sum of the gradient values for the vertical direction and the sum of the gradient values for the horizontal direction are derived according to Equation 14.

$$g_{h,v}^{max} = \max(g_h, g_v), g_{h,v}^{min} = \min(g_h, g_v),\qquad \text{[Equation 14]}$$

In this case, in order to compare the sum gv of the gradient values for the vertical direction and the sum gh of the gradient values for the horizontal direction, the values of the sums are compared according to Equation 15.

$$g_{h,v}^{max} = \begin{cases} g_h & \text{if } g_h \geq g_v \\ g_v & \text{if } g_v > g_h \end{cases}, g_{h,v}^{min} = \begin{cases} g_h & \text{if } g_h \leq g_v \\ g_v & \text{if } g_v < g_h \end{cases}, \qquad \text{[Equation 15]}$$

Alternatively, for example, the sum gd1 of the gradient values for the first diagonal direction and the sum gd2 of the gradient values for the second diagonal direction are compared, and the maximum value $q_{d0,d1}^{max}$ and the minimum value $g_{d0,d1}^{min}$ of the sum of the gradient values for the first diagonal direction and the sum of the gradient values for the second diagonal direction are derived according to Equation 16.

$$g_{d0,d1}^{max} = \max(g_{d0}, g_{d1}), g_{d0,d1}^{min} = \min(g_{d0}, g_{d1}).\qquad \text{[Equation 16]}$$

In this case, in order to compare the sum gd1 of the gradient values for the first diagonal direction and the sum gd2 of the gradient values for the second diagonal direction, the values of the sums are compared according to Equation 17.

$$g_{d0,d1}^{max} = \begin{cases} g_{d0} & \text{if } g_{d0} \geq g_{d1} \\ g_{d1} & \text{if } g_{d1} > g_{d0} \end{cases}, g_{d0,d1}^{min} = \begin{cases} g_{d0} & \text{if } g_{d0} \leq g_{d1} \\ g_{d1} & \text{if } g_{d1} < g_{d0} \end{cases}, \qquad \text{[Equation 17]}$$

According to one embodiment of the present invention, in order to calculate the directionality value D, the maximum values and the minimum values are compared with two threshold values t1 and t2 as described below.

The directionality value D is a positive integer or zero. For example, the directionality value D may have a value within a range of from 0 and 4. For example, the directionality value D may have a value within a range of from 0 and 2.

In addition, the directionality value D may be determined according to the characteristics of a region. For example, the directionality value Ds 0 to 4 represent the following: 0 represents a texture region; 1 represents a strong horizontal/vertical directionality; 2 represents a weak horizontal/vertical directionality; 3 represents a strong first/second diagonal directionality; and 4 represents a weal first/second diagonal directionality. The directionality value D is determined by steps described below.

Step 1: when $g_{h,v}^{max} \leq t_1 \cdot g_{h,v}^{min}$ and $g_{d0,d1}^{max} \leq t_1 \cdot g_{d0,d1}^{min}$ are satisfied the value D is set to 0

Step 2: the process proceeds to step 3 when $g_{h,v}^{max}/g_{h,v}^{min} > g_{d0,d1}^{max}/g_{d0,d1}^{min}$ is satisfied, but proceeds to step 4 when not satisfied.

Step 3: the value D is set to 2 when $g_{d0,d1}^{max} > t_2 \cdot g_{d0,d1}^{min}$ is satisfied, but set to 1 when not satisfied.

Step 4: the value D is set to 4 when $g_{d0,d1}^{max} > t_2 \cdot g_{d0,d1}^{min}$ is satisfied, but set to 3 when not satisfied.

Where, the threshold values t1 and t2 are positive integers, and t1 and t2 may have the same value or different values. For example, t1 and t2 are 2 and 9, respectively. In another example, t1 and t2 are both 1. In a further example, t1 and t2 are 1 and 9, respectively.

The activity value A can be expressed as Equation 18 when block classification is performed on a 2×2-size block basis.

$$A = \Sigma_{k=i-2}^{i+3} \Sigma_{l=j-2}^{j+3}(V_{k,l} + H_{k,l})\qquad \text{[Equation 18]}$$

For example, k and l are the same range. That is, a horizontal length and a vertical length of the operation range in which the sum of the one-dimensional Laplacian operations is calculated are equal.

Alternatively, for example, k and l are different ranges from each other. That is, the horizontal length and the vertical length of the operation range in which the sum of the one-dimensional Laplacian operations is calculated are different.

Further alternatively, for example, k is a range of from i−2 to i+3 and l is a range of from j−2 to j+3. In this case, the operation range in which the sum of the one-dimensional Laplacian operations is calculated is a 6×6 size.

Further alternatively, for example, k is a range of from i−1 to i+2 and l is a range of from j−1 to j+2. In this case, the operation range in which the sum of the one-dimensional Laplacian operations is calculated is a 4×4 size.

Further alternatively, for example, k is a range of from i to i+1 and l is a range of from j to j+1. In this case, the operation range in which the sum of the one-dimensional Laplacian operations is calculated is a 2×2 size. In this case, the operation range in which the sum of one-dimensional Laplacian operations is calculated may be equal to the size of the block classification unit.

For example, the operation range in which the sum of the results of the one-dimensional Laplacian operations is calculated may have a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

In addition, the activity value A can be expressed as Equation 19 when block classification is performed on a 4×4-size block basis.

$$A = \Sigma_{k=i-2}^{i+5} \Sigma_{l=j-2}^{j+5} (V_{k,l} + H_{k,l}) \qquad \text{[Equation 19]}$$

For example, k and l are the same range. That is, a horizontal length and a vertical length of the operation range in which the sum of the one-dimensional Laplacian operations is calculated are equal.

Alternatively, for example, k and l are different ranges from each other. That is, the horizontal length and the vertical length of the operation range in which the sum of the one-dimensional Laplacian operations is calculated are different.

Further alternatively, for example, k is a range of from i−2 to i+5 and l is a range of from j−2 to j+5. In this case, the operation range in which the sum of the one-dimensional Laplacian operations is calculated is a 8×8 size.

Further alternatively, for example, k is a range of from i to i+3 and l is a range of from j to j+3. In this case, the operation range in which the sum of the one-dimensional Laplacian operations is calculated is a 4×4 size. In this case, the operation range in which the sum of one-dimensional Laplacian operations is calculated may be equal to the size of the block classification unit.

For example, the operation range in which the sum of the results of the one-dimensional Laplacian operations is calculated may have a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

On the other hand, the activity value A is quantized to produce a quantized activity value Aq that is within a range of from I to J. Here, I and J are each positive integer or zero. For example, I and J are 0 and 4, respectively.

The quantized activity value Aq can be determined using a predetermined method.

For example, the quantized activity value Aq can by Equation 20. In this case, the quantized activity value Aq may be included within the range of from a specific minimum value X and a specific maximum value Y.

$$A_q = (WA) \gg R = \frac{WA}{2^R} \qquad \text{[Equation 20]}$$

In Equation 20, the quantized activity value Aq is calculated by multiplying the activity value A by a specific constant W and performing a right shift operation by R on the product of A and W. In this case, X, Y, W, and R are each positive integers or zero. For example, W is 24, and R is 13. Alternatively, for example, W is 64 and R is 3+N (bits). For example, N is a positive integer and is specifically 8 or 10. In another example, W is 32 and R is 3+N (bits). Alternatively, for example, N is a positive integer and is specifically 8 or 10.

Further alternatively, for example, the quantized activity value Aq is calculated using a look-up table (LUT), and a mapping relationship between the activity value A and the quantized activity value Aq is set. That is, an operation is performed on the activity value A, and the quantized activity value Aq is calculated using the look-up table. In this case, the operation may include at least one of multiplication, division, right shift operation, left shift operation, addition, and subtraction.

On the other hand, in the case of a chrominance component, filtering is performed for each chrominance component with K filters without performing a block classification process. Here, K is a positive integer or zero. For example, K is one of 0 to 7. In addition, in the case of a chrominance component, the block classification may not be performed on the chrominance component and filtering may be performed using a block class index derived from a luminance component at the corresponding position of the chrominance component. In addition, in the case of a chrominance component, filter information for the chrominance component may not be signaled, and a fixed type filter may be used.

Further alternatively, for example, the block class indices may be determined using at least one of the combinations of the block class index determination methods described above.

Hereinafter, the filtering execution sub-step will be described.

According to an exemplary embodiment of the present invention, a filter corresponding to the determined block class index is used to perform filtering on samples or blocks in a reconstructed/decoded picture. When performing the filtering, one of L filters is selected. The L is a positive integer or zero.

For example, one of the L filters is selected on a per block classification unit basis, and the filtering is performed on a reconstructed/decoded picture on a per reconstructed/decoded sample basis.

Alternatively, for example, one of the L filters is selected on a per block classification unit basis and the filtering is performed on a reconstructed/decoded picture on a per block classification unit basis.

Further alternatively, for example, one of the L filters is selected on a per block classification unit basis and the filtering is performed on a reconstructed/decoded picture on a per CU basis.

Further alternatively, for example, one of the L filters is selected on a per block classification unit basis and the filtering is performed on a reconstructed/decoded picture on a per block basis.

Further alternatively, for example, U filters of the L filters are selected on a per block classification unit basis and the filtering is performed on a reconstructed/decoded picture on a per reconstructed/decoded sample basis. Here, U is a positive integer.

Further alternatively, for example, U filters of the L filters are selected on a per block classification unit basis and the filtering is performed on a reconstructed/decoded picture on a per block classification unit basis. Here, U is a positive integer.

Further alternatively, for example, U filters of the L filters are selected on a per block classification unit basis and the filtering is performed on a reconstructed/decoded picture on a per CU basis. Here, U is a positive integer.

Further alternatively, for example, U filters of the L filters are selected on a per block classification unit basis and the filtering is performed on a reconstructed/decoded picture on a per block basis. Here, U is a positive integer.

Here, the L filters are referred to as a filter set.

According to an embodiment of the present invention, the L filters differ from each other in terms of at least one of a filter coefficient, the number of filter taps (i.e., a filter length), a filter shape, and a filter type.

For example, the L filters are common in terms of at least one of a filter coefficient, the number of filter taps (filter length), a filter coefficient, a filter shape, and a filter type in units of a block, a CU, a PU, a TU, a CTU, a slice, a tile, a tile group, a picture, and a sequence.

Alternatively, for example, the L filters are common in terms of at least one of a filter coefficient, the number of filter taps (a filter length), a filter shape, and a filter type in units of a CU, a PU, a TU, a CTU, a slice, a tile, a tile group, a picture, and a sequence.

The filtering may be performed using the same filter or different filters in units of a CU, a PU, a TU, a CTU, a slice, a tile, a tile group, a picture, and a sequence.

The filtering may be performed or may not be performed on the basis of filtering execution information of whether filtering is executed or not in units of a sample, a block, a CU, a PU, a TU, a CTU, a slice, a tile, a tile group, a picture, and a sequence. The filter execution information of whether to perform the filtering is information signaled from the encoder to the decoder in units of a sample, a block, a CU, a PU, a TU, a CTU, a slice, a tile, a tile group, a picture, and a sequence.

According to an embodiment of the present invention, N filters that differ in the number of filter taps and have the same filter shape (i.e., a diamond or rhombic filter shape) are used. Here, M is a positive integer. For example, the rhombic filters having 5×5, 7×7, or 9×9 filter taps are shown in FIG. 13.

FIG. 13 is a diagram illustrating rhombic filters according to an embodiment of the present invention.

Referring to FIG. 13, in order to signal information on which a filter among the three rhombic filters having the number of filter taps of 5×5, 7×7, or 9×9 from the encoder to the decoder, the filter index is entropy-encoded/decoder on a per picture/tile/tile group/slice/sequence basis. That is, the filter index is entropy-encoded/decoded in a sequence parameter set, a picture parameter set, a slice header, a slice data, a tile header, a tile group header, header, and the like in a bitstream.

According to an embodiment of the present invention, when the number of filter taps is fixed to 1 in the encoder/decoder, the encoder/decoder performs filtering using the filter index without entropy-encoding/decoding the filter index. Here, a rhombic filter having 7×7 filter taps is used for a luminance component and a rhombic filter having 5×5 filter taps is used for a chrominance component.

According to an embodiment of the present invention, at least one of the three rhombic filters is used to filter at least one reconstructed/decoded sample of at least one of a luminance component and a chrominance component.

For example, at least one of the three rhombus type filters illustrated in FIG. 13 is used to filter a reconstructed/decoded luminance sample.

Alternatively, for example, a 5×5 rhombus-shaped filter illustrated in FIG. 13 is used to filter reconstructed/decoded chrominance samples.

Further alternatively, for example, a filter used to filter a luminance sample is used to filter a reconstructed/decoded chrominance sample corresponding to the luminance sample.

According to an embodiment of the present invention, the filters have the same filter length which means 5×5 filter taps but may have different filter shapes selected from among a rhombus, a rectangle, a square, a trapezoid, a diagonal shape, a snowflake shape, a number sign shape, a clover shape, a cross shape, a triangle, a pentagon, a hexagon, an octagon, a decagon, and a dodecagon. For example, square-shaped, octagon-shaped, snowflake-shaped, rhombic filters having 5×5 filter taps are illustrated in FIG. 14.

The number of filter taps is not limited to 5×5. A filter having H×V filter taps selected from among 3×3, 4×4, 5×5, 6×6, 7×7, 8×8, 9×9, 5×3, 7×3, 9×3, 7×5, 9×5, 9×7, and 11×7 may be used. Here, H and V are positive integers and have the same value or different values. In addition, at least one of H and V is a value predefined in the encoder/decoder and a value signaled to the decoder from the encoder. In addition, one of H and V is defined using the other one of H and V. In addition, the final value of H or V can be defined using the values of H and V.

Figure 14:
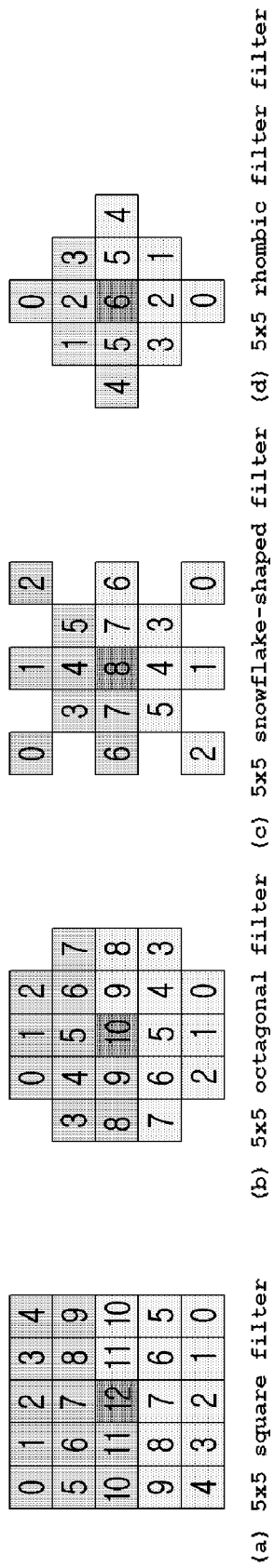
FIG. 14 is a view showing a filter having a number of filter tabs of 5×5 according to an embodiment of the present invention.

On the other hand, in order to signal information of which filter is to be used among the filters illustrated in FIG. 14 to the decoder from the encoder, the filter index may be entropy-encoded/decoded on a per picture/tile/tile group/slice/sequence basis. That is, a filter index is entropy-encoded/decoded into a sequence parameter set, a picture parameter set, a slice header, a slice data, a tile header, and a tile group header within a bitstream.

On the other hand, at least one of the filters among square-shaped, octagon-shaped, snowflake-shaped, rhombic filters illustrated in FIG. 14 is used to filter at least one reconstructed/decoded sample of at least one of a luminance component and a chrominance component.

According to an embodiment of the present invention, as filters used in the filtering process described above, filters having at least one shape selected from among a rhombus, a rectangle, a square, a trapezoid, a diagonal shape, a snowflake shape, a number sign shape, a clover shape, a cross shape, a triangle, a pentagon, a hexagon, an octagon, a decagon, and a dodecagon are used. For example, as illustrated in FIGS. 15A and/or 15B, the filter may have a shape selected from among a square, an octagon, a snowflake shape, a rhombus, a hexagon, a rectangle, a cross shape, a number sign shape, a clover shape, and a diagonal.

For example, a filter set is constructed using at least one of the filters having a vertical length of 5 among the filters shown in FIGS. 15A and/or 15B, and then filtering is performed using the filter set.

Figure 15B:
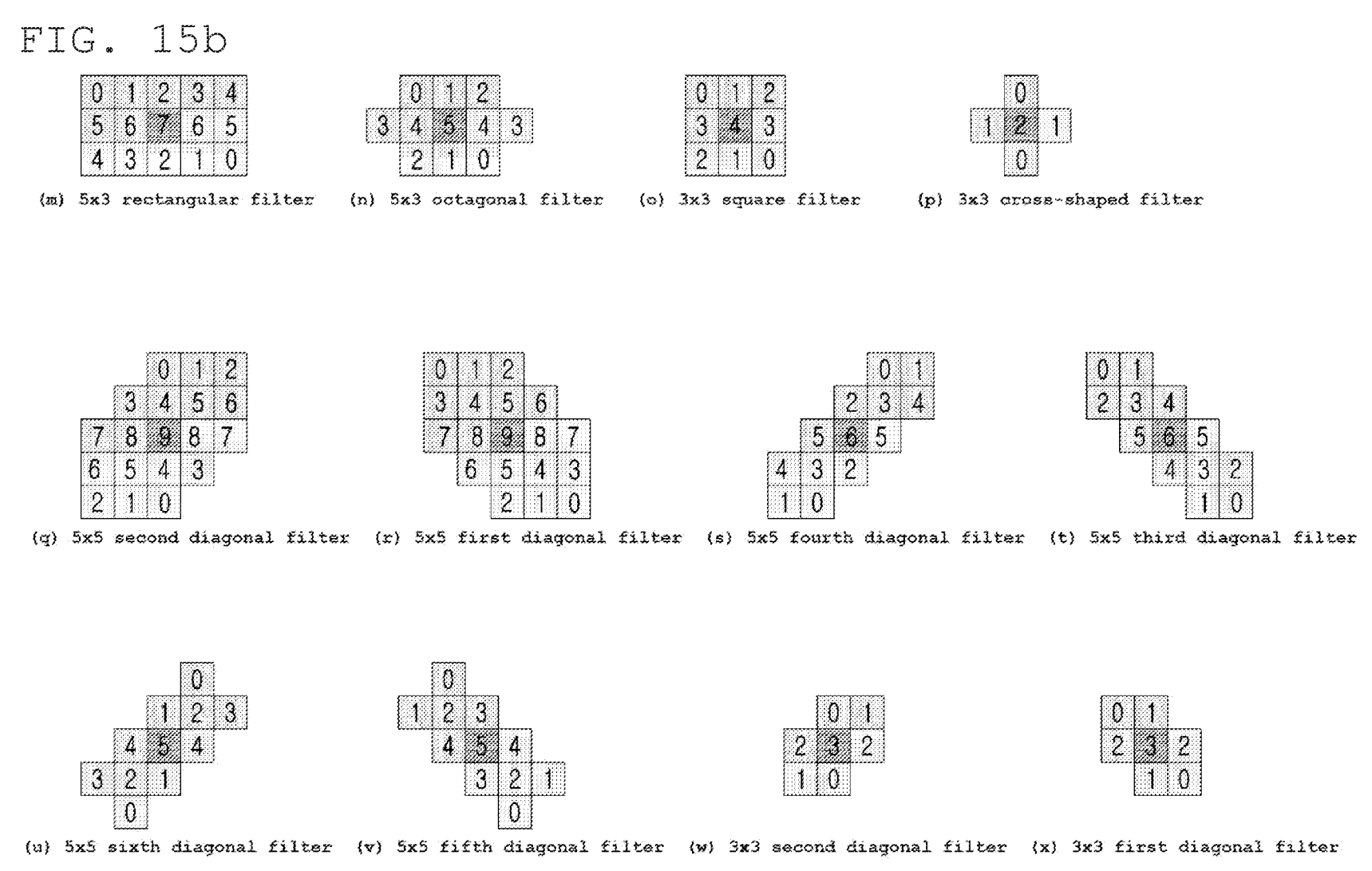

Alternatively, for example, a filter set is constructed using at least one filter of the filters having a vertical filter length of 3 among the filters shown in FIGS. 15A and 15B, and then filtering is performed using the filter set.

Further alternatively, for example, a filter set is constructed using at least one of the filters having a vertical filter length of 3 or 5 shown in FIGS. 15A and/or 15B, and filtering is performed using the filter set.

The filters shown in FIGS. 15A and 15B are designed to have a vertical filter length of 3 or 5. However, the filter shape used in the embodiments of the present invention is not limited thereto. Filters can be designed to have an arbitrary vertical filter length of M. Here, M is a positive integer.

On the other hand, H filter sets are prepared using the filters shown in FIG. 15A and/or FIG. 15B, information of which filter to use is signaled to the decoder from the encoder. In this case, filter indices are entropy-encoded/decoded on a per picture, tile, tile group, slice, or sequence basis. Here, H is a positive integer. That is, the filter index is entropy-encoded/decoded into a sequence parameter set, a picture parameter set, a slice header, a slice data, a tile header, and a tile group header within a bitstream.

At least one of the rhombic, rectangular, square, trapezoidal, diagonal, snowflake-shaped, number sign-shaped, clover-shaped, cross-shaped, triangular, pentagonal, hexagonal, octagonal, and decagonal filters is used to filter a reconstructed/decoded sample of at least one of a luminance component and a chrominance component.

On the other hand, the numbers in each filter shape illustrated in FIG. 15A and/or 15B represent filter coefficient indices, and the filter coefficient indices are symmetric with respect to the filter center. That is, the filter shapes illustrated in FIG. 15A and/or FIG. 15B are point symmetric filters.

At least one of the rhombic, rectangular, square, trapezoidal, diagonal, snowflake-shaped, number sign-shaped, clover-shaped, cross-shaped, triangular, pentagonal, hexagonal, octagonal, and decagonal filters is used to filter a reconstructed/decoded sample of at least one of a luminance component and a chrominance component.

According to one embodiment of the present invention, the filtering is performed on the reconstructed/decoded sample R(i,j) to produce the filtered decoded samples R'(i,j) The filtered decoded sample may be represented by Equation 21.

$$R'(i,j)=\Sigma_{k=-L/2}^{L/2}\Sigma_{l=-L/2}^{L/2}f(k,l) \times R(i+k,j+l) \quad \text{[Equation 21]}$$

In Equation 21, L is the number of filter taps (filter length) in the horizontal or vertical direction, and $f(k, l)$ is the filter coefficient.

On the other hand, when performing filtering, an offset value Y may be added to the filtered decoded sample R'(i, j) The offset value Y may be entropy-encoded/decoded. Also, the offset value Y is calculated using at least one statistic value of the current reconstructed/decoded sample value and the neighboring reconstructed/decoded sample values. In addition, the offset value Y is determined on the basis of at least one coding parameter of the current reconstructed/decoded sample and the neighboring reconstructed/decoded samples. Here, the threshold value E is a positive integer or zero.

Meanwhile, the filtered decoded samples may be clipped to be represented in N bits. Here, H is a positive integer. For example, when the filtered decoded sample generated by performing filtering on the reconstructed/decoded sample is clipped by 10 bits, the final decoded sample value may have a value within a range of from 0 to 1023.

According to an embodiment of the present invention, filtering on a chrominance component is performed on the basis of filter information of a luminance component.

For example, the filtering on a reconstructed picture of a chrominance component can be performed only when the filtering on a reconstructed picture of a luminance component is performed in a previous stage. Here, the reconstructed picture filtering of the chrominance components may be performed on U (Cr), V (Cb), or both components.

Alternatively, for example, in the case of a chrominance component, filtering is performed using at least one of the filter coefficients of the corresponding luminance component, the number of filter taps, the filter shape, and information of whether filtering is performed.

According to an exemplary embodiment of the present invention, when filtering is performed, when there is an unavailable sample in the vicinity of the current sample, padding is performed and filtering is then performed using the padded sample. The padding refers to a method of copying the sample value of an adjacent available sample to the unavailable sample. Alternatively, sample values or statistical values that are obtained on the basis of the available sample values adjacent to the unavailable sample are used. The padding may be repeatedly performed for P columns and R rows. Here, M and L are each positive integers.

Here, the unavailable sample refers to a sample disposed outside the boundary of a CTU, a CTB, a slice, a tile, a tile group, or a picture. Alternatively, the unavailable sample refers to a sample belonging to at least one of a CTU, a CTB, a slice, a tile, a tile group, and a picture that is different from at least one of a CTU, a CTB, a slice, a tile, a tile group, and a picture to which the current sample belongs.

According to an embodiment, a padding method of a sample located outside a picture boundary and a padding method of a sample located outside a predetermined region which is present in the picture boundary but to which adaptive in-loop filtering is applied may be different. For the sample located outside the picture boundary, the value of an available sample located at the picture boundary may be copied and the value of the sample located outside the picture boundary may be determined. For the sample located outside the predetermined region which is present in the picture boundary but to which adaptive in-loop filtering is applied, the padding value of an unavailable sample may be determined by mirroring the value of the available sample based on the picture boundary.

According to an embodiment, padding of the sample located outside the picture boundary may be performed only in a horizontal direction and may not be performed in a vertical direction. Conversely, padding of the sample located outside the picture boundary may be performed only in a vertical direction and may not be performed in a horizontal direction.

In addition, when filtering is performed, a predetermined sample may not be used.

For example, when filtering is performed, the padded samples may not be used.

Alternatively, for example, when filtering is performed, when there is an unavailable in the vicinity of the current sample, the unavailable sample may not be used in the filtering.

Further alternatively, for example, when filtering is performed, when a sample in the vicinity of the current sample is located outside a CTU or CTB, the neighboring sample in the vicinity of the current sample may not be used in the filtering.

In addition, when filtering is performed, a sample to which at least one of deblocking filtering, adaptive sample offset, and adaptive in-loop filtering is applied may be used.

In addition, when the filtering is performed, when at least one of the samples existing in the vicinity of the current sample is located outside the CTU or CTB boundaries, at least one of deblocking filtering, adaptive sample offset, and adaptive in-loop filtering may not be applied.

In addition, filtering target samples include an unavailable sample located outside the CTU or CTB boundaries, at least one of the deblocking filtering, the adaptive sample offset, and the adaptive in-loop filtering is not performed on the unavailable sample and the unavailable sample is used as it is for the filtering.

According to an embodiment of the present invention, when filtering is performed, filtering is performed on at least one sample of the samples located in the vicinity of the boundaries of at least one of a CU, a PU, a TU, a block, a block classification unit, a CTU and a CTB. In this case, the boundaries include at least one of a vertical boundary, a horizontal boundary, and a diagonal boundary. In addition, the samples located in the vicinity of the boundaries may be at least one of U rows, U columns, and U samples located adjacent to the boundaries. Here, U is a positive integer.

According to an embodiment of the present invention, when filtering is performed, filtering is performed on at least one sample of the samples located within a block and is not performed on the sample located outside the boundaries of at least one of a CU, a PU, a TU, a block, a block classification unit, a CTU and a CTB. In this case, the boundaries include at least one of a vertical boundary, a horizontal boundary, and a diagonal boundary. In addition, the samples located in the vicinity of the boundaries may be at least one of U rows, U columns, and U samples located adjacent to the boundaries. Here, U is a positive integer.

Further alternatively, for example, the filtering is performed by using any combination of the filtering methods described above.

Hereinafter, the filter information encoding/decoding step will be described.

According to an embodiment of the present invention, the filter information is entropy encoded/decoded to be disposed between a slice header and a first CTU syntax element of slice data, within a bitstream.

In addition, the filter information is entropy-encoded/decoded the to be disposed in a sequence parameter set, a picture parameter set, a slice header, slice data, a tile header, a tile group header, a CTU, or a CTB within a bitstream.

On the other hand, the filter information include at least one piece of information selected from among information on whether luminance component filtering is performed, information of whether chrominance component filtering is performed, a filter coefficient value; the number of filters, the number of filter taps (filter length), filter shape information, filter type information, information of whether filtering is performed on a per slice, tile, tile group, picture, CTU, CTB, block, or CU basis, information of the number of times that CU-based filtering is performed, CU maximum depth filtering information, information on whether CU-based filtering is performed, information on whether a filter of a previous reference picture is used, a filter index of a previous reference picture, information on whether a fixed filter is used for a block class index, index information for a fixed filter, filter merging information, information on whether different filters are used for a luminance component and a chrominance component, respectively, and filter symmetry shape information.

Here, the number of filter taps refers to at least one of a horizontal length of the filter, a vertical length of the filter, a first diagonal length of the filter, a second diagonal length of the filter, horizontal and vertical lengths of the filter, and the number of filter coefficients within a filter.

On the other hand, the filter information includes a maximum of L luminance filters. Here, L is a positive integer and is specifically 25. In addition, the filter information includes a maximum of L chrominance filters. Here, L is a positive integer including 0, and may be 0 to 8. Information on a maximum of L chrominance filters may be included in a parameter set or a header. The parameter set may be an adaptation parameter set. The Information on a maximum of L chrominance filters may mean information the number of chroma ALFs, and may be encoded/decoded as, for example, a syntax element alf_chroma_num_alt_filters_minus1.

On the other hand, one filter includes a maximum of K luminance filter coefficients. Here, K is a positive integer and is specifically 13. In addition, the filter information includes a maximum of K chrominance filter coefficients. Here, K is a positive integer and is specifically 7.

For example, the information on a filter symmetry shape is information on filter shapes, such as a point symmetric shape, a horizontal symmetric shape, a vertically symmetric shape, or a combination thereof.

On the other hand, only some of the filter coefficients are signaled. For example, when the filter has a symmetric form, information on the filter symmetry shape and only one filter coefficient set of the symmetric filter coefficient sets are signaled. Alternatively, for example, the filter coefficient at the filter center is not signaled because they can be implicitly derived.

According to an embodiment of the present invention, the filter coefficient value among the filter information is quantized in the encoder, and the resulting quantized filter coefficient value is entropy-encoded. Likewise, the filter coefficient values quantized in the decoder are entropy-decoded, and the quantized filter coefficient values are dequantized to be restored to the original filter coefficient values. The filter coefficient values are quantized into a range of values that can be represented by fixed M bits and then dequantized. In addition, at least one of the filter coefficients is quantized into different bits and dequantized. Conversely, at least one of the filter coefficients may be quantized into the same bits and dequantized. The M bits are determined according to a quantization parameter. In addition, M in the M bits is a constant predefined in the encoder and the decoder. Here, M may be a positive integer and may be specifically 8 or 10. The M bits may be less than or equal to the number of bits needed to represent samples in the encoder/decoder. For example, when the number of bits needed to represent the sample is 10, then M may be 8. A first filter coefficient of the filter coefficients within a filter may have a value in a range of from $-2M$ to $2M-1$, and a second filter coefficient may have a value in a range of from 0 to $2M-1$. Here, the first filter coefficient refers to filter coefficients except for the center filter coefficient among the filter coefficients, and the second filter coefficient refers to the center filter coefficient among the filter coefficients.

The filter coefficient value among the filter information may be clipped by at least one of the encoder and the decoder, and at least one of a minimum value and a maximum value related to the clipping may be entropy-encoded/decoded. The filter coefficient value may be clipped to fall within a range of from the minimum value and the maximum value. At least one of the minimum value and the maximum value may have different values for each filter coefficient. On the other hand, at least one of the minimum value and the maximum value may have the same value for each filter coefficient. At least one of the minimum value and the maximum value may be determined according to the quantization parameter. At least one of the minimum value and the maximum value may be a constant value predefined in the encoder and the decoder.

According to an exemplary embodiment of the present invention, whether to perform filtering on at least one of a luminance component and a chrominance component is indicated by using filtering execution information (flag).

For example, whether or not to perform filtering on at least one of the luminance component and the chrominance component is indicated by using filtering execution information (flag) on a per CTU, CTB, CU, or block basis. For example, filtering is performed on a per CTB basis when the filtering execution information has a first value, and filtering is not performed on the corresponding CTB when the filtering execution information has a second value. In this case, information on whether filtering is performed for each CTB can be entropy-encoded/decoded. Alternatively, for example, information on the maximum depth or minimum size of a CU (maximum depth filtering information of a CU) is additionally entropy-encoded/decoded, and the CU-based filtering execution information on CUs having the maximum depth or on CUs having the minimum size may be entropy-encoded/decoded.

For example, when a block can be partitioned into smaller square sub-blocks and non-square sub-blocks according to a block structure, CU-based flags are entropy-encoded/decoded up to the partition depth at which the block has a block structure that can be partitioned into smaller square sub-blocks. In addition, the CU-based flags may be entropy-encoded/decoded up to the partition depth at which the block has a block structure that can partitioned into smaller non-square sub-blocks.

Alternatively, for example, the information on whether to perform filtering on at least one of a luminance component and a chrominance component may be block-based flags (i.e., flags on a per block basis). For example, filtering is performed on a block when the block-based flag of the corresponding block has a first value and the filtering is not performed when the block-based flag of the corresponding block has a second value. The size of the block is N×M in which N and M are positive integers.

Further alternatively, for example, the information on whether to perform filtering on at least one of a luminance component and a chrominance component may be CTU-based flags (i.e., flags on a per CTU basis). For example, filtering is performed on a CTU when the CTU-based flag of the corresponding CTU has the first value and the filtering is not performed when the CTU-based flag of the corresponding CTU has the second value. The size of the CTU is N×M in which N and M are positive integers.

Further alternatively, for example, whether to perform filtering on at least one of a luminance and a chrominance component is determined according to a picture, slice, tile group, or tile type. The information on whether to perform filtering on at least one of a luminance component and a chrominance component may be a flag on a per picture, slice, tile group, or tile basis.

According to an embodiment of the present invention, the filtering is performed using a fixed filter set.

Although the temporal filter coefficient prediction cannot be used in the intra prediction picture (I picture, slice, tile group, or tile), at least one filter of a maximum of 16 kinds of fixed filters within a filter set can be used for filtering according to the block class index. In order to signal information on whether to use a fixed filter set to the decoder from the encoder, the information on whether to use a fixed filter on each of the block class indices is entropy-encoded/decoded. When a fixed filter is used, the index information on the fixed filter is also entropy-encoded/decoded. Even when a fixed filter is used for a specific block class index, the filter coefficient is also entropy-encoded/decoded, and a reconstructed picture is filtered using the entropy-encoded/decoded filter coefficient and the fixed filter coefficient.

In addition, the fixed filter set is also used in an inter prediction picture (a B/P picture, slice, tile group, or tile).

In addition, the adaptive in-loop filtering can be performed with a fixed filter without entropy-encoding/decoding of the filter coefficients. Here, the fixed filter may mean a filter set predefined in the encoder and the decoder. In this case, without entropy-encoding/decoding the filter coefficients, the encoder and the decoder entropy-encodes/decodes fixed filter index information indicating which filter of a filter set or which filter set of the filter sets predefined in the encoder and the decoder is used. In this case, the filtering is performed with fixed filers that differ in terms of at least one of a filter coefficient value, a filter tap (i.e., the number of filter taps or a filter length), and a filter shape, on at least one of a block class basis, a block basis, a CU basis, a slice basis, a tile basis, a tile group basis, and a picture basis.

According to an embodiment of the present invention, prediction of filter coefficients from filter coefficients of a predefined fixed filter is prohibited.

According to an embodiment of the present invention, the multiplication operation is replaced by a shift operation. First, filter coefficients used to perform filtering on the luminance and/or chrominance block are divided into two groups. For example, the filter coefficients are divided into a first group including coefficients of {L0, L1, L2, L3, L4, L5, L7, L8, L9, L10, L14, L15, L16, and L17} and a second group including the remaining coefficients. The first group is restricted to include only coefficient values of {−64, −32, −16, −8, −4, 0, 4, 8, 16, 32, and 64}. In this case, the multiplication of the filter coefficients included the in first group and the reconstructed/decoded samples can be performed by a single bit shift operation. Accordingly, the filter coefficients included in the first group are mapped to pre-binarized bit-shifted values to reduce signaling overhead.

A computer-readable recording medium according to the present invention stores a bitstream generated by a video encoding method including classifying a coding unit into classes on a per block classification unit basis, filtering the coding unit that is classified on a per block classification unit basis, and encoding filter information. The block classification unit is not limited to the coding unit. That is, the block classification may be performed in units of a slice, a tile, a tile group, a picture, a sequence, a CTU, a block, a CU, a PU, or a TU. In addition, a target to be filtered is not to the coding unit. That is, the filtering may be performed on a slice, a tile, a tile group, a picture, a sequence, a CTU, a block, a CU, a PU, or a TU. In addition, the filter information is not limited to filter information per coding unit. The filter information may be filter information per slice, tile, tile group, picture, sequence, CTU, block, CU, PU, or TU.

The following shows examples of syntax element information necessary to implement adaptive in-loop filtering in an encoder/decoder, semantics of the syntax element information, and an encoding/decoding process. In the present disclosure, the syntax may mean the syntax element.

FIGS. 16 to 21 show examples of syntax element information necessary for adaptive in-loop filtering. At least one of syntax elements necessary for adaptive in-loop filter may be entropy-encoded/decoded in at least one of a parameter set, a header, a brick, a CTU or a CU.

At this time, the parameter set, the header, the brick, the CTU or the CU may be at least one of a video parameter set, a decoding parameter set, a sequence parameter set, an adaptation parameter set, a picture parameter set, a picture header, a sub-picture header, a slice header, a tile group header, a tile header, a brick, a coding tree unit (CTU) or a coding unit (CU).

Here, the signaled parameter set, header, brick, CTU or CU may be used for adaptive in-loop filtering using a syntax element for adaptive in-loop filtering.

For example, when the syntax element for adaptive in-loop filtering is entropy-encoded/decoded in a sequence parameter set, adaptive in-loop filtering may be performed using a syntax element for adaptive in-loop filtering having the same syntax element value in the sequence unit.

In another example, when the syntax element for adaptive in-loop filtering is entropy-encoded/decoded in a picture parameter set, adaptive in-loop filtering may be performed using a syntax element for adaptive in-loop filtering having the same syntax element value in the picture unit.

In another example, when the syntax element for adaptive in-loop filtering is entropy-encoded/decoded in a picture header, adaptive in-loop filtering may be performed using a syntax element for adaptive in-loop filtering having the same syntax element value in the picture unit.

In another example, when the syntax element for adaptive in-loop filtering is entropy-encoded/decoded in a slice header, adaptive in-loop filtering may be performed using a syntax element for adaptive in-loop filtering having the same syntax element value in the slice unit.

In another example, when the syntax element for adaptive in-loop filtering is entropy-encoded/decoded in an adaptation parameter set, adaptive in-loop filtering may be performed using a syntax element for adaptive in-loop filtering having the same syntax element value in the unit referring to the same adaptation parameter set.

The adaptation parameter set may refer to a parameter set which may be referred to and shared in different pictures, sub pictures, slices, tile groups, tiles or bricks. In addition, in the sub picture, slice, tile group, tile or brick in the picture, information in the adaptation parameter set may be used by referring different adaptation parameter sets.

In addition, in the sub pictures, slices, tile groups, tiles or bricks in the picture, different adaptation parameter sets may be referred to using the identifiers of different adaptation parameter sets.

In addition, in the slices, tile groups, tiles or bricks in the sub picture, different adaptation parameter sets may be referred to using t identifiers of different adaptation parameter sets.

In addition, in the tiles or bricks in the slice, different adaptation parameter sets may be referred to using the identifiers of different adaptation parameter sets.

In addition, in the bricks in the tile, different adaptation parameter sets may be referred to using the identifiers of different adaptation parameter sets.

The adaptation parameter set identifier may refer to an identification number assigned to the adaptation parameter set.

Information on the adaptation parameter set identifier may be included in the parameter set or header of the sequence. The adaptation parameter set corresponding to the adaptation parameter set identifier may be used in the sequence.

Information on the adaptation parameter set identifier may be included in the parameter set or header of the picture. In addition, the adaptation parameter set corresponding to the adaptation parameter set identifier may be used in the picture.

Information on the adaptation parameter set identifier may be included in the parameter set or header of the sub picture. In addition, the adaptation parameter set corresponding to the adaptation parameter set identifier may be used in the sub picture.

Information on the adaptation parameter set identifier may be included in the parameter set or header of the tile. In addition, the adaptation parameter set corresponding to the adaptation parameter set identifier may be used in the tile.

Information on the adaptation parameter set identifier may be included in the parameter set or header of the slice. In addition, the adaptation parameter set corresponding to the adaptation parameter set identifier may be used in the slice.

Information on the adaptation parameter set identifier may be included in the parameter set or header of the brick. In addition, the adaptation parameter set corresponding to the adaptation parameter set identifier may be used in the brick.

The picture may be partitioned into one or more tile rows and one or more tile columns.

The sub picture may be partitioned into one or more tile rows and one or more tile columns in the picture. The sub picture is a region having a rectangular/square shape in the picture and may include one or more CTUs. In addition, at least one tile/brick/slice may be included in one sub picture.

The tile is a region having a rectangular/square shape in the picture and may include one or more CTUs. In addition, the tile may be partitioned into one or more bricks.

The brick may refer to one or more CTU rows in the tile. The tile may be partitioned into one or more bricks and each brick may have one or more CTU rows. In addition, the brick may mean a tile which is not additionally partitioned.

The slice may include one or more tiles in the picture and may include one or more bricks in the tile.

As in the example of FIG. 16, sps_alf_enabled_flag may mean information indicating whether adaptive in-loop filtering is performed in sequence units.

For example, when sps_alf_enabled_flag has a first value (e.g., 0), adaptive in-loop filtering may not be performed in sequence units. In addition, when sps_alf_enabled_flag has a second value (e.g., 1), adaptive in-loop filtering may be performed in sequence units.

When sps_alf_enabled_flag is not present in a bitstream, sps_alf_enabled_flag may be inferred as a first value (e.g., 0).

As in the example of FIG. 17, adaptation_parameter_set_id may mean the identifier of the adaptation parameter set referred to by another syntax element. When adaptation_parameter_set_id is not present in the bitstream, adaptation_parameter_set_id may be inferred as a first value (e.g., 0).

As in the example of FIG. 18, aps_params_type may mean adaptation parameter set type information present in the adaptation parameter set. In addition, aps_params_type may mean the type of the coding information included in the adaptation parameter set. For example, when aps_params_type has a first value (e.g., 0), the data/content/syntax element value in the adaptation parameter set may mean a parameter for adaptive in-loop filtering (ALF type). When aps_params_type has a second value (e.g., 1), the data/content/syntax element value in the adaptation parameter set may mean a parameter for luma mapping with chroma scaling (luma-mapping-with-chroma-scaling type). When aps_params_type has a third value (e.g., 2), the data/content/syntax element value in the adaptation parameter set may mean a parameter for quantization matrix set (quantization matrix type). Here, SL mean a scaling list meaning a quantization matrix. When aps_params_type is not present in the bitstream, aps_params_type may be inferred to a value other than a first value (e.g., 0), a second value (e.g., 1) and a third value (e.g., 2).

The same adaptation parameter set identifier as the adaptation parameter set identifier of a previously signaled adaptation parameter set may be newly signaled with respect to a current adaptation parameter set. In addition, an adaptation parameter set having the same adaptation parameter set identifier and adaptation parameter type as a previously signaled adaptation parameter set may be newly signaled. At this time, the data/content/syntax element value of a previously signaled adaptation parameter set may be replaced with the data/content/syntax element value of a newly signaled adaptation parameter set. The replacement process means an update process of the adaptation parameter set.

That is, in the encoder/decoder, by referring to the data/content/syntax element value of the previously signaled adaptation parameter set, at least one of adaptive in-loop filtering, luma mapping with chroma scaling (LMCS) and quantization/dequantization using quantization matrix may be performed. From a point of time when the adaptation parameter set having the same adaptation parameter set identifier as the adaptation parameter set identifier of the previously signaled adaptation parameter set is newly signaled with respect to the current adaptation parameter set, in the encoder/decoder, by referring to the data/content/syntax element value in the newly signaled adaptation parameter set, at least one of adaptive in-loop filtering, luma mapping with chroma scaling (LMCS) and quantization/dequantization using quantization matrix may be performed.

In addition, in the encoder/decoder, by referring to the data/content/syntax element value of the previously signaled adaptation parameter set, at least one of adaptive in-loop with chroma filtering, luma mapping scaling and (LMCS) quantization/dequantization using quantization matrix may be performed. From a point of time when the adaptation parameter set having the same adaptation parameter set identifier and adaptation parameter type as the previously signaled adaptation parameter set is newly signaled, in the encoder/decoder, by referring to the data/content/syntax element value in the newly signaled adaptation parameter set, in the encoder/decoder, by referring to the data/content/syntax element value in the newly signaled adaptation parameter set, at least one of adaptive in-loop filtering, luma mapping with chroma scaling (LMCS) and quantization/dequantization using quantization matrix may be performed.

According to an embodiment, chroma component presence information aps_chroma_present_flag indicating whether coding information related to a chroma component is included in the adaptation parameter set may be included in the adaptation parameter set and encoded/decoded. When the chroma component presence information indicates that the coding information related to the chroma component is included in the adaptation parameter set, the adaptation parameter set may include coding information of the chroma component for adaptive in-loop filtering, luma mapping with chroma scaling or quantization matrix. If not, the adaptation parameter set may not include coding information of the chroma component for adaptive in-loop filtering, luma mapping with chroma scaling or quantization matrix.

According to the chroma component presence information, whether the quantization matrix of the chroma component is present may be determined. In addition, according to the chroma component presence information, whether adaptive in-loop filter information of the chroma component is present may be determined. In addition, according to the chroma component presence information, whether luma-mapping-with-chroma-scaling information of the chroma component is present may be determined.

According to an embodiment, when the chroma format of a current video, sequence, picture or slice is 4:0:0 (in case of monochrome), the chroma component presence information may indicate that the chroma component is not present. Accordingly, when the chroma format is 4:0:0, the picture header or the slice header may not include the adaptation parameter set identifier for the chroma component. That is, when the chroma format is 4:0:0, the picture header or the slice header may not include quantization matrix information, adaptive in-loop filter information and luma mapping with chroma scaling (LMCS) for the chroma component.

chroma_format_idc or ChromaArrayType may mean a chroma format. The chroma format may mean the format of the chroma component.

For example, when chroma_format_idc has a first value (e.g., 0), the chroma format may be set to 4:0:0. When the chroma format of the current picture is 4:0:0, the current picture may be determined as monochrome without a chroma component.

In addition, when chroma_format_idc has a second value (e.g., 1), the chroma format may be set to 4:2:0. When chroma_format_idc has a third value (e.g., 2), the chroma format may be set to 4:2:2. When chroma_format_idc has a fourth value (e.g., 3), the chroma format may be set to 4:4:4.

In addition, when the chroma format is 4:0:0, the chroma component presence information in the adaptation parameter set referred to in the current picture or the current slice may be determined as a first value (e.g., 0) meaning that the coding information of the chroma component is not present.

In addition, when the chroma format is not 4:0:0, the chroma component presence information in the adaptation parameter set referred to in the current picture or the current slice may be determined as a second value (e.g., 1) meaning that the coding information of the chroma component is present.

In addition, when the chroma format is 4:0:0, the chroma component presence information in the adaptation parameter set referred to in the current picture or the current slice may be determined as a first value (e.g., 0) meaning that the quantization matrix information of the chroma component is not present.

In addition, when the chroma format is not 4:0:0, the chroma component presence information in the adaptation parameter set referred to in the current picture or the current slice may be value (e.g., 1) meaning the determined as a second quantization matrix information of the chroma component is present.

As in the example of FIG. 19, slice_alf_enabled_flag may mean information indicating whether adaptive in-loop filtering is performed in slice units with respect to at least one of Y, Cb or Cr component.

For example, when slice_alf_enabled_flag has a first value (e.g., 0), adaptive in-loop filtering may not be performed in slice units with respect to all Y, Cb and Cr components. In addition, when slice_alf_enabled_flag has a second value (e.g., 1), adaptive in-loop filtering may be performed in slice units at least one of Y, Cb or Cr component.

When slice_alf_enabled_flag is not present in the bitstream, slice_alf_enabled_flag may be inferred as a first value (e.g., 0).

slice_num_alf_aps_ids_luma may be slice luma ALF set number information meaning the number of adaptation parameter sets for adaptive in-loop filtering referred to in the slice. Here, the ALF set may mean a filter set including a plurality of adaptive in-loop filters (ALFs). At this time, the luma ALF may mean an adaptive in-loop filter for a luma component.

slice_num_alf_aps_ids_luma may have a value from 0 to N. Here, N may be a positive integer and may be, for example, 6.

When slice_num_alf_aps_ids_luma is not present in the bitstream, slice_num_alf_aps_ids_luma may be inferred as a first value (e.g., 0).

In addition, a maximum number of adaptation parameter sets for adaptive in-loop filtering and a maximum number of adaptation parameter sets for luma mapping with chroma scaling pre-set in the encoder/decoder may be equal to each other. In addition, a maximum number of adaptation parameter sets for adaptive in-loop filtering and a maximum number of adaptation parameter sets for quantization matrix set pre-set in the encoder/decoder may be equal to each other. In addition, a maximum number of adaptation parameter sets for luma mapping with chroma scaling and a maximum number of adaptation parameter sets for quantization matrix set pre-set in the encoder/decoder may be equal to each other.

In addition, a maximum number of adaptation parameter sets for adaptive in-loop filtering and a maximum number of adaptation parameter sets for luma mapping with chroma scaling pre-set in the encoder/decoder may be different from each other. In addition, a maximum number of adaptation parameter sets for the quantization matrix set and a maximum number of adaptation parameter sets for luma mapping with chroma scaling pre-set in the encoder/decoder may be different from each other. In addition, a maximum number of adaptation parameter sets for adaptive in-loop filtering and a maximum number of adaptation parameter sets for the quantization matrix set pre-set in the encoder/decoder may be different from each other.

A sum of the maximum number of adaptation parameter sets for adaptive in-loop filtering, the maximum number of adaptation parameter sets for luma mapping with chroma scaling and the maximum number of adaptation parameter sets for quantization matrix set may be a maximum number of adaptation parameter sets which may be included in the encoder/decoder.

The number of adaptation parameter sets for adaptive in-loop filtering may be maximally K in case of an intra slice and may be maximally L in case of an inter slice. Here, K and L may be positive integers and, for example, K may be 1 and L may be 6.

The number of adaptation parameter sets for luma mapping with chroma scaling may be maximally K in case of an intra slice and may be maximally L in case of an inter slice. Here, K and L may be positive integers and, for example, K may be 1 and L may be 6.

The number of adaptation parameter sets for the quantization matrix set may be maximally K in case of an intra slice and may be maximally L in case of an inter slice. Here, K and L may be positive integers and, for example, K may be 1 and L may be 6.

Alternatively, the number of adaptation parameter sets for luma mapping with chroma scaling may be maximally J regardless of the type of the slice. Here, J may be a positive integer of 1 to 8 and, for example, J may be 4.

Alternatively, the number of adaptation parameter sets for the adaptive in-loop filter may be maximally J regardless of the type of the slice. Here, J may be a positive integer of 1 to 8 and, for example, J may be 8.

Alternatively, the number of adaptation parameter sets for the quantization matrix set may be maximally J regardless of the type of the slice. Here, J may be a positive integer of 1 to 8 and, for example, J may be 8.

According to an embodiment, the adaptation parameter set identifier may have an N-bit positive integer value. The N value is a positive integer greater than 1. For example, the N value may be 5. Accordingly, the adaptation parameter set identifier may indicate one of 0 to 31. That is, a maximum of 32 adaptation parameter sets may be defined.

Among 32 adaptation parameter sets, 8 adaptation parameter sets may indicate information on a quantization matrix. In addition, the other 8 adaptation parameter sets may indicate information on adaptive in-loop filter. In addition, the other four adaptation parameter sets may indicate information on luma mapping with chroma scaling.

The adaptation parameter set identifier for quantization matrix may have a value from 0 to N. At this time, N is a positive integer and may be 7.

In addition, the adaptation parameter set identifier for adaptive in-loop filter may have a value from 0 to N. At this time, N is a positive integer and may be 7.

In addition, the adaptation parameter set identifier for luma mapping with chroma scaling may have a value from 0 to N. At this time, N is a positive integer and may be 3.

The adaptation parameter set identifier for quantization matrix, adaptive in-loop filter and luma mapping with chroma scaling may be encoded into a fixed-length code according to the adaptation parameter set type.

According to an embodiment, the maximum number of adaptation parameter sets referred to by the slices included in one picture may be one or more. For example, the slices included in one picture may refer to a maximum of one adaptation parameter set for quantization matrix, a maximum of one adaptation parameter set for luma mapping with chroma scaling, a maximum of N adaptation parameter sets for adaptive in-loop filter. N is an integer equal to or greater than 2. For example, N may be 8 or 9.

slice_alf_aps_id_luma[i] may mean a slice luma ALF set identifier indicating an i-th adaptation parameter set for adaptive in-loop filtering referred to in the slice.

When slice_alf_aps_id_luma[i] is not present in the bitstream, slice_alf_aps_id_luma[i] may be inferred as a first value (e.g., 0).

Here, a temporal layer identifier of an adaptation parameter set having the same adaptation_parameter_set_id as slice_alf_aps_id_luma [i] may be less than or equal to a temporal layer identifier of a current slice. In the present disclosure, adaptation_parameter_set_id may mean an adaptation parameter set identifier.

When two or more sub pictures/slices/tile groups/bricks have the same adaptation_parameter_set_id in one picture and two or more adaptation parameter sets for adaptive in-loop filtering having the adaptation_parameter_set_id are present, two or more adaptation parameter sets for adaptive in-loop filtering having the same adaptation_parameter_set_id may have the same data/content/syntax element value.

In case of an intra slice, slice_alf_aps_id_luma [i] may not refer to an adaptation parameter set for adaptive in-loop filtering for a picture other than an intra picture or a picture including an intra slice.

According to an embodiment, slice_alf_aps_id_luma[i] may refer to only an adaptation parameter set including an adaptive in-loop filter set for a luma component.

According to an embodiment, slice_alf_aps_id_luma [i] may refer to an adaptation parameter set for adaptive in-loop filtering among the adaptation parameter sets referred to in the picture header or the slice header. In addition, the picture header or the slice header may include coding information indicating an adaptation parameter set for adaptive in-loop filtering applicable to the picture or the slice. Here, the temporal layer identifier of the adaptation parameter set having adaptation_parameter_set_id indicated by the coding information may be less than or equal to the temporal layer identifier of the current picture.

When the adaptation parameter set type of a predetermined adaptation parameter set is a parameter for adaptive in-loop filtering (ALF type) and the adaptation parameter set identifier adaptation_parameter_set_id is equal to alf_aps_id_luma[i] which is the identifier of the adaptation parameter set referred to in the current picture or picture header, the temporal layer identifier of the predetermined adaptation parameter set may be less than or equal to the temporal layer identifier of the current picture.

When slice_alf_chroma_idc has a first value (e.g., 0), adaptive in-loop filtering may not be performed with respect to the Cb and Cr component.

In addition, when slice_alf_chroma_idc has a second value (e.g., 1), adaptive in-loop filtering may be performed with respect to the Cb component.

In addition, slice_alf_chroma_idc has a third value (e.g., 2), adaptive in-loop filtering may be performed with respect to the Cr component.

In addition, when slice_alf_chroma_idc has a fourth value (e.g., 3), adaptive in-loop filtering may be performed with respect to the Cb and Cr component.

When slice_alf_chroma_idc is not present in the bitstream, slice_alf_chroma_idc may be inferred as a first value (e.g., 0).

According to an embodiment, the picture header or slice header may include coding information indicating whether adaptive in-loop filtering is performed with respect to the Cb and Cr components in the slice included in the picture or the slice. In addition, with respect to the chroma components Cb and Cr allowed by the coding information of the picture header or slice header, slice_alf_chroma_idc may be chroma ALF application information indicating that the chroma component is allowed in the slice. For example, when only adaptive in-loop filtering of the Cb component of the picture header or slice header is allowed, slice_alf_chroma_idc may indicate only whether adaptive in-loop filtering of the Cb component is allowed in the slice. Conversely, when only adaptive in-loop filtering of the Cr component of the picture header or slice header is allowed, slice_alf_chroma_idc may indicate only whether adaptive in-loop filtering of the Cr component is allowed in the slice. In addition, when both the Cb component and the Cr component are not allowed, slice_alf_chroma_idc may be inferred as a first value (e.g., 0) without being encoded/decoded/acquired.

According to an embodiment, instead of slice_alf_chroma_idc, slice_alf_cb_flag indicating whether adaptive in-loop filtering is performed with respect to the Cb component and slice_alf_cr_flag indicating whether adaptive in-loop filtering is performed with respect to the Cr component may be encoded/decoded/acquired. When slice_alf_cb_flag has a first value (e.g., 0), adaptive in-loop filtering may not be performed with respect to the Cb component. In addition, slice_alf_cb_flag has a second value (e.g., 1), adaptive in-loop filtering may be performed with respect to the Cb component. When slice_alf_cr_flag has a first value (e.g., 0), adaptive in-loop filtering may not be performed with respect to the Cr component. In addition, when slice_alf_cr_flag has a second value (e.g., 1), adaptive in-loop filtering may be performed with respect to the Cr component. When slice_alf_cb_flag and slice_alf_cr_flag are in the bitstream, slice_alf_cb_flag and not present slice_alf_cr_flag may be inferred as a first value (e.g., 0).

According to an embodiment, the picture header or slice header may include coding information indicating whether adaptive in-loop filtering is performed with respect to the Cb component in slice included in the picture or the slice. In addition, when the coding information of the picture header or slice header allows adaptive in-loop filtering of the Cb component, slice_alf_cb_flag may be encoded/decoded/acquired. In addition, according to slice_alf_cb_flag, whether filtering of the Cb component in the picture or the slice may be determined. If the coding information of the picture header or slice header does not filtering of the allow adaptive in-loop Cb component, slice_alf_cb_flag may not be encoded/decoded/acquired, and slice_alf_cb_flag may be inferred as a first value (e.g., 0).

Similarly, the picture header or slice header may include coding information indicating whether adaptive in-loop filtering is performed with respect to the Cr component in the slice included in the picture or the slice. In addition, when the coding information of the picture header or slice header allows adaptive in-loop filtering of the Cr component, slice_alf_cr_flag may be encoded/decoded/acquired. In addition, according to slice_alf_cr_flag, whether filtering of the Cr component in the picture or the slice may be determined. If the coding information of the picture header or slice header does not allow adaptive in-loop filtering of the Cr component, slice_alf_cr_flag may not be encoded/decoded/acquired, and slice_alf_cr_flag may be inferred as a first value (e.g., 0).

The slice_alf_cb_flag and slice_alf_cr_flag are examples of information indicating whether adaptive in-loop filtering is performed with respect to the chroma component signaled in the slice, and, when information indicating whether adaptive in-loop filtering is performed with respect to the chroma component in the picture is signaled, the slice_alf_cb_flag and slice_alf_cr_flag may be changed to ph_alf_cb_flag and ph_alf_cr_flag.

slice_alf_aps_id_chroma may mean the identifier of the adaptation parameter set referred to in the chroma component of the slice. That is, slice_alf_aps_id_chroma may mean a slice chroma ALF set identifier indicating an adaptation parameter set for adaptive in-loop filtering referred to in the slice.

The slice_alf_aps_id_chroma may be encoded/decoded when at least one of slice_alf_cb_flag or slice_alf_cr_flag has a second value (e.g., 1).

When slice_alf_aps_id_chroma is not present in the bitstream, slice_alf_aps_id_chroma may be inferred as a first value (e.g., 0).

Here, the temporal layer identifier of the adaptation parameter set having the same adaptation_parameter_set_id as slice_alf_aps_id_chroma may be less than or equal to the temporal layer identifier of the current slice.

In case of an intra slice, slice_alf_aps_id_chroma or slice_alf_aps_id_chroma[i] may not refer to an adaptation parameter set for adaptive in-loop filtering for a picture other than an intra picture or a picture including an intra slice.

According to an embodiment, slice_alf_aps_id_chroma[i] may refer to only an adaptation parameter set including an adaptive in-loop filter set for a chroma component.

In addition, instead of slice_alf_aps_id_chroma, slice_alf_aps_id_chroma[i] may be used. That is, one of two or more adaptation parameter sets including adaptive in-loop filter information during adaptive in-loop filtering for the chroma component may be selected. Adaptive in-loop filter information (slice_alf_aps_id_chroma[i]) of the adaptation parameter set may be used in adaptive in-loop filtering for the chroma component.

slice_alf_aps_id_chroma[i] may mean the identifier of an i-th adaptation parameter set for adaptive in-loop filtering referred to in the slice. That is, slice_alf_aps_id_chroma [i] may mean a slice chroma ALF set identifier indicating an i-th adaptation parameter set for adaptive in-loop filtering referred to in the slice.

When slice_alf_aps_id_chroma[i] is not present in the bitstream, slice_alf_aps_id_chroma[i] may be inferred as a first value (e.g., 0).

Here, the temporal layer identifier of the adaptation parameter set having the same adaptation_parameter_set_id as slice_alf_aps_id_chroma[i] may be less than or equal to the temporal layer identifier of the current slice.

When two or more sub pictures/slices/tile groups/tiles/bricks have the same adaptation_parameter_set_id in one picture and two or more adaptation parameter sets for adaptive in-loop filtering having the adaptation_parameter_set_id are present, two or more adaptation parameter sets for adaptive in-loop filtering having the same adaptation_parameter_set_id may have the same data/content/syntax element value.

In case of an intra slice, slice_alf_aps_id_chroma[i] may not refer to an adaptation parameter set for adaptive in-loop filtering for a picture other than an intra picture or a picture including an intra slice.

When the adaptation parameter set type of a predetermined adaptation parameter set is a parameter for adaptive in-loop filtering (ALF type) and the adaptation parameter set identifier adaptation_parameter_set_id is equal to alf_aps_id_chroma or alf_aps_id_chroma [i] which is the identifier of the adaptation parameter set referred to in the current picture or picture header, the temporal layer identifier of the predetermined adaptation parameter set may be less than or equal to the temporal layer identifier of the current picture.

As in the examples of FIGS. 20a to 20d, alf_luma_filter_signal_flag may mean a luma ALF signaling flag indicating whether the adaptive in-loop filter set for the luma component is included in the adaptation parameter set. In addition, alf_luma_filter_signal_flag may mean a luma ALF signaling flag indicating whether the adaptive in-loop filter set for the luma component is encoded/decoded.

For example, when alf_luma_filter_signal_flag has a first value (e.g., 0), adaptive in-loop filter set for the luma component may not be entropy-encoded/decoded. When alf_luma_filter_signal_flag has a second value (e.g., 1), adaptive in-loop filter set for the luma component may be entropy-encoded/decoded.

When alf_luma_filter_signal_flag is not present in the bitstream, alf_luma_filter_signal_flag may be inferred as a first value (e.g., 0).

In an embodiment, when the chroma component presence information encoded/decoded/acquired in the adaptation parameter set indicates that information on the chroma component is not included in the adaptation parameter set, alf_luma_filter_signal_flag may not be included in adaptive in-loop filter data and may be inferred to as a second value (e.g., 1).

That is, alf_luma_filter_signal_flag may not be encoded/decoded in the adaptive in-loop filter data.

In addition, when the chroma component presence information indicates that the information on the chroma component is included in the adaptation parameter set, alf_luma_filter_signal_flag may be included in the adaptive in-loop filter data. That is, alf_luma_filter_signal_flag may be encoded/decoded in the adaptive in-loop filter data.

When the adaptation parameter set type of a predetermined adaptation parameter set is a parameter for adaptive in-loop filtering (ALF type) and the adaptation parameter set identifier adaptation_parameter_set_id is equal to slice_alf_aps_id_luma[i], a luma ALF signaling flag alf_luma_filter_signal_flag may be determined as a second value (e.g., 1). That is, when the parameter for adaptive in-loop filtering is present in the adaptation parameter set and the adaptation parameter set is referred to in the current picture or current slice, since adaptive in-loop filter information for the luma component is signaled, a luma ALF signaling flag (alf_luma_filter_signal_flag) may have a second value (e.g., 1).

alf_chroma_filter_signal_flag may mean a chroma ALF signaling flag indicating whether the adaptive in-loop filter set for the chroma component is included in the adaptation parameter set. In addition, alf_chroma_filter_signal_flag may mean a chroma ALF signaling flag indicating whether the adaptive in-loop filter set for the chroma component is encoded/decoded.

For example, when alf_chroma_filter_signal_flag has a first value (e.g., 0), the adaptive in-loop filter set for the chroma component may not be entropy-encoded/decoded. In addition, when alf_chroma_filter_signal_flag has a second value (e.g., 1), the adaptive in-loop filter set for the chroma component may be entropy-encoded/decoded.

When alf_chroma_filter_signal_flag is not present in the bitstream, alf_chroma_filter_signal_flag may be inferred as a first value (e.g., 0).

When the adaptation parameter set type of a predetermined adaptation parameter set is a parameter for adaptive in-loop filtering (ALF type) and the adaptation parameter set identifier adaptation_parameter_set_id is equal to slice_alf_aps_id_chroma or slice_alf_aps_id_chroma[i], the chroma ALF signaling flag alf_chroma_filter_signal_flag may be determined as a second value (e.g., 1). That is, when the parameter for adaptive in-loop filtering is present in the adaptation parameter set and the adaptation parameter set is referred to in the current picture or current slice, since adaptive in-loop filter information of the chroma component is signaled, the chroma ALF signaling flag alf_chroma_filter_signal_flag may have a second value (e.g., 1).

NumAlfFilters which is the maximum value of the number of different adaptive in-loop filters included in the adaptive in-loop filter set may be N. Here, N may be a positive integer and may be, for example, 25.

alf_luma_clip_flag may be a luma clipping flag meaning whether linear adaptive in-loop filtering or non-linear adaptive in-loop filtering is performed with respect to the luma component.

For example, when alf_luma_clip_flag has a first value (e.g., 0), linear adaptive in-loop filtering may be performed with respect to the luma component. In addition, when alf_luma_clip_flag has a second value (e.g., 1), nonlinear adaptive in-loop filtering may be performed with respect to the luma component.

When alf_luma_clip_flag is not present in the bitstream, alf_luma_clip_flag may be inferred as a first value (e.g., 0).

alf_luma_num_filters_signalled_minus1 may mean luma signaling ALF number information indicating the number of signaled luma ALFs. In addition, a value of alf_luma_num_filters_signalled_minus1+1 may mean the number of luma signaling ALFs.

The alf_luma_num_filters_signalled_minus1 may have a value from 0 to NumAlfFilters-N. Here, N may be a positive integer and may be, for example, 1.

When alf_luma_num_filters_signalled_minus1 is not present in the bitstream, alf_luma_num_filters_signalled_minus1 may be inferred as a value of 0.

alf_luma_coeff_delta_idx[filtIdx] may indicate the index of the luma signaling adaptive in-loop filter referred to by the luma adaptive in-loop filter corresponding to filtIdx. alf_luma_coeff_delta_idx[filtIdx] may mean a luma ALF delta index. The luma ALF delta index may mean a filter coefficient difference index for the luma component.

filtIdx may have a value of from 0 to NumAlfFilters−N. Here, N may be a positive integer and may be, for example, 1.

When alf_luma_coeff_delta_idx[filtIdx] is not present in the bitstream, alf_luma_coeff_delta_idx[filtIdx] may be inferred to as a value of 0.

alf_luma_use_fixed_filter_flag may mean whether a fixed filter is used when an adaptive in-loop filter coefficient is signaled.

For example, when alf_luma_use_fixed_filter_flag has a first value (e.g., 0), the fixed filter may not be used when the adaptive in-loop filter coefficient is signaled. In addition, when alf_luma_use_fixed_filter_flag has a second value (e.g., 1), the fixed filter may be used when the adaptive in-loop filter coefficient is signaled.

When alf_luma_use_fixed_filter_flag is not present in the bitstream, alf_luma_use_fixed_filter_flag may be inferred as a first value (e.g., 0).

alf_luma_fixed_filter_set_idx may mean a fixed filter set index.

The alf_luma_fixed_filter_set_idx may have a value from 0 to N. Here, N may be a positive integer and may be, for example, 15.

When alf_luma_fixed_filter_set_idx is not present in the bitstream, alf_luma_fixed_filter_set_idx may be inferred as a value of 0.

alf_luma_fixed_filter_pred_present_flag may mean whether alf_luma_fixed_filter_pred_flag[i] is present in the bitstream.

For example, when alf_luma_fixed_filter_pred_present_flag has a first value (e.g., 0), alf_luma_fixed_filter_pred_flag[i] may not be present in the bitstream. In addition, when alf_luma_fixed_filter_pred_present_flag has a second value (e.g., 1), alf_luma_fixed_filter_pred_flag[i] may be present in the bitstream.

In addition, alf_luma_fixed_filter_pred_present_flag may mean whether all adaptive in-loop filter coefficient classes (types) for the luma component are predicted from the fixed filter and signaled. For example, when alf_luma_fixed_filter_pred_present_flag has a first value (e.g., 0), all adaptive in-loop filter coefficient classes (types) for the luma component may not be predicted from the fixed filter and signaled. When alf_luma_fixed_filter_pred_present_flag has a second value (e.g., 1), at least one of adaptive in-loop filter coefficient classes (types) for the luma component may be predicted from the fixed filter and signaled.

When alf_luma_fixed_filter_pred_present_flag is not present in the bitstream, alf_luma_fixed_filter_pred_present_flag may be inferred as a first value (e.g., 0).

alf_luma_fixed_filter_pred_flag[i] may mean whether an i-th adaptive in-loop filter coefficient class (type) is predicted from the fixed filter and signaled.

For example, when alf_luma_fixed_filter_pred_flag[i] has a first value (e.g., 0), the i-th adaptive in-loop filter coefficient class (type) may not be predicted from the fixed filter. In addition, when alf_luma_fixed_filter_pred_flag[i] has a second value (e.g., 1), the i-th adaptive in-loop filter coefficient class (type) may be predicted from the fixed filter.

When alf_luma_fixed_filter_pred_flag[i] is not present in the bitstream, alf_luma_fixed_filter_pred_flag[i] may be inferred as a second value (e.g., 1).

According to an embodiment, unlike FIGS. 20a to 20d, the adaptive in-loop filter data syntax may not include information on the fixed filter (alf_luma_use_fixed_filter_flag, alf_luma_fixed_filter_set_idx, alf_luma_fixed_filter_pred_present_flag, and alf_luma_fixed_filter_pred_flag). Accordingly, the information on the fixed filter may not be signaled. Therefore, in the encoder/decoder, a predetermined fixed filter may be used in adaptive in-loop filtering. In addition, a filter coefficient may not be predicted from the fixed filter and signaled. In the encoder/decoder, only the predetermined fixed filter may be used in adaptive in-loop filtering and the filter coefficient predicted from the fixed filter may not be used in adaptive in-loop filtering.

alf_luma_coeff_delta_flag may mean whether alf_luma_coeff_delta_prediction_flag is signaled.

For example, when alf_luma_coeff_delta_flag has a first value (e.g., 0), alf_luma_coeff_delta_prediction_flag may be signaled, and, when alf_luma_coeff_delta_flag has a second value (e.g., 1), alf_luma_coeff_delta_prediction_flag may not be signaled.

When alf_luma_coeff_delta_flag is not present in the bitstream, alf_luma_coeff_delta_flag may be inferred as a second value (e.g., 1).

alf_luma_coeff_delta_prediction_flag may mean whether the signaled adaptive in-loop filter coefficient for the luma component is predicted from the previously signaled adaptive in-loop filter coefficient for the luma component.

For example, when alf_luma_coeff_delta_prediction_flag has a first value (e.g., 0), the signaled adaptive in-loop filter coefficient for the luma component may not be predicted from the previously signaled adaptive in-loop filter coefficient for the luma component. In addition, when alf_luma_coeff_delta_prediction_flag has a second value (e.g., 1), the signaled adaptive in-loop filter coefficient for the luma component may be predicted from the previously signaled adaptive in-loop filter coefficient for the luma component.

When alf_luma_coeff_delta_prediction_flag is not present in the bitstream, alf_luma_coeff_delta_prediction_flag may be inferred as a first value (e.g., 0).

The value of alf_luma_min_eg_order_minus1+1 may mean the minimum order of the exponential Golomb code used when the adaptive in-loop filter coefficient for the luma component is signaled.

alf_luma_eg_order_increase_flag[i] may mean that the order of the exponential Golomb code used when the adaptive in-loop filter coefficient for the luma component is signaled increases by 1.

The order expGoOrderY[i] of the exponential Golomb code used to entropy-encode/decode the value of alf_luma_coeff_delta_abs[sfIdx][j] may be derived as follows.

expGoOrderY[i]=1==i 0 ?expGoOrderY[i−1])+alf_luma_min_eg_order_minus1+1: alf_luma_eg_order_increase_flag[i]

alf_luma_coeff_flag[sfIdx] may mean whether the adaptive in-loop filter for the luma component indicated by sfIdx is signaled.

For example, when alf_luma_coeff_flag[sfIdx] has a first value (e.g., 0), the adaptive in-loop filter for the luma component indicated by sfIdx may be set to a value of 0. In addition, when alf_luma_coeff_flag[sfIdx] has a second value (e.g., 1), the adaptive in-loop filter for the luma component indicated by sfIdx may be signaled.

When alf_luma_coeff_flag[sfIdx] is not present in the bitstream, alf_luma_coeff_flag[sfIdx] may be inferred as a second value (e.g., 1).

According to an embodiment, unlike FIGS. 20a to 20d, alf_luma_coeff_flag[sfIdx] may not be included in the adaptive in-loop filter data syntax. That is, alf_luma_coeff_flag[sfIdx] may not be encoded/decoded in the adaptive in-loop filter data syntax. Accordingly, it may be determined that the coefficient information of the adaptive in-loop filter is encoded/decoded/acquired without encoding/decoding/acquiring alf_luma_coeff_flag[sfIdx].

alf_luma_coeff_delta_abs[sfIdx][j] may mean the absolute value of a j-th coefficient difference (delta) of the adaptive in-loop filter for the luma component indicated by sfIdx.

When alf_luma_coeff_delta_abs[sfIdx][j] is not present in the bitstream, alf_luma_coeff_delta_abs[sfIdx][j] may be inferred as a value of 0.

The order k of the exponential Golomb code (binarization) uek (v) may be derived as follows.
golombOrderIdxY[ ]={0, 0, 1, 0, 0, 1, 2, 1, 0, 0, 1, 2}
k=expGoOrderY[golombOrder IdxY[j]]

According to an embodiment, the order k of the exponential Golomb code uek (v) for entropy-encoding/decoding/binarization of alf_luma_coeff_delta_abs[sfIdx][j] may be fixed to 0.

Accordingly, for entropy-encoding/decoding/binarization of alf_luma_coeff_delta_abs[sfIdx][j], 0-th exponential Golomb code ue (v) is applicable. The value of alf_luma_coeff_delta_abs[sfIdx][j] may be a positive integer including 0 and may have a value in a range from 0 to 128.

alf_luma_coeff_delta_sign[sfIdx][j] may mean the sign of a j-th coefficient or coefficient difference of the adaptive in-loop filter for the luma component indicated by sfIdx. In addition, alf_luma_coeff_delta_sign[sfIdx][j] may be derived as follows.

When alf_luma_coeff_delta_sign[sfIdx][j] has a first value (e.g., 0), the adaptive filter coefficient or coefficient difference for the corresponding luma component may have a positive sign.

When alf_luma_coeff_delta_sign[sfIdx][j] has a second value (e.g., 1), the adaptive filter coefficient or coefficient difference for the corresponding luma component may have a negative sign.

When alf_luma_coeff_delta_sign [sfIdx][j] is not present in the bitstream, alf_luma_coeff_delta_sign [sfIdx][j] may be inferred as a first value (e.g., 0).

According to an embodiment, the value of the filter coefficient may be directly signaled instead of the coefficient difference value of the adaptive in-loop filter. For example, the sign information and the absolute value information of the filter coefficient may be included in the adaptive in-loop filter data syntax. That is, the sign information and the absolute value information of the filter coefficient may be encoded/decoded in the adaptive in-loop filter data syntax. For encoding/decoding of the absolute value information of the filter coefficient, a 0-th exponential Golomb code ue (v) may be used. The value of the absolute value information of the filter coefficient may be a positive integer including 0 and may have a value in a range from 0 to 128. The filter coefficient of the adaptive in-loop filter may include at least one of the filter coefficient of the adaptive in-loop filter for the luma component or the filter coefficient of the adaptive in-loop filter for the chroma component.

filtCoeff[sfIdx][j] which is a luma signaling ALF may be derived as follows. At this time, sfIdx may have a value from 0 to alf_luma_num_filters_signalled_minus1. In addition, j may have a value from 0 to N. Here, N may be a positive integer and may be, for example, 11.

filtCoeff[sfIdx][j]=alf_luma_coeff_delta_abs[sfIdx][j]*(1-2*alf_luma_coeff_delta_sign[sfIdx][j])

When alf_luma_coeff_delta_prediction_flag has a first value (e.g., 1), filtCoeff[sfIdx][j] may be derived as follows. At this time, sfIdx may have a value from 1 to alf_luma_num_filters_signalled_minus1. In addition, j may have a value from 0 to N. Here, N may be a positive integer and may be, for example, 11.

filtCoeff[sfIdx][j]+=filtCoeff[sfIdx-1][j]

According to an embodiment, unlike FIGS. 21a to 21d, alf_luma_coeff_delta_prediction_flag may not be included in the adaptive in-loop filter data syntax. That is, alf_luma_coeff_delta_prediction_flag may not be encoded/decoded in the adaptive in-loop filter data syntax. Accordingly, the luma component filter coefficient delta value of the adaptive in-loop filter may be directly signaled instead of being predictive encoded/decoded.

The adaptive in-loop filter coefficient for the luma component AlfCoeffL[adaptation_parameter_set_id][filtIdx][j] may be derived as follows. At this time, filtIdx may have a value from 0 to NumAlfFilters-1. In addition, j may have a value from 0 to N. Here, N may be a positive integer and may be, for example, 11.

AlfCoeffL[adaptation_parameter_set_id][filtIdx][j]=filtCoeff[alf_luma_coeff_delta_idx[filtIdx]][j]

When alf_luma_use_fixed_filter_flag has a second value (e.g., 1) and alf_luma_fixed_filter_pred_flag[filtIdx] has a second value (e.g., 1), AlfCoeffL[adaptation_parameter_set_id][filtIdx][j] may be derived as in the following example. At this time, filtIdx may have a value from 0 to NumAlfFilters-1. In addition, j may have a value from 0 to N. Here, N may be a positive integer and may be, for example, 11.

AlfCoeffL[adaptation_parameter_set_id][filtIdx][j]+=AlfFixFiltCoeff [AlfClassToFiltMap[alf_luma_fixed_filter_set_i dx][filtIdx]][j]

Figure 22B:
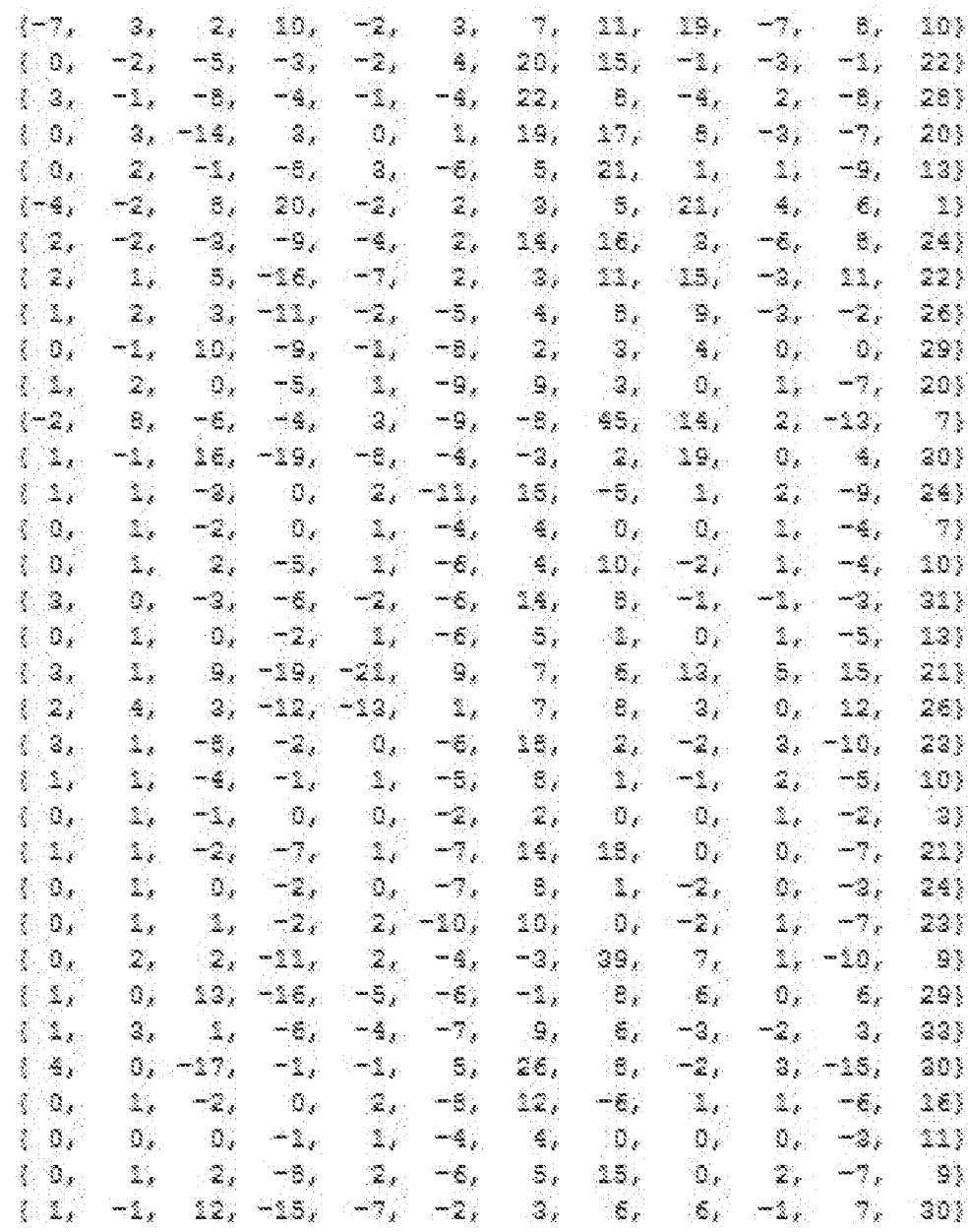

The fixed filter coefficient AlfFixFiltCoeff[i][j] may be derived as in the examples of FIGS. 22a and 22b. At this time, i may have a value from 0 to imax. In addition, j may have a value from 0 to N. Here, imax may be a positive integer, and may be, for example, 64. Here, N may be a positive integer and may be, for example, 11.

Figure 23:
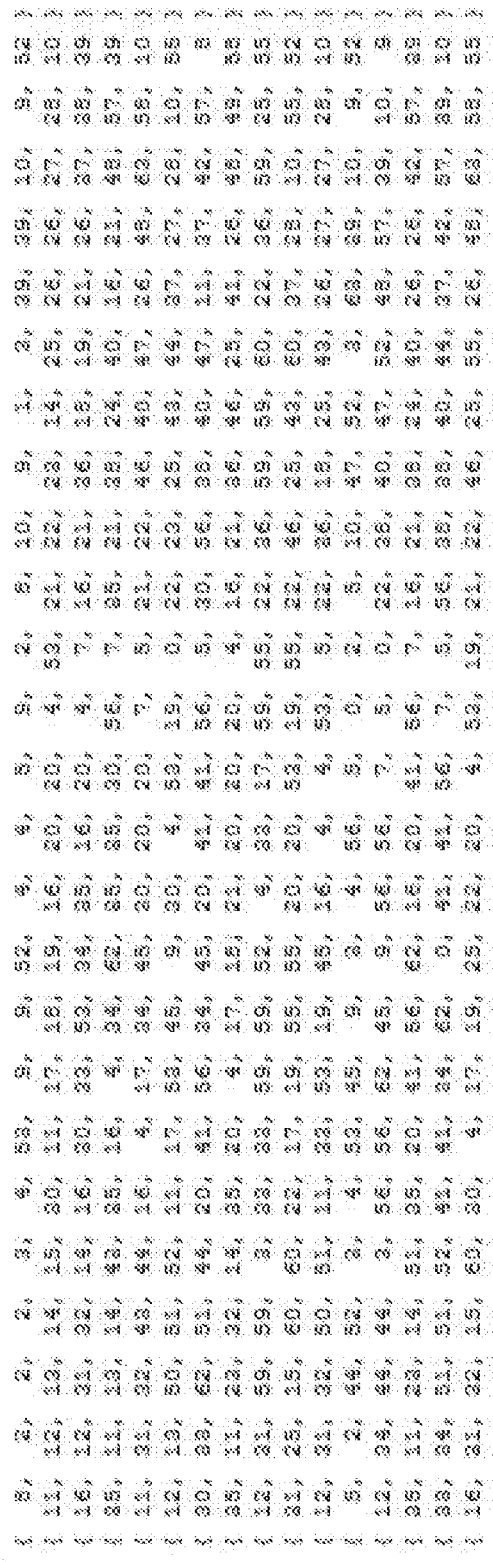
FIG. 23 is a view showing an embodiment of a mapping relationship between an adaptive in-loop filter coefficient class and a filter.

The mapping relationship AlfClassToFiltMap[m][n] between the adaptive in-loop filter coefficient class and the filter may be derived as in the example of FIG. 23. At this time, m may have a value from 0 to mmax. In addition, n may have a value from 0 to nmax. Here, mmax may be a positive integer, and may be, for example, 15. Here, nmax may be a positive integer, and may be, for example, 24.

AlfCoeffL[adaptation_parameter_set_id][filtIdx][j] may have a value from -2M to 2M-1. At this time, filtIdx may have a value from 0 to NumAlfFilters-1. In addition, j may have a value from 0 to N. Here, N may be a positive integer and may be, for example, 11. At this time, M may be a positive integer, and may be, for example, 7.

The value of alf_luma_clip_min_eg_order_minus1+1 may mean the minimum order of the exponential Golomb code used when the adaptive in-loop filter clipping index for the luma component is signaled. The clipping index may be signaled or used in case of the non-linear adaptive in-loop filter.

alf_luma_clip_eg_order_increase_flag[i] may mean whether the order of the exponential Golomb code used when the adaptive in-loop filter clipping index for the luma component is signaled increases by 1.

The order kClipY[i] of the exponential Golomb code used to entropy-encode/decode alf_luma_clip_idx[sfIdx][j] may be derived as follows.

kClipY[i]=(i==0?alf_luma_clip_min_eg_order_minus1+1: kClipY[i-1])+alf_luma_clip_eg_order_increase_flag[i]

alf_luma_clip_idx[sfIdx][j] may mean a luma clipping index for the clipping value used for clipping before the j-th coefficient of the adaptive in-loop filter for the luma component indicated by sfIdx is multiplied by a reconstruction/decoding sample. The clipping value may be determined by the luma clipping index indicated by alf_luma_clip_idx [sfIdx][j] and the bit depth of the image. Here, the bit depth may mean a bit depth determined in at least one of a sequence, picture, slice, tile group, tile or CUT unit.

When alf_luma_clip_idx[sfIdx][j] is not present in the bitstream, alf_luma_clip_idx[sfIdx][j] may be inferred as a first value (e.g., 0).

alf_luma_clip_idx[sfIdx][j] may have a value from 0 to M. Here, M may be a positive integer, and may be, for example, 3. At this time, sfIdx may have a value from 0 to alf_luma_num_filters_signalled_minus1. In addition, j may have a value from 0 to N. Here, N may be a positive integer and may be, for example, 11.

The order k of the exponential Golomb code (binarization) uek (v) may be derived as follows.

k=kClipY [golombOrderIdxY [j]]

filterClips[sfIdx][j] may be derived as follows. At this time, sfIdx may have a value from 0 to alf_luma_num_filters_signalled_minus1. In addition, j may have a value from 0 to N. Here, N may be a positive integer and may be, for example, 11.

filterClips[sfIdx][j]=Round(2(BitDepthY*(M+1−alf_luma_clip_idx[sfIdx][j])/(M+1)) or filterClips[sfIdx][j]= Round(2(BitDepthY−8)*2 (8*(M−alf_luma_clip_idx[sfIdx][j])/M))

Here, BitDepthY may mean an input bit depth/depth for the luma component. Here, the bit depth may mean a bit depth determined in at least one of a sequence, picture, slice, tile group, tile or CUT unit.

Here, M may be a positive integer, and may be, for example, 3. In addition, M may mean a maximum value of alf_luma_clip_idx[sfIdx][j].

The adaptive in-loop filter clipping value AlfClipL[adaptation_parameter_set_id][filtIdx][j] for the luma component may be derived as follows. At this time, filtIdx may have a value from 0 to NumAlfFilters−1. In addition, j may have a value from 0 to N. Here, N may be a positive integer and may be, for example, 11.

AlfClipL[adaptation_parameter_set_id][filtIdx][j]=filterClips[alf_luma_coeff_delta_idx[filtIdx]][j]

The exponential Golomb code used in alf_luma_clip_idx[sfIdx][j] may be efficiently entropy-encoded/decoded if a range of the value thereof is large. However, as in the above example, when the range (from 0 to 3) of the value of alf_luma_clip_idx[sfIdx][j] is relatively small, the exponential Golomb code used in alf_luma_clip_idx[sfIdx][j] may be inefficient in view of entropy-encoding/decoding.

Accordingly, instead of using at least one of alf_luma_clip_min_eg_order_minus1 or alf_luma_clip_eg_order_increase_flag[i], if the range (from 0 to 3) of the value of alf_luma_clip_idx[sfIdx][j] is relatively small, alf_luma_clip_idx[sfIdx][j] may be entropy-encoded/decoded using the entropy encoding/decoding method of at least one of tu(3), f(2), u(2) or tb(3).

alf_chroma_clip_flag may be a chroma clipping flag meaning whether linear adaptive in-loop filtering or non-linear adaptive in-loop filtering is performed with respect to the chroma component. That is, alf_chroma_clip_flag is not signaled and applied for each signaled chroma ALF, but alf_chroma_clip_flag may be signaled and applied only once for all signaled chroma ALFs. At this time, the chroma ALF may mean the adaptive in-loop filter for the chroma component.

For example, when alf_chroma_clip_flag has a first value (e.g., 0), linear adaptive in-loop filtering may be performed with respect to the chroma component. In addition, alf_chroma_clip_flag has a second value (e.g., 1), non-linear adaptive in-loop filtering may be performed with respect to the chroma component.

When alf_chroma_clip_flag is not present in the bitstream, alf_chroma_clip_flag may be inferred as a first value (e.g., 0).

The value of alf_chroma_min_eg_order_minus1+1 may mean the minimum order of the exponential Golomb code used when the adaptive in-loop filter coefficient for the chroma component is signaled.

alf_chroma_eg_order_increase_flag[i] may mean whether the order of the exponential Golomb code used when the adaptive in-loop filter coefficient for the chroma component is signaled increases by 1.

The order expGoOrderC[i] of the exponential Golomb code used to entropy-encode/decode the value of alf_chroma_coeff_abs[j] may be derived as follows.

expGoOrderC[i]= (i==0?alf_chroma_min_eg_order_minus1+1: expGoOrderC[i−1])+alf_chroma_eg_order_increase_flag[i]

alf_chroma_coeff_abs[j] may mean the absolute value of the j-th coefficient the adaptive in-loop filter for the chroma component.

When alf_chroma_coeff_abs[j] is not present in the bitstream, alf_chroma_coeff_abs[j] may be inferred as a value of 0.

alf_chroma_coeff_abs[j] may have a value from 0 to 2M−1. At this time, M may be a positive integer, and may be, for example, 7.

The order k of the exponential Golomb code (binarization) uek (v) may be derived as follows.

golombOrderIdxC[ ]={0, 0, 1, 0, 0, 1}
k=expGoOrderC[golombOrderIdxC[j]]

According to an embodiment, the order k of the exponential Golomb code uek (v) for entropy-encoding/decoding/binarization of alf_chroma_coeff_abs[j] may be fixed to 0. Accordingly, a 0-th exponential Golomb code ue (v) may be used for entropy-encoding/decoding/binarization of alf_chroma_coeff_abs[j]. The value of alf_chroma_coeff_abs[j] may be a positive integer including 0 and may have a value in a range from 0 to 128.

alf_chroma_coeff_sign[j] may mean the sign of the j-th coefficient or the coefficient difference of the adaptive in-loop filter for the chroma component. In addition, alf_chroma_coeff_sign[j] may be derived as follows.

When alf_chroma_coeff_sign[j] has a first value (e.g., 0), the adaptive in-loop filter coefficient or coefficient difference for the corresponding chroma component may have a positive sign.

When alf_chroma_coeff_sign[j] has a second value (e.g., 1), the adaptive in-loop filter coefficient or coefficient difference for the corresponding chroma component may have a negative sign.

When alf_chroma_coeff_sign[j] is not present in the bitstream, alf_chroma_coeff_sign[j] may be inferred as a first value (e.g., 0).

The adaptive in-loop filter for the chroma component coefficient (chroma signaling ALF) AlfCoeffC[adaptation_parameter_set_id][j] may be derived as follows. At this time, j may have a value from 0 to N. Here, N may be a positive integer and may be, for example, 5.

AlfCoeffC[adaptation_parameter_set_id][j]=alf_chroma_coeff_abs[j] *(1−2*alf_chroma_coeff_sign[j])

AlfCoeffC[adaptation_parameter_set_id][j] may have a value from −2M−1 to 2M−1. At this time, j may have a value from 0 to N. Here, N may be a positive integer and may be, for example, 5. At this time, M may be a positive integer, and may be, for example, 7. Alternatively, AlfCoeffC[ adaptation_parameter_set_id][j] may have a value from −2^M to 2^M−1.

The value of alf_chroma_clip_min_eg_order_minus1+1 may mean the minimum order of the exponential Golomb code used when the adaptive in-loop filter clipping index for the chroma component is signaled. The clipping index may be signaled or used in case of a non-linear adaptive in-loop filter.

alf_chroma_clip_eg_order_increase_flag[i] may mean whether the order of the exponential Golomb code used when the adaptive in-loop filter clipping index for the chroma component is signaled increases by 1.

The order kClipC[i] of the exponential Golomb code used to entropy-encode/decode alf_chroma_clip_idx[j] may be derived as follows.

kClipC[i]=1 i==0 ?alf_chroma_clip_min_eg_order_minus1+1: kClipC[i−1])+alf_chroma_clip_eg_order_increase_flag[i]

alf_chroma_clip_idx[j] may mean a chroma clipping index for the clipping value used for clipping before the j-th coefficient of the adaptive in-loop filter for the chroma component is multiplied by a reconstruction/decoding sample. The clipping value may be determined by the chroma clipping index indicated by alf_chroma_clip_idx[j] and the bit depth of the image. Here, the bit depth may mean a bit depth determined in at least one of a sequence, picture, slice, tile group, tile or CUT unit.

When alf_chroma_clip_idx[j] is not present in the bitstream, alf_chroma_clip_idx[j] may be inferred as a first value (e.g., 0).

alf_chroma_clip_idx[j] may have a value from 0 to M. Here, M may be a positive integer, and may be, for example, 3. At this time, j may have a value from 0 to N. Here, N may be a positive integer and may be, for example, 5.

The order k of the exponential Golomb code (binarization) uek (v) may be derived as follows.

k=kClipC[golombOrderIdxC[j]]

According to an embodiment, the clipping value indicated by the clipping index of the chroma component may be determined using the same method as the clipping value indicated by the clipping index of the luma component. That is, the clipping value for the chroma component and the clipping value for the luma component may be determined using the same method based on at least one of the clipping index or the bit depth. For example, it may be determined that the clipping value when the clipping index of the chroma component is 3 and the clipping value when the clipping index of the luma component is 3 are the same. Accordingly, when the clipping index and the bit depth are the same, the clipping process for the luma component sample and the clipping process for the chroma component sample may be performed by the same clipping value.

In addition, the clipping value may be set based on the bit depth. For example, the clipping value may be set to a value of 2<<(BitDepth−N). Here, N may be a positive integer including 0. N may be determined according to the clipping index value. As the clipping index increases, N may increase. Here, the BitDepth may mean a bit depth.

The adaptive in-loop filter clipping value for the chroma component AlfClipC[adaptation_parameter_set_id][j] may be derived as follows. At this time, j may have a value from 0 to N. Here, N may be a positive integer and may be, for example, 5.

AlfClipC[adaptation_parameter_set_id][j]=Round(2(BitDepthC−8)*2(8*(M−alf_chroma_clip_idx[j])/M)) or
AlfClipC[adaptation_parameter_set_id][j]=Round(2(BitDepthC*(M+1−alf_chroma_clip_idx[j])/(M+1))

Here, BitDepthC may mean an input bit depth/depth for the chroma component. Here, the bit depth may mean a bit depth determined in at least one of a sequence, picture, slice, tile group, tile or CUT unit.

Here, M may be a positive integer, and may be, for example, 3. In addition, M may mean a maximum value of alf_chroma_clip_idx[j].

The exponential Golomb code used in alf_chroma_clip_idx[j] may be efficiently entropy-encoded/decoded if a range of the value thereof is large. However, as in the above example, when the range (from 0 to 3) of the value of alf_chroma_clip_idx[j] is relatively small, the exponential Golomb code used in alf_chroma_clip_idx[j] may be inefficient in view of entropy-encoding/decoding.

Accordingly, instead of using at least one of the syntax element alf_chroma_clip_min_eg_order_minus1 or alf_chroma_clip_eg_order_increase_flag[i], if the range (from 0 to 3) of the value of alf_chroma_clip_idx[j] is relatively small, alf_chroma_clip_idx[j] may be entropy-encoded/decoded using the entropy encoding/decoding method of at least one of tu(3), f(2), u(2) or tb(3).

As in the example of FIG. 21, alf_ctb_flag[cIdx][xCtb>>Log2CtbSize][yCtb>>Log2CtbSize] may mean whether adaptive in-loop filtering is used in the color component (Y, Cb, or Cr) coding tree block indicated by cIdx at a luma component location (xCtb, yCtb).

For example, alf_ctb_flag[0][xCtb>>Log2CtbSize][yCtb>>Log2CtbSize] may be a first ALF coding tree block flag indicating whether adaptive in-loop filtering is applied to the luma sample of the current coding tree block. When alf_ctb_flag[0][xCtb>>Log2CtbSize][yCtb>>Log2CtbSize] has a first value (e.g., 0), adaptive in-loop filtering may not be used in the luma component coding tree block at the luma component location (xCtb, yCtb). In addition, when alf_ctb_flag[0][xCtb>>Log2CtbSize][yCtb>>Log2CtbSize] has a second value (e.g., 1), adaptive in-loop filtering may be used in the luma component coding tree block at the luma component location (xCtb, yCtb).

When alf_ctb_flag[0][xCtb>>Log2CtbSize][yCtb>>Log2CtbSize] not in the bitstream, is present alf_ctb_flag[0][xCtb>>Log2CtbSize][yCtb>>Log2CtbSize] may be inferred as a first value (e.g., 0).

For example, alf_ctb_flag[1][xCtb>>Log2CtbSize][yCtb>>Log2CtbSize] may be a second ALF coding tree block flag indicating whether adaptive in-loop filtering is applied to the tree block. When Cb sample of the current coding alf_ctb_flag[1][xCtb>>Log2CtbSize][yCtb>>Log2CtbSize] has a first value (e.g., 0), adaptive in-loop filtering may not be used in the Cb component coding tree block at the luma component location (xCtb, yCtb). In addition, when alf_ctb_flag[1][xCtb>>Log2CtbSize][yCtb>>Log2CtbSize] has a second value (e.g., 1), adaptive in-loop filtering may be used in the Cb component coding tree block at the luma component location (xCtb, yCtb).

When alf_ctb_flag[1][xCtb>>Log2CtbSize][yCtb>>Log2CtbSize] is not present in the bitstream, alf_ctb_flag[1][xCtb>>Log2CtbSize][yCtb>>Log2CtbSize] may be inferred as a first value (e.g., 0).

For example, alf_ctb_flag[2][xCtb>>Log2CtbSize][yCtb>>Log2CtbSize] may be a third ALF coding tree block flag indicating whether adaptive in-loop filtering is applied to the current tree sample of the coding block. When Cr alf_ctb_flag[2][xCtb>>Log2CtbSize][yCtb>>Log2CtbSize] has a first value (e.g., 0), adaptive in-loop filtering may not be used in the Cr coding tree block at the luma component location (xCtb, yCtb). In addition, when alf_ctb_flag[2]

[xCtb>>Log2CtbSize][yCtb>>Log2CtbSize] has a second value (e.g., 1), adaptive in-loop filtering may be used in the Cr coding tree block at the luma component location (xCtb, yCtb).

When alf_ctb_flag[2][xCtb>>Log2CtbSize][yCtb>>Log2CtbSize] not present in is the bitstream, alf_ctb_flag[2][xCtb>>Log2CtbSize][yCtb>>Log2CtbSize] may be inferred as a first value (e.g., 0).

alf_ctb_use_first_aps_flag may mean whether the adaptive in-loop filter information of the adaptation parameter set indicated by adaptation_parameter_set_id having the same value as slice_alf_aps_id_luma[0] is used.

For example, when alf_ctb_use_first_aps_flag has a first value (e.g., 0), the adaptive in-loop filter information of the adaptation parameter set indicated by adaptation_parameter_set_id having the same value as slice_alf_aps_id_luma[0] may not be used. In addition, when alf_ctb_use_first_aps_flag has a second value (e.g., 1), the adaptive in-loop filter information of the adaptation parameter set indicated by adaptation_parameter_set_id having the same value as slice_alf_aps_id_luma[0] may be used.

When alf_ctb_use_first_aps_flag is not present in the bitstream, alf_ctb_use_first_aps_flag may be inferred as a first value (e.g., 0).

According to an embodiment, unlike the example of FIG. 21, alf_ctb_use_first_aps_flag may not be included in the adaptive in-loop filter data syntax. That is, alf_ctb_use_first_aps_flag may not be encoded/decoded in the adaptive in-loop filter data syntax. Accordingly, without encoding/decoding/acquiring of alf_ctb_use_first_aps_flag, the adaptive in-loop filter set applied to the current luma coding tree block may be determined using alf_luma_prev_filter_idx.

alf_use_aps_flag may mean an adaptation parameter set application flag indicating whether the ALF set of the adaptation parameter set is applied to the current coding tree block.

For example, when alf_use_aps_flag has a first value (e.g., 0), at least one of fixed filters may be used in the luma component coding tree block. That is, at least one fixed filter in a fixed ALF set may be used in the current coding tree block. In addition, when alf_use_aps_flag has a second value (e.g., 1), adaptive in-loop filter information in at least one adaptation parameter set may be used in the luma component coding tree block.

When alf_use_aps_flag is not present in the bitstream, alf_use_aps_flag may be inferred as a first value (e.g., 0).

The value of alf_luma_prev_filter_idx_minus1 may mean an index indicating which of adaptive in-loop filter information in the adaptation parameter set used in at least one picture/sub picture/slice/tile group/brick of previous pictures is used.

alf_luma_prev_filter_idx_minus1 may have a value from 0 to slice_num_alf_aps_ids_luma-N. Here, N may be a positive integer and may be, for example, 1. According to FIG. 21, since alf_ctb_use_first_aps_flag indicates whether the index value of the adaptive in-loop filter applied to the current coding tree block is 1, alf_luma_prev_filter_idx_minus1 indicates one of at least two adaptive in-loop filters having index values of 2 or more. Accordingly, N may be determined to 2. Therefore, when slice_num_alf_aps_ids_luma is 2, the number of adaptive in-loop filters having the index value of 2 or more is one, alf_luma_prev_filter_idx_minus1 may not be signaled.

When alf_luma_prev_filter_idx_minus1 is not present in the bitstream, alf_luma_prev_filter_idx_minus1 may be inferred as a value of 0.

According to an embodiment, unlike the example of FIG. 21, when alf_ctb_use_first_aps_flag is not included in the syntax structure of the coding tree block, instead of alf_luma_prev_filter_idx_minus1, alf_luma_prev_filter_idx may be included in the syntax structure of the coding tree block. That is, alf_luma_prev_filter_idx may be encoded/decoded in the syntax structure of the coding tree block. alf_luma_prev_filter_idx may mean an index indicating which of the adaptive in-loop filter information in the adaptation parameter set used in at least one picture/sub picture/slice/tile group/brick of previous picture/sub pictures/slices/tile groups/bricks is used.

alf_luma_prev_filter_idx may have a value from 0 to slice_num_alf_aps_ids_luma-N. Here, N may be a positive integer and may be, for example, 1. When alf_ctb_use_first_aps_flag is not included in the syntax structure of the coding tree block, alf_luma_prev_filter_idx indicates one of at least two adaptive in-loop filters regardless of the index value. Accordingly, N may be determined as 1. Therefore, when slice_num_alf_aps_ids_luma is 1, since the total number of adaptive in-loop filters is 1, alf_luma_prev_filter_idx_minus1 may not be signaled.

When at least one of the case where alf_use_aps_flag has a second value (e.g., 1) or the case where slice_num_alf_aps_ids_luma is 2 or more is satisfied, the alf_luma_prev_filter_idx may be encoded/decoded.

When alf_luma_prev_filter_idx is not present in the bitstream, alf_luma_prev_filter_idx may be inferred as a value of 0.

The adaptive in-loop filter index AlfCtbFiltSetIdxY[xCtb>>Log2CtbSize][yCtb>>Log2CtbSize] used in the luma component coding tree block at the luma component location (xCtb, yCtb) may be derived as follows.

When alf_ctb_use_first_aps_flag has a second value (e.g., 1), AlfCtbFiltSetIdxY[xCtb>>Log2CtbSize][yCtb>>Log2CtbSize] may be determined as a value of F. Here, F may be a positive integer, and may be 16. In addition, F may mean a maximum number of fixed filters used in the encoder/decoder. That is, F may be a value of maximum value of the alf_luma_fixed_filter_idx+1.

When alf_ctb_use_first_aps_flag has a first value (e.g., 0) and alf_use_aps_flag has a first value (e.g., 0), AlfCtbFiltSetIdxY[xCtb>>Log2CtbSize][yCtb>>Log2*CtbSize*] may be determined as alf_luma_fixed_filter_idx.

In the other case, when (alf_ctb_use_first_aps_flag has a first value (e.g., 0) and alf_use_aps_flag has a second value (e.g., 1)), AlfCtbFiltSetIdxY[xCtb>>Log2CtbSize][yCtb>>Log2CtbSize] may be determined as 17+alf_luma_prev_filter_idx_minus1.

Alternatively, the adaptive in-loop filter index AlfCtbFiltSetIdxY[xCtb>>Log2CtbSize][yCtb>>Log2CtbSize] used in the luma component coding tree block at the luma component location (xCtb, yCtb) may be derived as follows.

When alf_use_aps_flag has a first value (e.g., 0), AlfCtbFiltSetIdxY[xCtb>>Log2CtbSize][yCtb>>Log2CtbSize] may be determined as alf_luma_fixed_filter_idx.

If not (when alf_use_aps_flag has a second value (e.g., 1)), AlfCtbFiltSetIdxY[xCtb>>Log2CtbSize][yCtb>>Log2CtbSize] may be determined as F+alf_luma_prev_filter_idx. Here, F may be a positive integer and may be 16. In addition, F may mean a maximum number of fixed filters used in the encoder/decoder. That is, F may be a value of the maximum value of alf_luma_fixed_filter_idx+1.

alf_luma_fixed_filter_idx may mean a fixed filter index used in the luma component coding tree block. That is, when at least one fixed filter in the fixed ALF set is used in the current coding tree block, the fixed filter may be selected from the fixed ALF set using alf_luma_fixed_filter_idx.

alf_luma_fixed_filter_idx may have a value from 0 to N. Here, N may be a positive integer and may be, for example, 15.

When alf_luma_fixed_filter_idx is not present in the bitstream, alf_luma_fixed_filter_idx may be inferred as a value of 0.

The syntax structure of the coding tree block of FIG. 21 may further include chroma adaptive in-loop filter index information alf_ctb_filter_alt_idx indicating one of a plurality of adaptive in-loop filters included in the adaptation parameter set. The chroma adaptive in-loop filter index information may be signaled when chroma ALF number information is a positive integer greater than 1.

For example, when alf_ctb_flag[1][xCtb>>Log2CtbSize][yCtb>>Log2CtbSize] indicates that the Cb adaptive in-loop filter is used in the current coding tree block and two or more Cb adaptive in-loop filters are included in the adaptation parameter set, the Cb adaptive in-loop filter index information alf_ctb_filter_alt_idx indicating the Cb adaptive in-loop filter used in the current coding tree block may be included in the syntax structure of the coding tree block. That is, the Cb adaptive in-loop filter index information alf_ctb_filter_alt_idx indicating the Cb adaptive in-loop filter used in the current coding tree block may be encoded/decoded in the syntax structure of the coding tree block.

In addition, when alf_ctb_flag[2][xCtb>>Log2CtbSize][yCtb>>Log2CtbSize] indicates that the Cr adaptive in-loop filter is used in the current coding tree block and two or more Cr adaptive in-loop filters are included in the adaptation parameter set, the Cr adaptive in-loop filter index information alf_ctb_filter_alt_idx indicating the Cr adaptive in-loop filter used in the current coding tree block may be included in the syntax structure of the coding tree block. That is, the Cr adaptive in-loop filter index information alf_ctb_filter_alt_idx indicating the Cr adaptive in-loop filter used in the current coding tree block may be encoded/decoded in the syntax structure of the coding tree block.

The Cb adaptive in-loop filter index information and the Cr adaptive in-loop filter index information may be signaled for each chroma component and may indicate different filter indices or the same filter index.

Hereinafter, one embodiment of the adaptive in-loop filter process will be described. In the following, reconstruction may mean decoding.

A luma component picture sample array recPictureL reconstructed before adaptive in-loop filtering is performed may be input. In addition, when ChromaArrayType does not have a first value (e.g., 0), chroma component picture sample arrays recPictureCb and recPictureCr reconstructed before the adaptive in-loop filter is performed may be input.

In addition, a luma component picture sample array alfPictureL changed and reconstructed after adaptive in-loop filtering is performed may be output according to an adaptive in-loop filter process. In addition, when ChromaArrayType does not have a first value (e.g., 0), chroma component picture sample arrays alfPictureCb and alfPictureCr reconstructed before the adaptive in-loop filter is performed may be output.

A luma component picture sample array alfPictureL changed and reconstructed after adaptive in-loop filtering is performed may be initialized to a luma component picture sample array recPictureL reconstructed before adaptive in-loop filtering is performed.

When ChromaArrayType does not have a first value (e.g., 0), picture sample arrays alfPictureCb and alfPictureCr reconstructed before the adaptive in-loop filter is performed may be initialized to picture sample arrays recPictureCb and recPictureCr reconstructed before the adaptive in-loop filter is performed.

When slice_alf_enabled_flag has a second value (e.g., 1), the following process may be performed with respect to all coding tree units having a luma coding tree block location (rx, ry). Here, rx may have a value from 0 to PicWidthInCtbs−1, and ry may have a value from 0 to PicHeightInCtbs−1.

When alf_ctb_flag[0][rx][ry] has a second value (e.g., 1), a coding tree block filtering process for a luma component may be performed.

Input of the coding tree block filtering process for the luma component: recPictureL, alfPictureL, the luma component coding tree block location (xCtb, yCtb) may be set to (rx<<CtbLog2SizeY, ry<<CtbLog2SizeY).

alfPictureL may be output by the coding tree block filtering process for the luma component.

When ChromaArrayType does not have a first value (e.g., 0) and alf_ctb_flag[1][rx][ry] has a second value (e.g., 1), a coding tree block filtering process for a chroma component Cb may be performed.

Input of the coding tree block filtering process for the chroma component Cb may be set to recPictureCb, alfPictureCb, and the chroma component Cb coding tree block location (xCtbC, yCtbC) may be set to ((rx<<CtbLog2SizeY)/SubWidthC, (ry<<CtbLog2SizeY)/SubHeightC).

alfPictureCb may be output by the coding tree block filtering process for the chroma component Cb.

According to an embodiment, when adaptive in-loop filtering is applied to the Cb sample of the current coding tree block, a second ALF coding tree block identifier indicating the adaptation parameter set including a Cb adaptive in-loop filter set (Cb ALF set) applied to the current coding tree block among one or more adaptation parameter sets including adaptive in-loop filter set applied to the current picture or the current slice. In addition, according to the second ALF coding tree block identifier, the adaptation parameter set including the Cb adaptive in-loop filter set applied to the current coding tree block may be determined.

In addition, the Cb adaptive in-loop filter set may be encoded/decoded/acquired in the adaptation parameter set.

When ChromaArrayType does not have a first value (e.g., 0) and alf_ctb_flag[2][rx][ry] has a second value (e.g., 1), a coding tree block filtering process for a chroma component Cr may be performed.

Input of the coding tree block filtering process for the chroma component Cr: recPictureCr, alfPictureCr, the chroma component Cr coding tree block location (xCtbC, yCtbC) may be set to ((rx<<CtbLog2SizeY)/SubWidthC, (ry<<CtbLog2SizeY)/SubHeightC).

alfPictureCr may be output by the coding tree block filtering process for the chroma component Cr.

According to an embodiment, when adaptive in-loop filtering is applied to the Cr sample of the current coding tree block, a third ALF coding tree block identifier indicating the adaptation parameter set including a Cr adaptive in-loop filter set (Cr ALF set) applied to the current coding tree block among one or more adaptation parameter sets including the adaptive in-loop filter set applied to the current picture or the current slice may be encoded/decoded/acquired. According to the third ALF coding tree block identifier, the adaptation parameter set including the Cr adaptive in-loop filter set applied to the current coding tree block may be determined. In addition, the Cr adaptive in-loop filter set may be encoded/decoded/acquired in the adaptation parameter set.

Hereinafter, an embodiment of the coding tree block filtering process for the luma component will be described.

For coding tree block filtering, the location (xCtb, yCtb) of the top left sample of the current luma component coding tree block based on the luma component picture sample array recPictureL reconstructed before adaptive in-loop filtering is performed, the luma component picture sample array alfPictureL changed after adaptive in-loop filtering is performed and the top left sample of the current picture may be input.

In addition, the changed luma component picture sample array alfPictureL may be output according to coding tree block filtering.

A filter index derivation process for coding tree block filtering may be performed as follows.

For the filter index derivation process, the location (xCtb, yCtb) of the top left sample of the current luma component coding tree block based on the luma component picture sample array recPictureL reconstructed before adaptive in-loop filtering is performed and the top left sample of the current picture may be input.

According to the filter index derivation process, a classification filter index array filtIdx and a transpose index array transposeIdx may be output.

At this time, x and y may have a value from 0 to CtbSizeY−1.

To derive alfPictureL[x][y], each reconstructed luma component sample in the current luma component coding tree block in recPictureL[x][y] may be filtered as follows. At this time, x and y may have from 0 to CtbSizeY−1.

A luma component filter coefficient array f[j] and a luma component clipping value array c[j] for the filter indicated by filtIdx[x][y] may be derived as follows. Here, j may have a value from 0 to N, and, for example, N may be a positive integer and may be, for example, 11.

When AlfCtbFiltSetIdxY[xCtb>>Log2CtbSize][yCtb>>Log2CtbSize] has a value less than F, the following may be performed. Here, F may be a positive integer, and may be 16. In addition, F may mean the maximum number of fixed filters used in the encoder/decoder. That is, F may be a value of the maximum value of alf_luma_fixed_filter_idx+1.

$i$=AlfCtbFiltSetIdxY[xCtb>>Log2CtbSize][yCtb>>Log2CtbSize]

$f[j]$=AlfFixFiltCoeff[AlfClassToFiltMap[$i$][filtIdx[$x$][$y$]]][$j$]

$c[j]$=2BitdepthY or $c[j]$=AlfClipL[$i$][filtIdx[$x$][$y$]][$j$]

Here, assigning AlfClipL[i][filtIdx [x][y]][j] to c[j] may mean that a clipping method which is a non-linear adaptive in-loop filtering method is used in the fixed filter.

When AlfCtbFiltSetIdxY[xCtb>>Log2CtbSize][yCtb>>Log2CtbSize] is greater than or equal to F, the following may be performed.

$i$=slice_alf_aps_id_luma[AlfCtbFiltSetIdxY[xCtb>>Log2CtbSize][yCtb>>Log2CtbSize]−F]

$f[j]$=AlfCoeffL[$i$][filtIdx[$x$][$y$]][$j$]

$c[j]$=AlfClipL[$i$][filtIdx[$x$][$y$]][$j$]

Here, f[j] may mean a luma ALF and c[j] may mean a luma clipping value.

An index idx for a luma component filter coefficient and a clipping value may be derived according to transposeIdx [x][y] as follows.

When transposeIndex[x][y] has a second value (e.g., 1), the following may be performed.

idx[ ]={9, 4, 10, 8, 1, 5, 11, 7, 3, 0, 2, 6}

When transposeIndex[x][y] has a third value (e.g., 2), the following may be performed.

idx[ ]={0, 3, 2, 1, 8, 7, 6, 5, 4, 9, 10, 11}

When transposeIndex[x][y] has a fourth value (e.g., 3), the following may be performed.

idx[ ]={9, 8, 10, 4, 3, 7, 11, 5, 1, 0, 2, 6}

If not (when transposeIndex[x][y] has a first value (e.g., 0)), the following may be performed.

idx[ ]={0, 1, 2, 3, 4, 5, 6, 7, 8, 9, 10, 11}

A location (hx+i, vy+j) in recPicture for each corresponding luma component sample (x, y) may be derived as follows. At this time, i and j may have a value from −N to N. Here, N may be a positive integer and may be, for example, 3. In addition, (N*2)+1 may mean the width or height of a luma component filter.

$hx+i$=Clip3(0,pic_width_in_luma_samples−1,xCtb+$x+i$)

$vy+j$=Clip3(0,pic_height_in_luma_samples−1,yCtb+$y+j$)

A variable applyVirtualBoundary indicating whether a virtual boundary is applied may be derived as follows.

When at least one of the following condition is true, applyVirtualBoundary may be set to 0.

When the lower boundary of the current coding tree block is a lower boundary of a picture, applyVirtualBoundary may be set to 0.

When the lower boundary of the current coding tree block is a lower boundary of a brick and loop_filter_across_bricks_enabled_flag has a first value (e.g., 0), applyVirtualBoundary may be set to 0.

Here, loop_filter_across_bricks_enabled_flag may mean whether filtering may be performed across a brick boundary using at least one of a loop filtering methods. That is, this may mean whether filtering may be performed at a brick boundary using at least one of the loop filtering methods.

When the lower boundary of the current coding tree block is a lower boundary of a slice and loop_filter_across_slices_enabled_flag has a first value (e.g., 0), applyVirtualBoundary may be set to 0.

Here, loop_filter_across_slices_enabled_flag may mean whether filtering may be performed across a slice boundary using at least one of the loop filtering methods. That is, this may mean whether filtering may be performed at a slice boundary using at least one of the loop filtering methods.

When the lower boundary of the current coding tree block is a lower boundary of a tile and loop_filter_across_tiles_enabled_flag has a first value (e.g., 0), applyVirtualBoundary may be set to 0.

Alternatively, when the lower boundary of the current coding tree block a boundary is lower of a tile and loop_filter_across_tiles_enabled_flag has a first value (e.g., 0), the location of the y coordinate of the lower boundary of a region (tile) to which the adaptive in-loop filter is applied may be determined according to the location of the y coordinate of the lower boundary of the current coding tree block.

Here, loop_filter_across_tiles_enabled_flag may mean whether filtering may be performed across a tile boundary using at least one of the loop filtering methods. That is, this may mean whether filtering may be performed at a tile boundary using at least one of the loop filtering methods.

According to an embodiment, even if the lower boundary of the current coding tree block is a lower boundary of a slice, applyVirtualBoundary may be set to 1.

In addition, even if the lower boundary of the current coding tree block is a lower boundary of a tile, applyVirtualBoundary may be set to 1. In addition, even if the lower boundary of the current coding tree block is a lower boundary of a sub picture, applyVirtualBoundary may be set to 1.

When the lower boundary of the current coding tree block is a lower boundary of a sub picture and loop_filter_across_subpictures_enabled_flag has a first value (e.g., 0), applyVirtualBoundary may be set to 0.

Alternatively, when the lower boundary of the current coding tree block is a lower boundary of a sub picture and loop_filter_across_subpictures_enabled_flag has a first value (e.g., 0), the location of the y coordinate of the lower boundary of a region (sub picture) to which the adaptive in-loop filter is applied may be determined according to the location of the y coordinate of the lower boundary of the current coding tree block.

Here, loop_filter_across_subpictures_enabled_flag may mean whether filtering may be performed across a sub picture boundary using at least one of the loop filtering methods. That is, this may mean whether filtering may be performed at a sub picture boundary using at least one of the loop filtering methods.

When the lower boundary of the current coding tree block is a lower virtual boundary of a picture and pps_loop_filter_across_virtual_boundaries_disabled_flag has a second value (e.g., 1), applyVirtualBoundary may be set to 0.

If not (if the above condition is not true), applyVirtualBoundary may be set to 1.

Reconstructed sample offsets r1, r2 and r3 may be determined according to a vertical luma component sample location and applyVirtualBoundary as shown in Table 1.

TABLE 1

| Condition | r1 | r2 | r3 |
| --- | --- | --- | --- |
| (y == CtbSizeY-5 ‖ y == CtbSizeY-4) && (applyVirtualBoundary == 1) | 0 | 0 | 0 |
| (y == CtbSizeY-6 ‖ y == CtbSizeY-3) && (applyVirtualBoundary == 1) | 1 | 1 | 1 |
| (y == CtbSizeY-7 ‖ y == CtbSizeY-2) && (applyVirtualBoundary == 1) | 1 | 2 | 2 |
| If not (if the above conditions are not applied) | 1 | 2 | 3 |

A sample value curr for a current sample location may be derived as follows.

curr=recPictureL[$h_x, v_y$]

A value sum obtained by performing filtering with respect to a current sample may be derived as follows.

sum=$f[idx[0]]$*(Clip3(−$c[idx[0]], c[idx[0]]$,recPicture$_L$[$h_x, V_{y+3}$]−curr)+Clip3(−$c[idx[0]], c[idx[0]]$, recPicture$_L$[$h_x, V_{y−3}$]−curr))+$f[idx[1]]$*(Clip3(−$c[idx[1]], c[idx[1]]$,recPicture$_L$[$h_{x+1}, V_{y+2}$]−curr)+Clip3(−$c[idx[1]], c[idx[1]]$,recPicture$_L$[$h_{x−1}, V_{y−2}$]−curr)+$f[idx[2]]$*(Clip3(−$c[idx[2]], c[idx[2]]$,recPicture$_L$[$h_x, V_{y+2}$]−curr)+Clip3(−$c[idx[2]], c[idx[2]]$,recPicture$_L$[$h_x, V_{y−2}$]−curr))+$f[idx[3]]$*(Clip3(−$c[idx[3]], c[idx[3]]$,recPicture$_L$[$h_{x−1}, V_{y+2}$]−curr)+Clip3(−$c[idx[3]], c[idx[3]]$,recPicture$_L$[$h_{x+1}, V_{y−2}$]−curr)+$f[idx[4]]$*(Clip3(−$c[idx[4]], c[idx[4]]$,recPicture$_L$[$h_{x+2}, V_{y+1}$]−curr)+Clip3(−$c[idx[4]], c[idx[4]]$,recPicture$_L$[$h_{x−2}, V_{y−1}$]−curr))+$f[idx[5]]$*(Clip3(−$c[idx[5]], c[idx[5]]$,recPicture$_L$[$h_{x+1}, V_{y+1}$]−curr)+Clip3(−$c[idx[5]], c[idx[5]]$,recPicture$_L$[$h_{x−1}, V_{y−1}$]−curr))+$f[idx[6]]$*(Clip3(−$c[idx[6]], c[idx[6]]$,recPicture$_L$[$h_x, V_{y+1}$]−curr)+Clip3(−$c[idx[6]], c[idx[6]]$,recPicture$_L$[$h_x, V_{y−1}$]−curr)+$f[idx[7]]$*(Clip3(−$c[idx[7]], c[idx[7]]$,recPicture$_L$[$h_{x−1}, V_{y+1}$]−curr)+Clip3(−$c[idx[7]], c[idx[7]]$,recPicture$_L$[$h_{x+1}, V_{y−1}$]−curr)+$f[idx[8]]$*(Clip3(−$c[idx[8]], c[idx[8]]$,recPicture$_L$[$h_{x−2}, V_{y+1}$]−curr)+Clip3(−$c[idx[8]], c[idx[8]]$,recPicture$_L$[$h_{x+2}, V_{y−1}$]−curr))+$f[idx[9]]$*(Clip3(−$c[idx[9]], c[idx[9]]$,recPicture$_L$[$h_{x+3}, V_y$]−curr)+Clip3(−$c[idx[9]], c[idx[9]]$,recPicture$_L$[$h_{x−3}, V_y$]−curr))+$f[idx[10]]$*(Clip3(−$c[idx[10]], c[idx[10]]$,recPicture$_L$[$h_{x+2}, V_y$]−curr)+Clip3(−$c[idx[10]], c[idx[10]]$,recPicture$_L$[$h_{x−2}, V_y$]−curr))+$f[idx[11]]$*(Clip3(−$c[idx[11]], c[idx[11]]$, recPicture$_L$[$h_{x+1}, V_y$]−curr)+Clip3(−$c[idx[11]], c[idx[11]]$,recPicture$_L$[$h_{x−1}, V_y$]−curr))       Equation 22 alfPictureL[xCtb+x][yCtb+y] may be derived as follows.

When pcm_loop_filter_disabled_flag has a second value (e.g., 1) and pcm_flag[xCtb+x][yCtb+y] has a second value (e.g., 1), the following may be performed.

alfPictureL [xCtb+x][yCtb+y]=recPictureL [hx, vy]

If not (when pcm_loop_filter_disabled_flag has a first value (e.g., 0) and pcm_flag[xCtb+x][yCtb+y] has a first value (e.g., 0)), the following may be performed.

alfPictureL[xCtb+$x$][yCtb+$y$]=Clip3(0,(1<<BitDepthY)−1,sum)

Hereinafter, an embodiment of a coding tree block filtering process for a chroma component will be described.

recPicture which is a reconstructed picture and alfPicture which is subjected to adaptive in-loop filtering may be input. In addition, the location (xCtbC, yCtbC) of the top left sample of the current chroma component coding tree block based on the top left sample of the current picture may be input. In addition, alfPicture which is a picture subjected to adaptive in-loop filtering may be output.

The width ctbWidthC and height ctbHeightC of the current chroma component coding tree block may be derived as follows.

ctbWidthC=CtbSizeY/SubWidthC ctbHeightC=CtbSizeY/SubHeightC

To derive alfPicture[x][y], each reconstructed chroma component sample in the current chroma component coding tree block in recPicture[x][y] may be filtered as follows. At this time, x may have a value from 0 to ctbWidthC−. 1. In addition, y may have a value from 0 to ctbHeightC−1.

A location (hx+i, vy+j) in recPicture for each corresponding chroma component sample (x, y) may be derived as follows. At this time, i and j may have a value from −N to N. Here, N may be a positive integer and may be, for example, 2. In addition, (N*2)+1 may mean the width or height of the chroma component filter.

hx+$i$=Clip3(0,pic_width_in_luma_samples/SubWidthC−1,xCtbC+x+$i$)

vy+$j$=Clip3(0,pic_height_in_luma_samples/SubHeightC−1,yCtbC+y+$j$)

A variable applyVirtualBoundary indicating whether a virtual boundary is applied may be derived as follows.

When at least one of the following conditions is true, applyVirtualBoundary may be set to 0.

When the lower boundary of the current coding tree block is a lower boundary of a picture, applyVirtualBoundary may be set to 0.

When the lower boundary of the current coding tree block is a lower boundary of a brick and loop_filter_across_bricks_enabled_flag has a first value (e.g., 0), applyVirtualBoundary may be set to 0.

Here, loop_filter_across_bricks_enabled_flag may mean whether filtering may be performed across a brick boundary using at least one of a loop filtering methods. That is, this may mean whether filtering may be performed at a brick boundary using at least one of the loop filtering methods.

When the lower boundary of the current coding tree block is a lower boundary of a slice and loop_filter_across_slices_enabled_flag has a first value (e.g., 0), applyVirtualBoundary may be set to 0.

Here, loop_filter_across_slices_enabled_flag may mean whether filtering may be performed across a slice boundary using at least one of the loop filtering methods. That is, this may mean whether filtering may be performed at a slice boundary using at least one of the loop filtering methods.

When the lower boundary of the current coding tree block is a lower boundary of a tile and loop_filter_across_tiles_enabled_flag has a first value (e.g., 0), applyVirtualBoundary may be set to 0.

Alternatively, when the lower boundary of the current coding tree block is a lower of boundary a tile and loop_filter_across_tiles_enabled_flag has a first value (e.g., 0), the location of the y coordinate of the lower boundary of a region (tile) to which the adaptive in-loop filter is applied may be determined according to the location of the y coordinate of the lower boundary of the current coding tree block.

Here, loop_filter_across_tiles_enabled_flag may mean whether filtering may be performed across a tile boundary using at least one of the loop filtering methods. That is, this may mean whether filtering may be performed at a tile boundary using at least one of the loop filtering methods.

According to an embodiment, even if the lower boundary of the current coding tree block is a lower boundary of a slice, applyVirtualBoundary may be set to 1.

In addition, even if the lower boundary of the current coding tree block is a lower boundary of a tile, applyVirtualBoundary may be set to 1. In addition, even if the lower boundary of the current coding tree block is a lower boundary of a sub picture, applyVirtualBoundary may be set to 1.

When the lower boundary of the current coding tree block is a lower boundary of a sub picture and loop_filter_across_subpictures_enabled_flag has a first value (e.g., 0), applyVirtualBoundary may be set to 0.

Alternatively, when the lower boundary of the current coding tree block is a lower boundary of a sub picture and loop_filter_across_subpictures_enabled_flag has a first value (e.g., 0), the location of the y coordinate of the lower boundary of a region (sub picture) to which the adaptive in-loop filter is applied may be determined according to the location of the y coordinate of the lower boundary of the current coding tree block.

Here, loop_filter_across_subpictures_enabled_flag may mean whether filtering may be performed across a sub picture boundary using at least one of the loop filtering methods. That is, this may mean whether filtering may be performed at a sub picture boundary using at least one of the loop filtering methods.

When the lower boundary of the current coding tree block is a lower virtual boundary of a picture and pps_loop_filter_across_virtual_boundaries_disabled_flag has a second value (e.g., 1), applyVirtualBoundary may be set to 0.

If not (if the above condition is not true), applyVirtualBoundary may be set to 1.

Reconstructed sample offsets r1 and r2 may be determined according to the vertical chroma component sample location y and applyVirtualBoundary as shown in Table 2.

TABLE 2

|  | r1 | r2 |
|---|---|---|
| (y == ctbHeightC-2 \|\| y == cbHeightC-3) && (applyVirtualBoundary == 1) | 0 | 0 |
| (y == ctbHeightC-1 \|\| y == cbHeightC-4) && (applyVirtualBoundary == 1) | 1 | 1 |
| If not (if the above conditions are not applied) | 1 | 2 |

A sample value curr for a current sample location may be derived as follows.

$$curr = recPicture[hx, vy]$$

A chroma component filter coefficient array f[j] and a chroma component clipping value array c[j] may be derived as follows. Here, j may have a value from 0 to N, and, for example, N may be a positive integer and may be, for example, 5.

$$f[j] = AlfCoeffC[slice\_alf\_aps\_id\_chroma][j]$$

$$c[j] = AlfClipC[slice\_alf\_aps\_id\_chroma][j]$$

Here, f[j] may mean a chroma ALF, and c[j] may mean a chroma clipping value.

A value sum obtained by performing filtering with respect to a current sample may be derived as shown in Equation 23.

$$\begin{aligned}sum = &f[0]*(Clip3(-c[0], c[0], recPicture_L[h_x, V_{y+r2}]-curr) + Clip3(-c[0], c[0], recPicture_L[h_x, V_{y-r2}]-curr)) \\&+ f[1]*(Clip3(-c[1], c[1], recPicture_L[h_{x+1}, V_{y+r1}]-curr) + Clip3(-c[1],c[1],recPicture_L[h_{x-1}, V_{y-r1}]-curr)) \\&+ f[2]*(Clip3(-c[2],c[2],recPicture_L[h_x,V_{y+r1}]-curr) + Clip3(-c[2],c[2],recPicture_L[h_x, V_{y-r1}]-curr)) \\&+ f[3]*(Clip3(-c[3],c[3],recPicture_L[h_{x-1}, V_{y+r1}]-curr) + Clip3(-c[3],c[3],recPicture_L[h_{x+1}, V_{y-r1}]-curr)) \\&+ f[4]*(Clip3(-c[4],c[4], recPicture_L[h_{x+2},V_y]-curr) + Clip3(-c[4],c[4], recPicture_L[h_{x-2},V_y]-curr)) \\&+ f[5]*(Clip3(-c[5],c[5],recPicture_L[h_{x+1},V_y]-curr) + Clip3(-c[5],c[5], recPicture_L[h_{x-1},V_y]-curr)) \\sum = &curr + (sum + 64) \gg 7)\end{aligned}$$
[Equation 23]

alfPicture [xCtbC+x][yCtbC+y] may be derived as follows.

When pcm_loop_filter_disabled_flag has a second value (e.g., 1) and pcm_flag[(xCtbC+x)*SubWidthC][(yCtbC+y)*SubHeightC] has a second value (e.g., 1), the following may be performed.

$$alfPicture[xCtbC+x][yCtbC+y] = recPictureL[hx, vy]$$

If not (when pcm_loop_filter_disabled_flag has a first value (e.g., 0) and pcm_flag[(xCtbC+x)*SubWidthC][(yCtbC+y)*SubHeightC] has a first value (e.g., 0)), the following may be performed.

$$alfPicture[xCtbC+x][yCtbC+y] = Clip3(0,(1 \ll BitDepthC)-1, sum)$$

As in the examples of FIGS. 24 and 25, u(2) entropy encoding/decoding method may be used to entropy-encode/decode alf_luma_clip_idx[sfIdx][j] and alf_chroma_clip_idx[j]. At this time, the maximum value of u(2) may be N. Here, N may be a positive integer and may be, for example, 3. In addition, u(2) may have the same meaning as f(2). At least one of u(n) or f(n) may mean that a syntax element is encoded/decoded into n-bit fixed-length code. Here, n may be a positive integer.

As in the examples of FIGS. 26 and 27, tu(v) entropy encoding/decoding method may be used to entropy-encode/ decode alf_luma_clip_idx[sfIdx][j] and alf_chroma_clip_idx[j]. At this time, the maximum value maxVal of tu(v) may be N. Here, N may be a positive integer and may be, for example, 3. In addition, when the maximum value of tu(v) is 3, this may have the same meaning as tu(3).

When the methods of the examples of FIGS. 24 to 27 are used, without using the syntax element semantics of syntax element alf_luma_clip_min_eg_order_minus1, alf_luma_clip_eg_order_increase_flag[i], alf_chroma_clip_min_eg_order_minus1, and alf_chroma_clip_eg_order_increase_flag[i] and syntax elements alf_luma_clip_min_eg_order_minus1, alf_luma_clip_eg_order_increase_flag[i], alf_chroma_clip_min_eg_order_minus1, alf_chroma_clip_eg_order_increase_flag[i], since alf_luma_clip_idx[sfIdx][j] and alf_chroma_clip_idx[j] may be entropy-encoded/decoded, it is possible to reduce implementation complexity necessary to entropy-encode/decode alf_luma_clip_idx[sfIdx][j] and alf_chroma_clip_idx[j].

In addition, since the encoding/decoding process necessary to derive the order kClipY[i] of the exponential Golomb code, the order kClipC[i] of the exponential Golomb code, the order k of the exponential Golomb code (binarization) uek (v) may not be performed, it is possible to reduce implementation complexity necessary to entropy-encode/decode alf_luma_clip_idx[sfIdx][j] and alf_chroma_clip_idx[j].

In addition, when the methods of the examples of FIGS. 24 to 27 are used, since alf_luma_clip_idx[sfIdx][j] and alf_chroma_clip_idx[j] may be entropy-encoded/decoded with fewer bits than the case where alf_luma_clip_idx[sfIdx][j] and alf_chroma_clip_idx[j] are entropy-encoded/decoded using the exponential Golomb code, it is possible to improve the coding efficiency of the image encoder/decoder.

Entropy encoding of tu(v) may be performed as follows, such that codeNum meaning the value of the syntax element may be calculated as follows. Here, entropy decoding may mean parsing. The range of the value of tu(v) may be determined as 0 to a maximum value maxVal. At this time, the maximum value may be a positive integer, and may be greater than or equal to 1, for example.

codeNum=0
keepGoing=1
for (i=0; i<maxVal && keepGoing; i++){
keepGoing=read_bits (1)
if (keepGoing)
codeNum++}

FIGS. 28 to 37 show examples of syntax element information necessary to implement an adaptive in-loop filtering method and apparatus and a recording medium for storing a bitstream according to an embodiment of the present invention, the semantics of syntax element information, and an encoding/decoding process.

Figure 38:
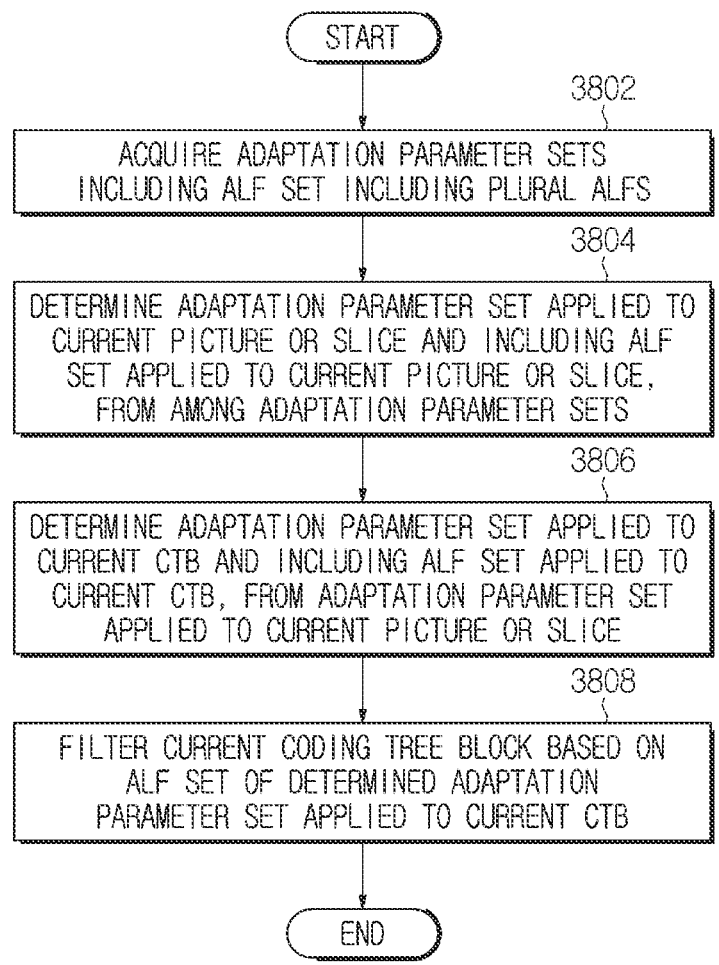
FIG. 38 is a view illustrating a video decoding method using an adaptive in-loop filter according to an embodiment.

FIG. 38 is a flowchart illustrating a video decoding method using an adaptive in-loop filter according to an embodiment.

In step 3802, at least one of adaptation parameter sets including an ALF set including a plurality of adaptive in-loop filters (ALFs) may be encoded/decoded/acquired.

According to an embodiment, the adaptation parameter set includes chroma ALF number information, and the ALF set includes chroma ALFs, the number of which is indicated by the chroma ALF number information.

According to an embodiment, the adaptation parameter set may include a luma clipping flag indicating whether non-linear adaptive in-loop filtering is performed with respect to a luma component, and a chroma clipping flag indicating whether non-linear adaptive in-loop filtering is performed with respect to a chroma component.

According to an embodiment, the adaptation parameter set may include a luma clipping index indicating a clipping value for non-linear adaptive in-loop filtering, when the luma clipping flag indicates that non-linear adaptive in-loop filtering is performed with respect to the luma component, and may include a chroma clipping index indicating a clipping value for non-linear adaptive in-loop filtering, when the chroma clipping flag indicates that non-linear adaptive in-loop filtering is performed with respect to the chroma component.

According to an embodiment, the luma clipping index and the chroma clipping index may be encoded with a 2-bit fixed length. According to an embodiment, a luma clipping value for non-linear adaptive in-loop filtering for the luma component may be determined according to a value indicated by the luma clipping index and the bit depth of a current sequence, and a chroma clipping value for non-linear adaptive in-loop filtering for the chroma component may be determined according to a value indicated by the chroma clipping index and the bit depth of the current sequence. When the value indicated by the luma clipping index and the value indicated by the chroma clipping index are the same, the luma clipping value and the chroma clipping value may be the same.

According to an embodiment, the adaptation parameter set may include an adaptation parameter set identifier indicating an identification number assigned to the adaptation parameter set and adaptation parameter set type information indicating a type of coding information included in the adaptation parameter set.

According to an embodiment, when the adaptation parameter set type information indicates an ALF type, an adaptation parameter set including an ALF set may be determined.

According to an embodiment, the adaptation parameter set may include a luma ALF signaling flag indicating whether the adaptation parameter set includes an ALF for the luma component and a chroma ALF signaling flag indicating whether the adaptation parameter set includes an ALF for the chroma component.

According to an embodiment, the adaptation parameter set includes luma signaling ALF number information indicating the number of luma signaling ALFs, and may include a luma ALF delta index indicating the index of a luma signaling ALF referred to by a predetermined number of luma ALFs of a luma ALF set when the luma signaling ALF number information indicates that the number of luma signaling ALFs is greater than 1.

According to an embodiment, the adaptation parameter set includes one or more luma signaling ALFs, and the predetermined number of luma ALFs may be determined from the one or more luma signaling ALFs according to the luma ALF delta index.

According to an embodiment, the adaptation parameter set may include chroma ALF number information indicating the number of chroma ALFs, and may include chroma ALFs, the number of which is indicated by the chroma ALF number information.

In step 3804, at least one of adaptation parameter sets applied to the current picture or slice and including an ALF set applied to the current picture or slice may be determined from among the adaptation parameter sets.

According to an embodiment, the luma ALF set number information of the current picture or slice may be encoded/decoded/acquired. In addition, the luma ALF set identifiers, the number of which is indicated by the luma ALF set number information, may be encoded/decoded/acquired.

In step 3806, the adaptation parameter set applied to a current coding tree block (CTB) and including an ALF set applied to the current CTB included in the current picture or slice may be determined from the adaptation parameter set applied to the current picture or slice.

According to an embodiment, chroma ALF application information of the current picture or slice may be encoded/decoded/acquired. In addition, when the chroma AF application information indicates that the ALF is applied to at least one of the Cb component or the Cr component, the chroma ALF set identifier may be encoded/decoded/acquired.

According to an embodiment, a first ALF coding tree block flag indicating whether adaptive in-loop filtering is applied to the luma sample of the current coding tree block may be encoded/decoded acquired, and adaptive in-loop filtering is applied to the luma sample of the current coding tree block may be determined according to the first ALF coding tree block flag. In addition, a second ALF coding tree block flag indicating whether adaptive in-loop filtering is applied to the Cb sample of the current coding tree block may be encoded/decoded/acquired, and whether adaptive in-loop filtering is applied to the Cb sample of the current coding tree block may be determined according to the second ALF coding tree block flag. In addition, a third ALF coding tree block flag indicating whether adaptive in-loop filtering is applied to the Cr sample of the current coding tree block may be encoded/decoded/acquired, and whether adaptive in-loop filtering is applied to the Cr sample of the current coding tree block may be determined according to the third ALF coding tree block flag.

According to an embodiment, when adaptive in-loop filtering is applied to the luma sample of the current coding tree block, an adaptation parameter set application flag indicating whether the ALF set of the adaptation parameter set is applied to the current coding tree block may be encoded/decoded/acquired. In addition, when the adaptation parameter set application flag indicates that the ALF set of the adaptation parameter set is applied to the current coding tree block, the luma ALF set applied to the current coding tree block may be determined from one or more adaptation parameter sets including the ALF set applied to the current picture or slice. Conversely, when the adaptation parameter set application flag indicates that the ALF set of the adaptation parameter set is not applied to the current coding tree block, a fixed filter applied to the current coding tree block may be determined from among fixed ALF sets for the luma sample.

According to an embodiment, when adaptive in-loop filtering is applied to the Cb sample of the current coding tree block, the second ALF coding tree block identifier indicating the adaptation parameter set including the Cb ALF set applied to the current coding tree block may be encoded/decoded/acquired from among one or more adaptation parameter sets including the ALF set applied to the current picture or slice. In addition, according to the second ALF coding tree block identifier, the adaptation parameter set including the Cb ALF set applied to the current coding tree block may be determined.

In addition, when adaptive in-loop filtering is applied to the Cr sample of the current coding tree block, the third ALF coding tree block identifier indicating the adaptation parameter set including the Cr ALF set applied to the current coding tree block may be encoded/decoded/acquired from among one or more adaptation parameter sets including the ALF set applied to the current picture or slice. In addition, according to the third ALF coding tree block identifier, the adaptation parameter set including the Cr ALF set applied to the current coding tree block may be determined.

In step 3808, based on the ALF set of the determined adaptation parameter set applied to the current CTB, the current coding tree block may be filtered.

According to an embodiment, a block classification index may be allocated to a basic filtering unit block of the current coding tree block. The block classification index may be determined using directional information and activity information.

According to an embodiment, at least one of the directional information or activity information may be determined based on the gradient value of at least one of a vertical, horizontal, first diagonal or second diagonal direction.

Figure 39:
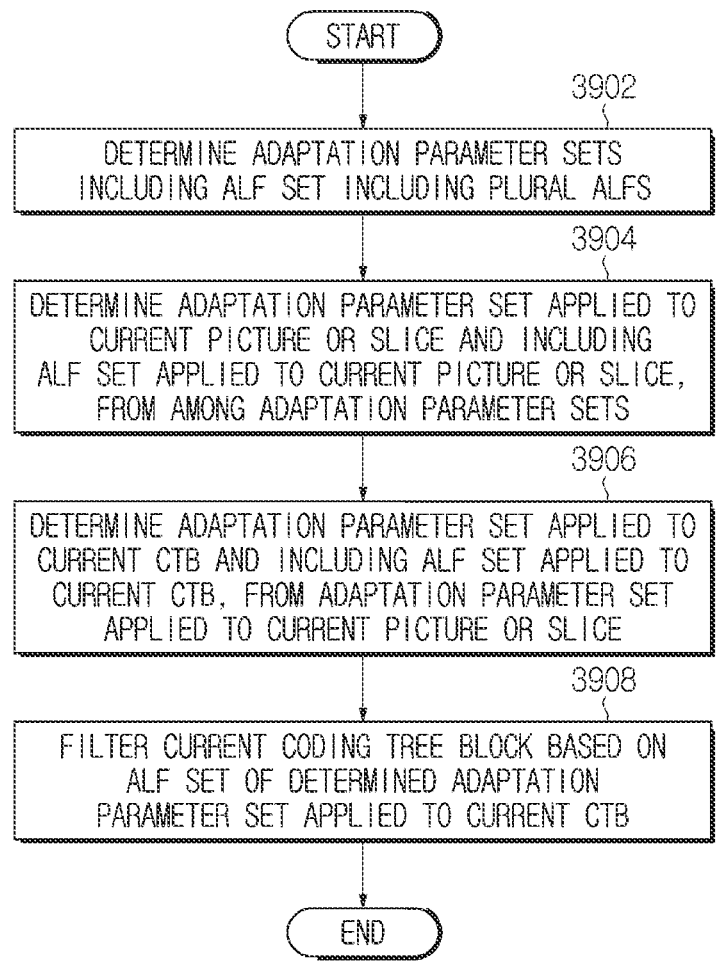
FIG. 39 is a view illustrating a video encoding method using an adaptive in-loop filter according to an embodiment.

FIG. 39 is a flowchart illustrating a video encoding method using an adaptive in-loop filter according to an embodiment.

In step 3902, at least one of adaptation parameter sets including an ALF set including a plurality of ALFs may be determined.

According to an embodiment, the adaptation parameter set may include chroma ALF number information, and the ALF set may include chroma ALFs, the number of which is indicated by the chroma ALF number information.

According to an embodiment, the adaptation parameter set may include a luma clipping flag indicating whether non-linear adaptive in-loop filtering is performed with respect to a luma component, and a chroma clipping flag indicating whether non-linear adaptive in-loop filtering is performed with respect to a chroma component.

According to an embodiment, the adaptation parameter set may include a luma clipping index indicating a clipping value for non-linear adaptive in-loop filtering when the luma clipping flag indicates that non-linear adaptive in-loop filtering is performed with respect to the luma component, and may include a chroma clipping index indicating a clipping value for non-linear adaptive in-loop filtering when the chroma clipping flag indicates that non-linear adaptive in-loop filtering is performed with respect to the chroma component.

According to an embodiment, the luma clipping index and the chroma clipping index may be encoded with a 2-bit fixed length.

According to an embodiment, a luma clipping value for non-linear adaptive in-loop filtering for the luma component is determined according to a value indicated by the luma clipping index and the bit depth of a current sequence, and a chroma clipping value for non-linear adaptive in-loop filtering for the chroma component may be determined according to a value indicated by the chroma clipping index and the bit depth of the current sequence. When the value indicated by the luma clipping index and the value indicated by the chroma clipping index are the same, the luma clipping value and the chroma clipping value may be the same.

According to an embodiment, the adaptation parameter set may include an adaptation parameter set identifier indicating an identification number assigned to the adaptation parameter set and adaptation parameter set type information indicating a type of coding information included in the adaptation parameter set.

According to an embodiment, when the adaptation parameter set type information indicates an ALF type, an adaptation parameter set including an ALF set may be determined.

According to an embodiment, the adaptation parameter set may include a luma ALF signaling flag indicating whether the adaptation parameter set includes an ALF for the luma component and a chroma ALF signaling flag indicating whether the adaptation parameter set includes an ALF for the chroma component.

According to an embodiment, the adaptation parameter set includes luma signaling ALF number information indicating the number of luma signaling ALFs, and may include a luma ALF delta index indicating the index of a luma signaling ALF referred to by a predetermined number of luma ALFs of a luma ALF set when the luma signaling ALF number information indicates that the number of luma signaling ALFs is greater than 1.

According to an embodiment, the adaptation parameter set includes one or more luma signaling ALFs, and the predetermined number of luma ALFs may be determined from the one or more luma signaling ALFs according to the luma ALF delta index.

According to an embodiment, the adaptation parameter set may include chroma ALF number information indicating the number of chroma ALFs, and may include chroma ALFs, the number of which is indicated by the chroma ALF number information.

In step 3904, at least one of adaptation parameter sets applied to the current picture or slice and including an ALF set applied to the current picture or slice may be determined from among the adaptation parameter sets.

According to an embodiment, the number of luma ALF sets of the current picture or slice may be determined. In addition, luma ALF set identifiers, the number of which is indicated by the luma ALF set number information, may be determined.

According to an embodiment, chroma ALF application information of the current picture or slice may be determined. When the chroma ALF application information indicates that the ALF is applied to at least one of the Cb component or the Cr component, the chroma ALF set identifier may be determined.

In step 3906, the adaptation parameter set applied to a current coding tree block (CTB) and including an ALF set applied to the current CTB included in the current picture or slice may be determined from the adaptation parameter set applied to the current picture or slice.

According to an embodiment, a first ALF coding tree block flag indicating whether adaptive in-loop filtering is applied to the luma sample of the current coding tree block may be determined. In addition, a second ALF coding tree block flag indicating whether adaptive in-loop filtering is applied to the Cb sample of the current coding tree block may be determined. In addition, a third ALF coding tree block flag indicating whether adaptive in-loop filtering is applied to the Cr sample of the current coding tree block may be determined.

According to an embodiment, when adaptive in-loop filtering is applied to the luma sample of the current coding tree block, an adaptation parameter set application flag indicating whether the ALF set of the adaptation parameter set is applied to the current coding tree block may be determined. In addition, when the adaptation parameter set application flag indicates that the ALF set of the adaptation parameter set is applied to the current coding tree block, the luma ALF set applied to the current coding tree block may be determined from one or more adaptation parameter sets including the ALF set applied to the current picture or slice. In addition, when the adaptation parameter set application flag indicates that the ALF set of the adaptation parameter set is not applied to the current coding tree block, the fixed filter applied to the current coding tree block may be determined from among fixed ALF sets for the luma sample.

According to an embodiment, when adaptive in-loop filtering is applied to the Cb sample of the current coding tree block, the second ALF coding tree block identifier indicating the adaptation parameter set including the Cb ALF set applied to the current coding tree block may be determined from among one or more adaptation parameter sets including the ALF set applied to the current picture or slice. In addition, according to the second ALF coding tree block identifier, the adaptation parameter set including the Cb ALF set applied to the current coding tree block may be determined.

When adaptive in-loop filtering is applied to the Cr sample of the current coding tree block, the third ALF coding tree block identifier indicating the adaptation parameter set including the Cr ALF set applied to the current coding tree block may be determined from among one or more adaptation parameter sets including the ALF set applied to the current picture or slice. In addition, according to the third ALF coding tree block identifier, the adaptation parameter set including the Cr ALF set applied to the current coding tree block may be determined.

In step 3908, based on the ALF set of the determined adaptation parameter set applied to the current CTB, the current coding tree block may be filtered.

According to an embodiment, a block classification index may be allocated to a basic filtering unit block of the current coding tree block. The block classification index may be determined using directional information and activity information.

According to an embodiment, at least one of the directional information or activity information may be determined based on the gradient value of at least one of a vertical, horizontal, first diagonal or second diagonal direction.

The embodiments of FIGS. 38 and 39 are merely examples, and the steps of FIGS. 38 and 39 may be easily modified by those skilled in the art. In addition, the components of FIGS. 38 and 39 may be omitted or replaced with other components. The video decoding method of FIG. 38 may be performed in the decoder of FIG. 2. In addition, the video encoding method of FIG. 39 may be performed in the encoder of FIG. 1. In addition, one or more processors may perform commands for implementing the steps of FIGS. 38 and 39. In addition, a program product including commands for implementing the steps of FIGS. 38 and 39 may be stored in a memory device or may be distributed online.

The adaptive in-loop filter may include one or more adaptive in-loop filter coefficients.

The number of luma signaling ALFs may mean an adaptive in-loop filter class (type). The adaptive in-loop filter class (type) includes one or more adaptive in-loop filter coefficients and may mean one filter used for filtering. That is, the adaptive in-loop filters may be different for each adaptive in-loop filter class (type).

The syntax element such as the flag or the index being included in at least one bitstream structure such as a parameter set, a header, a CTU, a CU, a PU, a TU or a block may mean that the syntax element such as the flag or the index is entropy-encoded/decoded.

In addition, the signaling unit of the syntax element such as the flag or the index is not limited to the parameter set, header, CTU, CU, PU, TU or block unit, and signaling may be performed in another parameter set, header, CTU, CU, PU, TU or block unit.

On the other hand, the in-loop filtering for the luminance block and the in-loop filtering for the chrominance block may be separately performed. A control flag is signaled at the picture, slice, tile group, tile, CTU, or CTB level to inform whether the adaptive in-loop filtering for the chrominance component is separately supported. It is possible to signal a flag indicating a mode in which the adaptive in-loop filtering is collectively performed on a luminance block and a chrominance block or a mode in which the adaptive in-loop filtering for a luminance block and the adaptive in-loop filtering for a chrominance block are separately performed.

The syntax element for the luma component among the syntax elements for adaptive in-loop filtering may be used to encode/decode/acquire the luma ALF and luma ALF set. In addition, the syntax element for the chroma component among the syntax elements for adaptive filtering may be used to in-loop encode/decode/acquire the chroma ALF and chroma ALF set.

The syntax element for adaptive in-loop filtering signaled in the specific unit is an example of the syntax element for adaptive in-loop filtering signaled in the corresponding unit, and, without being limited thereto, the syntax element for adaptive in-loop filtering may be signaled in at least one of a sequence parameter set, adaptation parameter set, picture parameter set, picture header or slice header unit. The name of the signaled syntax element for adaptive in-loop filtering may be changed and used.

As an example, the filter coefficient values of the luminance filter and the filter coefficient values of the chrominance filter are entropy-encoded/decoded using different binarization methods for the luminance filter and the chrominance filter.

As another example, the filter coefficient values of the luminance filter are entropy-encoded/decoded using different binarization methods. As a further example, the filter coefficient values of one luminance filter are entropy-encoded/decoded using the same binarization method.

As a further example, the filter coefficient values of one chrominance filter are entropy-encoded/decoded using different binarization methods. As a further example, the filter coefficient values of one chrominance filter are entropy-encoded/decoded using the same binarization method.

As a further example, when at least one piece of the filter information is entropy-encoded/decoded, at least one piece of the filter information of at least one of the neighboring blocks, or at least piece of the previously encoded/decoded filter information, or the encoded/decoded filter information within the previous picture is used to determine the context model.

As a further example, when at least one piece of the filter information is entropy-encoded/decoded, entropy-encoding/decoding is performed using at least one piece of the filter information of the different components as a prediction value of the filter information.

As a further example, when the filter coefficients are entropy-encoded/decoded, entropy-encoding/entropy-decoding is performed using at least one of the filter coefficient within a filter as a prediction value.

As a further example, the filter information is entropy-encoded/decoded using any one combination of the filter information entropy-encoding/decoding methods.

According to an embodiment of the present invention, the adaptive in-loop filtering is performed in units of at least one of a block, a CU, a PU, a TU, a CB, a PB, a TB, a CTU, a CTB, a slice, a tile, a tile group, and a picture. When the adaptive in-loop filtering is performed on a per any one unit of the units described above, the block classification step, it means that the filtering execution step, and the filter information encoding/step are performed in units of at least one of a block, a CU, a PU, a TU, a CB, a PB, a TB, a CTU, a CTB, a slice, a tile, a tile group, and a picture.

According to an embodiment of the present invention, whether to perform the adaptive in-loop filtering is determined on the basis of the determination of whether at least one of the deblocking filtering, a sample adaptive offset, and bidirectional filtering is performed.

As an example, the adaptive in-loop filtering is performed on the samples that has undergone at least one of the deblocking filtering, the sample adaptive offset, and the bidirectional filtering, among the reconstructed/decoded samples within the current picture.

As another example, the adaptive in-loop filtering is not performed on the samples that have undergone at least one of the deblocking filtering, the sample adaptive offset, and the bi-directional filtering, among the reconstructed/decoded samples within the current picture.

As a further example, with respect to the samples that have undergone at least one of the deblocking filtering, the sample adaptive offset, and the bi-directional filtering among the reconstructed/decoded samples within the current picture, the adaptive in-loop filtering is performed on the reconstructed/decoded samples within the current picture using L filters without performing the block classification. Here, L is a positive integer.

As a further example, at the time of performing the adaptive in-loop filtering on the current picture, the adaptive in-loop filtering is performed on the reconstructed/decoded samples within the current picture using L filters without performing the block classification. Here, L is a positive integer. In this case, the adaptive in-loop filtering is performed on the reconstructed/decoded samples within the current picture using L filters performing without the block classification, regardless to the temporal layer identifier.

On the other hand, at the time of performing the adaptive in-loop filtering on the current picture, the adaptive in-loop filtering is performed on the reconstructed/decoded samples within the current picture using L filters without depending on whether the block classification is performed. Here, L is a positive integer. In this case, the adaptive in-loop filtering may be performed on the reconstructed/decoded samples within the current picture using L filters without performing the block classification, without depending on the temporal layer identifier and on whether the block classification is performed.

On the other hand, the adaptive in-loop filtering may be performed using one filter shape. In this case, the adaptive in-loop filtering may be performed on the reconstructed/decoded samples within the current image using one filter shape without performing the block classification. Alternatively, the adaptive in-loop filtering may be performed on the reconstructed/decoded samples within the current image using one filter shape without depending on whether the block classification is performed.

On the other hand, the adaptive in-loop filtering may be performed using one filter tap. In this case, the adaptive in-loop filtering may be performed on the reconstructed/decoded samples within the current image using one filter tap without performing the block classification. Alternatively, the adaptive in-loop filtering may be performed on the reconstructed/decoded samples within the current image using one filter tap without depending on whether the block classification is performed.

On the other hand, the adaptive in-loop filtering may be performed on a specific unit basis. For example, the specific unit may be at least one of a picture, a slice, a tile, a tile group, a CTU, a CTB, a CU, a PU, a TU, a CB, a PB, a TB, and an M×N-size block. Here, M and N are each positive integers. M and N are the same integer or different integers. In addition, M, N, or both are values predefined in the encoder/decoder. Alternatively, M, N, or both may be values signaled to the decoder from the encoder.

Hereinafter, an adaptive in-loop filtering method and apparatus according to another embodiment of the present disclosure will be described with reference to FIGS. 40 to 52.

Figure 40:
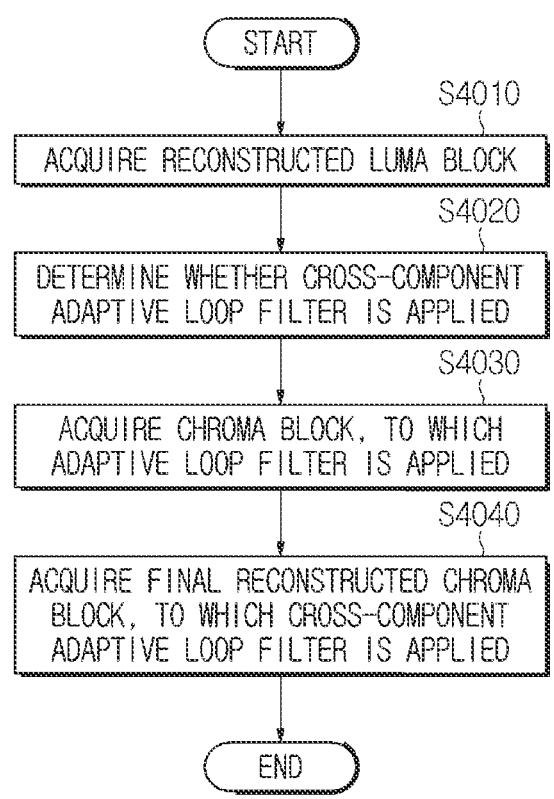
FIG. 40 is a view illustrating an image decoding method according to another embodiment of the present disclosure.

FIG. 40 is a view illustrating an image decoding method according to another embodiment of the present disclosure.

Referring to FIG. 40, the image decoding method according to the embodiment of the present disclosure may include acquiring a reconstructed luma block of a current block (S4010), determining whether to apply a cross-component adaptive loop filter to the current block (S4020), acquiring a reconstructed chroma block of the current block, to which the adaptive loop filter is applied, when the cross-component adaptive loop filter is applied to the current block (S4030) and acquiring a final reconstructed chroma block of the current block, to which the cross-component adaptive loop filter is applied, using the reconstructed luma block and the reconstructed chroma block, to which the adaptive loop filter is applied (S4040).

Figure 41:
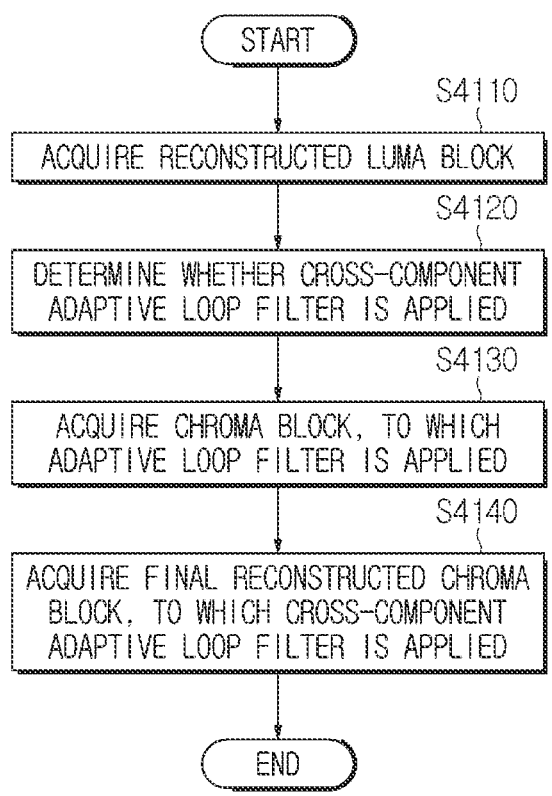
FIG. 41 is a view illustrating an image encoding method according to another embodiment of the present disclosure.

FIG. 41 is a view illustrating an image encoding method according to another embodiment of the present disclosure.

Referring to FIG. 41, the image encoding method according to the embodiment of the present disclosure may include acquiring a reconstructed luma block of a current block (S4110), determining whether to apply a cross-component adaptive loop filter to the current block (S4120), acquiring a reconstructed chroma block of the current block, to which the adaptive loop filter is applied, when the cross-component adaptive loop filter is applied to the current block (S4130) and acquiring a final reconstructed chroma block of the current block, to which the cross-component adaptive loop filter is applied, using the reconstructed luma block and the reconstructed chroma block, to which the adaptive loop filter is applied (S4140).

FIG. 42 is a view illustrating a sequence parameter set according to another embodiment of the present disclosure.

For example, the sequence parameter set may include a syntax element sps_alf_enabled_flag. In this case, sps_alf_enabled_flag may indicate whether adaptive in-loop filtering is performed in sequence units. For example, when sps_alf_enabled_flag has a first value (for example, 0), this may indicate that adaptive in-loop filtering is not performed in sequence units, and, when sps_alf_enabled_flag has a second value (for example, 1), this may indicate that adaptive in-loop filtering is performed in sequence units.

Meanwhile, when sps_alf_enabled_flag is not present in a bitstream, sps_alf_enabled_flag may be inferred as a first value.

Although, in the following description, the first value is 0 and the second value is 1, the first value and the second value are not limited to such an example, and the first value may be 1 and the second value may be 0. In addition, the first value and the second value may be defined as values other than 0 and 1. In addition, although a third value is 2 and the fourth value is 3, the third value and the fourth value are not limited to such an example.

As another example, the sequence parameter set may include a syntax element sps_ccalf_enabled_flag. In this case, sps_ccalf_enabled_flag may indicate whether cross-component adaptive in-loop filtering is applicable. For example, when sps_ccalf_enabled_flag has a first value, cross-component adaptive in-loop filtering may not be applied in sequence units, and, when sps_ccalf_enabled_flag has a second value, cross-component adaptive in-loop filtering may be performed in sequence units.

Meanwhile, when sps_ccalf_enabled_flag is not present in a bitstream, sps_ccalf_enabled_flag may be inferred as a first value.

In the following description, cross-component adaptive in-loop filtering may mean a technique that improves efficiency of adaptive in-loop filtering of a chroma component based on dependency of a luma component and a chroma component. Specifically, an encoder/decoder may acquire a finally filtered chroma component filtering result sample using a sample obtained by applying cross-component adaptive in-loop filtering to a luma component and a sample obtained by applying adaptive in-loop filtering to a chroma component. A method of performing cross-component adaptive in-loop filtering will be described below in detail.

FIG. 43 is a view illustrating an adaptation parameter set according to another embodiment of the present disclosure.

For example, the adaptation parameter may include a syntax element adaptation_parameter_set_id (or aps_adaptation_parameter_set_id). adaptation_parameter_set_id may mean an adaptation parameter identifier.

Meanwhile, when the syntax element adaptation parameter_set_id is not present in a bitstream, adaptation_parameter_set_id may be inferred as a first value.

FIG. 44 is a view illustrating an adaptation parameter according to another embodiment of the present disclosure.

For example, the adaptation parameter set may include a syntax element aps_params_type. In this case, the syntax element aps_params_type may indicate the type of an adaptation parameter present in the adaptation parameter set.

For example, when aps_params_type has a first value, data/content/syntax elements in the adaptation parameter set may be parameters for adaptive in-loop filtering. On the other hand, when aps_params_type has a second value, data/content/syntax elements in the adaptation parameter set may be parameters for luma mapping with chroma scaling (LMCS).

As another example, aps_params_type may be signaled before adaptation_parameter_set_id.

Meanwhile, when the syntax element aps_params_type is not present in a bitstream, aps_params_type may be inferred to as a value other than the first value and the second value. For example, the other value may be one of 2 to 7 as in the example of FIG. 44.

Meanwhile, when an adaptation parameter identifier and adaptation parameter type identical to at least one of previously signaled adaptation parameter identifiers and adaptation parameter types are newly signaled, the data/content/syntax element value in a previously signaled may be replaced with a adaptation parameter set data/content/syntax element value in a newly signaled adaptation parameter set. In this case, the replacement process may mean an update process.

That is, the encoder/decoder may perform at least one of adaptive in-loop filtering or luma mapping with chroma scaling, by referring to the data/content/syntax element value in the previously signaled adaptation parameter set. From a point in time when an identifier of an adaptation parameter set and an adaptation parameter type identical to at least one of previously signaled adaptation identifiers parameter and adaptation parameter types are newly signaled, the encoder/decoder may perform at least one of adaptive in-loop filtering or luma mapping with chroma scaling, by referring to the data/content/syntax element value in the adaptation parameter set at the newly signaled time.

FIG. 45 is a view illustrating a picture header according to another embodiment of the present disclosure.

For example, the picture header may include a syntax element pic_alf_enabled_flag (or ph_alf_enabled_flag). pic_alf_enabled_flag may indicate whether adaptive in-loop filtering is performed in units of all slices in a picture with respect to at least one of Y, Cb or Cr component.

For example, when pic_alf_enabled_flag has a first value, adaptive in-loop filtering may not be performed in units of at least one slice in the picture with respect to at least one of Y, Cb or Cr component, and, when pic_alf_enabled_flag has a second value, adaptive in-loop filtering may be performed in units of all slices in the picture with respect to at least one of Y, Cb or Cr component.

Meanwhile, when pic_alf_enabled_flag is not present in a bitstream, pic_alf_enabled_flag may be inferred as a first value.

As another example, the picture header may include a syntax element pic_num_alf_aps_ids_luma (or ph_num_alf_aps_ids_luma). pic_num_alf_aps_ids_luma may mean the number of adaptation parameter sets for adaptive in-loop filtering referred to in a slice associated with the picture header.

For example, pic_num_alf_aps_ids_luma may have a value from 0 to N. In this case, N may be a positive integer and may be, for example, 6 or 8.

Meanwhile, when pic_num_alf_aps_ids_luma is not present in a bitstream, pic_num_alf_aps_ids_luma may be inferred as a first value.

As another example, the picture header may include a syntax element pic_alf_aps_id_luma (or ph_alf_aps_id_luma). pic_alf_aps_id_luma[i] may mean an i-th adaptation parameter set identifier for adaptive in-loop filtering referred to in a slice associated with the picture header.

For example, the value of alf_luma_filter_signal_flag of an APS NAL unit where aps_params_type is ALF_APS and adaptation_parameter_set_id is identical to pic_alf_aps_id_luma [i] may be a second value.

In addition, sps_ccalf_enabled_flag is a first value, and the values of alf_cc_cb_filter_signal_flag and alf_cc_cr_filter_signal_flag of an APS NAL unit where aps_params_type is ALF_APS and adaptation_parameter_set_id is identical to pic_alf_aps_id_luma [i] may be a first value.

Meanwhile, when pic_alf_aps_id_luma[i] is not present in a bitstream, pic_alf_aps_id_luma[i] may be inferred as a first value.

For example, the temporal layer identifier of the adaptation parameter set for adaptive in-loop filtering having the same adaptation_parameter_set_id as pic_alf_aps_id_luma [i] may be less than or equal to the temporal layer identifier of a current slice.

As another example, when an adaptation parameter set for adaptive in-loop filtering of two or more subpictures/slices/tile groups/tiles in one picture having the same adaptation_parameter_set_id is present, two or more adaptation parameter sets having the same adaptation_parameter_set_id may have the same data/content/syntax element value.

As another example, when the current slice is an intra slice, pic_alf_aps_id_luma[i] may not refer to an adaptation parameter set for adaptive in-loop filtering for a picture including an intra slice or a picture other than an intra picture.

As another example, the picture header may include a syntax element pic_alf_chroma_idc. For example, when pic_alf_chroma_idc has a first value, adaptive in-loop filtering may not be performed with respect to Cb and Cr components. When pic_alf_chroma_idc has a second value, adaptive in-loop filtering may be performed with respect to a Cb component. When pic_alf_chroma_idc has a third value (for example, 2), adaptive in-loop filtering may be performed with respect to a Cr component. When pic_alf_chroma_idc has a fourth value (for example, 3), adaptive in-loop filtering may be performed with respect to Cb and Cr components.

Meanwhile, when pic_alf_chroma_idc is not present in a bitstream, pic_alf_chroma_idc may be inferred as a first value.

As another example, the picture header may include syntax elements ph_alf_cb_enabled_flag and/or ph_alf_cr_enabled_flag. ph_alf_cb_enabled_flag may indicate whether adaptive in-loop filtering may be performed with respect to a Cb component. ph_alf_cr_enabled_flag may indicate whether adaptive in-loop filtering may be performed with respect to a Cr component.

For example, when ph_alf_cb_enabled_flag has a first value, adaptive in-loop filtering may not be performed with respect to a Cb component, and, when ph_alf_cb_enabled_flag has a second value, adaptive in-loop filtering may be performed with respect to a Cb component. Meanwhile, when ph_alf_cr_enabled_flag has a first value, adaptive in-loop filtering may not be performed with respect to a Cr component, and, when ph_alf_cr_enabled_flag has a second value, adaptive in-loop filtering may be performed with respect to a Cr component.

Meanwhile, when ph_alf_cb_enabled_flag is not present in a bitstream, ph_alf_cb_enabled_flag may be inferred as a first value. In addition, when ph_alf_cr_enabled_flag is not present in a bitstream, ph_alf_cr_enabled_flag may be inferred as a first value.

As another example, the picture header may have a syntax element pic_alf_aps_id_chroma (or ph_alf_aps_id_chroma). pic_alf_aps_id_chroma may mean an adaptation parameter set identifier referred to by a chroma component of a slice associated with the picture header.

For example, the value of alf_chroma_filter_signal_flag of the APS NAL unit where aps_params_type is ALF_APS and adaptation_parameter_set_id is identical to pic_alf_aps_id_chroma may be a second value.

In addition, sps_ccalf_enabled_flag is a first value, and the values of alf_cc_cb_filter_signal_flag and alf_cc_cr_filter_signal_flag of the APS NAL unit where aps_params_type is ALF_APS and adaptation_parameter_set_id is identical to pic_alf_aps_id_chroma may be a first value.

Meanwhile, when pic_alf_aps_id_chroma is not present in a bitstream, pic_alf_aps_id_chroma may be inferred as a first value.

For example, the temporal layer identifier of the adaptation parameter set for adaptive in-loop filtering having the same adaptation_parameter_set_id as pic_alf_aps_id_chroma may be less than or equal to the temporal layer identifier of a current slice.

As another example, when the current slice is an intra slice, pic_alf_aps_id_chroma may not refer to an adaptation parameter set for adaptive in-loop filtering for a picture including an intra slice or a picture other than an intra picture.

As another example, the picture header may include a syntax element pic_alf_aps_id_chroma [i] (or ph_alf_aps_id_chroma[i]), instead of pic_alf_aps_id_chroma.

pic_alf_aps_id_chroma [i] may mean an i-th adaptation parameter set identifier for adaptive in-loop filtering referred in a slice associated with the picture header. One of two or more adaptation parameter sets including adaptive in-loop filter information may be selected upon adaptive in-loop filtering for a chroma component, thereby performing adaptive in-loop filtering for the chroma component.

For example, the value of alf_chroma_filter_signal_flag of the APS NAL unit where aps_params_type is ALF_APS and adaptation_parameter_set_id is identical to pic_alf_aps_id_chroma[i] may be a second value.

Meanwhile, when pic_alf_aps_id_chroma[i] is not present in a bitstream, pic_alf_aps_id_chroma[i] may be inferred to as a first value.

For example, the temporal layer identifier of the adaptation parameter set for adaptive in-loop filtering having the same adaptation_parameter_set_id as pic_alf_aps_id_chroma [i] may be less than or equal to the temporal layer identifier of a current slice.

As another example, when an adaptation parameter set of two or more subpictures/slices/tile groups/tiles/bricks having the same adaptation_parameter_set_id in one picture is present, two or more adaptive adaptation parameter sets having the same adaptation_parameter_set_id have may the same data/content/syntax element value.

As another example, when a current slice is an intra slice, pic_alf_aps_id_chroma [i] may not refer to an adaptation parameter set for adaptive in-loop filtering for a picture including an intra slice or a picture other than an intra picture.

As another example, the picture header may include syntax elements pic_cross_component_alf_cb_enabled_flag (or ph_alf_cc_cb_enabled_flag) and/or pic_cross_component_alf_cb_aps_id (or ph_alf_cc_cb_aps_id).

For example, when pic_cross_component_alf_cb_enabled_flag has a first value, a cross-component Cb filter may not be applied to a Cb color component. In addition, when pic_cross_component_alf_cb_enabled_flag has a second value, a cross-component Cb filter may be applied to a Cb color component.

Meanwhile, when pic_cross_component_alf_cb_enabled_ flag is not present in a bitstream, pic_cross_component_alf_cb_enabled_flag may be inferred as a first value.

pic_cross_component_alf_cb_aps_id may indicate adaptation_parameter_set_id referred to by a Cb color component of a slice associated with the picture header.

For example, TemporalId of the APS NAL unit where aps_params_type is ALF_APS and adaptation_parameter_set_id is identical to pic_cross_component_alf_cb_aps_id may be less than or equal to TemporalId of the NAL unit of a current slice associated with the picture header.

As another example, when the current slice associated with the picture header is an intra slice, pic_cross_component_alf_cb_aps_id may not refer to an adaptation parameter set for adaptive in-loop filtering for a picture including an intra slice or a picture other than an intra picture.

As another example, when pic_cross_component_alf_cb_enabled_flag has a second value, all ALF APSs referred to by pic_cross_component_alf_cb_aps_id in all slices, all tiles or all subpictures in a current picture may be the same. Meanwhile, a value of pic_cross_component_cb_filters_signalled_minus1+1 may indicate the number of cross-component Cb filters. In this case, pic_cross_component_cb_filters_signalled_minus1 may have a value from 0 to N. In this case, N may be a positive integer and may be, for example, 3.

As another when example, pic_cross_component_alf_cb_enabled_flag a second value, pic_cross_component_cb_filters_signalled_minus1 may be set as alf_cross_component_cb_filters_signalled_minus1 value in the ALF APS of pic_cross_component_alf_cb_aps_id referred to in a current slice associated with the picture header without separate signaling of pic_cross_component_cb_filters_signalled_minus1.

As another example, when pic_cross_component_alf_cb_enabled_flag has a second value, pic_cross_component_cb_filters_signalled_minus1 may be less than or equal to the value of alf_cross_component_cb_filters_signalled_minus1 in the ALF APS of pic_cross_component_alf_cb_aps_id referred to in a current slice associated with the picture header.

As another example, the picture header may include pic_cross_component_alf_cr_enabled_flag (or syntax elements ph_alf_cc_cr_enabled_flag) and/or pic_cross_component_alf_cr_aps_id (or ph_alf_cc_cr_aps_id).

For example, when pic_cross_component_alf_cr_enabled_flag has a first value, a cross-component Cr filter may not be applied to a Cr color component. In addition, when pic_cross_component_alf_cr_enabled_flag has a second value, this may indicate that a cross-component Cr filter is applied to a Cr color component.

Meanwhile, when pic_cross_component_alf_cr_enabled_flag is not present in a bitstream, pic_cross_component_alf_cr_enabled_flag may be inferred as a first value.

pic_cross_component_alf_cr_aps_id may indicate adaptation_parameter_set_id referred to by the Cr color component of a slice associated with the picture header.

For example, TemporalId of an APS NAL unit where aps_params_type is ALF_APS and adaptation_parameter_set_id is identical to pic_cross_component_alf_cr_aps_id may be less than or equal to TemporalId of an NAL unit of a current slice associated with the picture header.

As another example, when a current slice associated with the picture header is an intra slice, pic_cross_component_alf_cr_aps_id may not refer to an adaptation parameter set for adaptive in-loop filtering for a picture including an intra slice or a picture other than the intra picture.

As another example, when pic_cross_component_alf_cr_enabled_flag has a second value, all ALF APSs referred to by pic_cross_component_alf_cr_aps_id in all slices, all tiles or all subpictures in a current picture may be the same. Meanwhile, a value of pic_cross_component_cr_filters_signalled_minus1+1 may indicate the number of cross-component Cr filters. In this case, pic_cross_component_cr_filters_signalled_minus1 may have a value from 0 to N. In this case, N may be a positive integer and may be, for example, 3.

As another example, when pic_cross_component_alf_cr_enabled_flag has a second value, pic_cross_component_cr_filters_signalled_minus1 may be set as the value of alf_cross_component_cr_filters_signalled_minus1 in the ALF APS of pic_cross_component_alf_cr_aps_id referred to in the current slice associated with the picture header without separate signaling of pic_cross_component_cr_filters_signalled_minus1.

As another example, when pic_cross_component_alf_cr_enabled_flag has a second value, pic_cross_component_cr_filters_signalled_minus1 may be less than or equal to the value of alf_cross_component_cr_filters_signalled_minus1 in the ALF APS of pic_cross_component_alf_cr_aps_id referred to in a current slice associated with the picture header.

In the above description, the slice associated with the picture header may mean a slice which refers to at least one syntax element in a corresponding picture header or a slice belonging to a picture corresponding to the corresponding picture header.

FIG. 46 is a view illustrating a slice header according to another embodiment of the present disclosure.

For example, the slice header may include a syntax element slice_alf_enabled_flag (or sh_alf_enabled_flag). slice_alf_enabled_flag may indicate whether adaptive in-loop filtering is performed in slice units with respect to at least one of Y, Cb or Cr component.

For example, when slice_alf_enabled_flag has a first value, adaptive in-loop filtering may not be performed in slice units with respect to all Y, Cb and Cr components. On the other hand, when slice_alf_enabled_flag has a second value, adaptive in-loop filtering may be performed in slice units with respect to at least one of Y, Cb or Cr component.

Meanwhile, when slice_alf_enabled_flag is not present in a bitstream, slice_alf_enabled_flag may be inferred as a first value or pic_alf_enabled_flag.

As another example, the slice header may include a syntax element slice_num_alf_aps_ids_luma (or sh_num_alf_aps_ids_luma). slice_num_alf_aps_ids_luma may mean the number of adaptation parameter sets for adaptive in-loop filtering referred to in the slice.

For example, slice_num_alf_aps_ids_luma may have a value from 0 to N. In this case, N may be a positive integer and may be, for example, 6.

Meanwhile, when slice_num_alf_aps_ids_luma is not present in a slice_num_alf_aps_ids_luma may be inferred as a first value or pic_num_alf_aps_ids_luma.

The maximum number of adaptation parameter sets for adaptive in-loop filtering preset in the encoder/decoder and the maximum number of adaptation parameter sets for luma mapping with chroma scaling may be the same. In this case, the sum of the maximum number of adaptation parameter sets for adaptive in-loop filtering and the maximum number of adaptation parameter sets for luma mapping with chroma scaling may be a maximum number of adaptation parameter sets.

The maximum number of adaptation parameter sets for adaptive in-loop filtering preset in the encoder/decoder and the maximum number of adaptation parameter sets for luma mapping with chroma scaling may be different from each other. In this case, the sum of the maximum number of adaptation parameter sets for adaptive in-loop filtering and the maximum number of adaptation parameter sets for luma mapping with chroma scaling may be a maximum number of parameter sets.

For example, the number of adaptation parameter sets for adaptive in-loop filtering may be a maximum of K in the case of an intra slice and a maximum of L in the case of an inter slice. In this case, K and L may be positive integers. For example, K may be 1, and L may be 6.

As another example, the number of adaptation parameter sets for adaptive in-loop filtering may be a maximum of J regardless of the type of the slice. Here, J may be a positive integer. For example, J may be 6 or 8.

As another example, the number of adaptation parameter sets for luma mapping with chroma scaling may be a maximum of K in the case of an intra slice and may be a maximum of L in the case of an inter slice. In this case, K and L may be positive integers. For example, K may be 1, and L may be 6.

As another example, the number of adaptation parameter sets for luma mapping with chroma scaling may be a maximum of J regardless of the type of the slice. In this case, J may be a positive integer. For example, J may be 6.

As another example, the slice header may include a syntax element slice_alf_aps_id_luma (or sh_alf_aps_id_luma). slice_alf_aps_id_luma [i] may mean an i-th adaptation parameter set identifier for adaptive in-loop filtering referred to in a slice.

For example, the value of alf_luma_filter_signal_flag where aps_params_type is ALF_APS and adaptation_parameter_set_id is identical to slice_alf_aps_id_luma[i] may be a second value.

Meanwhile, when slice_alf_aps_id_luma[i] is not present in a bitstream, slice_alf_aps_id_luma[i] may be inferred to as a first value or pic_alf_aps_id_luma [i].

For example, the temporal layer identifier of the adaptation parameter set for adaptive in-loop filtering having the same adaptation_parameter_set_id as slice_alf_aps_id_luma [i] may be less than or equal to the temporal layer identifier of a current slice.

In addition, sps_ccalf_enabled_flag may be a first value, and the values of alf_cc_cb_filter_signal_flag and alf_cc_cr_filter_signal_flag of an APS NAL unit where aps_params_type is ALF_APS and adaptation_parameter_ set_id is identical to slice_alf_aps_id_luma[i] may be a first value.

As another example, when an adaptation parameter set for adaptive in-loop of filtering two or more subpictures/slices/tile groups/tiles/bricks in one picture having the same adaptation_parameter_set_id is present, two or more adaptation parameter sets having the same adaptation_parameter_ set_id may have the same data/content/syntax element value.

As another example, when the current slice is an intra slice, slice_alf_aps_id_luma [i] may not refer to an adaptation parameter set for adaptive in-loop filtering for a picture including an intra slice or a picture other than an intra picture.

As another example, the slice header may include a syntax element slice_alf_chroma_idc. For example, when slice_alf_chroma_idc has a first value, adaptive in-loop filtering may not be performed with respect to Cb and Cr components. When slice_alf_chroma_idc has a second value, adaptive in-loop filtering may be performed with respect to a Cb component. When slice_alf_chroma_idc has a third value, adaptive in-loop filtering may be performed with respect to a Cr component. When slice_alf_chroma_idc has a fourth value, adaptive in-loop filtering may be performed with respect to Cb and Cr components.

Meanwhile, when slice_alf_chroma_idc is not present in a bitstream, slice_alf_chroma_idc may be inferred as a first value.

As another example, the picture header may include syntax elements sh_alf_cb_enabled_flag and/or sh_alf_cr_enabled_flag. sh_alf_cb_enabled_flag may indicate whether adaptive in-loop filtering is performed with respect to a Cb component. sh_alf_cr_enabled_flag may indicate whether adaptive in-loop filtering is performed with respect to a Cr component.

For example, when sh_alf_cb_enabled_flag has a first value, adaptive in-loop filtering may not be performed with respect to a Cb component, and, when sh_alf_cb_enabled_flag has a second value, adaptive in-loop filtering may be performed with respect to a Cb component. Meanwhile, when sh_alf_cr_enabled_flag has a first value, adaptive in-loop filtering may not be performed with respect to a Cr component, and, when sh_alf_cr_enabled_flag has a second value, adaptive in-loop filtering may be performed with respect to a Cr component.

Meanwhile, when sh_alf_cb_enabled_flag is not present in a bitstream, sh_alf_cb_enabled_flag may be inferred as a first value. In addition, when sh_alf_cr_enabled_flag is not present in a bitstream, sh_alf_cr_enabled_flag may be inferred as a first value.

As another example, the slice header may include a syntax element slice_alf_aps_id_chroma (or sh_alf_aps_id_chroma). slice_alf_aps_id_chroma may mean the identifier of the adaptation parameter set referred to in the chroma component of a slice.

For example, the value of alf_chroma_filter_signal_flag of an APS NAL unit where aps_params_type is ALF_APS and adaptation_parameter_set_id is identical to slice_alf_aps_id_chroma may be a second value.

In addition, sps_ccalf_enabled_flag may be a first value, and the values of alf_cc_cb_filter_signal_flag and alf_cc_cr_filter_signal_flag of APS an NAL unit where aps_params_type is ALF_APS and adaptation_parameter_set_id is identical to slice_alf_aps_id_chroma may be a first value.

Meanwhile, when slice_alf_aps_id_chroma is not present in a bitstream, slice_alf_aps_id_chroma may be inferred as a first value or pic_alf_aps_id_chroma.

For example, the temporal layer identifier of the adaptation parameter set for adaptive in-loop filtering having the same adaptation_parameter_set_id as slice_alf_aps_id_chroma may be less than or equal to the temporal layer identifier of a current slice.

As another example, when the current slice is an intra slice, slice_alf_aps_id_chroma may not refer to an adaptation parameter set for adaptive in-loop filtering for a picture including an intra slice or a picture other than an intra picture.

As another example, the slice header may include a syntax element slice_alf_aps_id_chroma [i] instead of slice_alf_aps_id_chroma. slice_alf_aps_id_chroma[i] may mean an i-th adaptation parameter set identifier for adaptive in-loop filtering referred to in a slice associated with the picture header. One of two or more adaptation parameter sets including adaptive in-loop filter information may be selected upon adaptive in-loop filtering for a chroma component, thereby performing adaptive in-loop filtering for the chroma component.

For example, the value of alf_chroma_filter_signal_flag of an APS unit where NAL aps_params_type is ALF_APS and adaptation_parameter_set_id is identical to slice_alf_aps_id_chroma [i] may be a second value.

Meanwhile, when slice_alf_aps_id_chroma [i] is not present in a bitstream, slice_alf_aps_id_chroma[i] may be inferred as a first value or pic_alf_aps_id_chroma [i].

For example, the temporal layer identifier of the adaptation parameter set for adaptive in-loop filtering having the same adaptation_parameter_set_id as slice_alf_aps_id_chroma[i] may be less than or equal to the temporal layer identifier of a current slice.

As another example, when an adaptation parameter set of two or more subpictures/slices/tile groups/tiles/bricks having the same adaptation_parameter_set_id is present in one picture, two or more adaptation parameter sets for adaptive in-loop filtering having the same adaptation_parameter_set_id may have the same data/content/syntax element value.

As another example, when the current slice is an intra slice, slice_alf_aps_id_chroma [i] may not refer to an adaptation parameter set for adaptive in-loop filtering for a picture including an intra slice or a picture other than an intra picture.

As another example, the slice header may include syntax elements slice_cross_component_alf_cb_enabled_flag (or sh_alf_cc_cb_enabled_flag) and/or slice_cross_component_alf_cb_aps_id (or sh_alf_cc_cb_aps_id).

For example, when slice_cross_component_alf_cb_enabled_flag has a first value, a cross-component Cb filter may not be applied to a Cb color component. When slice_cross_component_alf_cb_enabled_flag has a second value, a cross-component Cb filter may be applied to a Cb color component.

Meanwhile, when slice_cross_component_alf_cb_enabled_flag is not present in a bitstream, slice_cross_component_alf_cb_enabled_flag may be inferred as a first value or pic_cross_component_alf_cb_enabled_flag.

slice_cross_component_alf_cb_aps_id may indicate adaptation_parameter_set_id referred to by the Cb color component of a slice.

For example, TemporalId of an APS NAL unit where aps_params_type is ALF_APS and adaptation_parameter_set_id is identical to slice_cross_component_alf_cb_aps_id may be less than or equal to TemporalId of an NAL unit of a current slice.

Meanwhile, when slice_cross_component_alf_cb_aps_id is not present in a bitstream, slice_cross_component_alf_cb_aps_id may be inferred as a first value or pic_cross_component_alf_cb_aps_id.

As another example, when the current slice is an intra slice, slice_cross_component_alf_cb_aps_id may refer to an adaptation parameter set for adaptive in-loop filtering for a picture including an intra slice or a picture other than an intra picture.

As another example, when slice_cross_component_alf_cb_enabled_flag has a second value, all ALF APSs referred to by slice_cross_component_alf_cb_aps_id in all slices, all tiles or all subpictures in a current picture may be the same. Meanwhile, a value of slice_cross_component_cb_filters_signalled_minus1+1 may indicate the number of cross-component Cb filters. In this case, slice_cross_component_cb_filters_signalled_minus1 may have a value from 0 to N. In this case, N may be a positive value and may be, for example, 3.

Meanwhile, when slice_cross_component_cb_filters_signalled_minus1 is not present in a bitstream, slice_cross_component_cb_filters_signalled_minus1 may be inferred as a first value or pic_cross_component_cb_filters_signalled_minus1.

As another example, when slice_cross_component_alf_cb_enabled_flag has a second value, slice_cross_component_cb_filters_signalled_minus1 may be set as the value of alf_cross_component_cb_filters_signalled_minus1 in the ALF APS of slice_cross_component_alf_cb_aps_id referred to in a current slice without separate signaling of slice_cross_component_cb_filters_signalled_minus1.

As another example, when slice_cross_component_alf_cb_enabled_flag has a second value, slice_cross_component_cb_filters_signalled_minus1 may be less than or equal to the value of alf_cross_component_cb_filters_signalled_minus1 in the ALF APS of slice_cross_component_alf_cb_aps_id referred to in a current slice.

As another example, when slice_cross_component_alf_cb_enabled_flag has a second value, slice_cross_component_cb_filters_signalled_minus1 may be less than or equal to the value of pic_cross_component_cb_filters_signalled_minus1 of a picture header referred to in a current slice.

As another example, the slice header may include syntax elements slice_cross_component_alf_cr_enabled_flag (or sh_alf_cc_cr_enabled_flag) and/or slice_cross_component_alf_cr_aps_id (or sh_alf_cc_cr_aps_id).

For example, when slice_cross_component_alf_cr_enabled_flag has a first value, a cross-component Cr filter may not be applied to a Cr color component. When slice_cross_component_alf_cr_enabled_flag has a second value, a cross-component Cr filter may be applied to a Cr color component.

Meanwhile, when slice_cross_component_alf_cr_enabled_flag is not present in a bitstream, slice_cross_component_alf_cr_enabled_flag may be inferred as a first value or pic_cross_component_alf_cr_enabled_flag.

slice_cross_component_alf_cr_aps_id may indicate adaptation_parameter_set_id referred by a Cr color component of a slice.

For example, TemporalId of an APS NAL unit where aps_params_type is ALF_APS and adaptation_parameter_set_id is identical to slice_cross_component_alf_cr_aps_id may be less than or equal to TemporalId of an NAL unit of a current slice.

Meanwhile, when slice_cross_component_alf_cr_aps_id is not present in a bitstream, slice_cross_component_alf_cr_aps_id may be inferred as a first value or pic_cross_component_alf_cr_aps_id.

As another example, when the current slice is an intra slice, slice_cross_component_alf_cr_aps_id may not refer to an adaptation parameter set for adaptive in-loop filtering for a picture including an intra slice or a picture other than an intra picture.

As another example, when slice_cross_component_alf_cr_enabled_flag has a second value, all ALF APSs referred to by slice_cross_component_alf_cr_aps_id in all slices, all tiles or all subpictures in the current picture may be the same. Meanwhile, a value of slice_cross_component_cr_filters_signalled_minus1+1 may indicate the number of cross-component Cr filters. In this case, slice_cross_component_cr_filters_signalled_minus1 may have a value from 0 to N. In this case, N may be a positive integer and may be, for example, 3.

Meanwhile, when slice_cross_component_cr_filters_signalled_minus1 is not present in a bitstream, slice_cross_component_cr_filters_signalled_minus1 may be inferred as a first value or pic_cross_component_cr_filters_signalled_minus1.

As another example, when slice_cross_component_alf_cr_enabled_flag has a second value, slice_cross_component_cr_filters_signalled_minus1 may be set as a value of alf_cross_component_cr_filters_signalled_minus1 in an ALF APS of slice_cross_component_alf_cr_aps_id referred to in a current slice without separate signaling of slice_cross_component_cr_filters_signalled_minus1.

As another example, when slice_cross_component_alf_cr_enabled_flag has a second value, slice_cross_component_cr_filters_signalled_minus1 may be less than to value of or equal the alf_cross_component_cr_filters_signalled_minus1 in the ALF APS of slice_cross_component_alf_cr_aps_id referred to in a current slice.

As another example, when slice_cross_component_alf_cr_enabled_flag has a second value, slice_cross_component_cr_filters_signalled_minus1 may be less than or equal to the value of pic_cross_component_cr_filters_signalled_minus1 of a picture header referred to in a current slice.

At least one of slice unit syntax elements may be replaced with a picture unit syntax element and signaled. That is, at least one of slice unit syntax elements signaled in a slice header may be signaled in a picture header.

In addition, at least one of slice unit syntax elements and at least one of picture unit syntax elements may be redundantly signaled. That is, even when at least one syntax element is signaled in a picture header, a syntax element having the same role as the signaled syntax element may be signaled even in a slice header.

FIG. 47 is a view illustrating ALF data according to another embodiment of the present disclosure.

For example, ALF data may include a syntax element alf_luma_filter_signal_flag. alf_luma_filter_signal_flag may indicate whether an adaptive in-loop filter set for a luma component is entropy-encoded/decoded. For example, when alf_luma_filter_signal_flag has a first value, the adaptive in-loop filter set for the luma component may not be entropy-encoded/decoded and, when alf_luma_filter_signal_flag has a second value, the adaptive in-loop filter set for the luma component may be entropy-encoded/decoded.

Meanwhile, alf_luma_filter_signal_flag is not present in a bitstream, alf_luma_filter_signal_flag may be inferred as a first value.

As another example, ALF data may include a syntax element alf_chroma_filter_signal_flag. alf_chroma_filter_signal_flag may indicate whether an adaptive in-loop filter set for a chroma component is entropy-encoded/decoded. For example, when alf_chroma_filter_signal_flag has a first value, the adaptive in-loop filter set for the chroma component may not be entropy-encoded/decoded, and, when alf_chroma_filter_signal_flag has a second value, the adaptive in-loop filter set for the chroma component may be entropy-encoded/decoded.

Meanwhile, when ChromaArrayType has a first value, alf_chroma_filter_signal_flag may have a first value. In addition, both the value of alf_luma_filter_signal_flag and the value of alf_chroma_filter_signal_flag may not simultaneously have a value of 0.

Meanwhile, when alf_chroma_filter_signal_flag is not present in a bitstream, alf_chroma_filter_signal_flag may be inferred as a first value.

As another example, NumAlfFilters which is a maximum value of the number of different adaptive in-loop filters included in an adaptive in-loop filter set may be N. In this case, N may be a positive integer and may be, for example, 25.

As another example, ALF data may include syntax elements alf_cross_component_cb_filter_signal_flag (or alf_cc_cb_filter_signal_flag) and/or alf_cross_component_cr_filter_signal_flag (or alf_cc_cr_filter_signal_flag).

alf_cross_component_cb_filter_signal_flag may indicate whether a cross-component Cb filter is signaled. For example, when alf_cross_component_cb_filter_signal_flag has a first value, a cross-component Cb filter may not be signaled. When alf_cross_component_cb_filter_signal_flag has a second value, a cross-component Cb filter may be signaled.

Meanwhile, when ChromaArrayType has a first value, alf_cross_component_cb_filter_signal_flag may have a first value.

alf_cross_component_cr_filter_signal_flag may mean whether a cross-component Cr filter is signaled. For example, when alf_cross_component_cr_filter_signal_flag has a first value, a cross-component Cr filter may not be signaled. When alf_cross_component_cr_filter_signal_flag has a second value, a cross-component Cr filter may be signaled.

Meanwhile, when ChromaArrayType has a first value, alf_cross_component_cr_filter_signal_flag may have a first value.

As another example, ALF data may include a syntax element alf_luma_clip_flag. alf_luma_clip_flag may indicate whether linear adaptive in-loop filtering or non-linear adaptive in-loop filtering is performed with respect to a luma component. For example, when alf_luma_clip_flag has a first value, linear adaptive in-loop filtering may be performed with respect to the luma component, and when alf_luma_clip_flag has a second value, non-linear adaptive in-loop filtering may be performed with respect to the luma component.

Meanwhile, alf_luma_clip_flag is not present in a bitstream, alf_luma_clip_flag may be inferred as a first value.

As another example, ALF data may include a syntax element alf_luma_num_filters_signalled_minus1. A value of alf_luma_num_filters_signalled_minus1+1 may mean the number of adaptive in-loop filter classes (types) for the luma component. For example, alf_luma_num_filters_signalled_minus1 may have a value from 0 to NumAlfFilters-N. At this time, N may be a positive integer and may be, for example, 1.

Meanwhile, when alf_luma_num_filters_signalled_minus1 is not present in a bitstream, alf_luma_num_filters_signalled_minus1 may be inferred as a value of 0.

As another example, ALF data may include a syntax element alf_luma_coeff_delta_idx. alf_luma_coeff_delta_idx[filtIdx] may mean an index of an adaptive in-loop filter coefficient for a luma component indicated by filtIdx.

For example, filtIdx may have a value from 0 to NumAlfFilters-N. In this case, N may be a positive integer and may be, for example, 1.

Meanwhile, when alf_luma_coeff_delta_idx[filtIdx] is not present in a bitstream, alf_luma_coeff_delta_idx[filtIdx] may be inferred as a value of 0.

In addition, the length of alf_luma_coeff_delta_idx[filtIdx] may be expressed by Ceil(Log2(alf_luma_num_filters_signalled_minus1+1)) bits. Here, Ceil(x) may be an operator for returning a smallest integer value less than or equal to x.

As another example, ALF data may include a syntax element alf_luma_coeff_abs. alf_luma_coeff_abs[sfIdx][j] may mean the absolute value of a j-th coefficient of an adaptive in-loop filter for a luma component indicated by sfIdx.

Meanwhile, when alf_luma_coeff_abs[sfIdx][j] is not present in a bitstream, alf_luma_coeff_abs[sfIdx][j] may be inferred as a value of 0.

In addition, the order k of an exponential-Golomb binarization uek (v) for alf_luma_coeff_abs[sfIdx][j] may be N. In this case, N may be a positive integer and may be, for example, 3.

As another example, ALF data may include a syntax element alf_luma_coeff_sign. alf_luma_coeff_sign[sfIdx][j] may the sign of a j-th coefficient of an adaptive in-loop filter for a luma component indicated by sfIdx. For example, when alf_luma_coeff_sign[sfIdx][j] has a first value, an adaptive in-loop filter coefficient for a corresponding luma component may have a positive sign. On the contrary, when alf_luma_coeff_sign[sfIdx][j] has a second value, an adaptive in-loop filter coefficient for a corresponding luma component may have a negative sign.

Meanwhile, when alf_luma_coeff_sign[sfIdx][j] is not present in a bitstream, alf_luma_coeff_sign[sfIdx][j] may be inferred as a first value.

A filter coefficient filtCoeff[sfIdx][j] indicated by sfIdx may be derived according to Equation 24 below. In this case, sfIdx may have a value from 0 to alf_luma_num_filters_signalled_minus1. In addition, j may have a value from 0 to N. Here, N may be a positive integer and may be, for example, 11.

filtCoeff[sfIdx][$j$]=alf_luma_coeff_abs[sfIdx][$j$]*(1−2*alf_luma_coeff_sign[sfIdx][$j$])  [Equation 24]

The adaptive in-loop filter coefficient for the luma component AlfCoeff_L[adaptation_parameter_set_id][filtIdx][j] may be derived according to Equation 25 below. In this case, filtIdx may have a value from 0 to NumAlfFilters−1. In addition, j may have a value from 0 to N. Here, N may be a positive integer and may be, for example, 11.

AlfCoeff_L[adaptation_parameter_set_id][filtIdx][$j$]=filtCoeff[alf_luma_coeff_delta_idx[filtIdx]][$j$]  [Equation 25]

Meanwhile, AlfCoeff_L[adaptation_parameter_set_id][filtIdx][j] may have a value from −2^M to 2^M−1. In this case, filtIdx may have a value from 0 to NumAlfFilters−1. In addition, j may have a value from 0 to N. In this case, N may be a positive integer and may be, for example, 11. In addition, M may be a positive integer and may be, for example, 7.

As another example, ALF data may include a syntax element alf_luma_clip_idx. alf_luma_clip_idx[sfIdx][j] may mean a clipping index for a clipping value used for clipping before a j-th coefficient of an adaptive in-loop filter for a luma component indicated by sfIdx is multiplied by a reconstructed/decoded sample.

Meanwhile, when alf_luma_clip_idx[sfIdx][j] is not present in a bitstream, alf_luma_clip_idx[sfIdx][j] may be inferred as a first value.

For example, alf_luma_clip_idx[sfIdx][j] may have a value from 0 to M. In this case, M may be a positive integer and may be, for example, 3. In this case, sfIdx may have a value from 0 to alf_luma_num_filters_signalled_minus1. In addition, j may have a value from 0 to N. In this case, N may be a positive integer and may be, for example, 11.

The adaptive in-loop filter clipping value for the luma component AlfClip_L[adaptation_parameter_set_id][filtIdx][j] may be derived according to Table 3 below. In this case, filtIdx may have a value from 0 to NumAlfFilters−1. In addition, j may have a value from 0 to N. In this case, N may be a positive integer and may be, for example, 11. In Table 3, BitDepth may mean the bit depth of an input sample, and clipIdx may be set to alf_luma_clip_idx[alf_luma_coeff_delta_idx[filtIdx]][j].

TABLE 3

| BitDepth | clipIdx | | | |
|---|---|---|---|---|
| | 0 | 1 | 2 | 3 |
| 8 | 255 | 50 | 10 | 2 |
| 9 | 511 | 100 | 20 | 4 |
| 10 | 1023 | 201 | 39 | 8 |
| 11 | 2047 | 402 | 79 | 15 |
| 12 | 4095 | 803 | 158 | 31 |
| 13 | 8191 | 1607 | 315 | 62 |
| 14 | 16383 | 3214 | 630 | 124 |
| 15 | 32767 | 6427 | 1261 | 247 |
| 16 | 65535 | 12855 | 2521 | 495 |

As another example, ALF data may include a syntax alf_chroma_num_alt_filters_minus1. A value of element alf_chroma_num_alt_filters_minus1+1 may mean the number of filters for a chroma component. For example, alf_chroma_num_alt_filters_minus1 may have a value from 0 to N. In this case, N may be a positive integer and may be, for example, 7, 8, 3 or 4.

Meanwhile, when alf_chroma_num_alt_filters_minus1 is not present in a bitstream, alf_chroma_num_alt_filters_minus1 may be inferred as a value of 0.

As another example, ALF data may include a syntax element alf_chroma_clip_flag. alf_chroma_clip_flag may indicate whether linear adaptive in-loop filtering or non-linear adaptive in-loop filtering is performed with respect to a chroma component. For example, when alf_chroma_clip_flag has a first value, linear adaptive in-loop filtering may be performed with respect to the chroma component, and, when alf_chroma_clip_flag has a second value, non-linear adaptive in-loop filtering may be performed with respect to the chroma component.

Meanwhile, when alf_chroma_clip_flag is not present in a bitstream, alf_chroma_clip_flag may be inferred as a first value.

Meanwhile, when alf_chroma_clip_flag is signaled for each ALF filter, alf_chroma_clip_flag may be signaled in the form of the same matrix as alf_chroma_clip_flag[altIdx]. On the other hand, when alf_chroma_clip_flag is signaled one by one for each ALF data, alf_chroma_clip_flag may be signaled as a single syntax element.

As another example, ALF data may include a syntax element alf_chroma_coeff_abs. alf_chroma_coeff_abs[altIdx][j] may mean the absolute value of a j-th coefficient of an adaptive in-loop filter for a chroma component indicated by altIdx.

For example, alf_chroma_coeff_abs[altIdx][j] may have a value from 0 to $2^{M}-1$. In this case, M may be a positive integer and may be, for example, 7. In addition, the order k of exponential-Golomb binarization uek (v) for alf_chroma_coeff_abs[altIdx][j] may be N. In this case, N may be a positive integer and may be, for example, 3.

Meanwhile, when alf_chroma_coeff_abs[altIdx][j] is not present in a bitstream, alf_chroma_coeff_abs[altIdx][j] may be inferred as a value of 0.

As another example, ALF data may include a syntax element alf_chroma_coeff_sign. alf_chroma_coeff_sign[altIdx][j] may mean the sign of a j-th coefficient of an adaptive in-loop filter for a chroma component indicated by altIdx. For example, when alf_chroma_coeff_sign[altIdx][j] has a first value, an adaptive in-loop filter coefficient for a corresponding chroma component may have a positive sign. On the other hand, when alf_chroma_coeff_sign[altIdx][j] has a second value, an adaptive in-loop filter coefficient for a corresponding chroma component may have a negative sign.

Meanwhile, when alf_chroma_coeff_sign [altIdx][j] is not present in a bitstream, alf_chroma_coeff_sign [altIdx][j] may be inferred as a first value (e.g., 0).

For example, the adaptive in-loop filter coefficient for the chroma component AlfCoeff_C[adaptation_parameter_set_id][altIdx][j] may be derived according to Equation 26 below. In this case, j may have a value from 0 to N. In addition, N may be a positive integer and may be, for example, 5.

$$\text{AlfCoeff\_}C[\text{adaptation\_parameter\_}set\_id][\text{altIdx}][j]=\\ alf\_\text{chroma\_coeff\_abs[altIdx]}[j]*1-2*alf\_\text{chroma\_coeff\_sign[altIdx]}[j])$$ [Equation 26]

AlfCoeff_C[adaptation_parameter_set_id][altIdx][j] may have a value from $-2^{M}$ to $2^{M}-1$. In this case, j may have a value from 0 to N. In this case, N may be a positive integer and may be, for example, 5. In addition, M may be a positive integer and may be, for example, 7.

As another example, ALF data may include a syntax element alf_chroma_clip_idx. alf_chroma_clip_idx[altIdx][j] may mean a clipping index for a clipping value used for clipping before a j-th coefficient of an adaptive in-loop filter for a chroma component indicated by altIdx is multiplied by a reconstructed/decoded sample.

Meanwhile, when alf_chroma_clip_idx[altIdx][j] is not present in a bitstream, alf_chroma_clip_idx[altIdx][j] may be inferred as a first value.

For example, alf_chroma_clip_idx[altIdx][j] may have a value from 0 to M. In this case, M may be a positive integer and may be, for example, 3. In addition, j may have a value from 0 to N. In addition, N may be a positive integer and may be, for example, 5.

The adaptive in-loop filter clipping value for the chroma component AlfClip_C[adaptation_parameter_set_id][altIdx][j] may be derived according to Table 3 above. In this case, j may have a value from 0 to N. In addition, N may be a positive integer and may be, for example, 5.

In Table 3, BitDepth may mean the bit depth of an input sample, and clipIdx may be set to alf_chroma_clip_idx [altIdx][j].

As another example, ALF data may include a syntax element alf_cross_component_cb_filters_signalled_minus1 (or alf_cc_cb_filters_signalled_minus1). A value of alf_cross_component_cb_filters_signalled_minus1+1 may mean the number of cross-component Cb filters signaled in a current ALF APS. For example, alf_cross_component_cb_filters_signalled_minus1 may have a value from 0 to M. In this case, M may be a positive integer and may be, for example, 3. In addition, in order to reduce computational complexity, M may be an integer less than 3.

As another example, ALF data may include a syntax element alf_cross_component_cb_coeff_plus32. A value of alf_cross_component_cb_coeff_plus32 [k][j]−32 may mean the value of a j-th filter coefficient of a signaled k-th cross-component Cb filter.

Meanwhile, when alf_cross_component_cb_coeff_plus32 [k][j] is not present in a bitstream, alf_cross_component_cb_ coeff_plus32 [k][j] may be inferred as a value of 32.

Meanwhile, the order k of exponential-Golomb binarization uek (v) for alf_cross_component_cb_coeff_plus32 [k][j] may be N. In this case, N may be a positive integer and may be, for example, 3.

A k-th cross-component Cb filter coefficient CcAlfApsCoeff_Cb[adaptation_parameter_set_id][k][j] may be derived according to Equation 27 below.

$$\text{CcAlfApsCoeff\_}Cb[\text{adaptation\_parameter\_}set\_id][k]\\ [j]=alf\_\text{cross\_component\_}cb\_\text{coeff\_plus32}[k]\\ [j]-32$$ [Equation 27]

In this case, CcAlfApsCoeff_Cb [adaptation_parameter_set_id][k][j] may have a value from $-2^{M}$ to $2^{M}-1$. In this case, j may have a value from 0 to N. In addition, N may be a positive integer and may be, for example, 7. In addition, M may be a positive integer and may be, for example, 5. In addition, in order to reduce computational complexity, M may be an integer less than 5.

As another example, ALF data may include a syntax element alf_cross_component_cr_filters_signalled_minus1 (or alf_cc_cr_filters_signalled_minus1). A value of alf_cross_component_cr_filters_signalled_minus1+1 may mean the number of cross-component Cr filters signaled in a current ALF APS. For example, alf_cross_component_cr_filters_signalled_minus1 may have a value from 0 to M. In this case, M may be a positive integer and may be, for example, 3. In addition, in order to reduce computational complexity, M may be an integer less than 3.

As another example, ALF data may include a syntax element alf_cross_component_cr_coeff_plus32. A value of alf_cross_component_cr_coeff_plus32 [k][j]−32 may mean the value of a j-th filter coefficient of a signaled k-th cross-component Cr filter.

Meanwhile, when alf_cross_component_cr_coeff_plus32 [k][j] is not present in a bitstream, alf_cross_component_cr_coeff_plus32 [k][j] may be inferred as a value of 32.

Meanwhile, the order k of 41 exponential-Golomb binarization uek (v) for alf_cross_component_cr_coeff_plus32 [k][j] may be N. In this case, N may be a positive integer and may be, for example, 3.

A k-th cross-component Cr filter coefficient CcAlfApsCoeff_Cr [adaptation_parameter_set_id][k][j] may be derived according to Equation 28 below.

$$CcAlfApsCoeff\_Cr[adaptation\_parameter\_set\_id][k][j]=alf\_cross\_component\_cr\_coeff\_plus32[k][j]-32 \quad \text{[Equation 28]}$$

In this case, CcAlfApsCoeff_Cr[adaptation_parameter_set_id][k][j] may have a value from $-2^M$ to $2^M-1$. In this case, j may have a value from 0 to N. In addition, N may be a positive integer and may be, for example, 7. In addition, M may be a positive integer and may be, for example, 5. In addition, in order to reduce computational complexity, M may be an integer less than 5.

In the above-described embodiments, N may be used instead of an integer of 32. In this case, N may be a positive integer. Here, N may mean the basic value of a filter coefficient.

FIG. 48 is a view illustrating a coding tree unit (CTU) according to another embodiment of the present disclosure.

For example, a CTU may include a syntax element alf_ctb_flag. alf_ctb_flag[cIdx][CtbAddrX][CtbAddrY] may indicate whether adaptive in-loop filtering is applied to the encoding tree block of a color component (Y, Cb or Cr) indicated by cIdx at a luma component position (xCtb, yCtb).

For example, when alf_ctb_flag[cIdx][CtbAddrX][CtbAddrY] has a first value, adaptive in-loop filtering may not be applied to the encoding tree block of a color component indicated by cIdx at a luma component position (xCtb, yCtb). On the other hand, when alf_ctb_flag[cIdx][CtbAddrX][CtbAddrY] has a second value, adaptive in-loop filtering may be applied to the encoding tree block of a color component indicated by cIdx at a luma component position (xCtb, yCtb).

Meanwhile, when alf_ctb_flag[cIdx][CtbAddrX][CtbAddrY] is not present in a bitstream, alf_ctb_flag[cIdx][CtbAddrX][CtbAddrY] may be inferred as a first value.

As another example, a CTU may include a syntax element alf_use_aps_flag. alf_use_aps_flag may mean whether at least one of fixed filters is used in a luma component encoding tree block. For example, when alf_use_aps_flag has a first value, at least one of fixed filters may be used in a luma component encoding tree block. On the other hand, when alf_use_aps_flag has a second value, at least one piece of adaptive in-loop filter information may be used in a luma component encoding tree block.

Meanwhile, when alf_use_aps_flag is not present in a alf_use_aps_flag may be inferred as a first value bitstream, (e.g., 0).

As another example, a CTU may include a syntax element alf_luma_prev_filter_idx. alf_luma_prev_filter_idx may mean an index indicating which of adaptive in-loop filter information used in at least one picture/subpicture/slice/tile group among previous pictures is used. Alternatively, alf_luma_prev_filter_idx may indicate an index indicating which of previous filters is used for a current encoding tree block.

For example, alf_luma_prev_filter_idx may have a value from 0 to slice_num_alf_aps_ids_luma-N or pic_num_alf_aps_ids_luma-N. In this case, N may be a positive integer and may be, for example, 1.

Meanwhile, when alf_luma_prev_filter_idx is not present in a bitstream, alf_luma_prev_filter_idx may be inferred as a value of 0.

An adaptive in-loop filter index AlfCtbFilt Set IdxY [CtbAddrX][CtbAddrY] used in a luma component encoding tree block at a luma component position (xCtb, yCtb) may be derived based on alf_use_aps_flag. For example, when alf_use_aps_flag has a first value, AlfCtbFiltSetIdxY [CtbAddrX][CtbAddrY] may be determined as alf_luma_fixed_filter_idx. On the other hand, when alf_use_aps_flag has a second value, AlfCtbFiltSetIdxY[CtbAddrX][CtbAddrY] may be determined as 16+alf_luma_prev_filter_idx.

As another example, a CTU may include a syntax element alf_luma_fixed_filter_idx. alf_luma_fixed_filter_idx may indicate a fixed filter index used in a luma component encoding tree block. For example, alf_luma_fixed_filter_idx may have a value from 0 to N. In this case, N may be a positive integer and may be for example, 15.

Meanwhile, when the color component of a current block is Cb, N may be less than or equal to alf_cross_component_cb_filters_signalled_minus1. On the other hand, when the color component of the current block is Cr, N may be less than or equal to alf_cross_component_cr_filters_signalled_minus1.

Meanwhile, when alf_luma_fixed_filter_idx is not present in a bitstream, alf_luma_fixed_filter_idx may be inferred as a value of 0.

As another example, a CTU may include a syntax element alf_ctb_filter_alt_idx. alf_ctb_filter_alt_idx[chromaIdx][CtbAddrX][CtbAddrY] may indicate an index of a chroma component filter used in a current encoding tree block. In this case, when chromaIdx is 0, this may mean a Cb component and, when chromaIdx is 1, this may mean a Cr component. For example, alf_ctb_filter_alt_idx[chromaIdx][CtbAddrX][CtbAddrY] may have a value from 0 to N or alf_chroma_num_alt_filters_minus1. In this case, N may be a positive integer and may be, for example, 3.

Meanwhile, when alf_ctb_filter_alt_idx[chromaIdx][CtbAddrX][CtbAddrY] is not present in a bitstream, alf_ctb_filter_alt_idx[chromaIdx][CtbAddrX][CtbAddrY] may be inferred as a value of 0.

As another example, a CTU may include a syntax element alf_ctb_cross_component_cb_idc (or alf_ctb_cc_cb_idc). alf_ctb_cross_component_cb_idc[CtbAddrX CtbAddrY] may indicate whether a cross-component Cb filter is applied to a current encoding tree block. For example, when alf_ctb_cross_component_cb_idc[CtbAddrX][CtbAddrY] has a first value, a cross-component Cb filter may not be applied to the current encoding tree block. On the other hand, when alf_ctb_cross_component_cb_idc[CtbAddrX][CtbAddrY] does not have a first value, a cross-component Cb filter may be applied to the current encoding tree block.

When alf_ctb_cross_component_cb_idc[CtbAddrX][CtbAddrY] does not have a first value, cross-component Cb filtering may be performed using a filter index indicated by alf_ctb_cross_component_cb_idc[CtbAddrX][CtbAddrY].

As another example, a CTU may include a syntax element alf_ctb_cross_component_cr_idc (or alf_ctb_cc_cr_idc). alf_ctb_cross_component_cr_idc[CtbAddrX][CtbAddrY] may indicate whether a cross-component Cr filter is applied to a current encoding block. For example, when tree alf_ctb_cross_component_cr_idc[CtbAddrx][CtbAddrY] has a first value, the cross-component Cr filter may not be applied to the current encoding tree block. On the other hand, when alf_ctb_cross_component_cr_idc[CtbAddrX][CtbAddrY] does not have a first value, the cross-component Cr filter may be applied to the current encoding tree block. When alf_ctb_cross_component_cr_idc[CtbAddrX][CtbAddrY] does not have a first value, cross-component Cr filtering may be performed using a filter index indicated by alf_ctb_cross_component_cr_idc[CtbAddrX][CtbAddrY].

The adaptive in-loop filter according to some embodiments of the present disclosure may be defined using one or more adaptive in-loop filter coefficients. In addition, the type of the adaptive in-loop filter may mean a filter defined according to one or more adaptive in-loop filter coefficients or forms.

Hereinafter, a method of applying an adaptive in-loop filter (or an adaptive loop filter) according to some embodiments of the present disclosure will be described.

For example, input of an adaptive in-loop filter may be a reconstructed picture luma sample array recPicture_L before performing adaptive in-loop filtering. As another example, when ChromaArrayType does not have a first value, input of an adaptive in-loop filter may be reconstructed picture Cb sample array recPicture_Cb and Cr sample array recPicture_Cr before performing adaptive in-loop filtering.

For example, output of an adaptive in-loop filter may be a changed reconstructed picture luma sample array after performing adaptive in-loop filtering. As another example, when ChromaArrayType does not have a first value, output of an adaptive in-loop filter may be changed reconstructed picture Cb sample array alfPicture_Cb and Cr sample array alfPicture_Cr after performing adaptive in-loop filtering.

Next, an adaptive in-loop filter process will be described in detail.

First, alfPicture_L may be initialized to recPicture_L. When ChromaArrayType does not have a first value, alfPicture_Cb and alfPicture_Cr may be initialized to recPicture_Cb and recPicture_Cr before performing adaptive loop filter.

When pic_alf_enabled_flag or slice_alf_enabled_flag has a second value, the following process may be performed with respect to all encoding tree units at a luma encoding tree block position of (rx, ry). For example, rx may have a value from 0 to PicWidthInCtbs−1, and ry may have a value from 0 to PicHeight InCtbs−1.

For example, when alf_ctb_flag[0][rx][ry] has a second value, an encoding tree block filtering process for a luma component may be performed.

Input of the encoding tree block filtering process for the luma component may be recPicture_L, alfPicture_L, and a luma component encoding tree block position (xCtb, yCtb). In this case, the luma component encoding tree block position may be determined as (rx<<CtbLog2SizeY, ry<<CtbLog2SizeY).

Meanwhile, output of the encoding tree block filtering process for the luma component may be alfPicture_L.

As another example, when ChromaArrayType does not have a first value and alf_ctb_flag[1][rx][ry] has a second value, an encoding tree block filtering process for a Cb chroma component may be performed.

Input of the encoding tree block filtering process for the Cb chroma component may be recPicture_Cb, alfPicture_Cb, and a chroma component encoding tree block position (xCtbC, yCtbC). In this case, the chroma component encoding block position tree may be determined as ((rx<<CtbLog2SizeY)/SubWidthC, (ry<<CtbLog2SizeY)/SubHeightC).

Meanwhile, output of the encoding tree block filtering process for the Cb chroma component may be alfPicture_Cb.

As another example, when ChromaArrayType does not have a first value and alf_ctb_flag[2][rx][ry] has a second value, an encoding tree block filtering process for a Cr chroma component may be performed.

Input of the encoding tree block filtering process for the Cr chroma component may be recPicture_Cr, alfPicture_Cr, component encoding tree block position and a chroma (xCtbC, yCtbC). In this case, the chroma component encoding tree block position may be determined as ((rx<<CtbLog2SizeY)/SubWidthC, (ry<<CtbLog2SizeY)/SubHeightC).

As another example, when ChromaArrayType does not have a first value and alf_ctb_cross_component_cb_idc[rx][ry] does not have a first value, a cross-component filtering process for a Cb chroma component may be performed.

Input of the cross-component filtering process for the Cb chroma component may be recPicture_L, alfPicture_Cb, and a chroma component encoding tree block position (xCtbC, yCtbC). In this case, the chroma component encoding tree block position may be set to ((rx<<CtbLog2SizeY)/SubWidthC, (ry<<CtbLog2SizeY)/SubHeightC)). In addition, ccAlfWidth may be set to (1<<<<CtbLog2SizeY)/SubWidthC, and ccAlfHeight may be set to (1<<<<CtbLog2SizeY)/SubHeightC. In addition, a cross-component filter coefficient CcAlfCoeff[j] may be set to CcAlfCoeff_Cb [slice_cross_component_alf_cb_aps_id] [alf_ctb_c ross_component_cb_idc [rx][ry]−1][j].

Meanwhile, output of the cross-component filtering process for the Cb chroma component may be ccAlfPicture_Cb.

As another example, when ChromaArrayType does not have a first value and alf_ctb_cross_component_cr_idc [rx][ry] does not have a first value, a cross-component filtering process for a Cr chroma component may be performed.

Input of the cross-component filtering process for the Cr chroma component may be recPicture_L, alfPicture_Cr, and a chroma component encoding tree block position (xCtbC, yCtbC). In this case, the chroma component encoding tree block position may be set to ((rx<<CtbLog2SizeY)/SubWidthC, (ry<<CtbLog2SizeY)/SubHeightC)). In addition, ccAlfWidth may be set to (1<<<<CtbLog2SizeY)/SubWidthC, and ccAlfHeight may be set to (1<<<<CtbLog2SizeY)/SubHeightC. In addition, a cross-component filter coefficient CcAlfCoeff[j] may be set to CcAlfCoeff_Cr[slice_cross_component_alf_cr_aps_id] [alf_ctb_c ross_component_cr_idc [rx][ry]−1][j].

Meanwhile, output of the cross-component filtering process for the Cr chroma component may be ccAlfPicture_Cr.

The cross-component filtering process for the chroma component may mean that filtering is performed with respect to the chroma component in order to minimize distortion between a luma component and a chroma component. Meanwhile, the color component according to the present disclosure is not limited to the luma and chroma components. For example, filtering may be performed with respect to an R or B component, in order to minimize distortion between a G component and the R or B component. In addition, the filtering process according to the present disclosure is applicable to at least one of a diffused component image, a specular component image, a shading component image, a direct shading component image, an indirect shading component image, an albedo component image, a depth component image and a normal vector component image in the form of decomposition of various attributes of an image.

Hereinafter, the encoding tree block filtering process for the luma component will be described in detail.

For example, input of the encoding tree block filtering process for the luma component may be at least one of recPicture_L, alfPicture_L or a top left sample position (xCtb, yCtb) of a current luma component encoding tree block based on a top left sample of a current picture. Meanwhile, output of the encoding tree block filtering process for the luma component may be alfPicture_L.

First, a filter index derivation process may be performed.

For example, input of the filter index derivation process may be at least one of a top left sample position (xCtb, yCtb) of an encoding tree block or recPicture_L. Meanwhile, output of the filter index derivation process may be filtIdx [x][y] or transposeIdx[x][y]. In this case, x and y may have a value from 0 to CtbSizeY−1.

Next, each reconstructed luma component sample in a current luma component encoding tree block in recPicture_L [x][y] may be filtered as follows. In this case, x and y may have a value from 0 to CtbSizeY−1.

A luma component filter coefficient array f[j] and a luma component clipping value array c[j] for a filter indicated by filtIdx [x][y] may be derived as follows. In this case, j may have a value from 0 to N, and, for example, N may be 11.

For example, when AlfCtbFiltSetIdxY[CtbAddrX][CtbAddrY] has a value less than F, operation according to Equation 29 below may be performed. In this case, F may be a positive integer and may be, for example, 16. In addition, F may mean a maximum number of fixed filters used in an encoder/decoder. That is, F may be a value of a maximum value of alf_luma_fixed_filter_idx+1.

$i$=AlfCtbFiltSetIdxY[CtbAddrX][CtbAddrY]     [Equation 29]

$f[j]$=AlfFixFiltCoeff[AlfClassToFiltMap[$i$][fi ltIdx[$x$] [$y$]]][$j$]

$c[j]$=2^BitdepthY or $c[j]$=AlfClipL[$i$][filtIdx[$x$][$y$]][$j$]

where, assigning AlfClipL[i][filtIdx [x][y]][j] to c[j] may mean that a clipping method which is a non-linear adaptive in-loop filtering is used in a fixed filter.

On the other hand, when AlfCtbFiltSetIdxY[CtbAddrX] [CtbAddrY] is greater than or equal to F, operation according to Equation 30 below will be performed.

$i$=pic_alf_aps_id_luma[AlfCtbFiltSetIdxY[CtbAddrX][CtbAddrY]−F] or
$i$=slice_alf_aps_id_luma[AlfCtbFiltSetIdxY[CtbAddrX][CtbAd $drY$]−F]     [Equation 30]

$f[j]$=AlfCoeff_L[$i$][filtIdx[$x$][$y$]][$j$]

$c[j]$=AlfClip_L[$i$][filtIdx[$x$][$y$]][$j$]

Next, an index idx for a luma component filter coefficient and clipping value may be derived according to transposeIdx [x][y] as follows.

For example, when transposeIndex[x][y] has a second value, idx[ ] may be determined as {9, 4, 10, 8, 1, 5, 11, 7, 3, 0, 2, 6}.

As another example, when transposeIndex[x][y] has a third value, idx[ ] may be determined as {0, 3, 2, 1, 8, 7, 6, 5, 4, 9, 10, 11}.

As another example, when transposeIndex[x][y] has a fourth value, idx[ ] may be determined as {9, 8, 10, 4, 3, 7, 11, 5, 1, 0, 2, 6}.

As another example, when transposeIndex[x][y] has a value other than the second to fourth values, idx[ ] may be determined as {0, 1, 2, 3, 4, 5, 6, 7, 8, 9, 10, 11}.

Meanwhile, a position (h_(x+i), v_(y+j)) in recPicture for a corresponding luma component sample (x, y) may be derived according to Equation 31 below. In this case, i and j may have a value from −N to N. In addition, N may be a positive integer and may be, for example, 3. In addition, (N*2)+1 may mean the width or height of a luma component filter.

$h\_(x+i)$=Clip3(0,$pic$_width_in_luma_samples−1, xCtb+$x+i$))     [Equation 31]

$v\_(y+j)$=Clip3(0,$pic$_height_in_luma_samples−1, yCtb+$y+j$)

Next, whether to apply a virtual boundary for filtering may be determined. For example, a variable applyVirtualBoundary for whether to apply a virtual boundary may be derived as follows.

When at least one of the following conditions is true, applyVirtualBoundary may be set to 0.

For example, applyVirtualBoundary may be set to 0 when at least one of the case where a lower boundary of a current encoding tree block is a lower boundary of a picture, the case where a lower boundary of a current encoding tree block is a lower boundary of a slice and loop_filter_across_slices_enabled_flag has a first value, the case where a lower boundary of a current encoding tree block is a lower boundary of a tile and loop_filter_across_tiles_enabled_flag has a first value, the case where a lower boundary of a current encoding tree block is a lower boundary of a subpicture and loop_filter_across_subpictures_enabled_flag has a first value or the case where a lower boundary of the current encoding tree block is a lower virtual boundary of a picture and pps_loop_filter_across_virtual_boundaries_disabled_flag has a second value is satisfied.

In this case, loop_filter_across_slices_enabled_flag may mean whether filtering is capable of being performed using at least one of in-loop filtering methods beyond a slice boundary, that is, whether filtering is capable of being performed using at least one of the in-loop filtering methods at a slice boundary.

In addition, loop_filter_across_tiles_enabled_flag may mean whether filtering is capable of being performed using at least one of in-loop filtering methods beyond a tile boundary, that is, whether filtering is capable of being performed using at least one of the in-loop filtering methods at a tile boundary.

In addition, loop_filter_across_subpictures_enabled_flag may mean whether filtering is capable of being performed using at least one of in-loop filtering methods beyond a subpicture boundary, that is, whether filtering is capable of being performed using at least one of the in-loop filtering methods at a subpicture boundary.

Meanwhile, when at least one of the above-described conditions is not satisfied, applyVirtualBoundary may be set to 1.

Next, reconstructed sample offsets r1, r2, and r3 may be determined according to Table 4 below according to a vertical luma component sample position y and applyVirtualBoundary.

TABLE 4

| condition | r1 | r2 | r3 |
|---|---|---|---|
| (y == CtbSizeY-5 ‖ y == CtbSizeY-4) && (applyVirtualBoundary == 1) | 0 | 0 | 0 |
| (y == CtbSizeY-6 ‖ y == CtbSizeY-3) && (applyVirtualBoundary == 1) | 1 | 1 | 1 |
| (y == CtbSizeY-7 ‖ y == CtbSizeY-2) && (applyVirtualBoundary == 1) | 1 | 2 | 2 |
| Otherwise (the above conditions are not satisfied) | 1 | 2 | 3 |

Next, a sample value curr for a current sample position may be derived according to Equation 32 below.

$$\text{curr} = \text{recPicture}\_L[h\_x, v\_y] \quad \text{[Equation 32]}$$

Next, a value sum filtered on a current sample may be derived according to Equation 33 below.

$$\begin{aligned}\text{sum} = &f[idx[0]]*(Clip3(-c[idx[0]],c[idx[0]],recPicture_L[h_x,V_{y+r3}]-curr)+Clip3(-c[idx[0]],c[idx[0]],recPicture_L[h_x,V_{y-r3}]-curr))+f[idx[1]]*\\&(Clip3(-c[idx[1]],c[idx[1]],recPicture_L[h_{x+1},V_{y+r2}]-curr)+Clip3(-c[idx[1]],[idx[1]],recPicture_L[h_{x-1},V_{y-r2}]-curr)+f[idx[2]]*(Clip3(-c[idx[2]],c[idx[2]],recPicture_L[h_x,V_{y+r2}]-curr)+Clip3(-c[idx[2]],c[idx[2]],recPicture_L[h_x,V_{y-r2}]-curr))+f[idx[3]]*(Clip3(-c[idx[3]],c[idx[3]],recPicture_L[h_{x-1},V_{y+r2}]-curr)+Clip3(-c[idx[3]],c[idx[3]],recPicture_L[h_{x+1},V_{y-r2}]-curr))+f[idx[4]]*(Clip3(-c[idx[4]],c[idx[4]],recPicture_L[h_{x+2},V_{y+r1}]-curr)+Clip3(-c[idx[4]],c[idx[4]],recPicture_L[h_{x-2},V_{y-r1}]-curr))+f[idx[5]]*(Clip3(-c[idx[5]],c[idx[5]],recPicture_L[h_{x+1},V_{y+r1}]-curr)+Clip3(-c[idx[5]],c[idx[5]],recPicture_L[h_{x-1},V_{y-r1}]-curr))+f[idx[6]]*(Clip3(-c[idx[6]],c[idx[6]],recPicture_L[h_x,V_{y+r1}]-curr)+Clip3(-c[idx[6]],c[idx[6]],recPicture_L[h_x,V_{y-r1}]-curr))+f[idx[7]]*(Clip3(-c[idx[7]],c[idx[7]],recPicture_L[h_{x-1},V_{y+r1}]-curr)+Clip3(-c[idx[7]],c[idx[7]],recPicture_L[h_{x+1},V_{y-r1}]-curr))+f[idx[8]]*(Clip3(-c[idx[8]],c[idx[8]],recPicture_L[h_{x-2},V_{y+r1}]-curr)+Clip3(-c[idx[8]],c[idx[8]],recPicture_L[h_{x+2},V_{y-r1}]-curr))+f[idx[9]]*(Clip3(-c[idx[9]],c[idx[9]],recPicture_L[h_{x+3},V_y]-curr)+Clip3(-c[idx[9]],c[idx[9]],recPicture_L[h_{x-3},V_y]-curr))+f[idx[10]]*(Clip3(-c[idx[10]],c[idx[10]],recPicture_L[h_{x+2},V_y]-curr)+Clip3(-c[idx[10]],c[idx[10]],recPicture_L[h_{x-2},V_y]-curr))+f[idx[11]]*(Clip3(-c[idx[11]],c[idx[11]],recPicture_L[h_{x+1},V_y]-curr)+Clip3(-c[idx[11]],c[idx[11]],recPicture_L[h_{x-1},V_y]-curr)) \text{ sum}=\text{curr}+((\text{sum}+64)\gg7)\end{aligned}$$

[Equation 33]

Finally, alfPicture_L[xCtb+x][yCtb+y] may be derived as follows.

For example, when pcm_loop_filter_disabled_flag has a second value and pcm_flag[xCtb+x][yCtb+y] has a second value, operation according to Equation 34 below may be performed.

$$\text{alfPicture}\_L[xCtb+x][yCtb+y] = \text{recPicture}\_L[h\_x, v\_y] \quad \text{[Equation 34]}$$

On the other hand, when pcm_loop_filter_disabled_flag has a first value and pcm_flag[xCtb+x][yCtb+y] has a first value, operation according to Equation 35 below may be performed.

$$\text{alfPicture}\_L[xCtb+x][yCtb+y] = Clip3(0,(1\ll \text{BitDepthY})-1,\text{sum}) \quad \text{[Equation 35]}$$

Hereinafter, the above-described filter index derivation process will be described in detail.

For example, input of the filter index derivation process may be at least one of a top left sample position (xCtb, yCtb) of an encoding tree block or recPicture_L.

Meanwhile, output of the filter index derivation process may be at least one of a classification filter index array filtIdx[x][y] or a transpose index array transposeIdx[x][y]. In this case, x and y may have a value from 0 to CtbSizeY−1.

First, a position (h_(x+i), v_(y+j)) in recPicture for a corresponding luma component sample (x, y) may be derived according to Equations 36 to 39 below. In this case, i and j may have a value from −M to N. Here, M and N may be positive integers and, for example, M may be 2 and N may be 5. In addition, M+N+1 may mean a range (width and height) in which a sum of 1D Laplacian operation is calculated.

$$h\_(x+i) = Clip3(0, pic\_width\_in\_luma\_samples-1, xCtb+x+i) \quad \text{[Equation 36]}$$

When yCtb+CtbSizeY is greater than or equal to pic_height_in_luma_samples, operation according to Equation 37 below may be performed.

$$v\_(y+j) = Clip3(0, pic\_height\_in\_luma\_samples-1, yCtb+y+j) \quad \text{[Equation 37]}$$

When y is less than CtbSizeY−4, operation according to Equation 38 below may be performed.

$$v\_(y+j) = Clip3(0, yCtb+CtbSizeY-5, yCtb+y+j) \quad \text{[Equation 38]}$$

When at least one of the above conditions is not satisfied, operation according to Equation 39 below may be performed.

$$v\_(y+j) = Clip3(yCtb+CtbSizeY-4, pic\_height\_in\_luma\_samples-1, yCtb+y+j) \quad \text{[Equation 39]}$$

Next, a classification filter index array filtIdx and a transpose index array transposeIdx may be derived.

First, filtH[x][y], filtV[x][y], filtD0[x][y] and filtD1[x][y] may be derived according to the following operation. In this case, x and y may have values from −2 to CtbSizeY+1. When both x and y are even numbers or odd numbers, operation according to Equation 40 below.

$$\begin{aligned}&filtH[x][y]=Abs((recPicture[h_x,v_y]\ll1)-recPicture[h_{x-1},v_y]-recPicture[h_{x+1},v_y])\ filtV[x][y]=Abs((recPicture[h_x,v_y]\ll1)-recPicture[h_x,V_{y-1}]-recPicture[h_x,v_{y+1}])\ filtD0[x][y]=Abs((recPicture[h_x,v_y]\ll1)-recPicture[h_{x-1},v_{y-1}]-recPicture[h_{x+1},v_{y+1}])\ filtD1[x][y]=Abs((recPicture[h_x,v_y]\ll1)-recPicture[h_{x-1},V_{y-1}]-recPicture[h_{x-1},v_{y+1}])\end{aligned}$$

[Equation 40]

Meanwhile, when the above condition (both x and y are even numbers or odd numbers) is not satisfied, filtH[x][y], filtV[x][y], filtD0[x][y] and filtD1[x][y] may be set to 0.

Next, minY, maxY and ac may be derived.

First, when (y≪2) is equal to (CtbSizeY−8) and (yCtb+CtbSizeY) is less than pic_height_in_luma_samples−1, the following operation may be performed.

minY may be set to −M. In this case, M may be a positive integer and may be, for example, 2. maxY may be set to N. In this case, N may be a positive integer and may be, for example, 3. ac may be set to 96.

In this case, M+N+1 may mean a range (height) in which a sum of 1D Laplacian operation is calculated.

When minY is −2 and maxY is 3, the range in which the sum of 1D Laplacian operation is calculated is smaller than when minY is −2 and maxY is 5. Therefore, it is necessary to adjust an ac value, such that a value of avgVar[x][y] is calculated as a value from 0 to 15. Accordingly, in this case, ac may be set to a value between 64 and 96, and, for example, ac may be 85 or 86.

That is, when minY is −2 and maxY is 3, the range (width×height) in which the sum of 1D Laplacian operation is calculated is 8×6 and, when minY is −2 and maxY is 5, the range (width×height) in which the sum of 1D Laplacian operation is calculated is 8×8. Therefore, it is necessary to multiply, by 4/3, 64 which is ac used when the range (width×height) in which the sum of 1D Laplacian operation is calculated is 8×8. When 64 is multiplied by 4/3, a value of 85.33 is output and thus an ac value may be set to 85 or 86.

Next, when (y<<2) is equal to (CtbSizeY−4) and (yCtb+CtbSizeY) is less than pic_height_in_luma_samples−1, the following operation may be performed.

minY may be set to M. In this case, M may be a positive integer and may be, for example, 0. maxY may be set to N. In this case, N may be a positive integer and may be, for example, 5. ac may be set to 96.

Here, M+N+1 may mean a range (height) in which the sum of 1D Laplacian operation is calculated.

When minY is 0 and maxY is 5, the range in which the sum of 1D Laplacian operation is calculated is smaller than when minY is −2 and maxY is 5. Therefore, it is necessary to adjust an ac value, such that a value of avgVar[x][y] is calculated as a value from 0 to 15. Accordingly, in this case, ac may be set to a value between 64 and 96, and, for example, ac may be 85 or 86.

That is, when minY is 0 and maxY is 5, the range (width×height) in which the sum of 1D Laplacian operation is calculated is 8×6 and, when minY is −2 and maxY is 5, the range (width×height) in which the sum of 1D Laplacian operation is calculated is 8×8. Therefore, it is necessary to multiply, by 4/3, 64 which is ac used when the range (width×height) in which the sum of 1D Laplacian operation is calculated is 8×8. When 64 is multiplied by 4/3, a value of 85.33 is output and thus an ac value may be set to 85 or 86.

When the above conditions are not satisfied, the following operation may be performed.

minY may be set to −M. In this case, M may be a positive integer and may be, for example, 2. maxY may be set to N. In this case, N may be a positive integer and may be, for example, 5. ac may be set to 64.

Here, M+N+1 may mean a range (height) in which the sum of 1D Laplacian operation is calculated.

Next, sumH[x][y], sumV[x][y], sumD0[x][y], sumD1 [x][y] and sumOfHV[x][y] may be derived.

For example, sumH[x][y], sumV[x][y], sumD0[x][y], sumD1[x][y] and sumOfHV[x][y] may be derived according to Equation 41 below. In this case, x and y may have values from 0 to (CtbSizeY−1)>>2.

$$\text{sumH}[x][y]=\Sigma_i\Sigma_j\text{filtH}[h_{(x<<2)+i}-\text{xCtb}][V_{(y<<2)+j}-\text{yCtb}]\text{sumV}[x][y]=\Sigma_i\Sigma_j\text{filtV}[h_{(x<<2)+i}-\text{xCtb}][V_{(y<<2)+j}-\text{yCtb}]\text{sumD0}[x][y]=\Sigma_i\Sigma_j\text{filtD0}[h_{(x<<2)+i}-\text{xCtb}][V_{(y<<2)+j}-\text{yCtb}]\text{sumD1}[x][y]=\Sigma_i\Sigma_j\text{filtD1}[h_{(x<<2)+i}-\text{xCtb}][V_{(y<<2)+j}-\text{yCtb}]\text{sumOfHV}[x][y]=\text{sumH}[x][y]+\text{sumV}[x][y]$$
[Equation 41]

In this case, i may have a value from −2 to 5, and j may have a value from minY to maxY.

Next, dir1[x][y], dir2[x][y] and dirS[x][y] may be derived. In this case, x and y may have values from 0 to CtbSizeY−1.

First, hv1, hv0 and dirHV may be derived as follows.

For example, when sumV[x>>2][y>>2] is greater than sumH[x>>2][y>>2], operation according to Equation 42 below may be performed.

$$hv1=\text{sumV}[x>>2][y>>2]hv0=\text{sumH}[x>>2][y>>2]\\\text{dirHV}=1$$
[Equation 42]

On the other hand, when sumV[x>>2][y>>2] is not greater than sumH[x>>2][y>>2], operation according to Equation 43 below may be performed.

$$hv1=\text{sumH}[x>>2][y>>2]hv0=\text{sumV}[x>>2][y>>2]\\\text{dirHV}=3$$
[Equation 43]

Next, d1, d0 and dirD may be derived as follows.

For example, when sumD0[x>>2][y>>2] is greater than sumD1[x>>2][y>>2], operation according to Equation 44 below may be performed.

$$d1=\text{sumD0}[x>>2][y>>2]d0=\text{sumD1}[x>>2][y>>2]\\\text{dirD}=0$$
[Equation 44]

On the other hand, when sumD0[x>>2][y>>2] is not greater than sumD1[x>>2][y>>2], operation according to Equation 45 below may be performed.

$$d1=\text{sumD1}[x>>2][y>>2]d0=\text{sumD0}[x>>2][y>>2]\\\text{dirD}=2$$
[Equation 45]

Next, Hvd1 and hvd0 may be derived according to Equation 45 below.

$$hvd1=(d1*hv0>hv1*d0)?d1:hv1hvd0=\\(d1*hv0>hv1*d0)?d0:hv0$$
[Equation 46]

Next, dirS[x][y], dir1[x][y] and dir2[x][y] may be derived according to Equation 47 below.

$$dir1[x][y]=(d1*hv0>hv1*d0)?\text{dirD}:\text{dirHV }dir2[x][y]=\\(d1*hv0>hv1*d0)?\text{dirHV}:\text{dirD dirS}[x][y]=\\(hvd1*2>9*hvd0)?2:((hvd1>2*hvd0)?1:0)$$
[Equation 47]

Next, avgVar[x][y] may be derived according to Equation 47 below. In this case, x and y may have values from 0 to CtbSizeY−1.

$$\text{varTab}[\ ]=\{0, 1, 2, 2, 2, 2, 2, 3, 3, 3, 3, 3, 3, 3, 3,\\4\}\text{avgVar}[x][y]=\text{varTab}[\text{Clip3}(0,15,(\text{sumOfHV}\\[x>>2][y>>2]*ac)>>(3+\text{BitDepthY}))]$$
[Equation 48]

Finally, a classification filter index array filtIdx[x][y] and a transpose index array transposeIdx[x][y] may be derived according to Equation 49 below. In this case, x and y may have values from 0 to CtbSizeY−1.

$$\text{transposeTable}[\ ]=\{0, 1, 0, 2, 2, 3, 1, 3\}$$
[Equation 49]

$$\text{transposeIdx}[x][y]=\text{transposeTable}[dir1[x][y]*2+(dir2\\{}[x][y]>>1)]$$

$$\text{filtIdx}[x][y]=\text{avgVar}[x][y]$$

Meanwhile, when dirS[x][y] does not have a first value, filtIdx[x][y] may be changed according to Equation 50 below.

$$\text{filtIdx}[x][y]+=(((dir1[x][y]\&\ 0\times 1)<<1)+\text{dirS}[x][y])*5$$ [Equation 50]

Hereinafter, an encoding tree block filtering (adaptive loop filter) process for a chroma component according to an embodiment of the present disclosure will be described.

For example, input of the encoding tree block filtering process for the chroma component may be at least one of recPicture, alfPicture or a top left sample position (xCtb, yCtb) of an encoding tree block.

Meanwhile, output of the encoding tree block filtering process for the chroma component may be alfPicture.

First, the width ctbWidthC and height ctbHeightC of a current chroma component encoding tree block may be derived according to Equation 51 below.

$$\text{ctbWidthC}=\text{CtbSizeY}/\text{SubWidthC}\\\text{ctbHeightC}=\text{CtbSizeY}/\text{SubHeightC}$$
[Equation 51]

Next, each reconstructed chroma sample in the current chroma component encoding tree block in recPicture[x][y]

may be filtered as follows. In this case, x may have a value from 0 to ctbWidthC−1. In addition, y may have a value from 0 to ctbHeightC−1.

A position (h_(x+i), v_(y+j)) in recPicture for each corresponding chroma component sample (x, y) may be derived according to Equation 52 below. In this case, i and j may have values from −N to N. In addition, N may be a positive integer and may be, for example, 2. In addition, (N*2)+1 may mean the width or height of a chroma component filter.

$h\_(x+i)$=Clip3(0,pic_width_in_luma_samples/SubWidthC−1,xCtbC+x+i)  [Equation 52]

$V\_(y+j)$=Clip3(0,pic_height_in_luma_samples/SubHeightC−1,yCtbC+y+j)

Next, whether to apply a virtual boundary for filtering may be determined. For example, a variable applyVirtualBoundary for whether to apply the virtual boundary may be derived as follows.

When at least one of the following conditions is true, applyVirtualBoundary may be set to 0.

For example, applyVirtualBoundary may be set to 0 when at least one of the case where a lower boundary of a current encoding tree block is a lower boundary of a picture, the case where a lower boundary of a current encoding tree block is a lower boundary of a slice and loop_filter_across_slices_enabled_flag has a first value, the case where a lower boundary of a current encoding tree block is a lower boundary of a tile and loop_filter_across_tiles_enabled_flag has a first value, the case where a lower boundary of a current encoding tree block is a lower boundary of a subpicture and loop_filter_across_subpictures_enabled_flag has a first value, and the case where the lower boundary of the current encoding tree block is a lower virtual boundary of a picture and pps_loop_filter_across_virtual_boundaries_disabled_flag has a second value is satisfied.

In this case, loop_filter_across_slices_enabled_flag may mean whether filtering is capable of being performed using at least one of in-loop filtering methods beyond a slice boundary, that is, whether filtering is capable of being performed using at least one of the in-loop filtering methods at a slice boundary.

In addition, loop_filter_across_tiles_enabled_flag may mean whether filtering is capable of being performed using at least one of in-loop filtering methods beyond a tile boundary, that is, whether filtering is capable of being performed using at least one of the in-loop filtering methods at a tile boundary.

In addition, loop_filter_across_subpictures_enabled_flag may mean whether filtering is capable of being performed using at least one of in-loop filtering methods beyond a subpicture boundary, that is, whether filtering is capable of being performed using at least one of the in-loop filtering methods at a subpicture boundary.

Meanwhile, when at least one of the above-described conditions is not satisfied, applyVirtualBoundary may be set to 1.

Next, reconstructed sample offsets r1 and r2 may be determined according to Table 5 below according to a vertical luma component sample position y and applyVirtualBoundary.

TABLE 5

| condition | r1 | r2 |
|---|---|---|
| (y == ctbHeightC-2 \|\| y == cbHeightC-3) && (applyVirtualBoundary == 1) | 0 | 0 |

TABLE 5-continued

| condition | r1 | r2 |
|---|---|---|
| (y == ctbHeightC-1 \|\| y == cbHeightC-4) && (applyVirtualBoundary == 1) | 1 | 1 |
| Otherwise (the above conditions are not satisfied) | 1 | 2 |

Next, a sample value curr for a current sample position may be derived according to Equation 53 below.

curr=recPicture[$h\_x,v\_y$]  [Equation 53]

Next, a chroma component filter coefficient array f[j] and a chroma component clipping value array c[j] may be derived according to Equation 54 below. In this case, j may have a value from 0 to N and may be, for example, 5.

$f[j]$=AlfCoeff_C[pic_alf_aps_id_chroma][j] or
$f[j]$=AlfCoeff_C[slice_alf_aps_id_chroma][j]
$c[j]$=AlfClip_C[pic_alf_aps_id_chroma][j] or
$c[j]$=AlfClip_C[slice_alf_aps_id_chroma][j]  [Equation 54]

Next, a value sum filtered on a current sample may be derived according to Equation 55 below.

sum=$f[0]$*(Clip3(−c[0],c[0],recPicture$_L$[h$_x$,V$_{y+r2}$]−curr)+Clip3(−c[0],c[0],recPicture$_L$[h$_x$,V$_{y-r2}$]−curr))+$f[1]$*(Clip3(−c[1],c[1],recPicture$_L$[h$_{x+1}$,V$_{y+r1}$]−curr)+Clip3(−c[1],c[1],recPicture$_L$[h$_{x-1}$,V$_{y-r1}$]−curr))+$f[2]$*(Clip3(−c[2],c[2],recPicture$_L$[h$_x$,V$_{y+1}$]−curr)+Clip3(−c[2],c[2],recPicture$_L$[h$_x$,V$_{y-r1}$]−curr))+$f[3]$*(Clip3(−c[3],c[3],recPicture$_L$[h$_{x-1}$,V$_{y+r1}$]−curr)+Clip3(−c[3],c[3],recPicture$_L$[h$_{x+1}$,V$_{y-r1}$]−curr))+$f[4]$*(Clip3(−c[4],c[4],recPicture$_L$[h$_{x+2}$,V$_y$]−curr)+Clip3(−c[4],c[4],recPicture$_L$[h$_{x-2}$,V$_y$]−curr))+$f[5]$*(Clip3(−c[5],c[5],recPicture$_L$[h$_{x+1}$,V$_y$]−curr)+Clip3(−c[5],c[5],recPicture$_L$[h$_{x-1}$,V$_y$]−curr) sum=curr+(sum+64)»7)  [Equation 55]

Finally, alfPicture[xCtbC+x][yCtbC+y] may be derived as follows.

For example, when pcm_loop_filter_disabled_flag has a second value and pcm_flag[(xCtbC+x)*SubWidthC][(yCtbC+y)*SubHeigh tC] has a second value, operation according to Equation 56 below may be performed.

alfPicture[xCtbC+$x$][yCtbC+$y$]=recPicture[$h\_x,v\_y$]  [Equation 56]

On the other hand, when pcm_loop_filter_disabled_flag has a first value and pcm_flag[(xCtbC+x)*SubWidthC][(yCtbC+y)*SubHeigh tC] has a first value, operation according to Equation 57 below may be performed.

alfPicture[xCtbC+$x$][yCtbC+$y$]=Clip3(0,(1 «BitDepthC)−1,sum)  [Equation 57]

Hereinafter, a cross-component adaptive loop filter method according to an embodiment of the present disclosure will be described.

For example, input of a cross-component in-loop filtering process for a chroma component may be at least one of recPicture_L, a chroma sample array alfPicture_C, to which an adaptive in-loop filter is applied, a top left sample position (xCtbC, yCtbC) of a current chroma component encoding tree block based on a top left sample of a current picture, the width ccAlfWidth of a chroma block, the height ccAlfHeight of the chroma block or a cross-component filter coefficient CcAlfCoeff[j].

Meanwhile, output of the cross-component in-loop filtering process for the chroma component may be a changed and filtered reconstructed chroma component sample array ccAlfPicture.

First, a position (xCtb, yCtb) of a current chroma component encoding tree block may be derived according to Equation 58 below.

$$xCtb=(((xCtbC*SubWidthC)>>Ctb\ Log2SizeY)<<Ctb\ Log2SizeY)\ yCtb=(((yCtbC*SubHeightC)>>Ctb\ Log2SizeY)<<Ctb\ Log2SizeY \quad \text{[Equation 58]}$$

Next, each reconstructed chroma sample alfPicture_C[xCtbC+x][yCtbC+y] in a current chroma block may be filtered as follows. In this case, x may have a value from 0 to ccAlfWidth−1. In addition, y may have a value from 0 to ccAlfHeight−1.

A luma position (xL, yL) corresponding to a current chroma sample position (xCtbC+x, yCtbC+y) may be set to (xCtbC+x)*SubWidthC, (yCtbC+y)*SubHeightC).

Variables clipLeftPos, clipRightPos, clipTopPos and clipBottomPos may be calculated from an ALF boundary position derivation process.

For example, vertical sample position offsets yM1, yP1 and yP2 may be derived based on Table 6 below according to a vertical luma sample position yL, clipLeftPos and clipRightPos. In addition, horizontal sample position offsets xM1 and xP1 may be derived based on Table 7 below according to a horizontal luma sample position xL, clipLeftPos and clipRightPos.

TABLE 6

| condition | yM1 | yP1 | yP2 |
|---|---|---|---|
| yL == clipTopPos + 1 | −1 | 1 | 1 |
| yL == clipTopPos | 0 | 0 | 1 |
| yL == clipBottomPos − 1 | 0 | 0 | 1 |
| yL == clipBottomPos − 2 | −1 | 1 | 1 |
| Otherwise | −1 | 1 | 2 |

TABLE 7

| condition | xM1 | xP1 |
|---|---|---|
| xL == clipLeftPos | 0 | 0 |
| xL == clipRightPos − 1 | 0 | 0 |
| xL == clipRightPos − 2 | −1 | 1 |
| Otherwise | −1 | 1 |

Next, a sample value curr for a current sample position may be derived according to Equation 59 below.

$$curr=alfPicture\_C[xCtbC+x,yCtbC+y] \quad \text{[Equation 59]}$$

Next, a cross-component filter coefficient array f[j] may be derived according to Equation 60 below. In this case, j may have a value from 0 to N, and, for example, N may be a positive integer and may be 7. As another example, in order to reduce computational complexity, the number of multipliers may be reduced by setting N to a number less than 7.

$$f[j]=CcAlfCoeff[j] \quad \text{[Equation 60]}$$

Next, a value sum filtered on a current sample may be derived according to Equation 61 below.

$$sum=f[0]*recPicture_L[h_x,V_{y+yM1}]+f[1]*recPicture_L[h_{x+xM1},V_y]+f[2]*recPicture_L[h_x,V_y]+f[3]*recPicture_L[h_{x+xP1},V_y]+f[4]*recPicture_L[h_{x+xM1},V_{y+yP1}]+f[5]*recPicture_L[h_x,V_{y+yP1}]+f[6]*recPicture_L[h_{x+xP1},V_{y+yP1}]+f[7]*recPicture_L[h_x,V_{y+yP2}]\ sum=Clip3(-(1<<(BitDepth_C-1)),(1<<(BitDepth_C-1))-1,sum)\ sum=curr+(sum+64)>>(7+(BitDepth_Y-BitDepth_C)) \quad \text{[Equation 61]}$$

Finally, ccAlfPicture[xCtbC+x][yCtbC+y] may be derived according to Equation 62 below.

$$ccAlfPicture[xCtbC+x][yCtbC+y]=Clip3(0,(1<<BitDepthC)-1,sum) \quad \text{[Equation 62]}$$

In filtering according to the present disclosure, at least one of the example of the above-described filter (3×4 diamond filter) and the other types of filters may be used. Meanwhile, in some embodiments of the present disclosure, when filtering is performed, in order to perform shift operation instead of a multiplication operation, the absolute value of the cross-component filter coefficient may be limited to a square of 2.

Exponential-Golomb code used in alf_luma_clip_idx[sfIdx][j] may be an efficient entropy encoding/decoding method when the range of a value of a corresponding syntax element is large. However, as described above, when the range of a value of alf_luma_clip_idx[sfIdx][j] is relatively small (e.g., 0 to 3), exponential-Golomb code may be inefficient in terms of entropy encoding/decoding.

Accordingly, instead of using at least one syntax element between alf_luma_clip_min_eg_order_minus1 and alf_luma_clip_eg_order_increase_flag[i], alf_luma_clip_idx[sfIdx][j] may be entropy-encoded/decoded using at least one entropy encoding/decoding method among tu(3), f(2), u(2) and tb(3).

Exponential-Golomb code used in alf_chroma_clip_idx[sfIdx][j] may be an efficient entropy encoding/decoding method when the range of the value of the corresponding syntax element is large. However, as described above, the range of the value of alf_chroma_clip_idx[sfIdx][j] is relatively small (e.g., 0 to 3), exponential-Golomb code may be inefficient in terms of entropy encoding/decoding.

Accordingly, instead of using at least one syntax element between alf_chroma_clip_min_eg_order_minus1 and alf_chroma_clip_eg_order_increase_flag[i], alf_chroma_clip_idx[sfIdx][j] may be entropy-encoded/decoded using at least one entropy encoding/decoding method among tu(3), f(2), u(2) and tb(3).

FIGS. 49 and 50 are other views illustrating ALF data according to another embodiment of the present disclosure.

As shown in FIGS. 49 and 50, alf_luma_clip_idx[sfIdx][j] and alf_chroma_clip_idx[j] may be entropy-encoded/decoded using a u(2) entropy encoding/decoding method. In this case, the maximum value of u(2) may be N. In this case, N may be a positive integer and may be, for example, 3. In addition, u(2) may have the same meaning as f(2).

FIGS. 51 and 52 are other views illustrating ALF data according to another embodiment of the present disclosure.

As shown in FIGS. 51 and 52 alf_luma_clip_idx[sfIdx][j] and alf_chroma_clip_idx[j] may be entropy-encoded/decoded a using tu(v) entropy encoding/decoding method. In this case, the maximum value maxVal of tu(v) may be N. In this case, N may be a positive integer and may be, for example, 3. In addition, when the maximum value of tu(v) is 3, tu(v) may have the same meaning as tu(3).

When the embodiments of FIGS. 49 to 52 are applied, since alf_luma_clip_idx[sfIdx][j] and alf_chroma_clip_idx[j] may be entropy-encoded/decoded without using semantics of syntax elements alf_luma_clip_min_eg_order_minus1, alf_luma_clip_eg_order_increase_flag[i], alf_chroma_clip_min_eg_order_minus1, and alf_chroma_clip_eg_order_increase_flag[i] and syntax elements alf_luma_clip_min_eg_order_minus1, alf_luma_clip_eg_order_increase_flag[i], alf_chroma_clip_min_eg_order_minus1, and alf_chroma_clip_eg_order_increase_flag[i], implementation complexity of an encoder/decoder necessary to entropy-encode/decode alf_luma_clip_idx[sfIdx][j] and alf_chroma_clip_idx[j] may be reduced.

In addition, since an encoding/decoding process necessary to derive the order kClipY[i] of exponential-Golomb code, the order kClipC[i] of exponential-Golomb code and the order k of exponential-Golomb code (binarization) is not performed, implementation complexity of an encoder/decoder necessary to entropy-encode/decode alf_luma_clip_idx[sfIdx][j] and alf_chroma_clip_idx[j] may be reduced.

When the embodiments according to FIGS. 49 to 52 are applied, since alf_luma_clip_idx[sfIdx][j] and alf_chroma_clip_idx[j] may be entropy-encoded/decoded with fewer bit than when alf_luma_clip_idx[sfIdx][j] and alf_chroma_clip_idx[j] are entropy-encoded/decoded using exponential-Golomb code, encoding efficiency of an image encoder/decoder may be improved.

Meanwhile, entropy encoding for tu(v) and acquisition of codeNum meaning the value of the syntax element may be performed according to Table 8 below. Here, entropy encoding may mean parsing. The range of a value for tu(v) may be determined to be from 0 to a maximum value maxVal. In this case, the maximum value may be a positive integer and may be, for example, greater than or equal to 1.

TABLE 8

```
codeNum = 0
keepGoing = 1
for(i = 0; i < maxVal && keepGoing; i++){|
   keepGoing = read_bits( 1 )
   if( keepGoing )
      codeNum ++
}
```

In the embodiments of the present invention, altIdx and sfIdx may have the same meaning.

At least one of the embodiments of the present invention is applicable to not only at least one of a luma image or a chroma image but also to at least one of a diffused component image, a specular component image, a shading component image, a direct shading component image, an indirect shading component image, an albedo component image, a depth component image and a normal vector component image in the form of decomposition of various attributes of an image, thereby removing redundancy between images and improving image encoding efficiency.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

At least one of syntax elements (flags, indices, etc.) entropy-coded by the encoder and entropy-decoded by the decoder may use at least one of the following binarization/debinarization methods and entropy-coding/decoding methods.

Signed 0-th binarization/debinarization method (se(v)) order Exp_Golomb

Signed k-th order Exp_Golomb binarization/debinarization method (sek(v))

Unsigned 0-th order Exp_Golomb binarization/debinarization method (ue(v))

Unsigned k-th order Exp_Golomb binarization/debinarization method (uek(v))

Fixed-length binarization/debinarization method (f(n))

Truncated Rice binarization/debinarization method or Truncated Unary binarization/debinarization method (tu (v))

Truncated binary binarization/debinarization method (tb (v))

Context-adaptive arithmetic encoding/decoding method (ae(v))

Byte-unit bit string (b(8))

Signed integer binarization/debinarization method (i(n))

Unsigned integer binarization/debinarization method (u(n))

Unary binarization/debinarization method

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a medium. The computer-readable computer-readable recording recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. An image decoding method comprising:
acquiring a reconstructed chroma block of a current block;
determining whether an adaptive loop filter is enabled for a chroma component; and
acquiring, in response to the adaptive loop filter being enabled for the chroma component, a final reconstructed chroma block of the current block by applying the adaptive loop filter to the reconstructed chroma block,
wherein whether the adaptive loop filter is enabled for the chroma component is determined based on a first flag indicating whether the adaptive loop filter is enabled for the chroma component,
wherein the first flag is signaled from a picture header,
wherein a type of the adaptive loop filter for the chroma component is determined based on a second flag indicating whether a linear adaptive loop filter is applied to the chroma component or a non-linear adaptive loop filter is applied to the chroma component, and
wherein the type of the adaptive loop filter includes the linear adaptive loop filter and the non-linear adaptive loop filter.

2. The image decoding method of claim 1, further comprising:
acquiring a reconstructed luma block of the current block; and
determining whether a cross-component adaptive loop filter is applied to the current block,
wherein the determining of whether the cross-component adaptive loop filter is applied to the current block comprises acquiring information indicating whether the cross-component adaptive loop filter is applicable to the current block, and
wherein the information indicating whether the cross-component adaptive loop filter is applicable is signaled through a sequence parameter set.

3. The image decoding method of claim 2, further comprising, when the cross-component adaptive loop filter is applicable to the current block, acquiring information indicating whether a cross-component adaptive loop filter is applied to a Cb component of the current block.

4. The image decoding method of claim 3, wherein the information indicating whether a cross-component adaptive loop filter is applied to the Cb component is signaled through a picture header.

5. The image decoding method of claim 3, further comprising acquiring an adaptive parameter set indicator referred to by the Cb component, when the cross-component adaptive loop filter is applied to the Cb component.

6. The image decoding method of claim 2, further comprising, when the cross-component adaptive loop filter is applicable to the current block, acquiring information indicating whether a cross-component adaptive loop filter is applied to a Cr component of the current block.

7. The image decoding method of claim 6, wherein the information indicating whether the cross-component adaptive loop filter is applied to the Cr component is signaled through a picture header.

8. The image decoding method of claim 6, further comprising, when the cross-component adaptive loop filter is applicable to the Cr component, acquiring an adaptive parameter set indicator referred to by the Cr component.

9. The image decoding method of claim 2, wherein, when information indicating whether the cross-component adaptive loop filter is applicable is not signaled, it is determined that the cross-component adaptive loop filter is not applicable to the current block.

10. The image decoding method of claim 1, wherein the second flag indicating whether the linear adaptive loop filter is applied to the chroma component or the non-linear adaptive loop filter is applied to the chroma component is a single syntax element.

11. An image encoding method comprising:
acquiring a reconstructed chroma block of a current block;

determining whether an adaptive loop filter is enabled for a chroma component; and acquiring, in response to the adaptive loop filter being enabled for the chroma component, a final reconstructed chroma block of the current block, by applying the adaptive loop filter to the reconstructed chroma block, wherein a first flag is encoded based on whether the adaptive loop filter is enabled for the chroma component, the first flag indicating whether the adaptive loop filter is enabled for the chroma component, wherein the first flag is encoded into a picture header, wherein a second flag is encoded based on a type of the adaptive loop filter for the chroma component, the second flag indicating whether a linear adaptive loop filter is applied to the chroma component or a non-linear adaptive loop filter is applied to the chroma component, and wherein the type of the adaptive loop filter includes the linear adaptive loop filter and the non-linear adaptive loop filter.

12. A non-transitory computer-readable medium storing a bitstream generated by an image encoding method, the image encoding method comprising:

acquiring a reconstructed chroma block of a current block;

determining whether an adaptive loop filter is enabled for a chroma component; and acquiring, in response to the adaptive loop filter being enabled for the chroma component, a final reconstructed chroma block of the current block, by applying the adaptive loop filter to the reconstructed chroma block, wherein a first flag is encoded based on whether the adaptive loop filter is enabled for the chroma component, the first flag indicating whether the adaptive loop filter is enabled for the chroma component, wherein the first flag is encoded into a picture header of the bitstream, wherein a second flag is encoded based on a type of the adaptive loop filter for the chroma component, the second flag indicating whether a linear adaptive loop filter is applied to the chroma component or a non-linear adaptive loop filter is applied to the chroma component, and wherein the type of the adaptive loop filter includes the linear adaptive loop filter and the non-linear adaptive loop filter.

* * * * *